United States Patent [19]
Behr et al.

[11] Patent Number: 5,808,566
[45] Date of Patent: Sep. 15, 1998

[54] ELECTRONIC NAVIGATION SYSTEM AND METHOD

[75] Inventors: David A. Behr, Roselle; Ramesh Ramakrishnan, Mount Prospect, both of Ill.

[73] Assignee: Navigation Technologies Corporation, Rosemont, Ill.

[21] Appl. No.: 494,198

[22] Filed: Jun. 23, 1995

Related U.S. Application Data

[63] Continuation-in-part of Ser. No. 265,094, Jun. 24, 1994, Pat. No. 5,543,789.

[51] Int. Cl.$^6$ .................................................. G08G 1/123
[52] U.S. Cl. ........................ 340/995; 340/988; 701/208; 701/211
[58] Field of Search .................................. 340/988, 990, 340/995, 991; 364/444, 449; 701/200, 208, 209, 211

[56] References Cited

U.S. PATENT DOCUMENTS

| | | | |
|---|---|---|---|
| 4,301,506 | 11/1981 | Turco | 364/436 |
| 4,311,876 | 1/1982 | Endo et al. | 455/54.1 |
| 4,428,057 | 1/1984 | Setliff et al. | 364/521 |
| 4,466,125 | 8/1984 | Kanayama | 340/990 |
| 4,481,584 | 11/1984 | Holland | 364/424 |
| 4,546,439 | 10/1985 | Esparza | 364/444 |
| 4,570,227 | 2/1986 | Tachi et al. | 364/444 |
| 4,642,775 | 2/1987 | Cline et al. | 364/443 |
| 4,733,356 | 3/1988 | Haeussermann et al. | 364/424 |
| 4,758,959 | 7/1988 | Thoone et al. | 364/454 |
| 4,780,717 | 10/1988 | Takanabe et al. | 340/995 |
| 4,812,843 | 3/1989 | Champion, III et al. | 340/905 |
| 4,951,212 | 8/1990 | Kurihara et al. | 340/995 |
| 4,954,958 | 9/1990 | Savage et al. | 364/444 |
| 5,043,902 | 8/1991 | Yokoyama et al. | 340/988 |
| 5,172,321 | 12/1992 | Ghaem et al. | 364/444 |

(List continued on next page.)

FOREIGN PATENT DOCUMENTS

| | | |
|---|---|---|
| 0 379 198 A3 | 7/1990 | European Pat. Off. . |
| 3150699 | 6/1991 | Japan . |
| WO 92/14215 | 8/1992 | WIPO . |
| WO 92/21001 | 11/1992 | WIPO . |

OTHER PUBLICATIONS

Hoffman, Steve and Stewart, Charles, "Text–based Routing: An Affordable Way Ahead?", Proceedings of the IEEE–IEE Vehicle Navigation & Information System Conference, Ottawa, Canada –VNIS 1993.

PCT –Notification of Transmittal of the International Search Report, dated Nov. 2, 1995, in International application No. PCT/US95/07859, Applicant Shields Enterprises, Inc.

"Smart cars, Smart Highways," Collier, W. Clay and Weiland, Richard J., *IEEE Spectrum*, Apr. 1994, pp. 27–33.

*Primary Examiner*—Brent A. Swarthout
*Attorney, Agent, or Firm*—Brinks Hofer Gilson & Lione

[57] ABSTRACT

The invention provides a method and system for providing route guidance and other information from a base unit to a remote unit in response to a request from the remote unit. A query is formatted at the remote unit, the query including the request, and is transmitted from the remote unit to the base unit. Requested route guidance information is calculated at the base unit in response to the query, using a large up-to-date database located at the base unit. A response to the query is formatted at the base unit, the response including route guidance information. The response is then transmitted from the base unit to the remote unit for display. The transmission is made in a compact form through the use of maneuver arms and combined maneuver arms and through the use of tokenized forms. A maneuver arm represents a road at an intersection, for depiction on a display, by one or two endpoint coordinates. The tokenized forms are expanded at the remote unit into textual driving instructions for each of one or more languages. In addition, the amount of information available at a remote unit can be increased by providing the remote unit with information from the base unit which is not adequately covered by any databases on-board the remote unit.

11 Claims, 15 Drawing Sheets

U.S. PATENT DOCUMENTS

| | | | |
|---|---|---|---|
| 5,243,528 | 9/1993 | Lefebvre | 340/995 |
| 5,262,775 | 11/1993 | Tamai et al. | 340/995 |
| 5,283,575 | 2/1994 | Kao et al. | 340/990 |
| 5,291,412 | 3/1994 | Tamai et al. | 364/449 |
| 5,291,413 | 3/1994 | Tamai et al. | 364/449 |
| 5,293,163 | 3/1994 | Kakihara et al. | 340/988 |
| 5,293,484 | 3/1994 | Dabbs, III et al. | 340/825.44 |
| 5,396,429 | 3/1995 | Hanchett | 364/436 |
| 5,559,707 | 9/1996 | DeLorme et al. | 340/995 |

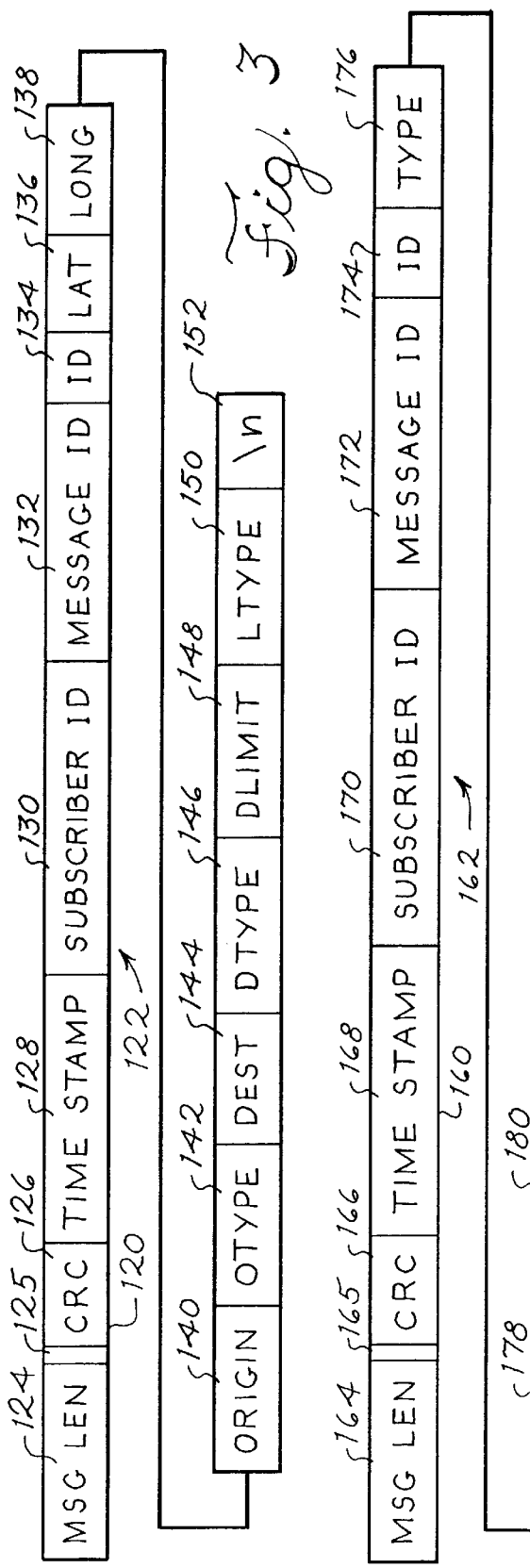
Fig. 3
Fig. 4
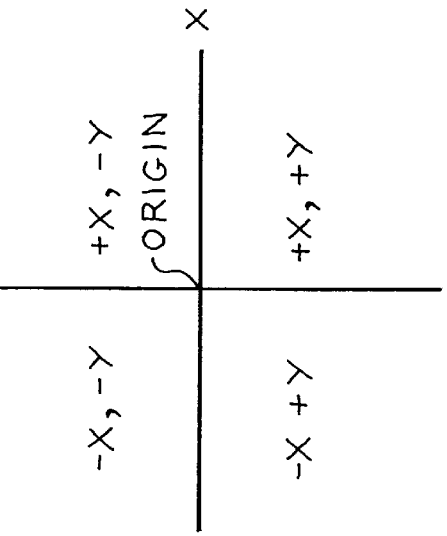
Fig. 5

START OUT GOING EAST ON
ROCKWOOD ST TOWARDS
GLENDALE BLVD.
DRIVE 0.1 MILES
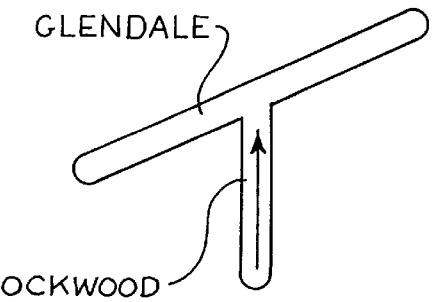
Fig. 6
TURN RIGHT ONTO GLENDALE BLVD.
DRIVE 0.1 MILES
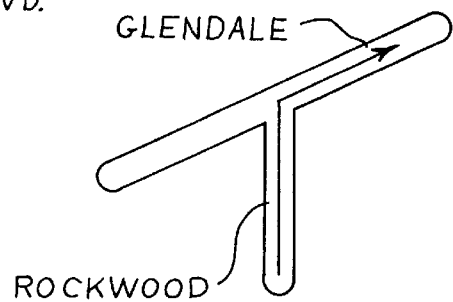
Fig. 7
Fig. 8
TURN SLIGHT RIGHT ONTO
LUCAS AVE
DRIVE 0.2 MILES
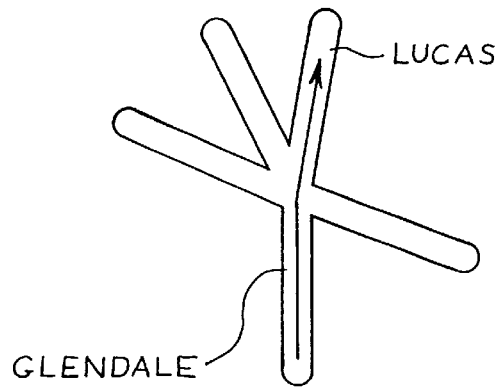

TURN LEFT ONTO EMERALD DR
DRIVE 0.1 MILES.

EMERALD

LUCAS

TURN RIGHT ONTO EMERALD ST.
DRIVE A SHORT DISTANCE TO
YOUR DESTINATION AT 280
EMERALD ST.

EMERALD

EMERALD

MAIN

ELM

BROAD

Fig. 11

```
                    MSG LEN  TIME STAMP   MESSAGE ID         ORIGIN TEXT
                   ⎧  CRC  ⎫ SUBSCRIBER ID ⎫ USER ID ⎫
WHOLE  ⎧  |131|D4D1|92D4580B|S40620B00159377|9bc5|DUNMIR21109|||1550 ROCKWOOD ST, LOS
PACKET ⎩   ANGELES|ADDRESS|280 EMERALD ST, LOS ANGELES|ADDRESS|0|M|ARMS=Y|
                                                      ⎫                 ⎫     ⎫         ⎫
              ORIGIN   DESTINATION              DESTINATION        LIMIT   ROUTING
               TYPE        TEXT                     TYPE          FIELD   ALTERNATIVES
                                                                   TYPE      INFO.
```

Fig. 12

```
              MSG LEN  TIME STAMP  MESSAGE ID       TYPE
             ⎧  CRC  ⎫ SUBSCRIBER ID ⎫ USER ID ⎫         ⎫                MESSAGE
PACKET HEADER⎧ |0805|a6d8|
             ⎩
1ST MESSAGE ⎧ |2fc37396|S40620B00159377|9bc5|DUNMIR21109|R|\r    About 0.4 miles, 3
            ⎩  minutes.\r|
2ND MESSAGE ⎧ |2fc37396|S40620B00159377|9bc5|DUNMIR21109|R|\r 1)   0.0  Start out going East
            ⎨  on ROCKWOOD ST towards GLENDALE BLVD.   \r          Drive 0.1 miles.
            ⎩  |ARM=ROCKWOOD;GLENDALE;1,99;-91,41;90,-42|
3RD MESSAGE ⎧ |2fc37396|S40620B00159377|9bc5|DUNMIR21109|R|\r 2)   0.1  Turn RIGHT onto
            ⎨  GLENDALE BLVD.  \r              Drive 0.1 miles.   |ARM=ROCKWOOD;GLENDALE;1,99;90,-
            ⎩  42;-91,41|
4TH MESSAGE ⎧ |2fc37396|S40620B00159377|9bc5|DUNMIR21109|R|\r 3)   0.2  Turn SLIGHT RIGHT
            ⎨  onto LUCAS AVE.  \r             Drive 0.2 miles.   |ARM=GLENDALE;LUCAS;1,99;17,-
            ⎩  98;-91,-40;-42,-90;93,34|
5TH MESSAGE ⎧ |2fc37396|S40620B00159377|9bc5|DUNMIR21109|R|\r 4)   0.4  Turn LEFT onto
            ⎨  EMERALD DR.  \r                 Drive 0.1 miles.   |ARM=LUCAS;EMERALD;1,99;-98,17;-7,-
            ⎩  99|MORE=Y|
```

WHOLE PACKET—{|073|2F39|92D45811|S40620B00159377|9BCA|DUNMIR21109|||||||||MANEUVER=NEXT|ARMS=Y|

```
PACKET HEADER—{|0495|9588
1ST MESSAGE—{|2fc3739b|S40620B00159377|9bca|DUNMIR21109|R|\r|\r 5)   0.4  Turn RIGHT onto
               EMERALD ST. \r       Drive a short distance to your destination at 280
               EMERALD ST.\r|ARM=EMERALD;EMERALD;1,99;96,-26;-74,-66|
              {|2fc3739b|S40620B00159377|9bca|DUNMIR21109|R|\r             Thank you for using
2ND MESSAGE—{ SEI/EnRoute!\r|rDatabase Copyright 1992 - 94 Navigation Technologies
              Corp.\r(Database version wsall0076_2.3.0,  SEI/EnRoute Copyright 1993-1994 SEI
              Information Technology/IDS Software version 1.2)\r|MORE=N|
```

Fig. 15

|078|0A8D|80DC0960|IDSDIVISION|9D89|BOBD|||||||||SESSION=00000000|BURST=N
MAXPKT=1024|⌐

|0039|67f1|2ef5d974|IDSDIVISION|9d89|BOBD|E|OK|⌐

|055|800B|80DC0962|IDSDIVISION|9D8B|BOBD|||||||CONFIG=LA.CFG|⌐

Fig. 18

|0039|3d8a|2ef5d976|IDSDIVISION|9d8b|BOBD|E|OK|⌐

Fig. 19

|119|A4C8|80DC096E|IDSDIVISION|9D98|BOBD|||950 S FLINT RIDGE WAY, ANAHEIM|ADDRESS|2043 N SACRAMENTO, ORANGE|ADDRESS|0|M|ARMS=Y|⌐

Fig. 20

|0753|2bc6|2ef5d987|IDSDIVISION|9d98|BOBD|R|\r\r  1)    0.0    About 9.1 miles 20 minutes.\r|⌐
|2ef5d987|IDSDIVISION|9d98|BOBD|R|\r\r        Start out going Northwest on S FLINT RIDGE WAY.    \r        Drive a short distance.
|ARM=FLINT RIDGE;WHITE FIR;1,99;-79,-61;24,-96|⌐
|2ef5d987|IDSDIVISION|9d98|BOBD|R|\r\r  2)    0.0    Turn LEFT onto E WHITE FIR LN.    \r        Drive 0.1 miles.    |ARM=FLINT RIDGE;WHITE FIR;1,99;79,-61;24,-96|⌐
|2ef5d987|IDSDIVISION|9d98|BOBD|R|\r\r  3)    0.1    Turn RIGHT onto S LONE PINE LN.    \r        Drive 0.1 miles.    |ARM=WHITE FIR;LONE PINE;1,99;67,-73|⌐
|2ef5d987|IDSDIVISION|9d98|BOBD|R|\r\r  4)    0.2    Turn LEFT onto E SOMERSET LN.    \r        Drive a short distance.    |ARM=LONE PINE;SOMERSET;1,99;-93,-35;38,-92|MORE=Y|⌐

Fig. 21

|062|61D6|80DC0975|IDSDIVISION|9D9F|BOBD|||||||MANEUVER=NEXT|ARMS=Y|⌐

Fig. 22

```
|0664|449c|2ef5d98a|IDSDIVISION|9d9f|BOBD|R|\r\r  5)    0.2   Turn RIGHT
onto SERRANO AVE.   \r       Drive 0.3 miles.
|ARM=SOMERSET;SERRANO;1,99;98,-18;-97,22;-12,-99|¬
|2ef5d98a|IDSDIVISION|9d9f|BOBD|R|\r\r  6)   0.6   Turn LEFT onto S WEIR
CANYON RD.   \r       Drive 0.8 miles.   |ARM=SERRANO;WEIR
CANYON;1,99;-99,0;-26,-96;97,-21|¬
|2ef5d98a|IDSDIVISION|9d9f|BOBD|R|\r\r  7)   1.4   Turn RIGHT onto the CA-
91 WEST RAMP.   \r       Drive 5.3 miles.   |ARM=YORBA LINDA;CA-91
WEST;1,99;83,-55;2,-99|¬
|2ef5d98a|IDSDIVISION|9d9f|BOBD|R|\r\r  8)   6.7   Take the CA-55 HWY SOUTH
exit.   \r          Drive 0.7 miles.   |ARM=RIVERSIDE;CA-55 SOUTH;1,99;0,-
100;7,-99|MORE=Y|¬
```

Fig. 23

```
|062|F22E|80DC0978|IDSDIVISION|9DA2|BOBD|||||||||MANEUVER=NEXT|ARMS=Y|¬
```

Fig. 24

```
|0652|6dc9|2ef5d98d|IDSDIVISION|9da2|BOBD|R|\r\r  9)   7.4   Take the NOHL
RANCH RD/LINCOLN AVE exit.   \r        Drive 0.2 miles.   |ARM=COSTA
MESA;TUSTIN ST;1,99;-2,-99;-21,-97|¬
|2ef5d98d|IDSDIVISION|9da2|BOBD|R|\r\r 10)   7.6   Turn LEFT onto N TUSTIN
ST.   \r       Drive 1.0 miles.   |ARM=TUSTIN ST;TUSTIN;1,99;-99,-
6;98,15|¬
|2ef5d98d|IDSDIVISION|9da2|BOBD|R|\r\r 11)   8.6   Turn LEFT onto E MEATS
AVE.   \r       Drive 0.4 miles.   |ARM=TUSTIN;MEATS;1,99;-99,3;-4,-
99;99,-11|¬
|2ef5d98d|IDSDIVISION|9da2|BOBD|R|\r\r 12)   8.9   Turn RIGHT onto N
BRECKENRIDGE ST.   \r       Drive a short distance.
|ARM=MEATS;BRECKENRIDGE;1,99;99,3;0,-100|MORE=Y|¬
```

|062|1595|80DC097B|IDSDIVISION|9DA5|BOBD|||||||MANEUVER=NEXT|ARMS=Y|⌐

Fig. 25

|0640|638b|2ef5d990|IDSDIVISION|9da5|BOBD|R|\r\r 13)    9.0    Turn RIGHT onto E BRENTFORD AVE.   \r               Drive 0.1 miles.
|ARM=BRECKENRIDGE;BRENTFORD;1,99;99,-4;-4,-99|⌐
|2ef5d990|IDSDIVISION|9da5|BOBD|R|\r\r 14)    9.0    Turn LEFT onto N SACRAMENTO ST.   \r       Drive a short distance to your destination at 2043 N SACRAMENTO ST.\r|ARM=BRENTFORD;SACRAMENTO;1,99;-99,0|⌐
|2ef5d990|IDSDIVISION|9da5|BOBD|R|\r               Thank you for using SEI/EnRoute!\r\rDatabase Copyright 1992 - 94 Navigation Technologies Corp.\r(Database version lao0104_2.3.0, SEI/EnRoute Copyright 1993-1994 SEI Information Technology/IDS Software version 5.48)\r|MORE=N|⌐

Fig. 26

|121|7372|80DC099C|IDSDIVISION|9DC6|BOBD|||1750 QUEENS RD, LOS ANGELES|ADDRESS|7530 ORANGETHORPE, BUENA PARK|ADDRESS|0|M|ARMS=Y|⌐

Fig. 27

```
|0746|fef2|2ef5d9b8|IDSDIVISION|9dc6|BOBD|R|\r         About 30.2
miles, 51 minutes.\r|⌐
|2ef5d9b8|IDSDIVISION|9dc6|BOBD|R|\r\r  1)  0.0  Start out going
Northwest on QUEENS RD towards FRANKLIN AVE.   \r       Drive a short
distance.   |ARM=QUEENS;QUEENS;1,99;-64,76|⌐
|2ef5d9b8|IDSDIVISION|9dc6|BOBD|R|\r\r  2)  0.1  Turn SLIGHT RIGHT onto
QUEENS RD.   \r         Drive 0.5 miles.   |ARM=FRANKLIN;QUEENS;1,99;4,-
99;95,-30|⌐
|2ef5d9b8|IDSDIVISION|9dc6|BOBD|R|\r\r  3)  0.5  Turn LEFT onto W SUNSET
BLVD.   \r         Drive 3.5 miles.   |ARM=QUEENS;SUNSET;1,99;-99,5;99,-
6|⌐
|2ef5d9b8|IDSDIVISION|9dc6|BOBD|R|\r\r  4)  4.1  Turn RIGHT onto the US-
101 SOUTH RAMP.   \r         Drive 24.5 miles.   |ARM=SUNSET;US-101
SOUTH;1,99;92,-37;-2,-99|MORE=Y|⌐
```

Fig. 28

```
|062|EB9C|80DC09A6|IDSDIVISION|9DD0|BOBD|||||||||MANEUVER=NEXT|ARMS=Y|⌐
```

|0802|db71|2ef5d9bb|IDSDIVISION|9dd0|BOBD|R|\r\r 5)  28.6  Take the KNOTT AVE exit.  \r        Drive 0.1 miles.    |ARM=SANTA ANA;ARTESIA BLVD;1,99;77,-63;12,-99|¬
|2ef5d9bb|IDSDIVISION|9dd0|BOBD|R|\r\r 6)  28.7  Merge onto KNOTT AVE.  \r        Drive 1.0 miles.   |ARM=ARTESIA BLVD;KNOTT;1,99;19,-98;-23,97;-97,-21;97,22|¬
|2ef5d9bb|IDSDIVISION|9dd0|BOBD|R|\r\r 7)  29.7  Turn LEFT onto ORANGETHORPE AVE.  \r        Drive 0.5 miles to your destination at 7530 ORANGETHORPE AVE.\r|ARM=KNOTT;ORANGETHORPE;1,99;-99,3;-4,-99;99,-1|¬
|2ef5d9bb|IDSDIVISION|9dd0|BOBD|R|\r       Thank you for using SEI/EnRoute!\r\rDatabase Copyright 1992 - 94 Navigation Technologies Corp.\r(Database version la0104_2.3.0,  SEI/EnRoute Copyright 1993-1994 SEI Information Technology/IDS Software version 5.48)\r|MORE=N|¬

Fig. 31

|104|5F31|80DC09DF|IDSDIVISION|9E08|BOBD|||1855 W KATELLA AVE, ORANGE|ADDRESS|HAPPY|RESTAURANT|100|M|QUERY=POIS|¬

Fig. 32

|0085|30dd|2ef5d9f4|IDSDIVISION|9e08|BOBD|Q|No of POIs found:00000: : :  :  :  --,:  :|MORE=N|¬

|105|E9C4|80DC09F6|IDSDIVISION|9E20|BOBD|||1855 W KATELLA AVE, ORANGE|ADDRESS|HUNGRY|RESTAURANT|100|M|QUERY=POIS|⌐

Fig. 33

|0269|523a|2ef5da0c|IDSDIVISION|9e20|BOBD|Q|No of POIs found:00002:  :  : - -, : ;HUNGRY TIGER SEAFOOD RESTAURANT:6231 MANCHESTER BLVD, BUENA PARK:36:23606:0-0-223-137,4,1:46646:N;HUNGRY BEAR RESTAURANT:2219 N HARBOR BLVD, FULLERTON:36:24034:0-0-459-108,4,2:38570:N|MORE=N|⌐

Fig. 34

|105|F245|80DC0A07|IDSDIVISION|9E31|BOBD|||1855 W KATELLA AVE, ORANGE|ADDRESS|BURGER|RESTAURANT|100|M|QUERY=POIS|⌐

Fig. 35

|0704|1c86|2ef5da1d|IDSDIVISION|9e31|BOBD|Q|No of POIs found:00016:  :  : - -, : ;BREA'S BEST BURGERS:707 S BREA BLVD, BREA:36:23589:0-0-230-190,4,1:38608:N;BURGER KING:959 S COAST DR, COSTA MESA:36:23729:0-0-395-82,4,1:43298:N;BURGER KING:19201 BROOKHURST ST, HUNTINGTON BEACH:36:24237:0-0-779-194,4,2:51444:N;BURGER KING:1236 W IMPERIAL HWY, LA HABRA:36:24406:0-0-453-165,4,2:49052:N;C AND J BURGER:421 E LA HABRA BLVD, LA HABRA:36:24408:0-0-229-139,4,1:50512:N;GEORGE'S BURGERS:601 W LA HABRA BLVD, LA HABRA:36:24429:0-0-908-180,4,1:52112:N;IMPERIAL BURGERS:241 E IMPERIAL HWY, LA HABRA:36:24435:0-0-919-268,4,-:46502:N;T AND S BURGER:650 W LA HABRA BLVD, LA HABRA:36:24484:0-0-908-180,4,2:52112:N|MORE=Y|⌐

Fig. 36

|055|A5C1|80DC0A0B|IDSDIVISION|9E34|BOBD|||||||MANEUVER=NEXT|

Fig. 37

|0643|833e|2ef5da1f|IDSDIVISION|9e34|BOBD|Q|IN-N-OUT BURGER:7926 VALLEY VIEW ST, LA PALMA:36:24514:0-0-1210-243,4,2:50592:N;BURGER KING:245 N CITRUS ST, ORANGE:36:26021:0-0-829-124,4,1:6189:N;IN-N-OUT BURGER:825 W CHAPMAN AVE, PLACENTIA:36:26314:0-0-959-137,4,1:24590:N;BURGER KING:2850 S BRISTOL ST, SANTA ANA:36:26542:0-0-396-111,4,1:36418:N;BURGER KING:601 E DYER RD, SANTA ANA:36:26543:0-0-797-207,4,1:35830:N;BURGER KING:13431 NEWPORT AVE, TUSTIN:36:26864:0-0-871-69,4,1:28304:N;BOB'S BURGER:13891 BEACH BLVD, WESTMINSTER:36:27177:0-0-199-315,4,2:40114:N;IN-N-OUT BURGER:6292 WESTMINSTER BLVD, WESTMINSTER:36:27186:0-0-1197-216,4,2:49140:N|MORE=N|

Fig. 38

| TOKEN | ENGLISH TABLE | SPANISH TABLE | GERMAN TABLE |
|---|---|---|---|
| 1 | MAKE A U TURN AT ____. | HAGA UNA VUELTA EN U EN ____. | AN DER KREUZUNG MIT ____ BITTE EINE KEHRTWENDUNG MACHEN. |
| 2 | ____ CHANGES NAME TO ____. | ____ CAMBIA EL NOMBRE A ____. | ____ ÄNDERT DEN NAMEN ZU ____. |
| 3 | TURN LEFT ON ____ AND DRIVE ____ MILES. | DÉ VUELTA A LA IZQUIERDA EN ____ Y MANEJE ____ MILLAS. | AUF ____ LINKS ABBIEGEN UND ____ MEILEN WEITERFÜHREN. |

ELECTRONIC NAVIGATION SYSTEM AND METHOD

This application is a continuation-in-part of U.S. patent application Ser. No. 08/265,094 filed on Jun. 24, 1994 by David A. Behr and Randall B. Jones, now U.S. Pat. No. 5,543,789, entitled "Computerized Navigation System." The entire contents of the Ser. No. 08/265,094 application is incorporated herein by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The invention relates generally to a system and method for providing route guidance and tracking information and other information from a base unit to a mobile unit over wireless, wireline, or optical devices. The invention more particularly relates to an apparatus and method for providing to a mobile unit route guidance and tracking information and other information which has been calculated and/or stored at a base unit in response to a query from the mobile unit.

Systems have already been developed which provide geographical or position-dependent information to a mobile user. Such systems are generally installed in an automobile or other vehicle. These systems generally include an on-board geographic database which may be accessed to determine geographic information, such as locations of points of interest, directions to points of interest, and directions between a specified origin and a destination. An on-board computer calculates route guidance information using data from the database in response to user inputs.

Such systems are known as autonomous route guidance systems since they are independent and self-contained. The systems generally include a geographic database, positioning sensors, and a computer including a keyboard and display. The geographic database is a representation of a region or metropolitan area and may include, for example, street names, navigation attributes, such as turn restrictions and one-way streets, street addresses, and points of interest, such as airports, restaurants and museums. The positioning sensors may determine geographic position from RF (Radio Frequency) triangulation or in response to signals from, for example, GPS (Global Positioning System), LORAN C or other similar positioning systems, and from motion and direction detectors. The computer calculates route guidance information in response to inputs from the other system components as well as from operator input. The route guidance information is provided to the user in the form of navigational text or map graphics.

Autonomous route guidance systems have many drawbacks, however, which have prevented their widespread use. Because the system is autonomous and has an on-board database, the system must include large storage capabilities for storing all of the data which form the database. Technologies such as CD-ROM have allowed storage of an entire database but require still a tradeoff between cost and fast, efficient data access.

Another problem with autonomous route guidance systems is maintenance and currency of the database. As new streets are built, or as old streets are reconfigured, as businesses and other points of interest open and close, the database on CD-ROM or other media becomes out of date. In addition, when a database is compiled, it may include errors which are then replicated in the many copies provided to users. These errors may require correction in the user copies by replacing those database copies. Moreover, incorrect or outdated information in the database can lead to errors when calculating routes. When an out-of-date database does not include the information that a particular roadway is closed, the system may be unable to calculate an alternate route.

Autonomous route guidance system providers may improve the accuracy of the system by providing occasional database updates to users. However, distribution of the database, in a medium such as CD-ROM or floppy disk, to remotely located mobile users may be difficult. In addition, the media themselves are expensive since they may generally be used only a single time.

Other aspects of such prior art autonomous route guidance systems add to their cost and inconvenience. Because the systems are autonomous, they must include all components, including the computer, the database and the position sensor. Using present technology, such a system is too heavy and too large to be readily transported by an individual. In addition, the complete system has power requirements which make battery operation impractical. As a result, autonomous route guidance systems have been limited to installation in automobiles or other vehicles which can accommodate the size and power requirements of such a system. The current best price for a complete autonomous route guidance system is substantial. This includes only the cost for a single, dedicated autonomous route guidance system.

Another type of route guidance system has been tested in Europe using beacons to provide a guidance signal to on-board equipment. The system directs the user to travel from beacon to beacon, creating a stepwise path between an origin and a destination because of the fixed locations of the beacons. The navigational information thus provided forms a generally inefficient routing path from origin to destination. In addition, such a system does not provide the capability to query a database for information about nearby points of interest and other geographical information.

Therefore, there is a need for a routing and information system that continually provides access to up-to-date, correct geographic information by a remote user. There is a further need for a routing and information system which can be implemented on lightweight, portable devices for easy, convenient transportation and use. There is a further need for a routing and information system which is independent of any particular hardware configuration and which may be implemented on any suitably equipped data processing apparatus, such as a desktop personal computer, a laptop computer, a personal digital assistant or even a pager. There is a further need for a routing and information system which provides communication between mobile units and a base unit over any available channel, including wireless, wireline, and optical channels. There is a still further need for a data communication protocol for providing accurate, reliable communication in such a system, independent of hardware configuration and in a compact form.

SUMMARY OF THE INVENTION

An object of the invention is to provide a method and system for transmitting route guidance and other information from a base unit to a remote unit in a compact form.

Another object of the invention is to provide a method and system for transmitting route guidance and other information from a base unit to a remote unit in a language independent form such that the remote unit can provide the information to a user in any language or form desired by the user at the remote unit.

Another object of the invention is to provide a method and system for transmitting route guidance and other information from a base unit to a remote unit in which the amount of information available at a remote unit can be expanded by providing the remote unit with information from the base unit which is not adequately covered by any databases on-board the remote unit.

The invention provides a method and system for providing route guidance and other information from a base unit to a remote unit in response to a request from the remote unit. A query is formatted at the remote unit, the query including the request, and is transmitted from the remote unit to the base unit. Requested route guidance information is calculated at the base unit in response to the query, using a large up-to-date database located at the base unit. A response to the query is formatted at the base unit, the response including route guidance information. The response is then transmitted from the base unit to the remote unit for display.

The transmission is made in a compact form through the use of maneuver arms and combined maneuver arms and through the use of tokenized forms. These tokenized forms represent a large amount of textual information by one or several alphanumeric characters.

A maneuver arm represents a road at an intersection, for depiction on a display, by one or two endpoint coordinates. If two intersections are sufficiently close together, a first set of maneuver arms for one intersection and a second set of maneuver arms for the other intersection are combined to produce a combined set of endpoints for transmission in a compact form to depict the first set of maneuver arms and the second set of maneuver arms on a common display.

The tokenized forms are expanded at the remote unit into textual driving instructions for each of one or more languages. In addition, the amount of information available at a remote unit can be increased by providing the remote unit with information from the base unit which is not adequately covered by any databases on-board the remote unit.

Other objects, features, and advantages of the invention will be apparent from the detailed description set forth below.

BRIEF DESCRIPITON OF THE DRAWINGS

The features of the invention are set forth with particularity in the appended claims. The invention, together with further objects and advantages thereof, may be further understood by making reference to the following description taken in conjunction with the accompanying drawings, wherein:

FIG. 3 is a diagram illustrating a data communication protocol for communicating data from a mobile, or remote, unit to a base unit in accordance with the invention and which is used in conjunction with the system of FIG. 1 and the method of FIG. 2;

FIG. 4 is a diagram illustrating a data communication protocol for communicating data from a base unit to a mobile unit in accordance with the invention and which is used in conjunction with the system of FIG. 1 and the method of FIG. 2;

FIG. 5 is a diagram illustrating a suitable sign convention for maneuver arm endpoint coordinates;

FIGS. 6 to 10 show examples of maneuver arms displays in a remote unit;

FIGS. 11 to 14 illustrate data that is transferred between a remote unit and a base unit in the example of FIGS. 6 to 10;

FIGS. 15 to 38 illustrate additional examples of data transferred between a remote unit and a base unit;

DETAILED DESCRIPTION OF PREFERRED EMBODIMENTS

Overview

Figure 1:
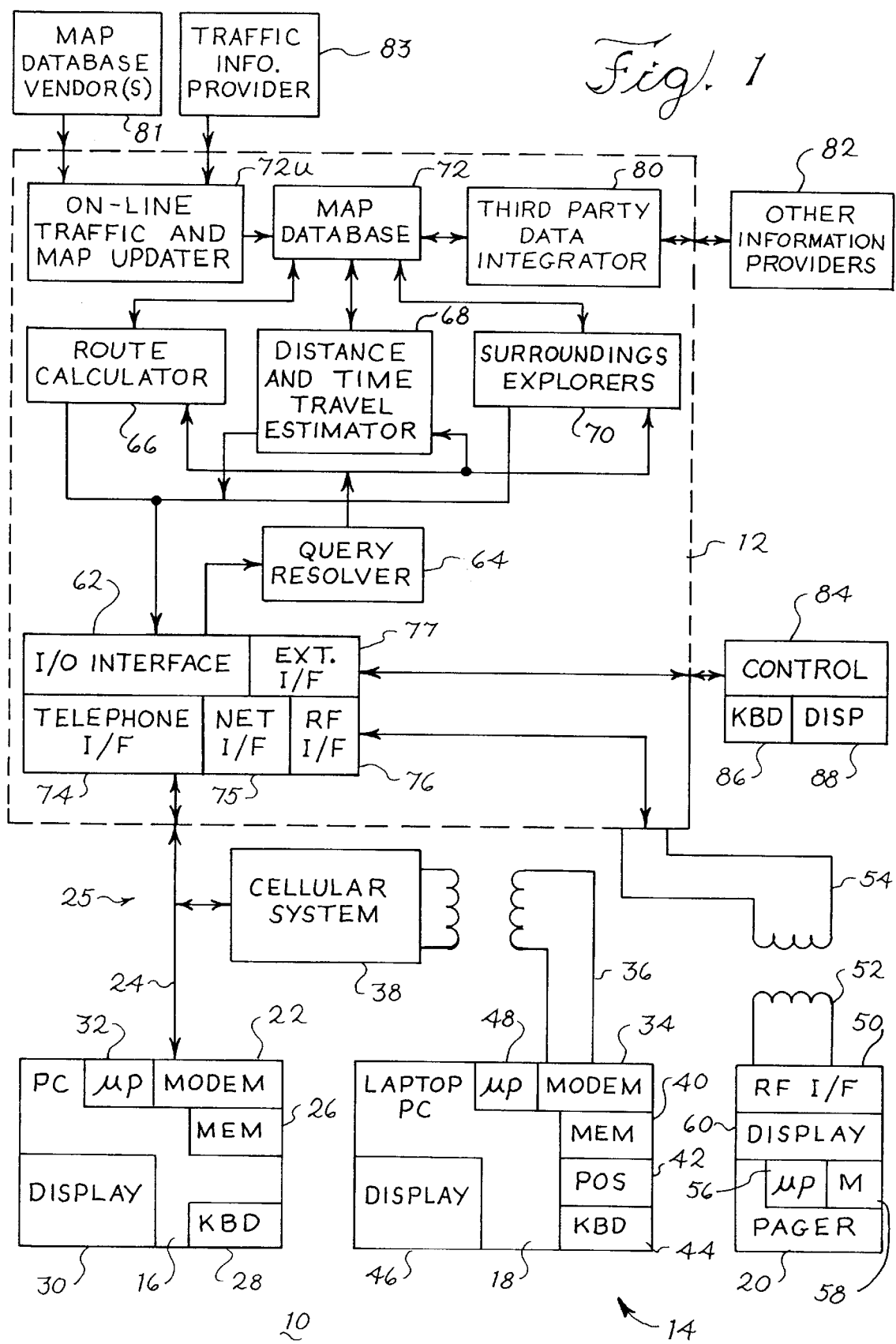
FIG. 1 is a functional block diagram illustrating a system of the invention.

The invention provides a method of providing route guidance information and other information from a base unit to a mobile unit in response to a request from the mobile unit. The method comprises the steps of formatting a query at the mobile unit, the query including the request, communicating the query from the mobile unit to the base unit, and calculating route guidance information at the base unit in response to the query. The method further comprises the steps of formatting a response to the query at the base unit, the response including route guidance information, and communicating the response from the base unit to the mobile unit. The guidance information may include navigation instructions from an origin to a destination, information about one or more points of interest within a particular region, or other geographically referenced information.

The invention further provides a system for communicating routing information between a base unit and a mobile unit. The system comprises an input means at the mobile unit for providing an origin and a destination. The system further comprises a calculating means at the base unit for calculating a route between the origin and the destination. The system still further comprises communication means for communicating the origin and the destination from the mobile unit to the base unit and for communicating the route from the base unit to the mobile unit. The routing information may include navigation instructions from an origin to a destination, information about one or more points of interest within a particular region, or other geographically referenced information.

The invention still further provides a method of providing routing information to a mobile unit. The method comprises the steps of providing an origin and a destination from the mobile unit to a base unit, the base unit located remotely from the mobile unit. The method further comprises the steps of calculating at the base unit a route between the origin and the destination, and providing the route to the mobile unit.

The invention still further provides a system for providing route guidance information to a remote location from a central location. The system comprises a mobile unit including an input means for providing at least a route destination and an output means for providing an indication of the route guidance information. The system further comprises a first transmission means at the mobile unit for transmitting destination data and origin data from the mobile unit, the destination data being indicative of a route destination and the origin data being indicative of a route origin. The system still further comprises a base unit at the central location. The base unit includes a first receiving means for receiving the destination data and the origin data from the first transmission means, a calculating means coupled with the receiving means for calculating a route to the route destination from a route origin responsive to the destination data and the origin data, and a second transmission means for transmitting routing data, the routing data being indicative of the route. The system still further comprises a second receiving means at the mobile unit for receiving the routing data from the second transmission means, the second receiving means being coupled with the output means for providing the route guidance information to the input means responsive to the routing data.

The invention also provides a system and method for providing geographically referenced information from a base unit or server to a mobile unit. The mobile unit may be a transportable device such as a laptop computer or personal digital assistant (PDA), or may be a desktop personal computer or any other device permitting data entry and display, printing, or sounding of the provided information.

The mobile unit communicates with the base unit using any available communication system, such as land line telephone link, cellular telephone or radio frequency transmission. Queries are communicated from the mobile unit to the base unit. The query requests route guidance information, information about a point of interest or other geographical information. The query is formatted in a specified protocol. The base unit communicates responses to queries, the responses also being formatted in a specified protocol. The responses may include, for example, textual navigational directions and/or maneuver arms showing graphical representations of street intersections and the calculated route through the intersection. Transmitting only a representation of the intersection, rather than all geographical features around the intersection, allows the response, including the maneuver arms, to be transmitted over a low bandwidth channel. The invention operates independently of the communication system and is adaptable to any system. The invention allows support for many different mobile unit platforms, taking advantage of each platform's capabilities while retaining as much system-level look and feel consistency as possible.

The base unit includes a geographical database, such as the Navigation Technologies Corp. navigable map database. The geographical database stores a variety of geographical and position-oriented attributes, such as street addresses, turn restrictions and points of interest. The points of interest are preferably organized according to different parameters, including point of interest type, such as "restaurant" or "museum;" point of interest name; city; driving distance; and/or driving time. The base unit further includes a server for receiving queries from one or more mobile units, resolving ambiguities in the queries, determining a response to a query, and accessing the geographical database as needed. The server formats a response to the query and communicates the response to the mobile unit.

In a first mode of operation, an origin and a destination are entered at the mobile unit. The origin and/or the destination may be in the form of a street address, an intersection of two streets, or a point of interest previously identified in the geographical database. The origin and destination are communicated from the mobile unit to the base unit. The base unit calculates a route between the specified origin and destination. The routing information is communicated from the base unit to the mobile unit where it is displayed by the mobile unit. The display can be a graphical display, showing map portions and providing travel directions along with a display of highway signs and other information. The display can include textual information providing travel directions. The mobile unit may supply a digitally synthesized voice which audibly presents the travel directions to the user. In some applications, the display is stylized to display additional information to the user or to display information in a more realistic or more informative form. For example, the display can indicate in graphical form whether an on or off ramp is a tight or gentle turn by displaying stylized ramps. Shapepoints, that is, points which more accurately depict the physical shape of a road, can be generated either by the base unit or by a remote unit.

In a second mode of operation, the mobile unit formulates a query requesting information about points of interest within a specified distance of an origin. The origin may be specified by street address, intersecting streets, by geographic position or by reference to a point of interest. The query is communicated from the mobile unit to the base unit. The base unit uses the geographical database to formulate a response. The response is communicated from the base unit to the mobile unit for display to the user.

In a third mode of operation, a mobile unit provides information specifying its location to the base unit. A control unit requests tracking information about the mobile unit from the base unit. The control unit may be, for example, another personal computer, coupled to the base unit through an external interface, either directly or through a communications network. The base unit provides to the control unit tracking information including the current location of the mobile unit with respect to the street network and the route covered by the mobile unit.

The invention further provides a protocol for communicating a query from the mobile unit to the base unit and for communicating a response from the base unit to the mobile unit. The protocol allows transmission of variable length messages, as required by the individual mobile unit or communication link. The protocol includes error checking, time stamping and subscriber information. The protocol further includes information specifying origin and destination, for a query, and message type and message contents, such as route information, for a response.

The invention thus provides geographically referenced information from a base unit to a mobile unit, the mobile unit needing only data entry and display devices and a communications link. An advantage of the invention is that the invention provides this capability in a mobile unit which does not require on-board database storage or position finding equipment at the mobile unit. A further advantage of the invention is that the invention provides a mobile unit with access to a larger, more comprehensive database. For example, prior art CD-ROM-based databases are limited to 600 MB of storage which may be sufficient to store map information for only a single metropolitan region. In contrast, the invention allows the mobile unit to access map information for many metropolitan regions or an entire nation, as well as other information, such as on-line yellow page information or news, weather and/or traffic advisory information, which may be provided by third-party information providers. Such information can be provided on a geographic specific basis. A still further advantage of the invention is that the invention permits automatic, real time database updates by maintaining the database only at the base unit, avoiding the need to distribute database updates to the mobile units.

A further advantage of the invention is that the invention provides a method for communicating requests for routing information and responses including routing information in which the method is independent of specific hardware. A further advantage of the invention is providing a system which can be implemented using any commonly available hardware devices, including laptop computers, personal digital assistants and other transportable units communicating via wireless, wireline, and/or optical systems.

A still further advantage of the invention is efficiently conveying complex information, including graphical information, over communication channels having a limited bandwidth using data compression and a novel protocol, to be described in detail below. This allows a system in accordance with the invention to dynamically transmit selected map portions for display on a capable mobile unit. The geographical information may be saved at the mobile unit for later retrieval and display, without having to again access the base unit.

System Description

FIG. 1 is a functional block diagram of a system 10 embodying the invention. The system 10 includes a base unit 12 and a plurality 14 of remote units arranged to communicate with the base unit 12. The base unit 12 includes a central processing unit (CPU) and a program memory which stores programs for performing the functions described below. IBM RS/6000 series computers are suitable for such a purpose; however, many other computer systems can be used. The plurality 14 of remote units may include, for example, a desktop personal computer (PC) 16 such as IBM compatible PC's and the Apple Newton, a laptop personal computer (PC) 18, or a pager 20. Suitable program languages include ANSI C and MS-Visual Basic.

The plurality 14 of remote units may include any number of mobile units. The base unit 12 is preferably located at a single, central location. One remote unit may be permanently located at a single site, such as desktop personal computer 16. Another remote unit may be mobile or transportable, such as laptop personal computer 18 or pager 20. As used herein, the term "mobile unit" includes both remote units which may be permanently located at a single site and remote units which are mobile or transportable.

Communications between the base unit and the remote units are packetized. A packet contains one or more messages.

The desktop personal computer 16 is an example of one type of mobile unit which may be included in the system 10. The desktop personal computer 16 preferably includes a modem 22, a memory 26, a keyboard 28, a display 30 and a microprocessor 32. The modem 22 is adapted to be coupled to a telephone line 24. The telephone line 24 is in turn coupled to the commercial telephone system 25. The modem 22 may be, for example, a serial (dial-up line) modem such as a modem compatible with an AT command set which is built into the desktop personal computer 16, a stand-alone modem, or a PCMCIA modem. Alternatively, the modem may be for use with a specialty wireless transmission network such as ARDIS, CDPD (cellular digital packet data) or RAM. Still further, the modem may be of a type custom designed for the desktop personal computer 16. The modem 22 forms a transmission means at the mobile unit for transmitting the origin and the destination and a receiving means at the mobile unit for receiving the responses, including the route, from the base unit 12.

The microprocessor 32 responds to program instructions and data stored in the memory 26. To activate the system 10, a user manipulates the keyboard 28 to formulate a request. The request may, for example, seek the route between an origin and a destination. The keyboard 28 thus provides an input means at the mobile unit for providing an origin and a destination. The desktop PC 16, under control of a program of instructions stored in the memory 26, conveys the request over the telephone line 24 to the base unit 12. The base unit 12 formulates a response to the request and conveys the response over the telephone line 24 to the desktop PC 16. The response to the request is displayed on the display 30. The display 30 thus forms an output means at the mobile unit for providing an indication of the route provided in the response. In addition, the response may be stored in the memory 26 for later retrieval and display. The memory 26 thus provides a storage means at the mobile unit for storing the route communicated from the base unit.

The laptop personal computer 18 is another example of a mobile unit which can be used in the system 10. The laptop PC 18 includes a modem 34, a memory 40, a position locator 42, a keyboard 44, a display 46 and a microprocessor 48. The modem 34 is coupled to an antenna 36 for sending and receiving cellular telephone calls in conjunction with the cellular telephone system 38, which is a portion of the commercial telephone system 25. The modem 34 may be, for example, any of the modem types described in conjunction with the modem 22 of the desktop personal computer 16.

The microprocessor 48 operates in response to program instructions and data stored in the memory 40. The position locator 42 provides the geographical position of the laptop PC 18. For example, the position indicator 42 may perform radio frequency (RF) triangulation or may be responsive to GPS (Global Positioning System), LORAN C signals or other satellite positioning systems for providing latitude and longitude positioning information. The position locator 42 thus provides a position determining means for determining the geographical position of the mobile unit. The laptop PC 18, in response to the program instructions stored in the memory 40, provides a request over the commercial telephone system to the base unit 12. The request may be, for example, for the route between an origin and a destination. The origin may be specified either by manipulating the keyboard 44 or by providing the latitude and longitude information produced by the position locator 42. The base unit 12 provides a response to the request to the laptop PC 18. The response is displayed on the display 46.

The pager 20 provides another example of a remote unit which can be used in the system 10. The pager 20 includes an RF interface 50 coupled to an antenna 52 for receiving RF signals from an antenna 54 coupled to the base unit 12. The pager 20 further includes a microprocessor 56 responsive to program instructions and data stored in a memory 58. In response to information transmitted from the base unit 12 and received at the antenna 52, the microprocessor 56 displays information, such as geographical directions, on a display 60.

In another mode of operation, one mobile unit, such as the desktop personal computer 16, may track another mobile unit, such as the laptop personal computer 18, using the system 10. A user of the desktop personal computer 16 may manipulate the keyboard 28 to request route guidance information such as tracking information. The request is transmitted over the telephone line 24 to the base unit 12. The base unit 12 formulates a response based on the geographic position information provided by the position locator 42 of the laptop PC 18. The response is transmitted over the telephone line 24 to the desktop personal computer 16 for display on the display 30.

Thus, the system 10 provides geo-referenced information over, for example, wireless and wireline devices to mobile and remote users. It is understood that the communications technologies and the mobile units illustrated in FIG. 1 may be combined in ways other than those illustrated in FIG. 1. For example, the desktop personal computer 16 may include an RF interface such as the RF interface 50 of the pager 20. Similarly, the modem 34 of the laptop PC 18 may be adapted for coupling directly to a telephone line such as telephone line 24. In addition, other types of mobile units, such as personal digital assistants (PDAs), may be included in the system 10. Moreover, mobile units may access the base unit indirectly by communicating directly with a third-party information provider, such as Prodigy™, which in turn conveys queries to and responses from the base unit 12. In accordance with the invention, the invention operates independently of particular hardware configurations of the plurality 14 of remote units and of the communications system.

The base unit 12 includes an I/O interface 62, a query resolver 64, a route calculator 66, a distance and time travel estimator 68, a surroundings explorer 70, a map database 72, an on-line traffic and map updater 72U, and a third-party data integrator 80. The I/O interface 62 includes a telephone interface 74 for coupling the base unit 12 to the commercial telephone system 25 including the telephone line 24. The I/O interface 62 further includes an RF interface 76 for coupling the base unit 12 with RF communication devices such as an antenna 54. The I/O interface 62 and the modem 22 thus provide a communication means for communicating an origin and a destination from the desktop personal computer 16 to the base unit 12 and for communicating a route from the base unit 12 to the desktop personal computer 16. The I/O interface 62, the modem 34 and the antenna 36 provide a communication means for communicating the origin and the destination from the laptop personal computer 18 to the base unit 12 and for communicating the route from the base unit 12 to the laptop personal computer 18.

The I/O interface 62 may further include a network interface 75 for coupling the base unit 12 to one or more wireless or wireline communication networks such as CDPD (cellular digital packet data), TCP/IP (transmission control protocol/Internet protocol), ARDIS or RAM. The I/O interface 62 may further include an external interface 77 for coupling the base unit 12 to a control unit 84. The control unit 84 provides an external link to the base unit 12 and may be, for example, a personal computer coupled over a wireless or wireline network or a directly connected terminal. The control unit 84 may include, for example, a keyboard 86 and a display 88. The control unit 84 may request tracking information about the location of one or more mobile units. For example, a mobile unit may be located in an armored vehicle transporting valuables along a specified route. The control unit may receive tracking information from the base unit and, if the mobile unit in the armored vehicle varies from the specified route by a predetermined amount, sound an alarm or trigger some other action.

The I/O interface 62, including the telephone interface 74 and the RF interface 76, provide a means for coupling the base unit 12 with communications media such as the commercial telephone system and other wireline and wireless devices. The I/O interface 62 thus receives queries from the plurality 14 of remote units and transmits the responses from the base unit 12 to the plurality 14 of remote units. The I/O interface 62 therefore provides a receiving means at the base unit for receiving the origin and destination and a transmitting means at the base unit for transmitting the route to a mobile unit.

The query resolver 64 receives the request from the I/O interface 62. When a request is entered at one of the plurality 14 of remote units, a mistake may be made. For example, in manipulating the keyboard 44 of the laptop personal computer 18, the user may have entered "O'HAIR," intending to enter "O'HARE," indicating O'Hare Airport. Other ambiguities may be in the format of the address provided, in the latitude and longitude of the position provided, or in the definition of cross streets. The function of the query resolver 64 is to resolve such ambiguities in the query at the base unit 12 and convey the query for further processing.

After the query resolver, the query is routed to the route calculator 66. In a manner well known in the art, the route calculator 66 determines a route between a specified origin and destination using the map database 72. The map database 72 may be, for example, the navigable map database maintained by Navigation Technologies Corp. The map database 72 preferably includes an accurate, complete, and up-to-date representation of geographic information such as addresses, street names, navigation attributes (including turn restrictions, one-way streets, physical dividers, relative heights, freeway sign text, and so forth), as well as point of interest categories, such as parks, schools, hospitals, restaurants, and golf courses associated with the geographic information. The on-line traffic and map updater 72U receives updating information from map database vendor(s) 81 and traffic information providers 83 and maintains map database 72 current.

In determining the route, the route calculator 66 preferably takes into account routing restrictions such as toll road avoidance, turn restrictions at a specified time of day, and other restrictions. Such routing restrictions may be specified by an operator at the base unit 12 in response to a temporary condition or may be added to the map database 72 when the restrictions become nationally available. The route calculator 66 thus forms a calculating means at the base unit for calculating a route between the origin and the destination. The map database may be divided into geographic areas such as metropolitan areas. Providing the route calculation function in the base unit 12 reduces the data storage and data processing requirements for the remote units. In certain applications, however, it may be desirable to provide the remote units with a limited route calculation function.

After a route has been calculated, the route is conveyed from the route calculator 66 to the I/O interface 62. The I/O interface 62 formats a response to the query. The response includes the route guidance information determined by the route calculator 66. The I/O interface 62 then communicates the response from the base unit 12 to the mobile unit which originally requested the information.

If the query requests a distance or a time of travel, the query is forwarded to the distance and time travel estimator 68. The distance and time travel estimator 68, in response to the query and using the map database 72, formulates a response to the query. The response is conveyed from the distance and time travel estimator 68 to the I/O interface 62. The response is formatted at the I/O interface 62 and communicated from the base unit 12 to the mobile unit which originally requested the information.

If the query requests information about points of interest in the area surrounding an origin, the query is conveyed to the surroundings explorer 70. The surroundings explorer 70 provides an optimized method for searching for points of interest satisfying specified criteria or parameters such as time or distance. For example, the surroundings explorer 70 may locate all McDonald's™ restaurants within a specified driving distance or driving time of a specified origin, or it may locate the McDonald's™ restaurant nearest the specified origin. The origin and search parameters are specified in the query received from the mobile unit. In response to the query, the surroundings explorer 70 accesses the map database 72 and searches outward from the specified origin. The surroundings explorer 70 analyzes paths in the map database 72 over which a mobile unit, in a car for example, could legitimately travel. The surroundings explorer 70 examines the associated point of interest information for entries satisfying the specified search parameters. The surroundings explorer 70 thus determines which points of interest satisfy the query. The information is then conveyed from the surroundings explorer 70 to the I/O interface 62 and a response is formatted. The response is then communicated from the base unit 12 to the remote unit which requested the information.

The third-party data integrator 80 provides additional data such as on-line yellow pages information or news, weather, and/or traffic advisory information for responding to queries from a mobile unit. The additional data are preferably received from other information providers, illustrated in FIG. 1 as functional block 82. The additional data may also be added directly to and located within the map database 72. The additional data may be supplied external to the base unit 12 via any known data communications network.

The functions performed by the base unit 12, as described above and illustrated in the functional block diagram of FIG. 1, are performed in a data processing system. The data processing system may be in one or more units and include a processor for executing program instructions, a memory for storage of the program instructions and data such as the map database 72. The data processing system further includes other equipment such as digital logic for implementing the I/O interface 62 for receiving queries and sending responses. The data processing system may include a display and a keyboard as an operator interface.

Figure 2:
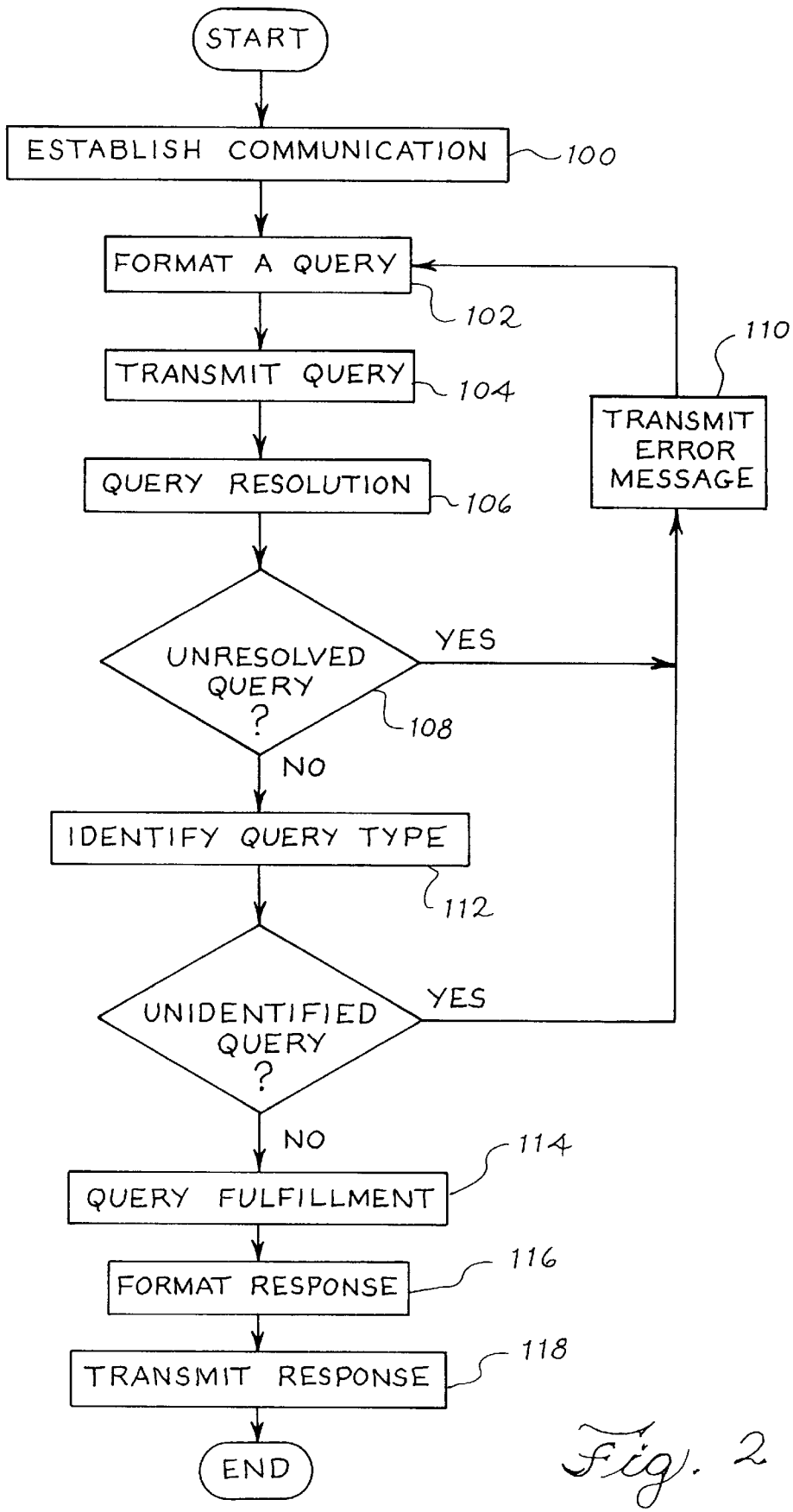
FIG. 2 is a flow diagram illustrating a method of the invention.
Figure 9:
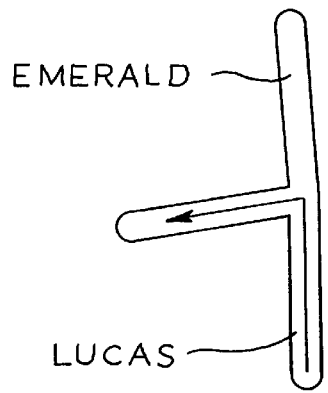
Figure 10:
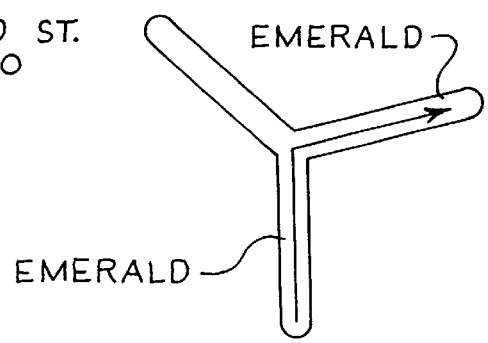

FIG. 2 is a flow diagram illustrating a method of the invention. The method begins at step 100 where communication is established between the mobile unit and the base unit 12. Performance of this step is largely dependent on the specific implementation of both the base unit 12 and the mobile unit. For example, with reference to FIG. 1, the desktop personal computer 16 would establish communications using the modem 22 to place a telephone call over the telephone line 24 to the base unit 12. The telephone interface 74 of the base unit 12 and the modem 22 would establish communication in a manner well known in the art. Similarly, the laptop personal computer 18 would establish communications with the base unit 12 by completing a telephone call through the cellular telephone system 38. However, the basic operation of the invention is independent of the particular hardware and communication channels employed.

The method continues at step 102, in which a query is formatted at the remote unit. The query is formatted in accordance with the protocol of the invention, to be described in further detail below in conjunction with FIG. 3. The query comprises a serial stream of data and control bits. The control bits, for example, identify the remote user originating the query. The data bits specify the precise request being made of the base unit. For example, the data bits may specify an origin point and a destination point, from which the route calculator 66 (FIG. 1) of the base unit 12 is to calculate the route. Certain communications transport protocols, specific to the particular hardware implementation of the system 10, may prepend or append characters or other control bits to the control and data bits which form the query. For example, the modem 22 of the desktop PC 16 may include handshaking bits or signals to be used by the telephone interface 74 of the base unit 12 for processing the query. At step 104, the query is transmitted from the mobile unit to the base unit 12.

The method continues at step 106, where ambiguities in the query are resolved by the query resolver 64 (FIG. 1). Ambiguities may be in the form of spelling errors in the identification of an origin or a destination, an inconsistent latitude or longitude specification, and the like. At step 108, if the query resolver 64 cannot resolve the ambiguity, an error message may be communicated from the base unit to the remote unit at step 110, and the query must be repeated.

The method continues at step 112, where the query type is identified. The query may be one of several different types, including a route query, a point of interest query, a language query, or a metro area query. A route query asks the base unit 12 to identify a route between a specified origin point and a specified destination point. A route query includes the origin and the destination. A point of interest query requests a list of points of interest which satisfy specified criteria. For example, a point of interest query might request a list of all restaurants of a specific type, such as McDonald's™, within a specified distance or a specified driving time of a specified origin. A language query requests a list of available languages for display of information at the mobile unit or specifies the language (such as English or Dutch) in which the routing information is to be displayed at the remote unit. Such language queries are not needed if the language independent mode (to be described below) is being used. A metro area query requests a list of available metropolitan areas or specifies the metropolitan area within the map database 72 (FIG. 1) to be used for responding to the query. For example, a query which has as its origin "77 W. Chestnut Street" in Chicago must specify the Chicago metropolitan area rather than, for example, the Cincinnati metropolitan area, in order to prevent confusion. If a query cannot be identified, an error message is generated at step 110 and the query must be repeated. After the query type has been determined at step 112, the query is routed to, for example, the route calculator 66, the distance and travel estimator 68, and/or the surroundings explorer 70 (FIG. 1) for processing.

The method continues at step 114, where the query is fulfilled. For example, if the query requested routing information between an origin and a destination, the route calculator 66, operating in conjunction with the map database 72, calculates a route between the origin and the destination. Similarly, if the query was a point of interest query, the surroundings explorer 70 will determine points of interest which satisfy the query.

The method continues at step 116, where the response to the query is formatted. The response is formatted in accordance with a data communications protocol to be described in detail in conjunction with FIG. 4. The formatted response includes control and data bits. The control bits specify information such as the mobile unit which initiated the request. The data bits specify the information, such as route guidance information, which fulfills the query. At step 118, the method concludes when the response is electromagnetically transmitted from the base unit 12 to the mobile unit.

Referring now to FIG. 3, it is a diagram illustrating a data communication protocol for communicating data from a mobile unit to a base unit in accordance with the invention and which can be used in conjunction with the system of FIG. 1 and the method of FIG. 2. The protocol illustrated in FIG. 3 is defined by a communications syntax including variable message lengths, allowing as little or as much data transfer as necessary for the specific application requirement. In this implementation example, the protocol can be used across all communications systems, as long as the printable, seven-bit ASCII character set, plus the "newline" character (0x0A) can be transmitted by the communications system.

The transmitted character set consists of the principal ASCII character set plus the newline character. To transmit bytes of data which do not fit in this character set, or for communication protocols which do not allow transmission of the newline character, an escape mechanism is provided to allow transmission of these characters. For communication in binary format, numeric fields or numeric values are transmitted using two's complement notation, in network byte order (most significant byte first, followed by bytes of decreasing significance). Floating point numbers are transmitted using the IEEE 64-bit double precision format, with the most significant byte transmitted first.

Only a single query message 120 is needed to transmit a query from a mobile unit to the base unit 12. This query message 120 provides for both current location tracking information as well as route calculation requests. The query message 120 includes a plurality of fields 122. Each field of the plurality 122 of fields is separated by a delimiter, preferably the vertical bar "|" (ASCII code 0x7C). The start of the query message 120 begins with a delimiter character. The end of each message is marked by a delimiter character immediately followed by a newline character (ASCII code 0x0A), represented in FIGS. 3 and 4 as "\n". Any characters between the ending newline character and the starting delimiter are preferably ignored by the base unit 12 and the mobile unit.

As noted, the query message 120 includes a plurality of fields 122. Some communications transport protocols may prepend or append characters for controlling communication of the message in accordance with the specific hardware implementation of the system 10.

The query message 120 includes a message length field 124. This field specifies the length of the query message 120. The message length field 124 may also include a compression marker 125 indicating the compression status of the message. For example, the compression marker 125 may take on a first value if the query message 120 is compressed using a current phrase compression table. The compression marker 125 may take on a second value if the query message 120 is compressed using the current dictionary (bit compression) table. The compression marker 125 may take on a third value if the query message 120 is compressed using the L-Z (Lev-Zempel) compression algorithm. And the compression marker 125 may take on a fourth value or simply not be present if the query message 120 is not compressed in any way.

The query message 120 further includes a cyclical redundancy check (CRC) field 126. This field is preferably the computed CRC-16 of the query message 120, starting with the delimiter following the CRC field 126 up to and including the ending newline, as actually transmitted (i.e., as compressed). The query message 120 further includes a time stamp field 128 which gives the number of seconds since the epoch (00:00:00 GMT Jan. 1, 1970) when this message was sent. Preferably, messages older than 20 minutes will be ignored when received by the base unit 12.

The query message 120 further includes a subscriber identifier field 130. The information provided in this field may be used for billing and audit information. The query message 120 further includes a message identifier field 132. The characters in this field are used to tag response messages transmitted from the base unit 12 to the requesting mobile unit. The base unit 12 will place the characters in the message ID field 132 in any return message so that the mobile unit may determine what original message the base unit 12 is responding to. The query message 120 further includes an identifier field 134, which provides identification information uniquely identifying the mobile unit which transmitted the query message 120. The identification field 134 is used for tracking and communications addressing.

The query message 120 further includes a latitude field 136 and a longitude field 138. These fields specify the current position of the mobile unit by latitude and longitude, respectively. By default, the current latitude and longitude provide the origin for all routing requests, and also provide the position used for default tracking address translation.

The query message 120 further includes an origin field 140. The origin field 140 specifies the origin address for a routing information request. If this field is empty, the current position specified by the latitude field 136 and the longitude field 138 is used as the origin address. The query message 120 further includes an origin type field 142, which may be either an address or a point of interest category (such as "restaurant", "museum" or "airport") which is recognizable by the base unit 12.

The query message 120 further includes a destination field 144, which specifies the destination address if routing information is requested by the mobile unit from the base unit 12. If the destination field 144 is empty, then no route is calculated by the base unit 12. Instead, the message 120 is considered to be a tracking message only, merely providing the location of the mobile unit.

The query message 120 further includes a destination type field 146 which specifies the type of destination. For example, the destination may be an address or a point of interest category recognizable by the base unit 12. For example, the point of interest categories may include "restaurant", "airport", or "museum." As one example, the destination type field 146 may be "restaurant", and the destination field 144 may be "McDonald's™".

The query message 120 further includes a destination limit field 148. This field specifies a limit for point of interest searches. Such a search will be limited to the range specified by the value in the destination limit field 148 about the origin. For example, if the destination limit field 148 is empty or has a value 0, the base unit 12 preferably interprets this to indicate that the nearest point of interest satisfying the requirements specified by the destination field 144 and the destination type field 146 should be located. If the destination limit field 148 is non-zero, then the limit specified sets the maximum range searched for a matching point of interest. If no matching point of interest is in the range specified, a "no match" route error is returned.

The value of the destination limit specified in the destination limit field 148 depends on the limit type field 150. The limit type field 150 determines what unit of measurement is in the destination limit field. For example, the limit type field may take on a first value (for example "M") when the destination limit specifies a straight line distance. The limit type field 150 may take on a second value when the destination limit is driving distance. Or, the limit type field 150 may take on a third value when the destination limit is driving time, in minutes.

The query message 120 concludes with an ending field 152. The ending field 152 preferably includes the newline character, represented in FIG. 3 as "\n".

Before the ending field 152, the query message 120 may also include additional optional fields which specify additional information or service requests from the mobile unit to the base unit 12. For example, the query message 120 may additionally specify a text message to an operator of the base unit 12, or specify whether the base unit 12 should provide maneuver arms information or combined maneuver arms information along with route guidance text. The query message 120 can also specify, for example, whether the base unit 12 should send route stripmap information for a specified strip width with the returned route text, whether the base unit 12 should send responses in a language independent manner, and/or whether map information should be sent by the base unit 12 in bitmap or vector form.

Maneuver arms information is used to represent intersections along the route determined by the base unit 12. Combined maneuver arms information can be provided when two intersections are sufficiently close together. Further, the query message 120 can additionally specify routing options such as route calculations which avoid tolls, avoid left turns or avoid limited access roads, or specify a time of day for the start of the route. Still further, the message 120 could optionally request additional information from the base unit 12, such as a list of point of interest types, a list of points of interest matching search criteria or a list of files which may be communicated from the base unit 12 to the mobile unit to provide descriptive information.

Referring now to FIG. 4, FIG. 4 illustrates a data communications protocol for communicating data from a base unit to a mobile unit in accordance with the invention and which can be used in conjunction with the system of FIG. 1 and the method of FIG. 2. In FIG. 4, a response message 160 is illustrated as including a plurality of fields 162.

In accordance with the invention, the response message 160 may be transmitted in a continuous stream of data, called the burst mode, or in a plurality of discrete responses to queries for data, called the normal mode. The mode of data transmission can be specified by the mobile unit, for example, in an additional field included in the query message 120. In the burst mode, the base unit 12 transmits data as fast as possible, without waiting for requests from the mobile unit. In the normal mode, the base unit 12 sends a packet, then waits for the mobile unit to request the next packet before sending the next packet.

As mentioned above, the response transmitted from the base unit 12 to a mobile unit may include maneuver arms information. Maneuver arms are graphical vectors used by the mobile unit for displaying a graphical representation of an intersection to be traversed. At least three types of visual information can be transmitted by the base unit. These include a geometric representation of the intersection, including arms representing the streets approaching an intersection and the angles at which the streets approach the intersection. The transmitted information can further include which of the streets is included in the route to be travelled so that, for example, that street may be highlighted in the graphical display. The transmitted information can further include information about street signs located at the intersection.

In one embodiment, the maneuver arms information includes only sufficient data to create a display showing only what the driver of a vehicle containing the mobile unit will see as the driver traverses the displayed intersection. Other, extraneous information, such as a map of the region around the intersection or of the entire metropolitan region, is not transmitted.

Transmitting only a representation of intersections to be traversed, rather than extraneous information, greatly reduces data transmission and storage requirements. Thus, a relatively low bandwidth channel may be used for transmitting queries and responses between the base unit 12 and the mobile unit. For example, a channel having a bandwidth as low as 1,200 bits per second may be used. In contrast, transmitting extraneous information may require a bandwidth as high as 1 megabit per second. Since, with the invention, the amount of data transmitted is relatively small, the entire response, including maneuver arms information, may be transmitted in a reasonable time, even at a low bandwidth. In addition, since only pertinent information about intersections is transmitted, only a small amount of memory, such as memory 26 of the desktop personal computer 16 (FIG. 1) is required at the mobile unit.

After an intersection has been traversed, the display is, in general, updated to show the next intersection to be traversed, using maneuver arms information received from the base unit and stored in memory. The display can be updated in response to operator control, for example, by operating a switch or by voice control, or automatically in response to a position sensor such as the position locator 42 of the laptop personal computer 18 (FIG. 1).

The response message 160 preferably includes a message length field 164 which specifies the length of the response message 160. In addition, the message length field 164 may include a compression marker character 165. The compression marker character 165 may take on one of a number of values. For example, the compression marker character 165 may take on a first value if the response message 160 is compressed using the current phrase compression table. The compression marker character 165 may take on a second value if the response message 160 is compressed using the current dictionary (bit compression) table. The compression marker character 165 may take on a third value if the response message 160 is compressed according to the L-Z (Lev-Zempel) compression algorithm. The compression marker character 165 may take on a fourth value or simply not be present if the response message 160 is not compressed in any way.

The response message 160 further includes a CRC field 166 which is preferably the computed CRC-16 of the message 160, starting with the delimiter following the CRC field 166 up to and including the ending character of the message 160. The response message 160 further includes a time stamp field 168 which specifies the number of seconds since the epoch (00:00:00 GMT Jan. 1, 1970) when this message was sent. Preferably, messages older than 20 minutes will be ignored by the mobile unit which receives the message.

The response message 160 further includes a subscriber identifier field 170. This field preferably specifies information used for auditing, billing and authorization.

The response message 160 further includes a message identification field 172. In accordance with the invention, the contents of the message identification field 170 of the response message 160 match the contents of the message ID field 132 of the query message 120. The response message 160 further includes an identifier field 174. Preferably, the contents of the identifier field 174 of the response message 160 match the contents of the identifier field 134 of the query message 120.

The response message 160 also includes a type field 176 and a message field 178. The type field 176 specifies the type of the message contained in the message field 178. For example, the type field 176 may have a first value (for example type "R") specifying that the message field 178 contains route tracking address translation information. Such a message would result from the base unit 12 having received a route tracking query. The message in the message field 178 is then the address corresponding to the current position (latitude, longitude). The type field 176 may have a second value specifying that the message field 178 includes route guidance information. This message would result from the base unit 12 having received a route calculation request. The message is the set of driving instructions. The instructions will contain several lines of text, each separated by carriage return/newline characters. There may be several messages of this type communicated for a single route. Each message will correspond to a single maneuver if arms are requested, or be the complete text if arms are not requested.

The message type field 176 may take on a third value to indicate that the message field 178 contains a download of information. This message would result from a query requesting particular information from the base unit 12. The type field 176 may take on a fourth value to indicate that the message field 178 contains an error message. For example, the latitude and longitude specified by the latitude field 136 and the longitude field 138 in the query message may be outside the specified metropolitan region, or the specified address may be invalid or not found for a route calculation. The message field 178 contains the error text defining the error.

The type field 176 may take on a fifth value to specify that the message field 178 contains a query response. Such a message would be the result of a query made of the database, for example requesting a list of point of interest types. The message field 178 includes the query data.

The response message 160 concludes with an ending field 180. Preferably, the ending field 180 includes the newline character, illustrated in FIG. 4 as "\n".

The use of maneuver arms will now be described in greater detail. Maneuver arms are used to depict roads at intersections. If maneuver arms information is requested by a remote unit, the base unit 12 generates the maneuver arms information in a maneuver arm generation module and provides this arms information for a current maneuver to the remote unit. The remote unit, for example computer 18, processes this information and displays the information on a display, for example display 46. The base unit 12 provides the information to the remote unit in the following form:

FromName; ToName; $x_1, y_1; x_2, y_2 [ \ldots ; x_n, y_n]$

"FromName" is the road being driven on at the beginning of the maneuver. "ToName" is the road being driven on at the end of the maneuver (except for the first maneuver). The x, y values specify the endpoints of the arms from an origin, which is set at the intersection. Each arm starts at the origin and radiates outward to an endpoint x, y. In one preferred embodiment, x and y are integer values between −100 and +100. The base unit 12 scales and rotates the arms so that the from road is vertical on the display and approaches the intersection from the bottom. If there are any arms, in general there will be at least two: a first arm to represent the "from" road using $x_1$ and $y_1$, and a second arm to represent the "to" road using $x_2$ and $y_2$. Other arms specified by $x_n$ and $y_n$ are used to represent any additional roads at the intersection. The signs of the x and y coordinates are shown in FIG. 5.

In one embodiment, the endpoint coordinates of the first, or from, arm are 1, 99 so that the first arm appears to be going straight up from the bottom of the display to the origin. The other arms are mapped relative to the position of this first arm. In this embodiment, endpoint coordinates of 99, −1 correspond to an approximately 90° right turn from the first arm. Endpoint coordinates of −99, 0 correspond to an approximately 90° left turn from the first arm. Endpoint coordinates of 1, −100 correspond to proceeding straight ahead through the intersection.

For the first maneuver, the ToName can represent a cross street near the beginning of a route to orient the driver even though this cross street is not to be turned onto.

FIGS. 6 to 10 illustrate examples of displays in a remote unit in the course of a trip from 1550 Rockwood St., Los Angeles, to 280 Emerald St., Los Angeles. In this example, after the driver enters the from information "1550 ROCKWOOD ST, LOS ANGELES" and the to information "280 EMERALD ST, LOS ANGELES" the display in the remote unit informs the driver of the approximate driving distance and driving time by displaying "ABOUT 0.4 MILES, 3 MINUTES" (not shown in FIGS. 6 to 10). Then, as the driver proceeds, the display displays the textual and graphic information shown in FIGS. 6 to 10. The directions in textual form are displayed on the left, and corresponding maneuver arms are graphically displayed on the right based on the x, y endpoint coordinates received from the base unit 12. The exact appearance of the display, for example, road width and road edge color, can be customized by the remote user.

FIGS. 11 to 14 illustrate the data transferred between the remote unit and the base unit in the example of FIGS. 6 to 10. More specifically, FIG. 11 illustrates the packet transmitted from the remote unit to the base unit. FIG. 12 illustrates the packet issued from the base unit in response. FIG. 13 illustrates a second communication from the remote unit to the base unit. And, FIG. 14 illustrates a corresponding response from the base unit. In the example of FIGS. 11 to 14, not all of the fields shown in FIGS. 3 and 4 are needed and are thus omitted.

As shown by the "ARMS=Y" designation in an optional routing alternatives field, the request in FIG. 11 includes a request for maneuver arms information. In the second message in FIG. 12, the base unit begins to send maneuver arms information, in the format described above, via the "ARM=ROCKWOOD,GLENDALE;1,99;−91,41;90,−42"instruction. The optional "MORE=Y" instruction in the fifth message of FIG. 12 indicates that there are more packets of messages to follow. The "MANEUVER=NEXT" and "ARMS=Y" instructions of FIG. 13 direct the base unit 12 to send the additional information, including maneuver arms information. This additional information is sent via the packet shown in FIG. 14.

FIGS. 15 to 38 illustrate additional examples of data transferred between a remote unit and a base unit. FIG. 15 illustrates a packet sent by a remote unit to a base unit which constitutes the initial log-in communication that sets a non-burst mode and a 1K maximum packet size. FIG. 16 illustrates the response to the request of FIG. 15. FIG. 16 is a response which merely acknowledges the request of FIG. 15 because there is insufficient information for a route request or a query. FIG. 17 illustrates a request to use a Los Angeles, Calif. database for future requests and FIG. 18 illustrates the corresponding acknowledgement.

FIG. 19 illustrates a request for a route from 950 S. Flint Ridge Way to 2043 N. Sacramento along with maneuver arms. FIG. 20 illustrates a first packet in response to the request of FIG. 19. FIG. 21 illustrates a request from the remote unit to the base unit to send the next packet of instructions along with maneuver arms. FIG. 22 illustrates a response providing the next packet, as requested. FIG. 23 illustrates a request for the next block of instructions and FIG. 24 illustrates the next block of instructions. Finally, FIG. 25 illustrates a request for the last block of instructions and FIG. 26 illustrates the corresponding response. Thus, FIGS. 19 to 26 together illustrate the communications to provide the route from 950 S. Flint Ridge Way to 2043 N. Sacramento.

FIG. 27 illustrates a request for a route from 1750 Queens Road to 7530 Orangethorpe, along with maneuver arms. FIG. 28 illustrates the packet giving the first block of instructions in response to the FIG. 27 request. FIG. 29 requests the next block of maneuvers. And, FIG. 30 illustrates the final block of maneuvers.

FIG. 31 illustrates a request for a list of all points of interest (POIS) of the restaurant type with "HAPPY" in their name within 10.0 miles (encoded as "100" and "M") of 1855 W. Katella Avenue. FIG. 32 illustrates the response indicating that there are no such points of interest found which satisfy the given criteria. FIG. 33 illustrates another request for a list of points of interest of the restaurant type with "HUNGRY" in their name within 10.0 miles of 1855 W. Katella Avenue. FIG. 34 illustrates the corresponding response providing the information for two points of interest satisfying the criteria set forth in the message of FIG. 33. In FIG. 34, "HUNGRY TIGER SEAFOOD RESTAURANT" at "6231 MANCHESTER BLVD, BUENA PARK" is the first point of interest. The "36" is the type of point of interest, i.e., restaurant. The "23606" is a unique identification number for the point of interest. The "0-0-223-137,4,1" specifies the restaurant location relative to a known node in the metropolitan region. The "46646" is the distance to the restaurant in feet and the "N" indicates that no additional information regarding the restaurant is available.

FIG. 35 is a packet sent from a remote unit to a base unit which requests a list of points of interest of the restaurant type with "BURGER" in their name within 10.0 miles of 1855 W. Katella Avenue. FIG. 36 illustrates the first packet in response to the request of FIG. 35. FIG. 37 requests additional points of interest in response to the request of FIG. 35. FIG. 38 provides additional points of interest satisfying the criteria in the request in FIG. 35.

Figure 39:
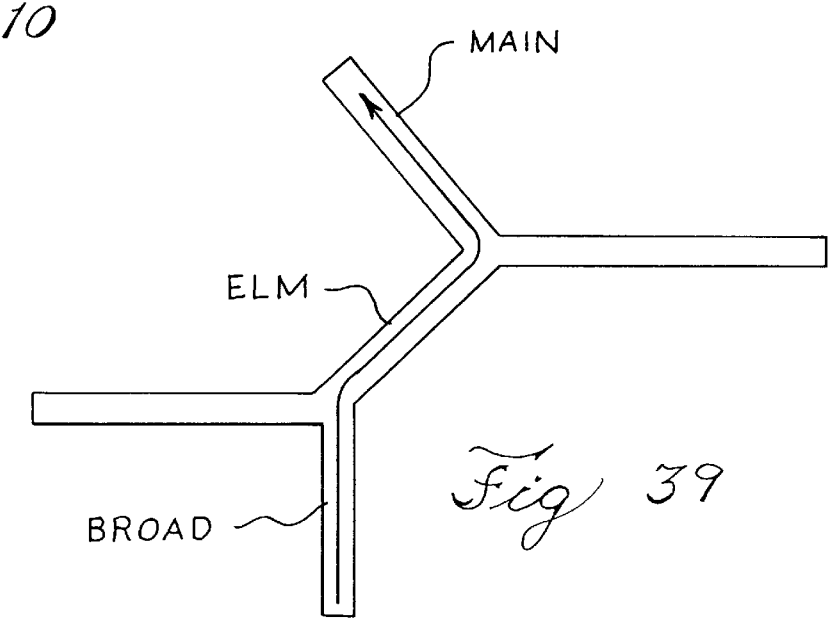
FIG. 39 illustrates a combined maneuver arms display.

The invention generates combined maneuver arms in situations where turns are required at two different intersections which are close together. FIG. 39 illustrates an example of a combined maneuver arm. In the example of FIG. 39, a slight right turn is required at the corner of Broad Street and Elm Street and a left turn is required at the intersection of Elm Street and Main Street. Instead of generating maneuver arms for the Broad-to-Elm turn and another set of maneuver arms for the Elm-to-Main turn, the invention generates a single combined maneuver arms display, as shown in FIG. 39, by the following process.

For each set of maneuver arms generated at an intersection, the base unit 12 determines whether there is a sufficiently close intersection at which the driver must turn. If sufficiently close intersections requiring turns occur, then the maneuver arms information for both of these intersections are merged for a single combined maneuver arms display such as that shown in FIG. 39. For the combined maneuver arms, the roads are designated by sets of endpoints, similar to that described above in connection with FIG. 5. One acceptable form for combined maneuver arms is as follows:

FromName, ToName, $ox_a$, $oy_a$, $x_{a1}$, $y_{a1}$; $x_{a2}$, $y_{a2}$; $X_{an}$, $y_{an}$: ToName, $ox_b$, $oy_b$, $x_{b1}$, $y_{b1}$; $x_{b2}$, $y_{b2}$; $x_{bn}$, $y_{bn}$ The $ox_a$ and $oy_a$ coordinates specify the coordinates of the first, or $a^{th}$, intersection, or origin, and the $ox_b$ and $oy_b$ coordinates specify the coordinates of the second, or $b^{th}$, intersection, or "origin." The arms are specified with respect to these origins. For example, $x_{a1}$ and $y_{a1}$ are the endpoint coordinates of the 1$^{st}$ road at the first, or $a^{th}$, intersection. To conserve space, coordinates for "origins" other than the first can be omitted because they can be reconstructed from the from/to arm data.

Combined textual information is also displayed along with combined maneuver arms. Thus, along with the graphic display shown in FIG. 39, the following textual instructions are also displayed: "Turn slight right on ELM ST. followed shortly by a left turn onto MAIN ST. Drive 5.6 miles." Three or more intersections can be combined.

An additional feature of the invention is the transmission of message information, that is, the information in message field 178 in FIG. 4, in a further compressed form. The use of such a form has at least two advantages. First, use of such a form allows message information to be transmitted electromagnetically in a more efficient way. Second, use of such a form allows transmission of information from the base unit 12 to a remote unit in a language independent manner. Upon receipt of the information in this form, the remote unit then converts the information for display into expanded textual instructions in any desired language such as English, Spanish, Japanese, and/or German. This form will generally be referred to herein as the language independent form or language independent mode.

In the language independent mode, the textual description of maneuvers are generated by a token generation module in base unit 12 and are transmitted to the remote unit in a tokenized form. For example, instructions to:

Turn left on W. MAIN ST. and drive 4.3 miles.

Would be transmitted as:

3,W. MAIN ST.,4.3.

In this example, the "3" represents the English instruction to:

Turn left on [blank 1. ] and drive [blank 2] miles.

The "W. MAIN ST." field is the information to be inserted in the [blank 1] position (corresponding to a street sign) and the "4.3" field is the information to be inserted in the [blank 2] position. If German language instructions are desired, then the remote unit displays the following text for a type "3" instruction:

Auf [blank 1] links abbiegen und [blank 2] Meilen weiterfahren.

Thus, using the 5th message of FIG. 12 as another example, instead of transmitting "Turn LEFT onto EMERALD DR. \r Drive 0.1 miles." the following tokenized information is transmitted to convey the same information in a much more compact form:

3,EMERALD DR.,0.1

Figures 40, 41:
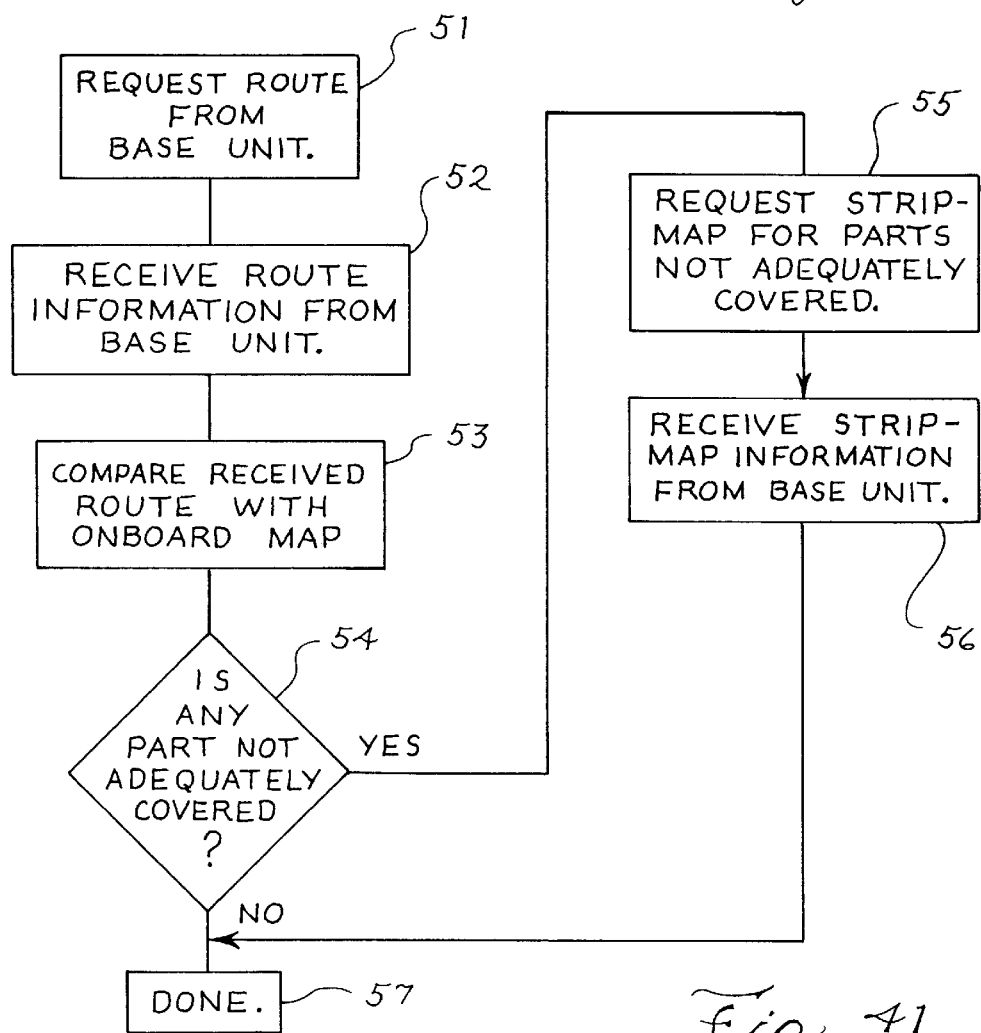
FIG. 40 illustrates some examples of tokens and corresponding expanded English, Spanish, and German text.
FIG. 41 is a flowchart used for explaining operation of a stripmap request feature of the invention.

FIG. 40 provides additional examples of tokens and corresponding expanded text in English, Spanish, and German.

Upon receiving the tokenized route information, the remote unit applies a set of translating instructions contained in a lookup table implemented, example, in computer 18, one table per language, or sounding, desired. For example, the English token translation instructions for a type 3 token indicate that "Turn left on" is displayed, then the signage or street name, then "and drive," then the distance, and then "miles." The remote unit can be equipped with a set of buttons for the user to specify the desired language(s).

Translation instruction can be more or less complicated and can include conditions for added flexibility. For example, the English token translation instructions for a type 5 instruction indicate that "Follow the sign" is displayed first, then if the number of signs in the message is greater than one an "s" should be added to "sign," then the sign(s) should be displayed, then "on the ramp." should be displayed. Thus, in one instance a type 5 token might produce, expanded English maneuver text of:

Follow the signs TO O'HARE, TO INDIANA on the ramp.

In another instance, a type 5 token might produce the expanded English maneuver text of:

Follow the sign TO CHICAGO on the ramp.

The remote unit can also convert the miles information into kilometers, if desired.

Thus, in the language independent mode, information is transmitted from the base unit without regard to any particular language. Accordingly, the transmission bandwidth does not depend on the language of the instructions to be displayed on the display in the remote unit. Because the remote unit produces the actual text portion, routes can be presented in more than one language or way either concurrently or serially, as desired by the remote user, without the need for additional information from the base unit.

Use of tokens allows remote system users to create their own language formats, if desired, to best fit particular needs and capabilities. Alternatively, a remote unit can download language formats (that is, expanded text corresponding to various tokens) that have already been created from the base unit.

The base unit can also provide the remote units with other information in addition to the textual directions and maneuver arms information discussed above. In some applications, a remote user desires more information than just the textual directions and maneuver arms information and more information than is stored and maintained in the remote unit. For various practical reasons, such as cost, remote units generally have at best only a limited database on-board. Such a limited database may, for example, include information and/or maps for a limited metropolitan area.

Even though a remote user may have no or a limited on-board database, the invention allows the remote user to obtain a large amount of information from the base unit. Thus, the invention allows a remote unit to access a large amount of information without burdening the remote unit with storage and maintenance of a large database. Such information can include, for example, maps for a complete route (not just information about intersections which require turns) or maps for an area which is simply not covered by any on-board database.

FIG. 41 is a flowchart which illustrates the operations in a remote unit, such as computer 18, for determining whether the remote unit needs additional information from the base unit and for obtaining such additional information when it is needed. In the operations illustrated in FIG. 41, the remote unit has a small on-board database.

In step S1, the remote unit requests a route between an origin and a destination from the base unit using the protocol shown in FIGS. 3 and 11. The base unit 12 calculates the route in route calculator 66 and this route is received in the remote unit in step S2. In step S3, the remote unit compares the route received from the base unit with map information stored on-board the remote unit. In a preferred embodiment, the comparison is made on a node basis. If any part of the route is not adequately covered by on-board maps in terms of geographic scope/bound or level of detail/content, as determined at step S4, then the processing proceeds on to step S5. Otherwise, the processing proceeds on to step S7 and is completed.

In step S5, the remote unit requests, from the base unit 12, stripmaps for those portions of the route which are not adequately covered by maps available on-board the remote unit. Maps are not requested for areas which are adequately covered by on-board maps. A stripmap can be relatively simple or it can be fairly detailed and include side roads, intersections, points of interest, and features for map-matching in the remote unit. In step S6, the remote unit receives the requested stripmap information from the base unit.

A similar procedure is used when a route is within the area covered by the on-board database but the base unit has more up-to-date information. The remote unit can also download updated maps, new programs, and the like. Remote units without any on-board database must obtain all information from the base unit. A remote unit specifies what information it needs, using the above-described protocol, based on what information the remote unit desires and can handle.

Included herewith as Appendix A is a copy of computer code for implementing the packet/message interpretation and parsing functions described above.

As can be seen from the foregoing, the invention provides a system and method for providing graphically referenced information from a base unit or server to a mobile unit in a compact form. The invention allows the mobile unit to operate with limited or no database storage or position sensor requirements. Software for controlling the mobile unit runs on generic hand-held devices or desktop computers with wireless or wireline communications capability. A query, communicated from the mobile unit to the base unit, and the response, communicated from the base unit to the mobile unit, are packaged into a standard data communications protocol that manages a broad spectrum of queries and responses available. This approach to providing route guidance information allows automatic real time database updates and corrections at the base unit, avoiding database distribution problems. In addition, the cost and technical requirements for the on-board or mobile unit equipment are substantially lower than for prior art route guidance information systems.

It is to be understood that, while the detailed drawings and specific examples given describe preferred embodiments of the invention, they are for the purpose of illustration only. The invention is not limited to the precise details disclosed, and various changes may be made therein. For example, the format or protocol of the query message and the response message, illustrated in FIGS. 3 and 4, respectively, may be modified to request different types of information from the map database or to specify different formats or subsets of information to be conveyed to the mobile unit. Such changes may be made without departing from the spirit of the invention which is defined by the following claims.

APPENDIX A — COMPUTER PROGRAM LISTING

```
static   char * _sccs_ =   { "   $ S o u r c e :
/ids/cvs/host/fe_spif/src/version.c,v $ Ver: $Revision: 1.1 $
Date: $Date: 1994/12/21 09:36:07 $"};
/* Copyright (C) 1994,1995 SEI Information Technology, Inc. */

/*::::::::::::::::::::::::::::::::::::::::::::::::::::::::::::
:::::::::::::::
:: Filename:   version.c
::
:: Purpose:        Get version number.
::
:: Revision:
:: WHO            --WHEN--  WHAT
:: Raju           10/27/94  Original
::::::::::::::::::::::::::::::::::::::::::::::::::::::::::::::
::::::::::::::*/ include <stdio.h> char    VERSION[] =    "$Revision: 1.1 $";

ifdef _MAIN_ main()
{
    printf("\nVersion Number is %s\n", VERSION);
} endif _MAIN_
```

```
static char * _rcs_ = {"$Id:$"};
/* Copyright (C) 1994,1995 SEI Information Technology, Inc. */
/*:::::::::::::::::::::::::::::::::::::::::::::::::::::::::::
:::::::::::::::
:: Filename:        btrftran.c
:: Purpose:             Translate BTRF data into text.
:: Revision:        03/20/95       RPD       Original
:::::::::::::::::::::::::::::::::::::::::::::::::::::::::::::
:::::::::::::*/
#ifndef _MAKEDEPEND_
#include <stdio.h>
include <stdlib.h>
#include <string.h>
#include <fcntl.h>
endif   /* _MAKEDEPEND_ */ define _BTRFTRAN_C_
include "ids_defs.h"
#include "capi.h"
#include "ci_defs.h"
#include "ci_err.h"
#include "ci_types.h"
#include "ci_proto.h"

/*:::::::::::::::::::::::::::::::::::::::::::::::::::::::::::
::::::::::::::::
:: Function:       sCI_BTRFInit
:: Purpose:           Init BTRF translator. Perform once when
API is
::                    initilized. Expects that all data is
uninitilized.
::
:: Arguments:      pSD: Pointer to State Data structure.
::
:: Return value:   SUCCESS:
::                         FAILURE:
::
:: Side affects:
:: Revision:       03/20/95       RPD       Original
:::::::::::::::::::::::::::::::::::::::::::::::::::::::::::::
:::::::::::::*/
SHORT sCI_BTRFInit(CI_STATE_DATA * pSD)
{
     SHORT          sResult;

/* Initilize state info */

/* Init sub container */
     sResult = sCI_BSCInit(pSD);
     if (sResult != SUCCESS)
     {
          return sResult;
     }

SD_BTRF(pSD).sBTRFState = eBTRFInit;
```

APPENDIX A — PAGE 2 OF 279

```
        SD_BTRF(pSD).pcFEBLangFilename = NULL;
        SD_BTRF(pSD).iFEBInFile = 0;
        SD_BTRF(pSD).palFEBTmplOffsets = NULL;
        SD_BTRF(pSD).pbyData = NULL;
        SD_BTRF(pSD).sDataLen = 0;
        SD_BTRF(pSD).pbyCurrInput = NULL;
        SD_BTRF(pSD).pcCopyright = NULL;
        SD_BTRF(pSD).ulTotalMansLen = 0L;
        SD_BTRF(pSD).sTotalMans = 0;
        SD_BTRF(pSD).sCurrManNum = 0;
        SD_BTRF(pSD).sCurrManTmplCount = 0;
        SD_BTRF(pSD).usCurrTmplSize = 0;
        SD_BTRF(pSD).pcTmplBuf = NULL;
        SD_BTRF(pSD).pcManBuf = NULL;
        SD_BTRF(pSD).pcCurrTmpl = NULL;
        return SUCCESS;
}

/*::::::::::::::::::::::::::::::::::::::::::::::::::::::::::::::::
:::::::::::::::::
:: Function:       sCI_BTRFReset
:: Purpose:            Reset BTRF translator to init state and
do necessary
::                     cleanup. Perform at the start of each
route request,
::                     and/or end of a route request.
::
:: Notes:          The main difference between Reset and Init
is that Reset
::                     will perserve the name of the language
file, close open
::                     files, etc.
::
:: Arguments:      pSD: Pointer to State Data structure.
::
:: Return value:   SUCCESS:
::                     FAILURE:
::
:: Side affects:
:: Revision:       03/20/95    RPD     Original
::::::::::::::::::::::::::::::::::::::::::::::::::::::::::::::::::
::::::::::::::::*/
SHORT sCI_BTRFReset(CI_STATE_DATA * pSD)
{
    SHORT    sResult;

/* Init state info */

SD_BTRF(pSD).sBTRFState = eBTRFInit;
    if (SD_BTRF(pSD).iFEBInFile != 0)
    {
        close(SD_BTRF(pSD).iFEBInFile);
        SD_BTRF(pSD).iFEBInFile = 0;
    }
```

```
    if (SD_BTRF(pSD).palFEBTmplOffsets != NULL)
    {
        vCI_MemFree(pSD, SD_BTRF(pSD).palFEBTmplOffsets);
        SD_BTRF(pSD).palFEBTmplOffsets = NULL;
    } if (SD_BTRF(pSD).pbyData != NULL)
    {
        vCI_MemFree(pSD, SD_BTRF(pSD).pbyData);
        SD_BTRF(pSD).pbyData = NULL;
    } if (SD_BTRF(pSD).pcTmplBuf != NULL)
    {
        vCI_MemFree(pSD, SD_BTRF(pSD).pcTmplBuf);
        SD_BTRF(pSD).pcTmplBuf = NULL;
    } if (SD_BTRF(pSD).pcManBuf != NULL)
    {
        vCI_MemFree(pSD, SD_BTRF(pSD).pcManBuf);
        SD_BTRF(pSD).pcManBuf = NULL;
    }

SD_BTRF(pSD).sDataLen = 0;
    SD_BTRF(pSD).pbyCurrInput = NULL;
    SD_BTRF(pSD).ulTotalMansLen = 0L;
    SD_BTRF(pSD).sTotalMans = 0;
    SD_BTRF(pSD).sCurrManNum = 0;
    SD_BTRF(pSD).sCurrManTmplCount = 0;
    SD_BTRF(pSD).usCurrTmplSize = 0;
    SD_BTRF(pSD).pcCurrTmpl = NULL;

/* Reset sub container */
    sResult = sCI_BSCReset(pSD);
    if (sResult != SUCCESS)
    {
        return sResult;
    } return SUCCESS;
}

/*:::::::::::::::::::::::::::::::::::::::::::::::::::::::::::::::::::::::::::::::::::
:: Function:        sCI_BTRFDealloc
:: Purpose:         Clean up BTRF translator. Release all used resources.
::                  Perform when BTRF translator is no longer needed.
::
:: Arguments:       pSD: Pointer to State Data structure.
::
:: Return value:    SUCCESS:
::                          FAILURE:
```

APPENDIX A — PAGE 4 OF 279

```
::
:: Side affects:
:: Revision:         03/20/95      RPD       Original
::::::::::::::::::::::::::::::::::::::::::::::::::::::::::::
::::::::::::::::*/
SHORT sCI_BTRFDealloc(CI_STATE_DATA * pSD)
{
    SHORT     sResult;
    LONG *    palFEBTmplOffsets;

sResult = sCI_BTRFReset(pSD);

if (SD_BTRF(pSD).pcCopyright != NULL)
    {
        vCI_MemFree(pSD, SD_BTRF(pSD).pcCopyright);
        SD_BTRF(pSD).pcCopyright = NULL;
    } if (SD_BTRF(pSD).pcFEBLangFilename != NULL)
    {
        vCI_MemFree(pSD, SD_BTRF(pSD).pcFEBLangFilename);
        SD_BTRF(pSD).pcFEBLangFilename = NULL;
    } if (SD_BTRF(pSD).palFEBTmplOffsets != NULL)
    {
        vCI_MemFree(pSD, SD_BTRF(pSD).palFEBTmplOffsets);
        SD_BTRF(pSD).palFEBTmplOffsets = NULL;
    } if (SD_BTRF(pSD).pbyData != NULL)
    {
        vCI_MemFree(pSD, SD_BTRF(pSD).pbyData);
        SD_BTRF(pSD).pbyData = NULL;
    } return SUCCESS;
}

/*::::::::::::::::::::::::::::::::::::::::::::::::::::::::::::
::::::::::::::::
:: Function:         sCI_BTRFSetLangFile
:: Purpose:          Specify name of FEB language file to be
used in BTRF
::                   translations.
::
:: Arguments:        pSD: Pointer to State Data structure.
::                   pcFileName: name of new language file.
::
:: Return value:     SUCCESS:
::                        FAILURE:
::
:: Side affects:
:: Revision:         03/20/95      RPD       Original
```

APPENDIX A — PAGE 5 OF 279

```
:::::::::::::::::::::::::::::::::::::::::::::::::::::::::::::::
:::::::::::::::*/
SHORT sCI_BTRFSetLangFile(CI_STATE_DATA * pSD, CHAR * pcFileName)
{
    CHAR *    pcLangFile;

if (pcFileName == NULL)
    {
        vCI_ErrorQPut(pSD,    CI_ER_INVLANGFILE,
CI_FUNC_BTRFSETLANGFILE, 0);
        return CI_ER_INVLANGFILE;
    }
    if (*pcFileName == '\0')
    {
        vCI_ErrorQPut(pSD,    CI_ER_INVLANGFILE,
CI_FUNC_BTRFSETLANGFILE, 0);
        return CI_ER_INVLANGFILE;
    } if (SD_BTRF(pSD).pcFEBLangFilename != NULL)
    {
        vCI_MemFree(pSD, SD_BTRF(pSD).pcFEBLangFilename);
        SD_BTRF(pSD).pcFEBLangFilename = NULL;
    }

SD_BTRF(pSD).pcFEBLangFilename =
                        (CHAR    *)pvCI_MemAlloc(pSD,
STRLEN(pcFileName) + 1);
    if (SD_BTRF(pSD).pcFEBLangFilename == NULL)
    {
        vCI_ErrorQPut(pSD,    CI_ER_NOMEM,
CI_FUNC_BTRFSETLANGFILE,
                            STRLEN(pcFileName) + 1);
        return CI_ER_NOMEM;
    }

/* copy string */
    STRCPY(SD_BTRF(pSD).pcFEBLangFilename, pcFileName);

return SUCCESS;
}

VOID fake_it(CI_STATE_DATA * pSD, CI_RES_MSG * pMsg)
{
    /* Fake Controller into arrival of data */
    memset(&(pSD->ManInfo), 0, sizeof(CI_MAN_REC));
    vCI_CtrlPreProcItem(pSD, pMsg->usMsgId);
    sCI_ROSAddMan(pSD, &(pSD->ManInfo));
    vCI_CtrlPostProcItem(pSD);
}

/*:::::::::::::::::::::::::::::::::::::::::::::::::::::::::::::::
:::::::::::::::
:: Function:        sCI_BTRFOpenFEB
```

```
::  Purpose:            Open and perform initial processing on
FEB file.
::
::  Arguments:      pSD: Pointer to State Data structure.
::
::  Return value:   SUCCESS:
::                  FAILURE:
::
::  Side affects:
::  Revision:       03/22/95        RPD        Original
::::::::::::::::::::::::::::::::::::::::::::::::::::::::::::::
:::::::::::::::*/
SHORT sCI_BTRFOpenFEB(CI_STATE_DATA * pSD)
{
    INT    iFileHndl;
    LONG   lOffset;
    SHORT      sShort;
    INT        iResult;
    LONG *     palOffsets;

#ifdef _WINDOWS
    iFileHndl = open(SD_BTRF(pSD).pcFEBLangFilename, O_RDONLY
#else
    iFileHndl = open(SD_BTRF(pSD).pcFEBLangFilename, O_RDONLY);
endif if (iFileHndl == -1)
    {
        vCI_ErrorQPut(pSD, CI_ER_FEBOPEN, CI_FUNC_BTRFOPENFEB,
0);
        return CI_ER_FEBOPEN;
    }

/* seek past language desc. */
    lOffset = lseek(iFileHndl, CI_FEB_DESCLEN, SEEK_SET);
    if (lOffset != CI_FEB_DESCLEN)
    {
        close(iFileHndl);
        vCI_ErrorQPut(pSD, CI_ER_INVFEB, CI_FUNC_BTRFOPENFEB,
0);
        return CI_ER_INVFEB;
    }

/* read template count */
    iResult = read(iFileHndl, &sShort, sizeof(sShort));
    vCI_SwapShorts(&sShort, 1);
    if (iResult != sizeof(sShort))
    {
        close(iFileHndl);
        vCI_ErrorQPut(pSD, CI_ER_INVFEB, CI_FUNC_BTRFOPENFEB,
0);
        return CI_ER_INVFEB;
    }
    SD_BTRF(pSD).sFEBTmplCount = sShort;

/* prepare for FEB template offsets */
```

APPENDIX A — PAGE 7 OF 279

```
        palOffsets = (LONG *) pvCI_MemAlloc(pSD,
                                        sizeof(LONG)    *
CI_MAX_FEBTMPLS);
        if (palOffsets == NULL)
        {
            close(iFileHndl);
            vCI_ErrorQPut(pSD, CI_ER_NOMEM, CI_FUNC_BTRFOPENFEB,
0);
            return CI_ER_NOMEM;
        }
        memset(palOffsets, 0, sizeof(LONG) * CI_MAX_FEBTMPLS);

/* Read in template offsets */
        iResult = read(iFileHndl, palOffsets,
                                        sizeof(LONG)    *
CI_MAX_FEBTMPLS);
        if (iResult != sizeof(LONG) * CI_MAX_FEBTMPLS)
        {
            vCI_MemFree(pSD, palOffsets);
            close(iFileHndl);
            vCI_ErrorQPut(pSD, CI_ER_INVFEB, CI_FUNC_BTRFOPENFEB,
0);
            return CI_ER_INVFEB;
        }

/* Correct byte order */
        vCI_SwapLongs(palOffsets, CI_MAX_FEBTMPLS);

SD_BTRF(pSD).palFEBTmplOffsets = palOffsets;
        SD_BTRF(pSD).iFEBInFile = iFileHndl;
#if 0
fprintf(stderr,     "template    count    =    %d\n",
SD_BTRF(pSD).sFEBTmplCount);
endif return SUCCESS;
}

/*::::::::::::::::::::::::::::::::::::::::::::::::::::::::::::::::
:::::::::::::::::
:: Function:        sCI_BTRFHeader
:: Purpose:             Process the header of a BTRF download.
::
:: Arguments:       pSD: Pointer to State Data structure.
::
:: Return value:    SUCCESS:
::                      FAILURE:
::
:: Side affects:    (within CI_BTRF_INFO)
::                      pbyCurrInput:   Current input data block.
::                      sCurrInLen:     Length of input data
block.
:: Revision:        03/28/95      RPD       Original
::::::::::::::::::::::::::::::::::::::::::::::::::::::::::::::::::
::::::::::::::*/
```

```
SHORT sCI_BTRFHeader(CI_STATE_DATA * pSD)
{
    BYTE *      pbyInput;
    SHORT       sBytesRead = 0;
    SHORT       sHdrLen;
    LONG *      pLong;
    LONG        lLongVal;
    SHORT *     pShort;
    SHORT       sShortVal;
#if 0
fprintf(stderr, "sCI_BTRFHeader()\n");
#endif
    pbyInput = SD_BTRF(pSD).pbyCurrInput;

/* Read Magic Number */
    if (SD_BTRF_DATA_REMAINING(pSD, pbyInput) < sizeof(LONG))
    {
        vCI_ErrorQPut(pSD,    CI_ER_INVBTRFHDR,
CI_FUNC_BTRFHEADER, 0);
        return CI_ER_INVBTRFHDR;
    }
    pLong = (LONG *)pbyInput;
    lLongVal = *pLong;
    vCI_SwapLongs(&lLongVal, 1);
    /* Verify Magic Number */
    if (lLongVal != CI_BTRF_MAGIC_NUMBER)
    {
        vCI_ErrorQPut(pSD,    CI_ER_INVBTRFHDR,
CI_FUNC_BTRFHEADER, 0);
        return CI_ER_INVBTRFHDR;
    }
    /* Move on to next field */
    pLong++;
    sBytesRead += sizeof(LONG);

/* Read header size */
    pShort = (SHORT *)pLong;
    if (SD_BTRF_DATA_REMAINING(pSD, pShort) < sizeof(SHORT))
    {
        vCI_ErrorQPut(pSD,    CI_ER_INVBTRFHDR,
CI_FUNC_BTRFHEADER, 0);
        return CI_ER_INVBTRFHDR;
    }
    sHdrLen = *pShort;
    vCI_SwapShorts(&sHdrLen, 1);
    pShort++;
    sBytesRead += sizeof(SHORT);

/* Do we have enough data for remaining header? */
    if (SD_BTRF_DATA_REMAINING(pSD, pShort) < sHdrLen)
    {
        vCI_ErrorQPut(pSD,    CI_ER_INVBTRFHDR,
CI_FUNC_BTRFHEADER, 0);
        return CI_ER_INVBTRFHDR;
    }
```

```
    /* Read File Version */
    sShortVal = *pShort;
    vCI_SwapShorts(&sShortVal, 1);
    if (sShortVal != CI_BTRF_FILE_VER)
    {
        vCI_ErrorQPut(pSD,      CI_ER_INVBTRFHDR,
CI_FUNC_BTRFHEADER, 0);
        return CI_ER_INVBTRFHDR;
    }
    pShort++;
    sBytesRead += sizeof(SHORT);

pbyInput = (BYTE *)pShort;

/*
     * Skip Data Flags, Offset to Node VID
     * info, System time and DBE ver fields.
     */
    pbyInput += sizeof(SHORT) + sizeof(LONG) + sizeof(LONG) +
                16 * sizeof(CHAR);
    sBytesRead += sizeof(SHORT) + sizeof(LONG) + sizeof(LONG)
+
                16 * sizeof(CHAR);

/* Save copyright info */
    if (SD_BTRF(pSD).pcCopyright == NULL)
    {
        SD_BTRF(pSD).pcCopyright =
                        (CHAR    *)    pvCI_MemAlloc(pSD,
CI_BTRF_COPYRIGHT_LEN);
        if (SD_BTRF(pSD).pcCopyright == NULL)
        {
            vCI_ErrorQPut(pSD,     CI_ER_NOMEM,
CI_FUNC_BTRFHEADER, 0);
            return CI_ER_NOMEM;
        }
    }
    memcpy(SD_BTRF(pSD).pcCopyright,   pbyInput,
CI_BTRF_COPYRIGHT_LEN);

pbyInput += CI_BTRF_COPYRIGHT_LEN;
    sBytesRead += CI_BTRF_COPYRIGHT_LEN;

/* Read size of maneuver data */
    pLong = (LONG *)pbyInput;
    lLongVal = *pLong;
    vCI_SwapLongs(&lLongVal, 1);
    SD_BTRF(pSD).ulTotalMansLen = (ULONG)lLongVal;
    pLong++;
    sBytesRead += sizeof(LONG);

/* Read # of maneuvers */
    pShort = (SHORT *)pLong;
    sShortVal = *pShort;
    vCI_SwapShorts(&sShortVal, 1);
    SD_BTRF(pSD).sTotalMans = sShortVal;
```

APPENDIX A — PAGE 10 OF 279

```
    pShort++;
    sBytesRead += sizeof(SHORT);
#if 0
fprintf(stderr,    "ulTotalMansLen    =    %ld\n",
SD_BTRF(pSD).ulTotalMansLen);
fprintf(stderr, "sTotalMans = %d\n", SD_BTRF(pSD).sTotalMans);
endif SD_BTRF(pSD).pbyCurrInput = (BYTE *)pShort;

return SUCCESS;
}

/*:::::::::::::::::::::::::::::::::::::::::::::::::::::::::::::::::
::::::::::::::::::
:: Function:       sCI_BTRFManHdr
:: Purpose:              Process the Maneuver header porition of
a BTRF download
::                       message.
::
:: Arguments:      pSD: Pointer to State Data structure.
::
:: Return value:   SUCCESS:
::                       FAILURE:
::
:: Side affects:
:: Revision:       03/28/95      RPD      Original
::::::::::::::::::::::::::::::::::::::::::::::::::::::::::::::::::
:::::::::::::::*/
SHORT sCI_BTRFManHdr(CI_STATE_DATA * pSD)
{
    CHAR *       pChar;
    USHORT *  pUShort;

/* Do we have entire maneuver header? */
    if (SD_BTRF_DATA_REMAINING(pSD, SD_BTRF(pSD).pbyCurrInput)
<
            CI_BTRF_MANHDR_SZ)
    {
        return CI_BTRF_NEED_DATA;
    }

/* Read Man # */
    pChar = (CHAR *)SD_BTRF(pSD).pbyCurrInput;
    SD_BTRF(pSD).sCurrManNum = (SHORT)(signed char)*pChar;
    pChar++;

/* Read Template count */
    SD_BTRF(pSD).sCurrManTmplCount = (SHORT)*pChar;
    pChar++;

pUShort = (USHORT *)pChar;
    /* Skip Offset to Node Data */
    pUShort++;
```

```
    /* Read Template Data Size */
    SD_BTRF(pSD).usCurrTmplSize = *pUShort;
    vCI_SwapShorts((SHORT *)&(SD_BTRF(pSD).usCurrTmplSize),1);
    pUShort++;

SD_BTRF(pSD).pbyCurrInput = (BYTE *)pUShort;
#if 0
fprintf(stderr, "Man # = %d\n", SD_BTRF(pSD).sCurrManNum);
fprintf(stderr,    "Tmpl   Count   =   %d\n",
SD_BTRF(pSD).sCurrManTmplCount);
fprintf(stderr, "Tmpl Size = %d\n", SD_BTRF(pSD).usCurrTmplSize);
#endif
    return SUCCESS;
}

/*::::::::::::::::::::::::::::::::::::::::::::::::::::::::::::::
::::::::::::::::::
:: Function:      sCI_BTRFSkipMan
:: Purpose:
::
:: Arguments:     pSD: Pointer to State Data structure.
::
:: Return value:  SUCCESS:
::                FAILURE:
::
:: Side affects:
:: Revision:      03/28/95      RPD       Original
::::::::::::::::::::::::::::::::::::::::::::::::::::::::::::::::
::::::::::::::*/
SHORT sCI_BTRFSkipMan(CI_STATE_DATA * pSD)
{
    SHORT *       pShort;
    CHAR *        pChar;
    SHORT         sArmDataSize;

/* Do we have entire maneuver data? */
    if (SD_BTRF_DATA_REMAINING(pSD, SD_BTRF(pSD).pbyCurrInput)
<
            SD_BTRF(pSD).usCurrTmplSize)
    {
        return CI_BTRF_NEED_DATA;
    }

/* Skip past data */
    pShort = (SHORT *)(SD_BTRF(pSD).pbyCurrInput +
                                SD_BTRF(pSD).usCurrTmplSize);

/* Do we have enough data for arms data size? */
    if (SD_BTRF_DATA_REMAINING(pSD, pShort) < sizeof(SHORT))
    {
        return CI_BTRF_NEED_DATA;
    }
    sArmDataSize = *pShort;
    vCI_SwapShorts(&sArmDataSize, 1);
    pShort++;
```

APPENDIX A — PAGE 12 OF 279

```c
    /* Do we have enough data for arms? */
    if (SD_BTRF_DATA_REMAINING(pSD, pShort) < sArmDataSize)
    {
        return CI_BTRF_NEED_DATA;
    }

/* Skip past arm data */
    pChar = (CHAR *)pShort;
    pChar += sArmDataSize;
    SD_BTRF(pSD).pbyCurrInput = (BYTE *)pChar;
    return SUCCESS;
}

/*::::::::::::::::::::::::::::::::::::::::::::::::::::::::::::::::
:::::::::::::::
:: Function:       sCI_BTRFReadSub
:: Purpose:
::
:: Arguments:      pSD: Pointer to State Data structure.
::
:: Return value:   SUCCESS:
::                 FAILURE:
:: Notes:          All   data   is   assured   to   exist   by
sCI_BTRFTransMan().
::
:: Side affects:
:: Revision:       03/28/95      RPD       Original
:::::::::::::::::::::::::::::::::::::::::::::::::::::::::::::::::
:::::::::::::::*/
SHORT sCI_BTRFReadSub(CI_STATE_DATA * pSD)
{
    SHORT *     pShort;
    SHORT       sSubNum;
    SHORT       sSubDataLen;
    CHAR *      pChar;
    CHAR        acSubData[CI_BTRF_MAX_SUB_LEN];
    SHORT       sResult;

pShort = (SHORT *)SD_BTRF(pSD).pbyCurrInput;

/* Read Sub Number */
    sSubNum = *pShort;
    vCI_SwapShorts(&sSubNum, 1);
    pShort++;

/* Read Sub Data Length */
    sSubDataLen = *pShort;
    vCI_SwapShorts(&sSubDataLen, 1);
    pShort++;

pChar = (CHAR *)pShort;

memcpy(acSubData, pChar, sSubDataLen);
    acSubData[sSubDataLen + 1] = '\0';
```

APPENDIX A — PAGE 13 OF 279

```
    /* Add to substitution container */
    sResult   =   sCI_BSCAddSub(pSD,   sSubNum,   acSubData,
sSubDataLen);

pChar += sSubDataLen;
    SD_BTRF(pSD).pbyCurrInput = (BYTE *)pChar;

return SUCCESS;
}

/*:::::::::::::::::::::::::::::::::::::::::::::::::::::::::::::::::::
:::::::::::::::::
:: Function:        sCI_BTRFReadFEBTmpl
:: Purpose:
::
:: Arguments:       pSD: Pointer to State Data structure.
::                  sTmplNum: Template number to read.
::
:: Return value:    SUCCESS:
::                  CI_ER_INVINDX: Invalid sTmplNum
::                  FAILURE:
::
:: Side affects:
:: Revision:        03/28/95     RPD     Original
:::::::::::::::::::::::::::::::::::::::::::::::::::::::::::::::::::::
:::::::::::::::*/
SHORT sCI_BTRFReadFEBTmpl(CI_STATE_DATA * pSD, SHORT sTmplNum)
{
    LONG    lFEBOffset;
    LONG    lResult;
    SHORT   sTmplLen;
    INT     iResult;

if (sTmplNum < 0 || sTmplNum > CI_MAX_FEBTMPLS)
    {
        vCI_ErrorQPut(pSD, CI_ER_INVINDX, CI_FUNC_UNDEFINED,
sTmplNum);
        return CI_ER_INVINDX;
    } lFEBOffset = SD_BTRF(pSD).palFEBTmplOffsets[sTmplNum];

if (lFEBOffset == 0L)
    {
        /* Invalid template */
        vCI_ErrorQPut(pSD, CI_ER_INVINDX, CI_FUNC_UNDEFINED,
sTmplNum);
        return CI_ER_INVINDX;
    }

/* Seek to template */
    lResult   =   lseek(SD_BTRF(pSD).iFEBInFile,   lFEBOffset,
SEEK_SET);
    if (lResult == -1)
    {
```

```
                vCI_ErrorQPut(pSD, CI_ER_INVINDX, CI_FUNC_UNDEFINED,
sTmplNum);
                return CI_ER_INVINDX;
        }

/* read template size */
        iResult   =   read(SD_BTRF(pSD).iFEBInFile,   &sTmplLen,
sizeof(sTmplLen));
        if (iResult != sizeof(sTmplLen))
        {
                vCI_ErrorQPut(pSD, CI_ER_INVFEB, CI_FUNC_UNDEFINED, 0);
                return CI_ER_INVFEB;
        }
        vCI_SwapShorts(&sTmplLen, 1);

/* Prepare template buffer */
        if (SD_BTRF(pSD).pcTmplBuf != 0)
        {
                vCI_MemFree(pSD, SD_BTRF(pSD).pcTmplBuf);
        }
        SD_BTRF(pSD).pcTmplBuf = (CHAR *)pvCI_MemAlloc(pSD, sTmplLen
+ 1);
        if (SD_BTRF(pSD).pcTmplBuf == NULL)
        {
                vCI_ErrorQPut(pSD,  CI_ER_NOMEM,  CI_FUNC_UNDEFINED,
sTmplLen + 1);
                return CI_ER_NOMEM;
        }
        /* read template */
        iResult     =     read(SD_BTRF(pSD).iFEBInFile,
SD_BTRF(pSD).pcTmplBuf, sTmplLen);
        if (iResult != sTmplLen)
        {
                vCI_ErrorQPut(pSD, CI_ER_INVFEB, CI_FUNC_UNDEFINED, 0);
                return CI_ER_INVFEB;
        }
        SD_BTRF(pSD).pcTmplBuf[sTmplLen] = '\0';

return SUCCESS;
}

/*::::::::::::::::::::::::::::::::::::::::::::::::::::::::::::::::::
:::::::::::::::::
:: Function:         sCI_BTRFTransTmpl
:: Purpose:
::
:: Arguments:        pSD: Pointer to State Data structure.
::
:: Return value:     SUCCESS:
::                           FAILURE:
::
:: Side affects:
:: Revision:         03/28/95       RPD        Original
:::::::::::::::::::::::::::::::::::::::::::::::::::::::::::::::::::
:::::::::::::::*/
```

```
SHORT sCI_BTRFTransTmpl(CI_STATE_DATA * pSD)
{
      CHAR *    pcChar = SD_BTRF(pSD).pcTmplBuf;
      SHORT *   pShort;
      SHORT     sSubNum;
      CHAR *    pcSubText;

while (*pcChar != '\0')
      {
            /* Is this a substitution mark? */
            if (*pcChar == (CHAR)0xFF)
            {
                  pShort = (SHORT *)pcChar;
                  sSubNum = *pShort;
                  vCI_SwapShorts(&sSubNum, 1);
                  /* Lookup Substitution */
                  pcSubText = pcCI_BSCFindSub(pSD, sSubNum);
                  if (pcSubText != NULL)
                  {
                        /* Copy Substitution text to result */
                        while (*pcSubText != '\0')
                        {
                              *(SD_BTRF(pSD).pcCurrTmpl) = *pcSubText;
                              SD_BTRF(pSD).pcCurrTmpl++;
                              pcSubText++;
                        }
                  }
                  /* Skip over sub marker */
                  pcChar++;
                  pcChar++;
            }
            else
            {
                  /* Copy template text */
                  *(SD_BTRF(pSD).pcCurrTmpl) = *pcChar;
                  SD_BTRF(pSD).pcCurrTmpl++;
                  pcChar++;
            }
      } return SUCCESS;
}

/*:::::::::::::::::::::::::::::::::::::::::::::::::::::::::::::::::::
:::::::::::::::::
:: Function:       sCI_BTRFProcTmpl
:: Purpose:
::
:: Arguments:      pSD: Pointer to State Data structure.
::
:: Return value:   SUCCESS:
::                 FAILURE:
:: Notes:          All    data   is    assured    to   exist   by
sCI_BTRFTransMan().
::
```

```
::  Side affects:
::  Revision:         03/28/95       RPD       Original
::::::::::::::::::::::::::::::::::::::::::::::::::::::::::
:::::::::::::::*/
SHORT sCI_BTRFProcTmpl(CI_STATE_DATA * pSD)
{
      CHAR *          pChar;
      SHORT *         pShort;
      SHORT           sTmplNum;
      SHORT           sSubCount;
      SHORT           sSubDataLen;
      SHORT           sCount;
      SHORT           sResult;

pChar = (CHAR *)SD_BTRF(pSD).pbyCurrInput;

/* Read Template number */
      sTmplNum = (SHORT)*pChar;
      pChar++;

/* Read Substitution count */
      sSubCount = (SHORT)*pChar;
      pChar++;

/* Read Substitution data size */
      pShort = (SHORT *)pChar;
      sSubDataLen = *pShort;
      vCI_SwapShorts(&sSubDataLen, 1);
      pShort++;
#if 0
fprintf(stderr, "\t Template # = %d\n", sTmplNum);
fprintf(stderr, "\t Sub count = %d\n", sSubCount);
fprintf(stderr, "\t Sub Data Len = %d\n", sSubDataLen);
endif SD_BTRF(pSD).pbyCurrInput = (BYTE *)pShort;

/* Reset Substitution container */
      sResult = sCI_BSCReset(pSD);
      if (sResult != SUCCESS)
      {
            return sResult;
      } for (sCount = sSubCount; sCount > 0; sCount--)
      {
            sResult = sCI_BTRFReadSub(pSD);
            if (sResult != SUCCESS)
            {
                  return sResult;
            }
      }
#if 0
      /* RPD : Debug print */
      vCI_BSCPrint(pSD);
#endif
```

APPENDIX A — PAGE 17 OF 279

```c
    /* Read Template from FEB */
    sResult = sCI_BTRFReadFEBTmpl(pSD, sTmplNum);
    if (sResult != SUCCESS)
    {
        return sResult;
    }

/* Translate template and substitutions */
    /*  into text appending to result */
    sResult = sCI_BTRFTransTmpl(pSD);
    if (sResult != SUCCESS)
    {
        return sResult;
    }

/* Dump template data */
    *(SD_BTRF(pSD).pcCurrTmpl) = '\0';
#if 0
    fprintf(stderr, "\t\tttext = <%s>\n", SD_BTRF(pSD).pcManBuf);
endif /* Reset Substitution container */
    sResult = sCI_BSCReset(pSD);
    if (sResult != SUCCESS)
    {
        return sResult;
    } return SUCCESS;
}

/*:::::::::::::::::::::::::::::::::::::::::::::::::::::::::::::::::::::::::::::::::::::::
:: Function:      sCI_BTRFProcInter
:: Purpose:
::
:: Arguments:     pSD: Pointer to State Data structure.
::
:: Return value:  SUCCESS:
::                      FAILURE:
:: Notes:         All    data    is    assured    to    exist    by
sCI_BTRFTransMan().
::
:: Side affects:
:: Revision:      03/28/95      RPD        Original
::::::::::::::::::::::::::::::::::::::::::::::::::::::::::::::::::::::::::::::::::::::*/
SHORT sCI_BTRFProcInter(CI_STATE_DATA * pSD)
{
    LONG *      pLong;
    CHAR *      pChar;
    SHORT *     pShort;
    SHORT       sShort;
    SHORT       sArmCount;
    SHORT       sNameLen;
```

```
        SHORT           sCount = 0;

pLong = (LONG *)SD_BTRF(pSD).pbyCurrInput;
    /* Skip longitute */
    pLong++;
    /* Skip latitude */
    pLong++;

pChar = (CHAR *)pLong;
    /* Skip intersection # */
    pChar++;

/* Read arm count */
    sArmCount = (SHORT)*pChar;
    pChar++;

pSD->ManInfo.sArmCount = min(sArmCount, CI_MAX_ARMS);

pShort = (SHORT *)pChar;

/* Read From name len */
    sNameLen = *pShort;
    vCI_SwapShorts(&sNameLen, 1);
    pShort++;
    pSD->ManInfo.sFromLen    =    min(sNameLen,
sizeof(pSD->ManInfo.acFromName));
    /* Copy from name */
    pChar = (CHAR *)pShort;
    STRNCPY(pSD->ManInfo.acFromName,   pChar,
sizeof(pSD->ManInfo.acFromName));
    pSD->ManInfo.acFromName[sizeof(pSD->ManInfo.acFromName)-1]
= '\0';
    while (*pChar != '\0')
    {
        pChar++;
    }
    pChar++;

pShort = (SHORT *)pChar;

/* Read To name len */
    sNameLen = *pShort;
    vCI_SwapShorts(&sNameLen, 1);
    pShort++;
    pSD->ManInfo.sToLen     =    min(sNameLen,
sizeof(pSD->ManInfo.acToName));
    /* Copy to name */
    pChar = (CHAR *)pShort;
    STRNCPY(pSD->ManInfo.acToName,   pChar,
sizeof(pSD->ManInfo.acToName));
    pSD->ManInfo.acToName[sizeof(pSD->ManInfo.acToName)-1]    =
'\0';
    while (*pChar != '\0')
    {
        pChar++;
    }
```

APPENDIX A — PAGE 19 OF 279

```
pChar++;

/* Skip X-coordinate for intersection */
pChar++;
/* Skip Y-coordinate for intersection */
pChar++;

/* Read from arm X-coordinate */
sShort = (SHORT) *pChar;
pChar++;
pSD->ManInfo.aPoint[sCount].sX = sShort;
/* Skip shape points */
pChar++;
pChar++;

/* Read from arm Y-coordinate */
sShort = (SHORT) *pChar;
pChar++;
pSD->ManInfo.aPoint[sCount].sY = sShort;
/* Skip shape points */
pChar++;
pChar++;
sCount++;

/* Read to arm X-coordinate */
sShort = (SHORT) *pChar;
pChar++;
pSD->ManInfo.aPoint[sCount].sX = sShort;
/* Skip shape points */
pChar++;
pChar++;

/* Read to arm Y-coordinate */
sShort = (SHORT) *pChar;
pChar++;
pSD->ManInfo.aPoint[sCount].sY = sShort;
/* Skip shape points */
pChar++;
pChar++;
sCount++;

/* Read remaining arm points */
while (sCount < sArmCount)
{
    /* Read X-coordinate */
    sShort = (SHORT) *pChar;
    pChar++;
    pSD->ManInfo.aPoint[sCount].sX = sShort;
    /* Skip shape points */
    pChar++;
    pChar++;

/* Read Y-coordinate */
    sShort = (SHORT) *pChar;
    pChar++;
    pSD->ManInfo.aPoint[sCount].sY = sShort;
```

```
            /* Skip shape points */
            pChar++;
            pChar++;

sCount++;
        }

SD_BTRF(pSD).pbyCurrInput = (BYTE *)pChar;

return SUCCESS;
}

/*:::::::::::::::::::::::::::::::::::::::::::::::::::::::::::::::::::::
:::::::::::::::::::
:: Function:       sCI_BTRFProcArms
:: Purpose:
::
:: Arguments:      pSD: Pointer to State Data structure.
::
:: Return value:   SUCCESS:
::                 FAILURE:
:: Notes:          All     data    is    assured    to    exist    by
sCI_BTRFTransMan().
::
:: Side affects:
:: Revision:       03/28/95       RPD        Original
:::::::::::::::::::::::::::::::::::::::::::::::::::::::::::::::::::::
:::::::::::::::*/
SHORT sCI_BTRFProcArms(CI_STATE_DATA * pSD)
{
        SHORT *      pShort;
        CHAR *       pChar;
        SHORT        sArmDataSize;
        SHORT        sIntersectionCount;
        SHORT        sCount;
        SHORT        sResult;

pShort = (SHORT *)SD_BTRF(pSD).pbyCurrInput;

/* Read Arm Data Size */
        sArmDataSize = *pShort;
        vCI_SwapShorts(&sArmDataSize, 1);
        pShort++;

if (sArmDataSize == 0)
        {
                SD_BTRF(pSD).pbyCurrInput = (BYTE *)pShort;
                return SUCCESS;
        }
#if 0
        /* RPD : Skip data for now */
        pChar = (CHAR *)pShort;
        pChar += sArmDataSize;
        SD_BTRF(pSD).pbyCurrInput = (BYTE *)pChar;
```

```c
      return SUCCESS;
#endif
      /* Read intersection count */
      sIntersectionCount = *pShort;
      vCI_SwapShorts(&sIntersectionCount, 1);
      pShort++;
      SD_BTRF(pSD).pbyCurrInput = (BYTE *)pShort;

/* Process each intersection */
      for (sCount = 0; sCount < sIntersectionCount; sCount++)
      {
            sResult = sCI_BTRFProcInter(pSD);
            if (sResult != SUCCESS)
            {
                  return sResult;
            }
      } return SUCCESS;
}

/*:::::::::::::::::::::::::::::::::::::::::::::::::::::::::::::::::
:::::::::::::::::
:: Function:       sCI_BTRFTransMan
:: Purpose:
::
:: Arguments:      pSD: Pointer to State Data structure.
::
:: Return value:   SUCCESS:
::                 FAILURE:
::
:: Side affects:
:: Revision:       03/28/95        RPD        Original
:::::::::::::::::::::::::::::::::::::::::::::::::::::::::::::::::::
:::::::::::::::*/
SHORT sCI_BTRFTransMan(CI_STATE_DATA * pSD)
{
      SHORT *      pShort;
      SHORT        sArmDataSize;
      SHORT        sCount;
      SHORT        sResult;

/* Do we have entire maneuver data? */
      if (SD_BTRF_DATA_REMAINING(pSD, SD_BTRF(pSD).pbyCurrInput)
<
                  SD_BTRF(pSD).usCurrTmplSize)
      {
            return CI_BTRF_NEED_DATA;
      }

/* Do we have entire arm data? */
      pShort = (SHORT *)(SD_BTRF(pSD).pbyCurrInput +
                                    SD_BTRF(pSD).usCurrTmplSize);

/* Do we have enough data for arms data size? */
```

APPENDIX A — PAGE 22 OF 279

```c
    if (SD_BTRF_DATA_REMAINING(pSD, pShort) < sizeof(SHORT))
    {
        return CI_BTRF_NEED_DATA;
    }
    sArmDataSize = *pShort;
    vCI_SwapShorts(&sArmDataSize, 1);

/* Do we have enough data for arms? */
    if (SD_BTRF_DATA_REMAINING(pSD, pShort) < sArmDataSize)
    {
        return CI_BTRF_NEED_DATA;
    }

/* Setup maneuver buffer */
    if (SD_BTRF(pSD).pcManBuf != NULL)
    {
        vCI_MemFree(pSD, SD_BTRF(pSD).pcManBuf);
        SD_BTRF(pSD).pcManBuf = NULL;
        SD_BTRF(pSD).pcCurrTmpl = NULL;
    }
    SD_BTRF(pSD).pcManBuf    =    (CHAR    *)pvCI_MemAlloc(pSD,
CI_BTRF_MAX_MAN);
    if (SD_BTRF(pSD).pcManBuf == NULL)
    {
        vCI_ErrorQPut(pSD,   CI_ER_NOMEM,   CI_FUNC_UNDEFINED,
CI_BTRF_MAX_MAN);
        return CI_ER_NOMEM;
    }
    SD_BTRF(pSD).pcCurrTmpl = SD_BTRF(pSD).pcManBuf;

for (sCount = SD_BTRF(pSD).sCurrManTmplCount; sCount > 0;
sCount--)
    {
        sResult = sCI_BTRFProcTmpl(pSD);
        if (sResult != SUCCESS)
        {
            return sResult;
        }
    }

/* Move maneuver text into ROS result item */
    memset(&(pSD->ManInfo), 0, sizeof(CI_MAN_REC));
    pSD->ManInfo.pcManText = SD_BTRF(pSD).pcManBuf;
    pSD->ManInfo.sTextLen = strlen(SD_BTRF(pSD).pcManBuf);
    SD_BTRF(pSD).pcManBuf = NULL;
    SD_BTRF(pSD).pcCurrTmpl = NULL;

sResult = sCI_BTRFProcArms(pSD);
    if (sResult != SUCCESS)
    {
        return sResult;
    }

/* Add maneuver to ROS */
    vCI_CtrlPreProcItem(pSD, SD_BTRF(pSD).usMsgId);
    sResult = sCI_ROSAddMan(pSD, &(pSD->ManInfo));
```

```c
        if (sResult != SUCCESS)
        {
             return sResult;
        }
        vCI_CtrlPostProcItem(pSD);

return SUCCESS;
}

/*:::::::::::::::::::::::::::::::::::::::::::::::::::::::::::::::
:::::::::::::::::
:: Function:        sCI_BTRFManeuver
:: Purpose:              Process the Maneuver porition of a BTRF
download message.
::
:: Arguments:      pSD: Pointer to State Data structure.
::
:: Return value:   SUCCESS:
::                       FAILURE:
::
:: Side affects:
:: Revision:        03/28/95       RPD       Original
:::::::::::::::::::::::::::::::::::::::::::::::::::::::::::::::::
::::::::::::::*/
SHORT sCI_BTRFManeuver(CI_STATE_DATA * pSD)
{
      SHORT *       pShort;
      CHAR  *       pChar;
      SHORT         sArmDataSize;
      SHORT         sResult;

/* Ignore useless maneuvers */
      switch (SD_BTRF(pSD).sCurrManNum)
         {
#if 0
      case CI_BTRF_SUMMARY_MAN:
      case CI_BTRF_FOOTER_MAN:
#endif
      case CI_BTRF_DRIVETIME_MAN:
      case CI_BTRF_DELAYTIME_MAN:
      case CI_BTRF_ORIGIN_MAN:
      case CI_BTRF_DEST_MAN:
      case CI_BTRF_VERSION_MAN:
      case CI_BTRF_HEADER_MAN:
            sResult = sCI_BTRFSkipMan(pSD);
            return sResult;
      default:
            sResult = sCI_BTRFTransMan(pSD);
            return sResult;
      }
      return SUCCESS;
}
```

```
/*::::::::::::::::::::::::::::::::::::::::::::::::::::::::::::::::
:::::::::::::::::
:: Function:       sCI_BTRFAddData
:: Purpose:
::
:: Arguments:      pSD: Pointer to State Data structure.
::                 pbyData: Pointer to data to add.
::                 sDataLen: Length of data.
::
:: Return value:   SUCCESS:
::                 CI_ER_NOMEM:   Unable to alloc buffer
::
:: Side affects:
:: Revision:       03/03/95    RPD      Original
::::::::::::::::::::::::::::::::::::::::::::::::::::::::::::::::::
::::::::::::::*/
SHORT sCI_BTRFAddData(CI_STATE_DATA * pSD, BYTE * pbyData, SHORT
sDataLen)
{
    BYTE *    pbyTmp;

if (SD_BTRF(pSD).pbyData == NULL)
    {
        SD_BTRF(pSD).pbyData = (BYTE *) pvCI_MemAlloc(pSD,
CI_BTRF_BUF_SZ);
        if (SD_BTRF(pSD).pbyData == NULL)
        {
            vCI_ErrorQPut(pSD,   CI_ER_NOMEM,
CI_FUNC_BTRFADDDATA,
                          CI_BTRF_BUF_SZ);
            return CI_ER_NOMEM;
        }
        memset(SD_BTRF(pSD).pbyData, 0, CI_BTRF_BUF_SZ);
        SD_BTRF(pSD).sDataLen = 0;
        SD_BTRF(pSD).pbyCurrInput = SD_BTRF(pSD).pbyData;
    } pbyTmp = SD_BTRF(pSD).pbyData + SD_BTRF(pSD).sDataLen;

memcpy(pbyTmp, pbyData, sDataLen);
    SD_BTRF(pSD).sDataLen += sDataLen;

return SUCCESS;
}

/*::::::::::::::::::::::::::::::::::::::::::::::::::::::::::::::::
:::::::::::::::::
:: Function:       sCI_BTRFProcData
:: Purpose:
::
:: Arguments:      pSD: Pointer to State Data structure.
::
::
:: Return value:   SUCCESS:
::                 FAILURE:
```

APPENDIX A — PAGE 25 OF 279

```
::
:: Side affects:
:: Revision:       03/03/95      RPD       Original
::::::::::::::::::::::::::::::::::::::::::::::::::::::::::::::::
:::::::::::::*/
SHORT sCI_BTRFProcData(CI_STATE_DATA * pSD)
{
    BOOL        bExit = FALSE;
    SHORT       sResult;

do
    {
        /* process according to current state */
        switch (SD_BTRF(pSD).sBTRFState)
        {
        case eBTRFInit:
            sResult = sCI_BTRFOpenFEB(pSD);
            if (sResult == CI_BTRF_NEED_DATA)
            {
                bExit = TRUE;
                break;
            }
            else if (sResult != SUCCESS)
            {
                return sResult;
            }
            /* transition to reading BTRF header state */
            SD_BTRF(pSD).sBTRFState = eBTRFHeader;
            break;
        case eBTRFHeader:
            sResult = sCI_BTRFHeader(pSD);
            if (sResult == CI_BTRF_NEED_DATA)
            {
                bExit = TRUE;
                break;
            }
            else if (sResult != SUCCESS)
            {
                return sResult;
            }
            /* transition to reading BTRF Maneuver Header state */
            SD_BTRF(pSD).sBTRFState = eBTRFManHdr;
            break;
        case eBTRFManHdr:
            sResult = sCI_BTRFManHdr(pSD);
            if (sResult == CI_BTRF_NEED_DATA)
            {
                bExit = TRUE;
                break;
            }
            else if (sResult != SUCCESS)
            {
                return sResult;
            }
            SD_BTRF(pSD).sBTRFState = eBTRFManeuver;
```

```
                    break;
            case eBTRFManeuver:
                    sResult = sCI_BTRFManeuver(pSD);
                    if (sResult == CI_BTRF_NEED_DATA)
                    {
                            bExit = TRUE;
                            break;
                    }
                    else if (sResult != SUCCESS)
                    {
                            return sResult;
                    }
                    SD_BTRF(pSD).sBTRFState = eBTRFManHdr;
                    break;
            case eBTRFComplete:
                    bExit = TRUE;
                    break;
            default:
                    bExit = TRUE;
                    break;
            }

/* Do fake work */
/*          fake_it(pSD, pMsg); */
       } while (bExit != TRUE);

return SUCCESS;
}

/*:::::::::::::::::::::::::::::::::::::::::::::::::::::::::::::::::::::
:::::::::::::::::
:: Function:      sCI_ProcBTRF
:: Purpose:       Process a BTRF download message.
::
:: Arguments:     pSD: Pointer to State Data structure.
::                pMsg: Pointer to message to be
processed.
::
:: Return value:  SUCCESS:
::                FAILURE:
::
:: Side affects:
:: Revision:      03/03/95        RPD        Original
::::::::::::::::::::::::::::::::::::::::::::::::::::::::::::::::::::::
:::::::::::::::*/
SHORT sCI_ProcBTRF(CI_STATE_DATA * pSD, CI_RES_MSG * pMsg)
{
       SHORT         sResult;
       BYTE *        pbyData;
       CHAR *        pcData;
       CHAR *        pcTmp;
       LONG          lOffset;
       SHORT         sDataLen;
#if 0
fprintf(stderr, "sCI_ProcBTRF() = <%s>\n", pMsg->pbyData);
```

```
#endif
    /* Does ROS contain proper result type? */
    if (SD_ROS_TYPE(pSD) != CI_ROS_ROUTE)
    {
        /* Existing incorrect object type! */
        vCI_ErrorQPut(pSD, CI_ER_INVROS, CI_FUNC_PROCBTRF, 0);
        return FAILURE;
    }

/* Remember message id */
    SD_BTRF(pSD).usMsgId = pMsg->usMsgId;

/*
     * Find start of binary data as well as data length.
     */ pcData = (CHAR *)pMsg->pbyData;

/* Skip filename */
    pcTmp = STRCHR(pcData, CI_DOWNLOAD_DELIM_CHAR);
    if (pcTmp == NULL)
    {
        return SUCCESS;
    }
    pcTmp++;  /* skip delim */
    pcData = pcTmp;

/* get offset */
    lOffset = strtol(pcData, &pcTmp, CI_BASE_DEC);
    pcData = pcTmp;
    /* Skip upto delim */
    pcTmp = STRCHR(pcData, CI_DOWNLOAD_DELIM_CHAR);
    if (pcTmp == NULL)
    {
        return SUCCESS;
    }
    pcTmp++;  /* skip delim */
    pcData = pcTmp;

/* get length */
    sDataLen = (SHORT)strtol(pcData, &pcTmp, CI_BASE_DEC);
    pcData = pcTmp;
    /* skip upto delim */
    pcTmp = STRCHR(pcData, CI_DOWNLOAD_DELIM_CHAR);
    if (pcTmp == NULL)
    {
        return SUCCESS;
    }
    pcTmp++;  /* skip delim */
    pcData = pcTmp;

/* quick sanity check */
    if (sDataLen > pMsg->sDataLen)
    {
        /* insane data, ignore by reporting success */
```

```
        return SUCCESS;
    }

/* point to end of data */
    pbyData = (BYTE *)pcData;
    pbyData += sDataLen;

/* process alternates */
    sResult = sCI_ProcAlts(pSD, pbyData,
                            pMsg->sDataLen - (SHORT)(pbyData
- pMsg->pbyData));
    if (sResult != SUCCESS)
    {
        /* Error recorded in called func */
        return sResult;
    }

/* point to start of data */
    pbyData = (BYTE *)pcData;

/* Append to data buffer */
    sResult = sCI_BTRFAddData(pSD, (BYTE *)pcData, sDataLen);
    if (sResult != SUCCESS)
    {
        return sResult;
    }

/* Process data */
    sResult = sCI_BTRFProcData(pSD);
    if (sResult != SUCCESS)
    {
        return sResult;
    } return SUCCESS;
}
```

```
/* _sccs_ "@(#)ER %P% Ver: %I% Date: %G%" */
/* _rcs_ "$Id: capi.h,v 1.5 1995/02/28 19:09:47 bobd Exp bobd $"
*/
/* Copyright (C) 1994,1995 SEI Information Technology, Inc. */
/*:::::::::::::::::::::::::::::::::::::::::::::::::::::::::::::
:::::::::::::::::
:: Filename:          capi.h
:: Purpose:           Public header file for CAPI.
:: Revision:          01/03/95      RPD      Original
:::::::::::::::::::::::::::::::::::::::::::::::::::::::::::::::
::::::::::::::::*/
#ifndef _CAPI_H
define _CAPI_H /*
 * Error codes
 */
#define CI_ER_FIRST            -30000
#define CI_ER_OK               CI_ER_FIRST - 0       /*       No
error available    */
#define CI_ER_ABORT            CI_ER_FIRST - 1       /     *
Operation aborted      */
#define CI_ER_BUFFULL          CI_ER_FIRST - 2       / *     A
required buffer is full*/
#define CI_ER_BUSY             CI_ER_FIRST - 3       /* Process
is busy         */
#define CI_ER_COMMINIT         CI_ER_FIRST - 4       /* Comm.
not established    */
#define CI_ER_COMMIO           CI_ER_FIRST - 5       /     *
Communications failed  */
#define CI_ER_DESTBEARING      CI_ER_FIRST - 6       /* Invalid
dest. bearing  */
#define CI_ER_DESTLATLONG      CI_ER_FIRST - 7       /* Invalid
dest. lat/long */
#define CI_ER_DESTLOC          CI_ER_FIRST - 8       /*  Invalid
dest. location */
#define CI_ER_DESTNAME         CI_ER_FIRST - 9       /*  Invalid
destination name   */
#define CI_ER_DESTSXLOCUS      CI_ER_FIRST - 10      /* Invalid dest
sxlocus         */
#define CI_ER_DESTTYPE         CI_ER_FIRST - 11      /*  Invalid
dest. type         */
#define CI_ER_ENCODE           CI_ER_FIRST - 12      /*  Encode
process failed */
#define CI_ER_ERRTEXTSZ        CI_ER_FIRST - 13      /*  Invalid
error text size    */
#define CI_ER_FROMNAMESZ CI_ER_FIRST - 14      /* From name size*/
#define CI_ER_INVALT           CI_ER_FIRST - 15      /*  Invalid
alternate.         */
#define CI_ER_INVARG           CI_ER_FIRST - 16      /*  Invalid
argument        */
#define CI_ER_INVARMCOUNT      CI_ER_FIRST - 17      /* Invalid arm
count           */
#define CI_ER_INVFIELD         CI_ER_FIRST - 18      /*  Detected
invalid field  */
```

APPENDIX A — PAGE 30 OF 279

```c
#define CI_ER_INVFILEDSC CI_ER_FIRST - 19    /* Invalid    file
descriptor      */
#define CI_ER_INVINDX        CI_ER_FIRST - 20    /*    Invalid
array index     */
#define CI_ER_INVITEM        CI_ER_FIRST - 21    /*    Invalid
result item     */
#define CI_ER_INVMANCOUNT    CI_ER_FIRST - 22    /*    Invalid
maneuver cfg cnt   */
#define CI_ER_INVMSGQ        CI_ER_FIRST - 23    /*    Corrupt
MsgQ            */
#define CI_ER_INVPOICOUNT    CI_ER_FIRST - 24    /* Invalid POI
config count    */
#define CI_ER_INVRGNCOUNT    CI_ER_FIRST - 25    /*    Invalid
region config cnt*/
#define CI_ER_INVROS         CI_ER_FIRST - 26    /*    Corrupt
ROS             */
#define CI_ER_INVSD          CI_ER_FIRST - 27    /* State Data
is invalid      */
#define CI_ER_IOBUFCONFIG    CI_ER_FIRST - 28    /*    Error
configing IO bufs */
#define CI_ER_LIMIT          CI_ER_FIRST - 29    /*    Invalid
limit value     */
#define CI_ER_LIMITTYPE      CI_ER_FIRST - 30    /*    Invalid
limit type      */
#define CI_ER_LOGGEDIN       CI_ER_FIRST - 31    /*    Already
loggedin to host */
#define CI_ER_LOGGEDOUT      CI_ER_FIRST - 32    /*    Already
loggedout of host*/
#define CI_ER_MANSZ          CI_ER_FIRST - 33    /*    Maneuver
size            */
#define CI_ER_MISSINGDEST    CI_ER_FIRST - 34    /* Missing a
destination     */
#define CI_ER_MISSINGORG CI_ER_FIRST - 35    /*    Missing    a
origin          */
#define CI_ER_NOARG          CI_ER_FIRST - 36    /*    Required
argument missing*/
#define CI_ER_NODATA         CI_ER_FIRST - 37    /* No data for
operation */
#define CI_ER_NOMEM          CI_ER_FIRST - 38    /*    Memory
allocation failed */
#define CI_ER_NOSUPPORT      CI_ER_FIRST - 39    /* Feature not
supported.      */
#define CI_ER_OBJ_CREATE CI_ER_FIRST - 40    /* Error creating
object */
#define CI_ER_OFFLINE        CI_ER_FIRST - 41    /*    Comm.
already disconn.   */
#define CI_ER_ONLINE         CI_ER_FIRST - 42    /*    Comm.
already connected */
#define CI_ER_ORGBEARING CI_ER_FIRST - 43    /* Invalid origin
bearing */
#define CI_ER_ORGLAT         CI_ER_FIRST - 44    /*    Invalid
origin latitude    */
#define CI_ER_ORGLATLONG CI_ER_FIRST - 45    /* Invalid  org.
lat/long */
#define CI_ER_ORGLOC         CI_ER_FIRST - 46    /*    Invalid
origin location    */
```

```c
#define CI_ER_ORGLONG        CI_ER_FIRST - 47   /*   Invalid
origin longitude    */
#define CI_ER_ORGNAME        CI_ER_FIRST - 48   /*   Invalid
origin name         */
#define CI_ER_ORGSXLOCUS CI_ER_FIRST - 49       /* Invalid origin
sxlocus   */
#define CI_ER_ORGTYPE        CI_ER_FIRST - 50   /*   Invalid
origin type         */
#define CI_ER_POIADDRSZ      CI_ER_FIRST - 51   /* POI address
size      */
#define CI_ER_POIHDRSZ       CI_ER_FIRST - 52   /* Invalid POI
header size         */
#define CI_ER_POINAMESZ      CI_ER_FIRST - 53   /*  POI  name
size      */
#define CI_ER_POISXLOCUSSZ   CI_ER_FIRST - 54   /* POI SXLocus
size      */
#define CI_ER_PROTOCOL       CI_ER_FIRST - 55   /*   Protocol
error from host     */
#define CI_ER_RGNFILESZ      CI_ER_FIRST - 56   /*    Region
Filename Size       */
#define CI_ER_RGNNAMESZ      CI_ER_FIRST - 57   /* Region Name
Size      */
#define CI_ER_ROSTYPE        CI_ER_FIRST - 58   /* Invalid ROS
type for op.        */
#define CI_ER_ROUTEHDRSZ CI_ER_FIRST - 59       /*  Route  header
size      */
#define CI_ER_ROUTETRLSZ CI_ER_FIRST - 60       /*  Route  trailer
size */
#define CI_ER_TIMEOUT        CI_ER_FIRST - 61   /*   Time-out
waiting response*/
#define CI_ER_TONAMESZ       CI_ER_FIRST - 62   /*   To  name
size      */
#define CI_ER_UNEXPMSGID CI_ER_FIRST - 63       /* Unexpected Msg
Id        */
#define CI_ER_UNSOLMSGSZ CI_ER_FIRST - 64       /* Invalid unsol.
msg. size */
#define CI_ER_UNSPECIFIED    CI_ER_FIRST - 65   /*    General
error     */
#define CI_ER_INVDLFMT       CI_ER_FIRST - 66   /*   Invalid
download format     */
#define CI_ER_WRITE_FD       CI_ER_FIRST - 67   /*  Write  to
file failed         */
#define CI_ER_INVLANGFILE    CI_ER_FIRST - 68   /*   Invalid
language file       */
#define CI_ER_FEBOPEN        CI_ER_FIRST - 69   /* Open lang
file failed         */
#define CI_ER_INVFEB         CI_ER_FIRST - 70   /* Invalid FEB
file      */
#define CI_ER_INVBTRFHDR CI_ER_FIRST - 71       /*  Invalid  BTRF
header    */
#define CI_ER_LAST           CI_ER_FIRST - 72   /*  Always  1
less than last */

/*
 * Defines needed for platform specific functions
 */
```

```
#define CI_TIMEOUT              -2

/*
 * Defines for Gets
 */
#define CI_ITEM_NEXT            -1
#define CI_ITEM_PREV            -2
#define CI_ITEM_CURR            -3
#define CI_ITEM_FIRST           -4

/*
 * Communications modes
 */
#define  CI_COMMMODE_INIT       0
#if 0    /* Not supported */
#define CI_COMMMODE_FIRST       1
#define CI_COMMMODE_ALLWAYS     2
endif /*
 * Result Memory Models
 */
#define CI_STORE_RESULT         0       /*  Store   entire result in ROS */
#if 0    /* Not supported */
#define CI_STORE_PACKET         1       /* Store packet only in ROS */
#define CI_STORE_BURST          2       /*  Store   entire burst in ROS */
endif /*
 * Limit Types
 */
#define CI_LIMIT_SLD            1       /*  Straight  line distance */
#if 0    /* Not supported */
#define CI_LIMIT_DD             2       /* Driving distance */
#define CI_LIMIT_DT             3       /* Driving time */
endif /*
 * O/D Lat, Long, Bearing defines
 */
#define CI_LL_UNDEFINED         -(LONG)2147483648L  /* Undefined Lat./Long. */
#define CI_BEARING_UNDEFINED -1          /* Undefined bearing*/

/* Blocking Modes (needed by PSxxxComm functions) */
#define CI_IO_NONBLOCK          0
#define CI_IO_BLOCK             1

/*
 * Compression Modes
 */
```

```
#define CI_COMP_NONE            0

/*
 * Download formats
 */
#define CI_DL_ASCII             0         /* Standard route
transfer        */
#define CI_DL_BINARY            1         /*  BTRF   route
transfer           */

/*
 * Field sizes
 */
#define CI_MSG_SUBS_MAX_LEN     64        /* Max length of
Sub. Id field  */
#define CI_MSG_CLI_MAX_LEN      64        /* Max length of
Cli. Id field  */
#define CI_MAX_ARMS             8         /* Max arms in a
maneuver        */

/*
 * Function pointer types
 */
/* Idle processing function */
typedef SHORT        (* PS_ON_IDLE)(VOID * pvUserData);
/* Unsolisited Message notification */
typedef SHORT        (* PS_ON_MESSAGE)(VOID * pvUserData);
/* Opening Comm. Dev. */
typedef SHORT        (*  PS_DEV_OPEN)(VOID  ** ppvCD,  VOID  *
pvUserData);
/* Closeing Comm. Dev. */
typedef SHORT        (* PS_DEV_CLOSE)(VOID * pvDevHndl, VOID *
pvUserData);
/* Read from Comm. Dev. */
typedef SHORT        (* PS_DEV_READ)(VOID * pvDevHndl,
                                               BYTE    *    pbyBuf,
USHORT usSize, BYTE byMode,
                                                  VOID * pvUserData);
/* Write to Comm. Dev. */
typedef SHORT        (* PS_DEV_WRITE)(VOID * pvDevHndl,
                                               BYTE    *    pbyBuf,
USHORT usSize,
                                                  VOID * pvUserData);
/* Allocate memory */
typedef VOID *       (* PS_MEM_ALLOC)(size_t size);
/* Free memory */
typedef VOID         (* PS_MEM_FREE)(VOID * pvData);

/* File Open */
typedef VOID *       (*  PS_FILE_OPEN)(CHAR  * pFilename,  CHAR  *
pMode);
/* File Close */
typedef INT                (* PS_FILE_CLOSE)(VOID * pFile);
/* File Seek */
typedef INT                (*  PS_FILE_SEEK)(VOID  *  pFile,  LONG
lOffset, INT iOrigin);
```

APPENDIX A — PAGE 34 OF 279

```
/* File Read */
typedef size_t      (* PS_FILE_READ)(VOID * pBuf, size_t size,
                                                  size_t count,
VOID * pFile);
/* File Write */
typedef size_t      (* PS_FILE_WRITE)(VOID * pBuf, size_t size,
                                                   size_t count,
VOID * pFile);

/*
 * User config field types
 */
typedef CHAR        SubscriberId[CI_MSG_SUBS_MAX_LEN + 1];
typedef CHAR        ClientId[CI_MSG_CLI_MAX_LEN + 1];

/* Used for supplying user config arguments to OpenAPI */
typedef struct ci_user_config
{
        SubscriberId    acSubscriberId;
        ClientId        acClientId;
        USHORT          usMaxPktSize;
        BYTE            byMemModel;         /* Store entire result
or packet only */
        USHORT          usMaxMans;
        USHORT          usMaxPOIs;
        USHORT          usMaxRegions;
        BYTE            byCommMode;
        USHORT          usTimeout;
        BYTE            byDownloadFormat;   /* BTRF related */
        CHAR *          pcLangFileName;
        PS_ON_IDLE      pfsOnIdle;
        PS_ON_MESSAGE   pfsOnMessage;
        PS_DEV_OPEN     pfsDevOpen;
        PS_DEV_CLOSE    pfsDevClose;
        PS_DEV_READ     pfsDevRead;
        PS_DEV_WRITE    pfsDevWrite;
        PS_MEM_ALLOC    pfpvMemAlloc;
        PS_MEM_FREE     pfvMemFree;
        VOID *          pvUserData;
} CI_USER_CONFIG;

/* Point struct for Arms */
typedef struct ci_point
{
        SHORT           sX;
        SHORT           sY;
} CI_POINT;

typedef struct ci_resman_rec
{
        CHAR *          pcManText;
        USHORT          usManLen;
        CHAR *          pcFromName;
        USHORT          usFromLen;
        CHAR *          pcToName;
```

```
        USHORT              usToLen;
        USHORT              usArmCount;
        CI_POINT            aPoint[CI_MAX_ARMS];
} CI_RESMAN_REC;

typedef struct ci_respoi_rec
{
        CHAR *              pcName;
        USHORT              usNameLen;
        CHAR *              pcAddr;
        USHORT              usAddrLen;
        SHORT               sPOIType;
        LONG                lPOIId;
        CHAR *              pcSXLocus;
        USHORT              usLocusLen;
        LONG                lDist;
        BOOL                bHasCustInfo;
} CI_RESPOI_REC;

typedef struct ci_resrgn_rec
{
        CHAR *              pcName;
        USHORT              usNameLen;
        CHAR *              pcFile;
        USHORT              usFileLen;
} CI_RESRGN_REC;

/*
 * Function prototypes
 */
SHORT FUNC_DECL     sCI_OpenAPI(VOID ** ppvCAPI, CI_USER_CONFIG
* pConfig);
SHORT FUNC_DECL     sCI_OpenComm(VOID * pvCAPI);
SHORT FUNC_DECL     sCI_CloseComm(VOID * pvCAPI);
SHORT FUNC_DECL sCI_ConnectComm(VOID * pvCAPI);
SHORT FUNC_DECL sCI_DisconnectComm(VOID * pvCAPI);
SHORT FUNC_DECL     sCI_CloseAPI(VOID * pvCAPI, BOOL bForce);
VOID FUNC_DECL vCI_AbortTask(VOID * pvCAPI);

SHORT FUNC_DECL     sCI_GetError(VOID * pvCAPI,
                        SHORT   *   psErrType,   SHORT   *
psErrData,
                        CHAR    *   pcErrText,   USHORT   *
pusTextLen);

SHORT FUNC_DECL     sCI_SetRoute(VOID * pvCAPI,
                        CHAR * pcOrgName, CHAR * pcOrgType,
                        LONG lOrgLat, LONG lOrgLong, SHORT
sOrgBearing,
                        CHAR * pcOrgSXLocus,
                        CHAR    *   pcDestName,   CHAR    *
pcDestType,
                        LONG   lDestLat,   LONG   lDestLong,
SHORT sDestBearing,
```

```
                                    CHAR * pcDestSXLocus,
                                    LONG lLimit, BYTE byLimitType,
                                    BOOL bArms, CHAR * pcTOD);
SHORT FUNC_DECL     sCI_SetPOI(VOID * pvCAPI,
                                    CHAR * pcOrgName, CHAR * pcOrgType,
                                    LONG lOrgLat, LONG lOrgLong, SHORT
sOrgBearing,
                                    CHAR * pcOrgSXLocus,
                                    CHAR  *  pcDestName,  CHAR  *
pcDestType,
                                    LONG  lDestLat,  LONG  lDestLong,
SHORT sDestBearing,
                                    CHAR * pcDestSXLocus,
                                    LONG lLimit, BYTE byLimitType,
                                    CHAR * pcTOD);
SHORT FUNC_DECL     sCI_SetBugReport(VOID * pvCAPI,
                                    CHAR * pcMsgText);
SHORT FUNC_DECL     sCI_SetIncludeArms(VOID  *  pvCAPI,  BOOL
bValue);
SHORT FUNC_DECL     sCI_SetRegion(VOID * pvCAPI, CHAR * pcName,
CHAR * pcFile);
SHORT FUNC_DECL     sCI_SetMaxPacket(VOID  *  pvCAPI,  USHORT
usPktSize);
SHORT FUNC_DECL     sCI_SetBurstMode(VOID * pvCAPI, BOOL sState);
SHORT  FUNC_DECL    sCI_SetLanguageFile(VOID  *  pvCAPI,  CHAR  *
pcLangFile);
SHORT  FUNC_DECL    sCI_SetDownloadFormat(VOID  *  pvCAPI,  BYTE
byFormat);

SHORT FUNC_DECL     sCI_GetRouteHeader(VOID * pvCAPI,
                                    CHAR  *  pcHdrText,  USHORT  *
pusHdrLen);
SHORT FUNC_DECL     sCI_GetRouteTrailer(VOID * pvCAPI,
                                    CHAR  *  pcTrlText,  USHORT  *
pusTrlLen);
SHORT FUNC_DECL     sCI_GetManeuver(VOID * pvCAPI, SHORT sIndex,
                                    CHAR  *  pcManText,  USHORT  *
pusManLen,
                                    USHORT * pusArmCount,
                                    CHAR  *  pcFromName,  USHORT  *
pusFromLen,
                                    CHAR * pcToName, USHORT * pusToLen,
                                    CI_POINT  *     paArmPoints);
SHORT FUNC_DECL     sCI_GetRouteAsFile(VOID  *  pvCAPI,  CHAR  *
pcFilename);
SHORT FUNC_DECL     sCI_GetPOIHeader(VOID * pvCAPI,
                                    CHAR  *  pcHdrText,  USHORT  *
pusHdrLen);
SHORT FUNC_DECL     sCI_GetPOIItem(VOID * pvCAPI, SHORT sIndex,
                                    CHAR * pcName, USHORT * pusNameLen,
                                    CHAR * pcAddr, USHORT * pusAddrLen,
                                    SHORT * psPOIType, LONG * plPOIId,
                                    CHAR  *  pcSXLocus,  USHORT  *
pusSXLocusLen,
                                    LONG  *  plDist,  BOOL  *
pbHasCustInfo);
```

```
SHORT FUNC_DECL      sCI_GetRegionItem(VOID  *   pvCAPI,    SHORT
sIndex,
                            CHAR * pcName, USHORT * pusNameLen,
                            CHAR    *    pcFile,    USHORT    *
pusFileLen);
SHORT FUNC_DECL      sCI_GetActiveRegion(VOID * pvCAPI,
                            CHAR * pcName, USHORT * pusNameLen,
                            CHAR    *    pcFile,    USHORT    *
pusFileLen);
USHORT FUNC_DECL     usCI_GetActiveMaxPacket(VOID * pvCAPI);
USHORT FUNC_DECL     usCI_GetActiveTimeout(VOID * pvCAPI);
BOOL FUNC_DECL bCI_GetActiveBurstMode(VOID * pvCAPI);
SHORT FUNC_DECL      sCI_GetCommStatus(VOID * pvCAPI,
                            BOOL    *    pbOnLine,    BOOL    *
pbLoggedIn);
VOID FUNC_DECL vCI_GetAPIVersion(SHORT * psMajor,
                            SHORT * psMinor, SHORT * psInter);
SHORT FUNC_DECL      sCI_GetFile(VOID * pvCAPI,
                            CHAR   *   pcSourceFile,   CHAR   *
pcDestFile,
                            BYTE byFormat);

SHORT FUNC_DECL      sCI_Login(VOID * pvCAPI);
SHORT FUNC_DECL      sCI_Logout(VOID * pvCAPI);

SHORT FUNC_DECL      sCI_BGMsgHandler(VOID * pvCAPI);

SHORT FUNC_DECL      sCI_ReceiveMessage(VOID * pvCAPI,
                            CHAR * pcMsg, USHORT * pusMsgLen);
SHORT FUNC_DECL      sCI_SendMessage(VOID   *   pvCAPI,   CHAR   *
pcUserMsg);

VOID * FUNC_DECL pvCI_GetUserData(VOID * pvCAPI);

#endif    /* _CAPI_H */
```

```
/* _sccs_ "@(#)ER %P% Ver: %I% Date: %G%" */
/* _rcs_ "$Id: ci_defs.h,v 1.5 1995/02/28 19:11:17 bobd Exp bobd
$" */
/* Copyright (C) 1994,1995 SEI Information Technology, Inc. */
/*:::::::::::::::::::::::::::::::::::::::::::::::::::::::::::::::
::::::::::::::::
:: Filename:        ci_defs.h
:: Purpose:         Defines for Protocol Layer of CAPI
library.
:: Revision:        09/19/94        RPD        Original
:::::::::::::::::::::::::::::::::::::::::::::::::::::::::::::::::
:::::::::::::::*/
#ifndef _CI_DEFS_H
define _CI_DEFS_H /* Additional return codes to those defined in ids_defs.h */
define CI_NODATA               -3

/*
 * API version number
 */
#define CI_VER_MAJOR            1
#define CI_VER_MINOR            0
#define CI_VER_INTER            1

/*
 * General size and limit defines
 */
#define CI_MIN_MAXPKT_SIZE      220     /* Smallest MaxPkt
setting      */
#define CI_DEF_ERRQ_SIZE    5
#define CI_MAX_ERR_MSG_LEN      80
#define CI_MAX_UNSOLMSG_LEN     256
#define CI_DEF_PKT_SIZE         1024
#define CI_MAX_PROTO_VER    1           /* Supported protocol
version   */
#define CI_MANEUVER_MIN_LEN     30      /*    Smallest
resonable maneuver  */ define CI_BASE_DEC             10      /* Used for strtol
conversions   */
define CI_BASE_HEX             16 define CI_MAX_MANEUVERS    128         /* Max  maneuvers  per
result      */
#define CI_MAX_POIS             3000 /* Max   poi's   per
result      */
#define CI_MAX_REGIONS          500     /* Max regions per
result      */ define CI_NO_ITEM              -1      /* Use to indicate
no current item */ define CI_BTRF_MAGIC_NUMBER  42330L    /*   BTRF   file   magic
number      */
#define CI_BTRF_FILE_VER    1           /* BTRF file version*/
```

```
#define CI_BTRF_COPYRIGHT_LEN 128
#define CI_BTRF_BUF_SZ              32767      /*  Data  buffer
size              */
#define CI_BTRF_MANHDR_SZ           sizeof(CHAR) + sizeof(CHAR)
+ \
                                    sizeof(SHORT)    +
sizeof(SHORT)
#define CI_BTRF_MAX_SUB_LEN         256
#define CI_BTRF_MAX_SUBS       15
#define CI_BTRF_NEED_DATA           10         /* != SUCCESS or an
error      */
#define CI_BTRF_MAX_MAN             350        /* Max len of man
text */

/* BTRF Maneuver types */
#define CI_BTRF_FOOTER_MAN          -1
#define CI_BTRF_SUMMARY_MAN         -2
#define CI_BTRF_DRIVETIME_MAN -3
#define CI_BTRF_DELAYTIME_MAN -4
#define CI_BTRF_ORIGIN_MAN          -5
#define CI_BTRF_DEST_MAN       -6
#define CI_BTRF_VERSION_MAN         -7
#define CI_BTRF_HEADER_MAN          -8

/* Location types */
#define CI_LOC_ORIGIN               1          /*  An     origin
location */
#define CI_LOC_DEST                 2          /* A  destination
location */

/*
 * Field position ID's
 */
/* Relative to start of message */
#define CI_TIMESTAMP_FLDID     1
#define CI_MSGTYPE_FLDID       5

/*
 * General Field Lengths
 */
#define CI_MAX_ARM_LEN              512
#define CI_MAX_ARM_NAME_LEN         50
#define CI_MIN_ARMS                 2
#define CI_MAX_POI_NAME_LEN         80
#define CI_MAX_POI_ADDR_LEN         64
#define CI_MAX_SXLOCUS_LEN          50         /* Length of SXLocus
as text */
#define CI_MAX_REGION_NAME_LEN      30
#define CI_MAX_REGION_FILE_LEN      30

/*
 * General Packet field defines
 */
#define   CI_DELIM_CHAR             '|'
#define CI_DELIM_STR                "|"
```

APPENDIX A — PAGE 40 OF 279

```
#define CI_EQUAL_CHAR              '='
#define CI_NO_CHAR                 'N'
#define CI_YES_CHAR                'Y'
#define CI_ESCAPE_CHAR             '\\'
#define CI_NEW_LINE                '\n'
#define CI_ARM_DELIM_CHAR          ';'
#define CI_POINT_DELIM_CHAR        ','
#define CI_POI_DELIM1_CHAR         ';'
#define CI_POI_DELIM2_CHAR         ':'
#define CI_REGION_DELIM1_CHAR ':'
#define CI_DOWNLOAD_DELIM_CHAR     ':'
#define CI_REGION_DELIM2_CHAR ';'
#define CI_MANNEXT_STR             "NEXT"
#define CI_MANPREV_STR             "PREVIOUS="
#define CI_BEARING_DELIM_CHAR ';'

/*
 * Result Object Storage types
 */
#define CI_ROS_NONE                0
#define CI_ROS_ROUTE               1
#define CI_ROS_POIS                2
#define CI_ROS_REGION              3
#define CI_ROS_LANG                4

/*
 * Result Memory Models
 */
#if 0
#define CI_STORE_RESULT            0    /* Store entire result in ROS   */
#endif
#define CI_STORE_PACKET            1    /* Store a packets worth in ROS   */
#define CI_STORE_BURST             2    /* Store entire burst in ROS */

/*
 * Result Object page sizes
 */
#define CI_MANS_PER_PG             64
#define CI_POIS_PER_PG             100
#define CI_RGNS_PER_PG             25

/*
 * Request Type defines
 */
#define CI_REQ_ROUTE               1
#define CI_REQ_POIS                2
#define CI_REQ_LOGIN               3
#define CI_REQ_CONFIG              4
#define CI_REQ_LOGOUT              5
#define CI_REQ_GENERIC             6
#define CI_REQ_REGIONS             7
#define CI_REQ_MAXPKT              8
#define CI_REQ_BUGRPT              9
```

```
#define CI_REQ_HB              10
#define CI_REQ_MAN             11
#define CI_REQ_MSG             12
#define CI_REQ_DL              13

/*
 * Limit Types
 */
#if 0    /* Moved to public header file capi.h */
#define CI_LIMIT_SLD           1    /*    Straight    line
distance */
#endif
#define CI_LIMIT_DD            2    /* Driving distance */
#define CI_LIMIT_DT            3    /* Driving time    */

/*
 * Request Packet field format strings
 */
#define CI_MSGLEN_FMT          CI_DELIM_STR "%04d"
#define CI_CRC_FMT             CI_DELIM_STR "%041X"
#define CI_TIMESTAMP_FMT       CI_DELIM_STR "%081X"
#define CI_SUBSCRIB_FMT        CI_DELIM_STR "%8.64s"
#define CI_MSGID_FMT           CI_DELIM_STR "%04X"
#define CI_CLIENTID_FMT        CI_DELIM_STR "%0.64s"

#define CI_LAT_FMT             CI_DELIM_STR "%s"
#define CI_LONG_FMT            CI_DELIM_STR "%s"
#define CI_ORGNAME_FMT         CI_DELIM_STR "%s"
#define CI_ORGTYPE_FMT         CI_DELIM_STR "%s"
#define CI_DESTNAME_FMT        CI_DELIM_STR "%s"
#define CI_DESTTYPE_FMT        CI_DELIM_STR "%s"
#define CI_LIMIT_FMT           CI_DELIM_STR "%s"
#define CI_LIMITTYPE_FMT       CI_DELIM_STR "%s"

/*
 * Login field defines
 */
#define CI_XMIT_ASCII          0    /* Transmission types*/
define CI_XMIT_BINARY         1 define CI_COMP_NONE           0    /* Compression Modes*/
define CI_COMP_PHRASE         1    /* ... phrase table */
#define CI_COMP_DICT           2    /* ... dictionary   */
define CI_COMP_LZ             3    /* ... lz(w?)       */ define CI_VECTOR              0    /* Vector Map       */
define CI_BITMAP              1    /* Bitmap is Bitmap!*/

/*
 * Request alternate defines
 */
#define CI_MAX_ALT_LEN         255
define CI_MAX_REQ_ALTS        8 define CI_ALT_SESSION_ID      "SESSION="
```

```
#define CI_ALT_CONFIG_ID        "CONFIG="
#define CI_ALT_QUERY_ID             "QUERY="
#define CI_ALT_MAN_ID               "MANEUVER="
#define CI_ALT_LOGOUT_ID        "LOGOUT="
#define CI_ALT_MSG_ID               "MSG="
#define CI_ALT_BUG_ID               "BGRPT="
#define CI_ALT_HB_ID                "HEARTBEAT="
#define CI_ALT_LANG_ID              "LANGUAGE="
#define CI_ALT_BUG_ID               "BGRPT="
#define CI_ALT_ARMS_ID              "ARMS="
#define CI_ALT_MAP_ID               "MAP="
#define CI_ALT_BURST_ID             "BURST="
#define CI_ALT_MAXPKT_ID        "MAXPKT="
#define CI_ALT_BEARING_ID           "BEARING="
#define CI_ALT_SXLOCUS_ID           "SXLOCUS="
#define CI_ALT_TOD_ID               "ROUTETOD="
#define CI_ALT_DOWNLOAD_ID          "DOWNLOAD="
#define CI_ALT_FORMAT_ID        "FORMAT="

#define CI_ALT_ARM_ID               "ARM="
#define CI_ALT_MORE_ID              "MORE="
#define CI_ALT_CONT_ID              "CONFCONT="

/*
 * Limit type defines
 */
#define CI_LIMIT_SLD_ID             "M"        /* Straight line
distance */
#define CI_LIMIT_DD_ID              "D"        /* Driving distance
*/
#define CI_LIMIT_DT_ID              "T"        /* Driving time */

/*
 * Query type defines
 */
#define CI_Q_POIS_ID                "POIS"
#define CI_Q_REGIONS_ID             "CONFIG"

/*
 * Result Query type defines
 */
#define CI_Q_POIS_TYPE              1
#define CI_Q_REGIONS_TYPE           2

/*
 * Download format types
 */
#define CI_DL_BINARY_ID             "DL"       /*  Binary
download  */
#define CI_DL_BTRF_ID               "BTRF,DL"  /*  BTRF,
binary      */

/*
 * FEB sizes
 */
```

```
#define CI_FEB_DESCLEN          128             /* Lang desc length */
#define CI_MAX_FEBTMPLS         300             /* Max # FEB templates */

/*
 * Result alternate "tags" for determining alt contents
 */
#define CI_ALT_HB_TAG           "|HEARTBEAT=Y"
#define CI_RSP_ER_OK_TAG        "OK"

/*
 * Result alternate "types".
 */
#define CI_ALT_UNKNOWN_TYPE     0
#define CI_ALT_ARM_TYPE         1
#define CI_ALT_MORE_TYPE        2
#define CI_ALT_CONT_TYPE        3
#define CI_ALT_MAXPKT_TYPE      4

/*
 * Request alternate states
 */
#define CI_ALT_CLEAR            0
#define CI_ALT_SET              1
#define CI_ALT_SENT             2

/*
 * Request field defines
 */
#define CI_MAX_LL_LEN           15
#define CI_MAX_OD_NAME_LEN      80
#define CI_MAX_OD_TYPE_LEN      40
#define CI_MAX_LIMIT_LEN        15
#define CI_MAX_LIMIT_TYPE_LEN   2
#define CI_MAX_FLD_LEN          80              /* Equal to largest of above */

/*
 * Request field states
 */
#define CI_FIELD_CLEAR          0
#define CI_FIELD_SET            1

/*
 * Transmission Modes
 */
#define CI_XMIT_ASCII           0
#define CI_XMIT_BINARY          1

/*
 * Amount to increment MsgId each request
 */
#define CI_MSGID_INC            15
#define CI_MAX_MSGID            30000
```

APPENDIX A — PAGE 44 OF 279

```c
/*
 * Message type markers
 * (As delivered from host)
 */
#define CI_MSG_TYPE_ADDR        'A'
#define CI_MSG_TYPE_ROUTE       'R'
#define CI_MSG_TYPE_DL          'D'
#define CI_MSG_TYPE_ERROR       'E'
#define CI_MSG_TYPE_QUERY       'Q'
#define CI_MSG_TYPE_MSG         'M'

/*
 * Result Message Type defines
 * (converted from message type
 *  markers, recorded within a msg)
 */
#define CI_RES_ADDR_TYPE        1
#define CI_RES_ROUTE_TYPE       2
#define CI_RES_DL_TYPE          3
#define CI_RES_ERROR_TYPE       4
#define CI_RES_QUERY_TYPE       5
#define CI_RES_MSG_TYPE         6

/*
 * Msg field sizes
 */
#define CI_MSG_SUBS_LEN         8       /* Min length of Subscriber Id */
#define CI_MSG_CLI_LEN          0       /* Min length of Client Id */
#define CI_MSG_ID_LEN           4       /* Length of Message Id field */
#define CI_MSG_TS_LEN           8       /* Length of Time Stamp field */

/*
 * Packet field sizes
 */
#define CI_PKT_MSGLEN_LEN       4
#define CI_PKT_COM_LEN          1
#define CI_PKT_CRC_LEN          4
#define CI_PKT_HDR_MIN_SIZE     (1 + CI_PKT_MSGLEN_LEN + 1 + CI_PKT_CRC_LEN)

#define CI_PKT_END              "|\n"

/*
 * State Data accessor macros
 */

/* For accessing the ROS */
#define SD_ROS_HDR(pSD)         ((pSD)->ROSHdr)
#define SD_ROS_TYPE(pSD)        ((pSD)->ROSHdr.byObjectType)

/* For accessing the BTRF translator */
```

```c
#define SD_BTRF(pSD)                ((pSD)->BTRFInfo)

/* For accessing BTRF substitution container */
#define SD_BSC(pSD)
(((pSD)->BTRFInfo).SubContainer)

/* For accessing the Message Queue */
#define SD_MSGQ_GET(pSD)        ((pSD)->msgQ)

/*
 * Called once on entry to API: if TRUE is returned, current API func
 * can continue. If FALSE is returned, app. is currently within API and
 * func should return.
 */ define SD_API_ENTER(pSD)          \
         (((pSD)->bWithinAPI    ==     TRUE)    ?    FALSE    :
((pSD)->bWithinAPI = TRUE))
/* Called once on exit from API */
#define SD_API_LEAVE(pSD)               ((pSD)->bWithinAPI    =
FALSE)

/* For accessing origin name and type */
#define SD_ORGNAME_GET(pSD)             ((pSD)->acReqOrgName)
#define SD_ORGTYPE_GET(pSD)             ((pSD)->acReqOrgType)
/* For accessing destination name and type */
#define SD_DESTNAME_GET(pSD)        ((pSD)->acReqDestName)
#define SD_DESTTYPE_GET(pSD)        ((pSD)->acReqDestType)

/* Set/Get Initial Request State */
#define SD_MARK_NEW_REQUEST(pSD)    ((pSD)->bNewRequest = TRUE)
#define SD_MARK_OLD_REQUEST(pSD)    ((pSD)->bNewRequest = FALSE)
#define SD_IS_NEW_REQUEST(pSD)          ((pSD)->bNewRequest)

/* For accessing the request type */
#define   SD_REQ_TYPE_SET(pSD, reqType) \
                                                    ((pSD)->byReqType
= (reqType))
#define  SD_EXP_QUERYTYPE_SET(pSD, qType)       \

((pSD)->byExpQueryType = (qType))

/* For accessing the result more alternate indicator */
#define SD_RES_ALTMORE_SET(pSD, value)  \
                                                    ((pSD)->bResAltMore
= (value))
#define SD_RES_ALTMORE_GET(pSD)         ((pSD)->bResAltMore)

/* For accessing the result confirm/continue alternate indicator
*/
#define SD_RES_ALTCONTINUE_SET(pSD, value)   \

((pSD)->bResAltContinue = (value))
#define SD_RES_ALTCONTINUE_GET(pSD)     ((pSD)->bResAltContinue)
```

APPENDIX A -- PAGE 46 OF 279

```
/* For accessing the message id (both current and expected). */
#define SD_MSGID_SET(pSD, value)    ((pSD)->usMsgId = (value))
#define SD_MSGID_GET(pSD)           ((pSD)->usMsgId)
#define SD_EXP_MSGID_SET(pSD)       ((pSD)->usExpMsgId   =
SD_MSGID_GET(pSD))
#define SD_EXP_MSGID_GET(pSD)       ((pSD)->usExpMsgId)
/* For accessing the message type */
#define SD_EXP_MSGTYPE_SET(pSD, type)    \
                                            ((pSD)->byExpMsgType
= (type))
#define SD_EXP_MSGTYPE_GET(pSD)     ((pSD)->byExpMsgType)

/* For accessing the request acknowledgement */
#define SD_ACK_GET(pSD)             ((pSD)->byAck)
#define SD_ACK_SET(pSD, value)      ((pSD)->byAck = (value))

#define SD_XMIT_FMT_GET(pSD)        ((pSD)->byXmitFmt)
#define SD_XMIT_FMT_SET(pSD, value) ((pSD)->byXmitFmt    =
(value))

#define SD_COMP_MODE_GET(pSD)       ((pSD)->byCompMode)
#define    SD_COMP_MODE_SET(pSD,  value)   ((pSD)->byCompMode =
(value))

#define SD_COLOR_DEPTH_GET(pSD)        ((pSD)->sColorDepth)
#define   SD_COLOR_DEPTH_SET(pSD, value)  ((pSD)->sColorDepth =
(value))

#define SD_MAP_FMT_GET(pSD)         ((pSD)->byMapFmt)
#define SD_MAP_FMT_SET(pSD, value) ((pSD)->byMapFmt = (value))

/* For accessing protocol version */
#define SD_PROTO_VER_GET(pSD)       ((pSD)->sProtoVer)
#define SD_PROTO_VER_SET(pSD, value) ((pSD)->sProtoVer = (value))

/* For accessing BURST mode */
#define SD_BURST_MODE_GET(pSD)      ((pSD)->bBurstMode)
#define    SD_BURST_MODE_SET(pSD,  value)   ((pSD)->bBurstMode =
(value))

/* Flags burst mode state change */
#define SD_BURST_CHANGED_SET(pSD, value)
((pSD)->bBurstChanged = (value))
#define SD_BURST_CHANGED_GET(pSD)   ((pSD)->bBurstChanged)

/* For accessing the logged in indicator */
#define SD_LOGGEDIN_GET(pSD)        ((pSD)->bLoggedIn)
#define SD_LOGGEDIN_SET(pSD, value)     ((pSD)->bLoggedIn    =
(value))

/* For accessing online status. */
#define SD_IS_ONLINE(pSD)              ((pSD)->bOnline)
#define SD_ONLINE_SET(pSD, value)   ((pSD)->bOnline = (value))

/* For accessing comm. device */
#define SD_COMMDEV_GET(pSD)         ((pSD)->pvCD)
```

APPENDIX A — PAGE 47 OF 279

```
#define SD_COMMDEV_SET(pSD, value)  ((pSD)->pvCD = (value))

/* For accessing desired maxpkt */
#define SD_DESIRED_MAXPKT_GET(pSD)         ((pSD)->sDesMaxPkt)
#define SD_DESIRED_MAXPKT_SET(pSD, value)  ((pSD)->sDesMaxPkt = (value))
/* For accessing result maxpkt */
#define SD_RESMAXPKT_GET(pSD)         ((pSD)->sResMaxPkt)
#define SD_RESMAXPKT_SET(pSD, value)  ((pSD)->sResMaxPkt  = (value))
/* For accessing current maxpkt */
#define SD_CURMAXPKT_GET(pSD)         ((pSD)->sCurMaxPkt)
#define SD_CURMAXPKT_SET(pSD, value)  ((pSD)->sCurMaxPkt  = (value))

/* For accessing state of request fields. */
#define SD_REQFLDSTATE_GET(pSD, sFieldId)    \

((pSD)->abyReqFldState[(sFieldId)])
#define SD_REQFLDSTATE_SET(pSD, sFieldId, value)  \

((pSD)->abyReqFldState[(sFieldId)] = (value))

/* For accessing Ctrl Current Item */
#define SD_CTRL_CURRITEM_GET(pSD)    ((pSD)->sCtrlCurrItem)
#define SD_CTRL_CURRITEM_SET(pSD, value)    \

((pSD)->sCtrlCurrItem = (value))

/* For accessing Ctrl User Item index */
#define SD_CTRL_USERITEM_GET(pSD)    ((pSD)->sCtrlUserItem)
#define SD_CTRL_USERITEM_SET(pSD, value)    \

((pSD)->sCtrlUserItem = (value))

/* For accessing Ctrl ROS Offset */
#define SD_CTRL_ROSOFFSET_GET(pSD)  ((pSD)->sCtrlROSOffset)
#define SD_CTRL_ROSOFFSET_SET(pSD, value)    \

((pSD)->sCtrlROSOffset = (value))

/* Access to Ctrl file download req. */
#define SD_CTRL_REQDL_GET(pSD)            ((pSD)->bReqDownload)
#define SD_CTRL_REQDL_SET(pSD, value)    \
                                                ((pSD)->bReqDownload
= (value))
/* For accessing Greatest (relevant) item received */
#define SD_GREATEST_ITEM_GET(pSD)    ((pSD)->sGreatestItem)
#define SD_GREATEST_ITEM_SET(pSD, value)    \

((pSD)->sGreatestItem = (value))
/* For accessing the previous Msg Id */
#define SD_PREV_MSGID_GET(pSD)           ((pSD)->sPrevMsgId)
#define SD_PREV_MSGID_SET(pSD, value)    \
                                                ((pSD)->sPrevMsgId
= (value))
```

```
/* For accessing memory model field */
#define SD_MEM_MODEL_GET(pSD)       ((pSD)->byMemModel)
#define SD_MEM_MODEL_SET(pSD, value)    \
                                    ((pSD)->byMemModel
= (value))

/* For accessing state of result */
#define SD_RESULT_COMPLETE_GET(pSD)     ((pSD)->bResultComplete)
#define SD_RESULT_COMPLETE_SET(pSD, value)  \

((pSD)->bResultComplete = (value))

/* For accessing last msg id */
#define SD_LAST_MSGID_GET(pSD)      ((pSD)->usLastMsgId)
#define SD_LAST_MSGID_SET(pSD, value)   \
                                    ((pSD)->usLastMsgId
= (value))

/* For accessing error code */
#define SD_ERRCODE_GET(pSD)         ((pSD)->sErrCode)
#define SD_ERRCODE_SET(pSD, value)  ((pSD)->sErrCode = (value))

/* For accessing abort flag */
#define SD_ABORT_GET(pSD)           ((pSD)->bAbortTask)
#define SD_ABORT_SET(pSD, value)    ((pSD)->bAbortTask = (value))

/* For accessing user data */
#define SD_USERDATA_GET(pSD)        ((pSD)->pvUserData)
#define SD_USERDATA_SET(pSD, value)     ((pSD)->pvUserData   =
(value))

/* For accessing API timeout value */
#define SD_TIMEOUT_GET(pSD)         ((pSD)->dTimeout)
#define SD_TIMEOUT_SET(pSD, value)  ((pSD)->dTimeout = (value))

/* For accessing File Desc on downloads */
#define SD_DOWNLOAD_FD_GET(pSD)     ((pSD)->iDnldFD)
#define SD_DOWNLOAD_FD_SET(pSD, fileDesc)   ((pSD)->iDnldFD =
(fileDesc))

/* Access to download format */
#define SD_DLFORMAT_GET(pSD)        ((pSD)->byDownloadFormat)
#define SD_DLFORMAT_SET(pSD, byFormat)  \

((pSD)->byDownloadFormat = (byFormat))

#define SD_BTRF_DATA_REMAINING(pSD, pbyInput)   \
                (SD_BTRF(pSD).sDataLen - \
                ((CHAR   *)(pbyInput)   -   (CHAR
*)SD_BTRF(pSD).pbyData))

#endif  /* _CI_DEFS_H */
```

```
/* "@(#)ER %P% Ver: %I% Date: %G%" */
/* Copyright (C) 1994,1995 SEI Information Technology, Inc. */
/*:::::::::::::::::::::::::::::::::::::::::::::::::::::::::::::::::::::::::::::
:: Filename:          ci_err.h
:: Purpose:           Defines for API Errors.
:: Revision:          12/16/94      RPD         Original
:::::::::::::::::::::::::::::::::::::::::::::::::::::::::::::::::::::::::::::::
:::::::::::::::*/
#ifndef _CI_ERR_H
define _CI_ERR_H /*
 * Error codes
 * (Moved to capi.h)
 */

/*
 * Error check points (locations where which errors are reported)
 */
#define CI_FUNC_UNDEFINED               0         /* No where in
particular */
#define CI_FUNC_OPENAPI                 1
#define CI_FUNC_SENDREQUEST             2
#define CI_FUNC_CREATELOGINREQ          3
#define CI_FUNC_CREATECONFIGREQ         4
#define CI_FUNC_CREATEROUTEREQ          5
#define CI_FUNC_CREATEPOISREQ    6
#define CI_FUNC_CREATELOGOUTREQ         7
#define CI_FUNC_CREATEGENERICREQ 8
#define CI_FUNC_CREATEREQ               9
#define CI_FUNC_CREATEEMPTYREQ          10
#define CI_FUNC_ALTAPPENDTOREQ          11
#define CI_FUNC_REQFLDAPPEND     12
#define CI_FUNC_PACKETREQ               13
#define CI_FUNC_RECEIVEDATA             14
#define CI_FUNC_PROCRESULTS             15
#define CI_FUNC_OPENCOMM         16
#define CI_FUNC_ROSALLOC         17
#define CI_FUNC_ROSROUTEALLOC    18
#define CI_FUNC_PROCROUTE               19
#define CI_FUNC_PROCARMS         20
#define CI_FUNC_ROSADDMAN               21
#define CI_FUNC_ROSADDMANAT             22
#define CI_FUNC_ROSGETMANAT             23
#define CI_FUNC_ROSDELMANAT             24
#define CI_FUNC_ROSADDPOIAT             25
#define CI_FUNC_ROSGETPOIAT             26
#define CI_FUNC_PROCQPOIS               27
#define CI_FUNC_PROCPOISITEM     28
#define CI_FUNC_ROSPOISALLOC     29
#define CI_FUNC_ROSREGIONALLOC          30
#define CI_FUNC_ROSADDREGIONAT          31
#define CI_FUNC_ROSGETREGIONAT          32
#define CI_FUNC_PROCQREGION             33
```

```
#define CI_FUNC_PROCREGIONITEM            34
#define CI_FUNC_SETORIGINNT               35
#define CI_FUNC_SETDESTNT                 36
#define CI_FUNC_SETINCLUDEARMS            37
#define CI_FUNC_SETLIMITVT                38
#define CI_FUNC_SETXMITFORMAT     39
#define CI_FUNC_SETCOMPRESSION            40
#define CI_FUNC_SETCOLORDEPTH     41
#define CI_FUNC_SETMAPFORMAT      42
#define CI_FUNC_SETPROTOCOLVER            43
#define CI_FUNC_SETBURSTMODE      44
#define CI_FUNC_DOLOGIN                   45
#define CI_FUNC_DOLOGOUT          46
#define CI_FUNC_GETNEXTMANEUVER           47
#define CI_FUNC_GETNEXTPOI                48
#define CI_FUNC_GETNEXTREGION     49
#define CI_FUNC_SETREGION                 50
#define CI_FUNC_DOREGIONSELECT            51
#define CI_FUNC_PROCALTS          52
#define CI_FUNC_MSGQPUT                   53
#define CI_FUNC_BGMSGHANDLER      54
#define CI_FUNC_DOMAXPACKET               55
#define CI_FUNC_SETMAXPACKET      56
#define CI_FUNC_ROUTEISVALID      57
#define CI_FUNC_GETMANEUVER               58
#define CI_FUNC_SETNEWREQUEST     59
#define CI_FUNC_CTRLLOADROSA      60
#define CI_FUNC_CTRLLOADROSB      61
#define CI_FUNC_GETREGIONITEM     62
#define CI_FUNC_GETPOIITEM                63
#define CI_FUNC_SETPOI                    64
#define CI_FUNC_SETROUTE          65
#define CI_FUNC_GETACTIVEREGION           66
#define CI_FUNC_SDACTIVEREGIONGET 67
#define CI_FUNC_GETERROR          68
#define CI_FUNC_LOADMSGQ          69
#define CI_FUNC_CLOSECOMM                 70
#define CI_FUNC_SDMESSAGEGET      71
#define CI_FUNC_CLOSEAPI          72
#define CI_FUNC_GETRESULT                 73
#define CI_FUNC_SENDMESSAGE               74
#define CI_FUNC_GETROUTEHEADER            75
#define CI_FUNC_GETROUTETRAILER           76
#define CI_FUNC_GETPOIHEADER      77
#define CI_FUNC_SETBUGREPORT      78
#define CI_FUNC_SETTOD                    79
#define CI_FUNC_GETFILE                   80
#define CI_FUNC_GETROUTEASFILE            81
#define CI_FUNC_PROCDOWNLOAD      82
#define CI_FUNC_SETLANGUAGEFILE           83
#define CI_FUNC_BTRFSETLANGFILE           84
#define CI_FUNC_CTRLSETDLFORMAT           85
#define CI_FUNC_SETDOWNLOADFORMAT 86
#define CI_FUNC_PROCBTRF          87
#define CI_FUNC_BTRFOPENFEB               88
#define CI_FUNC_BTRFHEADER                89
```

APPENDIX A — PAGE 51 OF 279

```
#define CI_FUNC_BTRFADDDATA         90
#endif   /* _CI_ERR_H */
```

```c
/* _sccs_ "@(#)ER %P% Ver: %I% Date: %G%" */
/* _rcs_ "$Id: ci_proto.h,v 1.3 1995/02/08 19:51:50 bobd Exp bobd
$" */
/* Copyright (C) 1994,1995 SEI Information Technology, Inc. */
/*::::::::::::::::::::::::::::::::::::::::::::::::::::::::::::::
:::::::::::::::::
:: Filename:         ci_proto.h
:: Purpose:          Declares function prototypes required
for Protocol
::                   Translation layer compilation (public
to the library,
::                   but private to users of the library).
:: Revision:         10/27/94        RPD        Original
::::::::::::::::::::::::::::::::::::::::::::::::::::::::::::::
:::::::::::::::*/
#ifndef _CI_PROTO_H
define _CI_PROTO_H /*
 * User supplied functions
 */
SHORT    sPS_OnIdle(VOID * pvUserData);           /*    Event
notification */
SHORT    sPS_OnMessage(VOID * pvUserData);  / *   E v e n t
notification */

SHORT    sPS_DevOpen(VOID ** ppvCD, VOID * pvUserData);
SHORT    sPS_DevClose(VOID * pvCD, VOID * pvUserData);
SHORT    sPS_DevRead(VOID * pvCD, BYTE * pbyBuf, SHORT sSize,
                     BYTE    byBlockMode,    VOID    *
pvUserData);
SHORT    sPS_DevWrite(VOID * pvCD, BYTE * pbyBuf, SHORT sSize,
                     VOID * pvUserData);

VOID *   pvPS_MemAlloc(size_t size);
VOID vPS_MemFree(VOID * pvData);

/*
 * Module statedat.c
 */
VOID vCI_APIAbortTask(CI_STATE_DATA * pSD);
SHORT    sCI_SDInitReq(CI_STATE_DATA * pSD);
SHORT    sCI_SDConfigIOBuffs(CI_STATE_DATA   *   pSD,   SHORT
sBufSize);
SHORT    sCI_SDActiveRegionSet(CI_STATE_DATA * pSD,
                     CHAR * pcName, CHAR * pcFile);
SHORT    sCI_SDActiveRegionGet(CI_STATE_DATA * pSD,
                     CHAR * pcName, USHORT * pusNameLen,
                     CHAR    *    pcFile,    USHORT    *
pusFileLen);
SHORT    sCI_SDMessageSet(CI_STATE_DATA * pSD,
                     CHAR * pcMessage, SHORT sMsgLen);
SHORT    sCI_SDMessageGet(CI_STATE_DATA * pSD,
                     CHAR * pcMsg, USHORT * pusMsgLen);
```

APPENDIX A — PAGE 53 OF 279

```
/*
 * Module sendreq.c
 */
SHORT    sCI_SendRequest(CI_STATE_DATA * pSD);
SHORT    sCI_CreateRequest(CI_STATE_DATA * pSD);
SHORT    sCI_CreateEmptyReq(CI_STATE_DATA * pSD);
SHORT    sCI_CreateLoginReq(CI_STATE_DATA * pSD);
SHORT    sCI_CreateConfigReq(CI_STATE_DATA * pSD);
SHORT    sCI_CreateRouteReq(CI_STATE_DATA * pSD);
SHORT    sCI_CreatePOISReq(CI_STATE_DATA * pSD);
SHORT    sCI_CreateLogoutReq(CI_STATE_DATA * pSD);
SHORT    sCI_CreateGenericReq(CI_STATE_DATA * pSD);

/*
 * Module reqpack.c
 */
SHORT    sCI_PacketReq(CI_STATE_DATA * pSD);
SHORT    sCI_CreateReqHeader(CI_STATE_DATA * pSD, SHORT sMsgLen,
LONG lCRC);

/*
 * Module reqalt.c
 */
SHORT    sCI_AltInit(CI_STATE_DATA * pSD);
SHORT    sCI_AltClearAll(CI_STATE_DATA * pSD);
SHORT    sCI_AltClear(CI_STATE_DATA * pSD, SHORT sAltId);
SHORT    sCI_AltAppendAll(CI_STATE_DATA * pSD);
SHORT    sCI_AltAppendToReq(CI_STATE_DATA * pSD, SHORT sAltId);
SHORT    sCI_AltSetValue(CI_STATE_DATA * pSD,
                                SHORT sAltId, CHAR * pcAltValue);
VOID vCI_AltChangeState(CI_STATE_DATA * pSD, SHORT sAltId,
                                BYTE ucFromState, BYTE ucToState);
VOID vCI_AltChangeStates(CI_STATE_DATA * pSD,
                                BYTE ucFromState, BYTE ucToState);

/*
 * Module reqfield.c
 */
SHORT    sCI_ReqFldSetValue(CI_STATE_DATA * pSD,
                                        SHORT    sFieldId,   CHAR    *
pcValue);
SHORT    sCI_ReqFldAppend(CI_STATE_DATA * pSD, SHORT sFieldId);
SHORT    sCI_ReqFldGetState(CI_STATE_DATA    *    pSD,    SHORT
sFieldId);
SHORT    sCI_ReqFldClrState(CI_STATE_DATA    *    pSD,    SHORT
sFieldId);
SHORT    sCI_ReqFldClrAll(CI_STATE_DATA * pSD);

/*
 * Module cp_utils.c
 */
VOID vCI_MsgIdSetNext(CI_STATE_DATA * pSD);
LONG lCI_ComputeCRC(BYTE * pbyBuff, SHORT sNumBytes, LONG lSeed);
VOID *   pvCI_MemAlloc(CI_STATE_DATA * pSD, size_t size);
VOID vCI_MemFree(CI_STATE_DATA * pSD, VOID * pvData);
VOID vCI_ErrorSet(CI_STATE_DATA * pSD, BYTE byErrType,
```

```
                                    BYTE byWhere, SHORT sData);
SHORT     sCI_ReqBufAppend(CI_STATE_DATA * pSD, BYTE * pbyData,
SHORT sDataLen);
SHORT     sCI_FieldGetLong(CHAR ** ppcBuffer, SHORT sBase, LONG
* plDest,
                          SHORT sMinLen, SHORT sMaxLen, CHAR
cDelim);
SHORT     sCI_FieldGetString(CHAR ** ppcBuffer, CHAR * pcDest,
                          SHORT sMinLen, SHORT sMaxLen, CHAR
cDelim);
BYTE *    pbyCI_BufFind(BYTE * pbySource, SHORT sSourceLen,
                        BYTE    *    pbyTarget,    SHORT
sTargetLen);
BYTE *    pbyCI_ByteFindNE(BYTE * pbySource, SHORT sSourceLen,
BYTE byTarget);
VOID vCI_SwapLongs(LONG * pLongs, SHORT sCount);
VOID vCI_SwapShorts(SHORT * pShorts, SHORT sCount);

/*
 * Module errorq.c
 */
VOID vCI_ErrorQClear(CI_STATE_DATA * pSD);
BOOL bCI_ErrorQIsEmpty(CI_STATE_DATA * pSD);
VOID vCI_ErrorQPut(CI_STATE_DATA * pSD, SHORT sErrType,
                          BYTE byWhere, SHORT sData);
VOID vCI_ErrorQPutProto(CI_STATE_DATA * pSD, BYTE * pbyData,
                          SHORT sDataLen);
BOOL bCI_ErrorQGet(CI_STATE_DATA * pSD, SHORT * psErrType,
                          BYTE    *    pbyErrData,    SHORT    *
psDataLen);

/*
 * Module recvdata.c
 */
SHORT     sCI_ReceiveData(CI_STATE_DATA * pSD, BYTE byBlockMode);

/*
 * Module recvpack.c
 */
SHORT     sCI_GetResult(CI_STATE_DATA * pSD);
SHORT     sCI_LoadMsgQ(CI_STATE_DATA * pSD);
BOOL bCI_InBufContainsPkt(CI_STATE_DATA * pSD);
SHORT     sCI_PktReadHdr(CI_STATE_DATA * pSD, BYTE * pbyBuf,
SHORT sBufLen);
BOOL bCI_PktIsValid(CI_STATE_DATA * pSD);
BOOL bCI_MsgIsHeartbeat(CI_RES_MSG * pResMsg);
SHORT     sCI_HBSend(CI_STATE_DATA * pSD);

/*
 * Module stripmsg.c
 */
SHORT     sCI_PktStripMsgs(CI_STATE_DATA * pSD);

/*
 * Module msgend.c
 */
```

APPENDIX A — PAGE 55 OF 279

```
VOID    vCI_FindMsgEnd(BYTE ** ppbyMsg, SHORT * psBufLen);
VOID    vCI_FindDownloadEnd(BYTE ** ppbyMsg, SHORT * psBufLen);

/*
 * Module msgdcode.c
 */
SHORT     sCI_MsgDecode(CI_STATE_DATA   *   pSD,    CI_RES_MSG    *
pResMsg,
                                BYTE * pbyMsg, SHORT sMsgLen);

/*
 * Module btrftran.c
 */
SHORT     sCI_BTRFInit(CI_STATE_DATA * pSD);
SHORT     sCI_BTRFReset(CI_STATE_DATA * pSD);
SHORT     sCI_BTRFDealloc(CI_STATE_DATA * pSD);
SHORT     sCI_BTRFSetLangFile(CI_STATE_DATA   *   pSD,   CHAR    *
pcFileName);
SHORT     sCI_ProcBTRF(CI_STATE_DATA * pSD, CI_RES_MSG * pMsg);

/*
 * Module subcont.c
 */
SHORT     sCI_BSCInit(CI_STATE_DATA * pSD);
SHORT     sCI_BSCReset(CI_STATE_DATA * pSD);
SHORT     sCI_BSCAddSub(CI_STATE_DATA * pSD, SHORT sSubNum,
                        CHAR * pcData, SHORT sDataLen);
CHAR *    pcCI_BSCFindSub(CI_STATE_DATA * pSD, SHORT sSubNum);
VOID      vCI_BSCPrint(CI_STATE_DATA * pSD);

/*
 * Module msgq.c
 */
SHORT      sCI_MsgQCreate(CI_STATE_DATA * pSD);
VOID vCI_MsgQDestroy(CI_STATE_DATA * pSD);
BOOL bCI_MsgQIsEmpty(CI_STATE_DATA * pSD);
CI_RES_MSG *   pCI_MsgQGet(CI_STATE_DATA * pSD);
SHORT      sCI_MsgQPut(CI_STATE_DATA * pSD, CI_RES_MSG * pResMsg);
VOID vCI_MsgQDelMsg(CI_STATE_DATA * pSD, CI_RES_MSG * pMsg);
VOID vCI_MsgQFlush(CI_STATE_DATA * pSD);

/*
 * Module proc_res.c
 */
SHORT     sCI_ProcResults(CI_STATE_DATA * pSD);
SHORT     sCI_ProcMsg(CI_STATE_DATA * pSD, CI_RES_MSG * pMsg);
SHORT     sCI_ProcAddr(CI_STATE_DATA * pSD, CI_RES_MSG * pMsg);
SHORT     sCI_ProcRoute(CI_STATE_DATA * pSD, CI_RES_MSG * pMsg);
SHORT     sCI_ProcQuery(CI_STATE_DATA * pSD, CI_RES_MSG * pMsg);
SHORT     sCI_ProcQPOIS(CI_STATE_DATA * pSD, CI_RES_MSG * pMsg);
SHORT     sCI_ProcPOISItem(CI_STATE_DATA * pSD, USHORT usMsgId,
                           CHAR * pcPOI, SHORT sPOILen);
SHORT     sCI_ProcQRegion(CI_STATE_DATA   *   pSD,    CI_RES_MSG   *
pMsg);
SHORT     sCI_ProcRegionItem(CI_STATE_DATA * pSD, USHORT usMsgId,
```

```
                                         CHAR   *   pcRegion,    SHORT
sRegionLen);
SHORT     sCI_ProcUnexpMsgId(CI_STATE_DATA * pSD, CI_RES_MSG *
pMsg);
SHORT     sCI_ProcUnexpMsgType(CI_STATE_DATA * pSD, CI_RES_MSG
* pMsg);
BOOL bCI_MsgIdIsExpected(CI_STATE_DATA * pSD, USHORT usMsgId);
BOOL bCI_MsgTypeIsExpected(CI_STATE_DATA * pSD, BYTE byMsgType);

/*
 * Module procerr.c
 */
SHORT     sCI_ProcError(CI_STATE_DATA * pSD, CI_RES_MSG * pMsg);

/*
 * Module procdnld.c
 */
SHORT     sCI_ProcDownload(CI_STATE_DATA * pSD, CI_RES_MSG *
pMsg);

/*
 * Module resalt.c
 */
SHORT     sCI_ProcAlts(CI_STATE_DATA * pSD, BYTE * pbyAltsBuf,
SHORT sBufLen);
SHORT     sCI_AltGetType(BYTE * pbyAlt, SHORT sBufLen);
SHORT     sCI_ProcArms(CI_STATE_DATA * pSD, BYTE * pbyAltData,
SHORT sBufLen);

/*
 * Module ros.c
 */
SHORT     sCI_ROSCreate(CI_STATE_DATA * pSD);
SHORT     sCI_ROSConfig(CI_STATE_DATA * pSD,
                         SHORT sMaxMans, SHORT sMaxPOIs, SHORT
sMaxRegions);
SHORT     sCI_ROSAlloc(CI_STATE_DATA * pSD, BYTE byROSType);
SHORT     sCI_ROSRouteAlloc(CI_STATE_DATA * pSD);
SHORT     sCI_ROSPOISAlloc(CI_STATE_DATA * pSD);
SHORT     sCI_ROSRegionAlloc(CI_STATE_DATA * pSD);
SHORT     sCI_ROSDealloc(CI_STATE_DATA * pSD);
SHORT     sCI_ROSGetItemCount(CI_STATE_DATA * pSD);
VOID vCI_ROSFlush(CI_STATE_DATA * pSD);

SHORT     sCI_ROSAddMan(CI_STATE_DATA * pSD, CI_MAN_REC * pMan);
SHORT     sCI_ROSAddManAt(CI_STATE_DATA * pSD, CI_MAN_REC * pMan,
SHORT sIndex);
SHORT     sCI_ROSGetManAt(CI_STATE_DATA * pSD, SHORT sIndex,
CI_MAN_REC * pMan);

SHORT     sCI_ROSAddPOI(CI_STATE_DATA * pSD, CI_POI_REC * pPOI);
SHORT     sCI_ROSAddPOIAt(CI_STATE_DATA * pSD, CI_POI_REC * pPOI,
SHORT sIndex);
SHORT     sCI_ROSGetPOIAt(CI_STATE_DATA * pSD, SHORT sIndex,
CI_POI_REC * pPOI);
```

APPENDIX A — PAGE 57 OF 279

```
SHORT      sCI_ROSAddRegion(CI_STATE_DATA * pSD, CI_REGION_REC *
pRegion);
SHORT      sCI_ROSAddRegionAt(CI_STATE_DATA * pSD,
                                    CI_REGION_REC * pRegion, SHORT
sIndex);
SHORT      sCI_ROSGetRegionAt(CI_STATE_DATA * pSD,
                                    SHORT sIndex, CI_REGION_REC
* pRegion);
VOID vCI_ROSRouteDealloc(CI_STATE_DATA * pSD);
VOID vCI_ROSPOISDealloc(CI_STATE_DATA * pSD);
VOID vCI_ROSRgnDealloc(CI_STATE_DATA * pSD);
VOID vCI_ROSFreeManText(CI_STATE_DATA * pSD,  CI_ROS_HEADER  *
pROS,
                                    SHORT sPageNum);

/*
 * Module sets.c
 */
SHORT      sCI_SetXmitFormat(CI_STATE_DATA * pSD, BYTE byXmitFmt);
SHORT      sCI_SetCompression(CI_STATE_DATA    *    pSD,    BYTE
byCompMode);
SHORT      sCI_SetColorDepth(CI_STATE_DATA * pSD, SHORT sDepth);
SHORT      sCI_SetMapFormat(CI_STATE_DATA * pSD, BYTE byMapFmt);
SHORT      sCI_SetProtocolVer(CI_STATE_DATA * pSD, SHORT sVer);
SHORT      sCI_SetNewRequest(CI_STATE_DATA * pSD);
#if 0
SHORT FUNC_DECL    sCI_SetOriginNT(CI_STATE_DATA * pSD, CHAR *
pcName,
                                    CHAR * pcType);
SHORT FUNC_DECL    sCI_SetDestNT(CI_STATE_DATA * pSD, CHAR *
pcName,
                                    CHAR * pcType);
SHORT FUNC_DECL    sCI_SetLimitVT(CI_STATE_DATA  *  pSD,   LONG
lValue,
                                    BYTE byType);
endif SHORT      sCI_AssignOrigin(CI_STATE_DATA * pSD,
                            CHAR * pcName, CHAR * pcType,
                            LONG lLat, LONG lLong,
                            SHORT sBearing,
                            CHAR * pcSXLocus);
SHORT      sCI_AssignDest(CI_STATE_DATA * pSD,
                            CHAR * pcName, CHAR * pcType,
                            LONG lLat, LONG lLong,
                            SHORT sBearing,
                            CHAR * pcSXLocus);

/*
 * Module gets.c
 */
#if 0
SHORT      sCI_GetNextRegion(CI_STATE_DATA * pSD, CI_REGION_REC
* pRegion);
SHORT      sCI_GetNextManeuver(CI_STATE_DATA * pSD, CI_MAN_REC *
pMan);
```

```
SHORT      sCI_GetPrevManeuver(CI_STATE_DATA * pSD, CI_MAN_REC *
pMan);
SHORT      sCI_GetNextPOI(CI_STATE_DATA * pSD, CI_POI_REC * pPOI);
#endif
SHORT      sCI_GetTotalPktsSent(CI_STATE_DATA * pSD);
SHORT      sCI_GetTotalPktsRcvd(CI_STATE_DATA * pSD);
LONG lCI_GetTotalBytesSent(CI_STATE_DATA * pSD);
LONG lCI_GetTotalBytesRcvd(CI_STATE_DATA * pSD);

/*
 * Module validate.c
 */
BOOL bCI_RouteIsValid(CI_STATE_DATA * pSD);
BOOL bCI_POIQIsValid(CI_STATE_DATA * pSD);
BOOL bCI_LoginIsValid(CI_STATE_DATA * pSD);
BOOL bCI_RegionSelectIsValid(CI_STATE_DATA * pSD);
SHORT      sCI_ValidateLocation(CI_STATE_DATA   *   pSD,    BYTE
byLocType,
                                CHAR * pcName, CHAR * pcType,
                                LONG lLat, LONG lLong, SHORT
sBearing,
                                CHAR * pcSXLocus);

/*
 * Module doos.c
 */
SHORT      sCI_DoLogin(CI_STATE_DATA * pSD);
SHORT      sCI_DoLogout(CI_STATE_DATA * pSD);
SHORT      sCI_DoRegionSelect(CI_STATE_DATA * pSD);
SHORT      sCI_DoMaxPacket(CI_STATE_DATA * pSD);

/*
 * Module ctrlr.c
 */
VOID vCI_CtrlReset(CI_STATE_DATA * pSD);
VOID vCI_CtrlClearResult(CI_STATE_DATA * pSD);
SHORT      sCI_CtrlSetDownloadFormat(CI_STATE_DATA  *  pSD,  BYTE
byFormat);
SHORT      sCI_CtrlRouteReq(CI_STATE_DATA * pSD);
SHORT      sCI_CtrlRouteGet(CI_STATE_DATA * pSD, SHORT sItem,
                            CI_MAN_REC * pMan);
SHORT      sCI_CtrlPOISReq(CI_STATE_DATA * pSD);
SHORT      sCI_CtrlPOISGet(CI_STATE_DATA * pSD, SHORT sItem,
                            CI_POI_REC * pPOI);
SHORT      sCI_CtrlRegionsReq(CI_STATE_DATA * pSD);
SHORT      sCI_CtrlRegionGet(CI_STATE_DATA * pSD, SHORT sItem,
                            CI_REGION_REC * pRegion);
SHORT      sCI_CtrlLoadROSA(CI_STATE_DATA * pSD, SHORT sItem);
SHORT      sCI_CtrlLoadROSB(CI_STATE_DATA * pSD, SHORT sItem);
VOID vCI_CtrlPreProcItem(CI_STATE_DATA * pSD, USHORT usMsgId);
VOID vCI_CtrlPostProcItem(CI_STATE_DATA * pSD);

/*
 * Module update.c
 */
```

APPENDIX A — PAGE 59 OF 279

```
SHORT     sCI_CommFunctional(CI_STATE_DATA   *    pSD,     BYTE
byErrWhere);

/*
 * Module msgmap.c
 */
VOID vCI_MMAddMsgId(CI_STATE_DATA * pSD, USHORT usMsgId, SHORT
sFirstItem);
USHORT    usCI_MMFind(CI_STATE_DATA * pSD, SHORT sItem);
SHORT     sCI_MMFirstItem(CI_STATE_DATA    *     pSD,    USHORT
usTargetMsgId);

/*
 * Module unsolmsg.c
 */
SHORT     sCI_RecvUnsolMsg(CI_STATE_DATA * pSD, CI_RES_MSG *
pMsg);

/*
 * Module vb_utils.c
 */
ULONG FUNC_DECL ulCI_StrAddr(CHAR * pcString);

#endif    /* _CI_PROTO_H */
```

```
/* _sccs_ "@(#)ER %P% Ver: %I% Date: %G%" */
/* _rcs_ "$Id: ci_types.h,v 1.3 1995/02/11 00:15:24 bobd Exp bobd
$" */
/* Copyright (C) 1994,1995 SEI Information Technology, Inc. */
/*::::::::::::::::::::::::::::::::::::::::::::::::::::::::::::::
::::::::::::::::
:: Filename:          ci_types.h
:: Purpose:           Declares types required for use and
functioning of API.
:: Revision:          09/19/94        RPD         Original
::::::::::::::::::::::::::::::::::::::::::::::::::::::::::::::
::::::::::::::::*/
#ifndef _CI_TYPES_H
define _CI_TYPES_H /*
 * Enumeration types
 */
typedef enum ci_req_alt_type    /* Types of request alternates */
{
    eReqAltSession = 0,         /*    Identifies     index    in
array    */
    eReqAltConfig,              /* Config            */
    eReqAltQuery,               /* Query             */
    eReqAltMan,                     /* Maneuver      */
    eReqAltLogout,              /* Logout            */
    eReqAltMsg,                     /* User Message  */
    eReqAltHB,                      /* Heartbeat     */
    eReqAltLang,                /* Language          */
    eReqAltBug,                     /* Bug Report    */ eReqAltOrgSXLocus,          /* Origin SXLocus    */
    eReqAltDestSXLocus,         /* Dest. SXLocus     */
    eReqAltOrgBearing,          /* Origin Bearing    */
    eReqAltDestBearing,         /* Dest. Bearing     */
    eReqAltArms,                /* Arms              */
    eReqAltBurst,               /* Burst             */
    eReqAltMaxPkt,              /* MaxPkt            */
    eReqAltTOD,                     /* Time of day   */
    eReqAltDownload,            /* File download     */
    eReqAltFormat,              /* Download format */
    eReqAltMaxAlts              /* Records total number of
request alts */
} CI_REQ_ALT_TYPE;

typedef enum ci_req_field_type   /* Types of request fields */
{
    eReqFldOrgLat = 0,          /* Origin Latitude */
    eReqFldOrgLong,                /* Origin Longitude */
    eReqFldOrgName,                /* Origin Name    */
    eReqFldOrgType,                /* Origin Type    */
    eReqFldDestName,            /* Destination Name */
    eReqFldDestType,            /* Destination Type */
    eReqFldLimit,               /* Limit             */
    eReqFldLimitType,           /* Limit Type        */
```

```
        eReqFldMaxFlags                 /* Records total number
of fields */
} CI_REQ_FIELD_TYPE;

typedef enum ci_btrf_state      /* BTRF download states   */
{
    eBTRFInit = 0,              /* Initialized            */
    eBTRFHeader,                /* Awaiting file header   */
    eBTRFManHdr,                /* Awaiting maneuver header*/
    eBTRFManeuver,              /* Awaiting maneuver      */
    eBTRFComplete               /* BTRF download complete*/
} CI_BTRF_STATE;

/*
 * Type declarations...
 */
/* Describes a request alternate */
typedef struct ci_req_alt
{
    BYTE            byState;
    CHAR            acValue[CI_MAX_ALT_LEN + 1];
} CI_REQ_ALT;

/*
 * State data field types
 */
typedef CHAR        ReqLL[CI_MAX_LL_LEN + 1];
typedef CHAR        ReqODName[CI_MAX_OD_NAME_LEN + 1];
typedef CHAR        ReqODType[CI_MAX_OD_TYPE_LEN + 1];
typedef CHAR        ReqLimit[CI_MAX_LIMIT_LEN + 1];
typedef CHAR        ReqLimitType[CI_MAX_LIMIT_TYPE_LEN + 1];

/* Result Message Header */
typedef struct ci_res_msg
{
    LONG                lTimestamp;
    SubscriberId        acSubscriberId;
    USHORT                  usMsgId;
    ClientId            acClientId;
    BYTE                byType;             /* Message type */
    BYTE *                  pbyData;        /* Data of message
*/
    SHORT                   sDataLen;       /* Length of data
*/
    struct ci_res_msg * pNext;              /* Link to next msg
in q */
} CI_RES_MSG;

/* Message Queue */
typedef struct ci_msgq
{
    SHORT           sLen;                   /* Count of
items in queue. */
    CI_RES_MSG *    pHead;                  /* Pointer to head
of queue. */
```

APPENDIX A — PAGE 62 OF 279

```
        CI_RES_MSG *   pTail;                    /* Pointer to tail
of queue. */
} CI_MSGQ;

/* API error information */
typedef struct ci_err_data
{
        SHORT              sErrorId;
        SHORT              sErrorData;
        BYTE               abyMsgText[CI_MAX_ERR_MSG_LEN + 1];
        SHORT              sMsgLen;              /* Actual length of
msgtext */
} CI_ERR_DATA;

/* Maneuver Arm information */
typedef CHAR       ArmName[CI_MAX_ARM_NAME_LEN];
typedef struct ci_arm_rec
{
        ArmName            acFromName;           /* From
Street          */
        SHORT              sFromLen;
        ArmName            acToName;             /* To Street*/
        SHORT              sToLen;
        SHORT              sArmCount;            /* # of
Arms       */
        CI_POINT           aPoint[CI_MAX_ARMS];  /* Arm positions*/
} CI_ARM_REC;

/* Maneuver (with Arms) information */
typedef struct ci_man_rec
{
        CHAR *             pcManText;            /*    *
Maneuver text  */
        SHORT              sTextLen;
        ArmName            acFromName;           /* From
Street          */
        SHORT              sFromLen;
        ArmName            acToName;             /* To Street*/
        SHORT              sToLen;
        SHORT              sArmCount;            /* # of
Arms       */
        CI_POINT           aPoint[CI_MAX_ARMS];  /* Arm positions*/
} CI_MAN_REC;

/* Describes a POI result */
typedef CHAR       POIName[CI_MAX_POI_NAME_LEN];
typedef CHAR       POIAddr[CI_MAX_POI_ADDR_LEN];
typedef CHAR       SXLocus[CI_MAX_SXLOCUS_LEN];
typedef struct ci_poi_rec
{
        POIName            acName;               /* POI Name*/
        SHORT              sNameLen;
        POIAddr            acAddr;               / *    P O I
Address      */
        SHORT              sAddrLen;
        SHORT              sPOIType;             /* POI Type    */
```

APPENDIX A — PAGE 63 OF 279

```
    LONG            lPOIId;                 /* POI Id      */
    SXLocus         acSXLocus;
    SHORT           sSXLocusLen;
    LONG            lDist;                  /* Dist. from origin
*/
    BOOL            bHasCustInfo;
} CI_POI_REC;

/* Describes a Metro Region selection */
typedef CHAR        RegionName[CI_MAX_REGION_NAME_LEN];
typedef CHAR        RegionFile[CI_MAX_REGION_FILE_LEN];
typedef struct ci_region_rec
{
    RegionName      acName;                 /*  Name   of
region          */
    SHORT           sNameLen;
    RegionFile      acFile;                 /* Filename of
region      */
    SHORT           sFileLen;
} CI_REGION_REC;

/* ROS header record */
typedef struct ci_ros_header
{
    BYTE            byObjectType;           /* Current storage type
*/
    SHORT           sFirstItemNum;
    SHORT           sTotalItems;
    CI_MAN_REC **   papManPages;
    SHORT           sMaxManeuvers;
    SHORT           sMaxManPages;
    CI_POI_REC **   papPOIPages;
    SHORT           sMaxPOIs;
    SHORT           sMaxPOIPages;
    CI_REGION_REC ** papRgnPages;
    SHORT           sMaxRegions;
    SHORT           sMaxRgnPages;
} CI_ROS_HEADER;

/* BTRF Substitution data */
typedef struct ci_btrf_subdata
{
    SHORT           sNum;                   /* Substitution
number  */
    SHORT           sDataLen;               /* Data length */
    CHAR *          pcData;                 /* Pointer to
sub data */
} CI_BTRF_SUBDATA;

/* BTRF Substitution Container info */
typedef struct ci_bsc_info
{
    CI_BTRF_SUBDATA *   apSubData[CI_BTRF_MAX_SUBS];
    SHORT               sSize;              /* # of subs
in array */
} CI_BSC_INFO;
```

APPENDIX A — PAGE 64 OF 279

```c
/* State Data BTRF translation info */
typedef struct ci_btrf_info
{
    CI_BSC_INFO     SubContainer;       /* Sub       data
container    */
    SHORT           sBTRFState;         /*     B T R F
download state    */
    INT             iFEBInFile;         /*  FEB    file
handle       */
    CHAR *          pcFEBLangFilename;  /* Name of language
file */
    SHORT           sFEBTmplCount;      /* # templates in
FEB          */
    LONG *          palFEBTmplOffsets;  /*  FEB   template
array        */
    BYTE *          pbyData;            /* Input buffer*/
    SHORT           sDataLen;           /* Current length
of data buf  */
    BYTE *          pbyCurrInput;       /* Current pointer
into data */
    CHAR *          pcCopyright;        /*  BTRF    header
copyright */
    ULONG           ulTotalMansLen;     /* Total length
(all man info) */
    SHORT           sTotalMans;         /*     Total
maneuver count  */
    SHORT           sCurrManNum;        /* Current Maneuver
number       */
    SHORT           sCurrManTmplCount;  /*  Current    man
template count */
    USHORT          usCurrTmplSize;     /* Current man
tmpl size */
    CHAR *          pcTmplBuf;          /*    Template
buffer       */
    CHAR *          pcManBuf;           /* Maneuver   text
buffer       */
    CHAR *          pcCurrTmpl;         /*       Offset
within pcManBuf  */
    USHORT          usMsgId;            /* Incomming message
Id           */
} CI_BTRF_INFO;

typedef CHAR        UnsolMsg[CI_MAX_UNSOLMSG_LEN];
/* THE State Data */
typedef struct ci_state_data
{
    SHORT           sErrCode;           /* Most    recient
error code */
    BOOL            bAbortTask;         /* Flag   to  abort
current operation */

/* Unsol. Msg storage */
    UnsolMsg        acUnsolMsg;

/* Active region */
```

APPENDIX A — PAGE 65 OF 279

```
        RegionName          acActiveRegionName;
        RegionFile          acActiveRegionFile;

/* Controller Layer */
        SHORT               sCtrlCurrItem;          /* Current controler
item index                  */
        SHORT               sCtrlUserItem;          /* Current users
item index                  */
        SHORT               sCtrlROSOffset;            /* Offset of
1st ROS item from Ctrl */
        BYTE        byMemModel;             /* Entire result or
packet only         */

SHORT               sGreatestItem;          /*    Greatest
(relevant) item rcvd.   */
        SHORT               sPrevMsgId;             /* MsgId of
Previous Message        */
        BOOL        bReqDownload;       /* Requesting a file
download            */
        INT         iDnldFD;                /* File desc. for
downloads           */
        BYTE        byDownloadFormat;   /*   ASCII   or   BINARY
(BTRF)              */

/* Result Object Storage */
        CI_ROS_HEADER  ROSHdr;

/* Request or Result Packet */
        USHORT              usMsgId;
        USHORT              usLastMsgId;        /* Id of last msg
received */

/* General State Info */
        BOOL        bWithinAPI;             /* Guard against
reentry */
        BOOL        bNewRequest;        /* Flag req. for new req.
*/

/* Login values */
        BYTE        byXmitFmt;                  /*   Transmission
format (ASCII/BIN) */
        BOOL        bLoggedIn;          /*  Logged  in  to
host                */
        BOOL        bOnline;            /* Connected to host */
        BYTE        byCompMode;         /*    Compression
mode                */
        SHORT               sColorDepth;        /* Color depth of
client              */
        BYTE        byMapFmt;           /* Map format         */
        SHORT               sProtoVer;             /*    Desired
protocol version    */
        BOOL        bBurstMode;         /*   Burst   mode
state                   */
        BOOL        bBurstChanged;      /* Flags change in burst
mode */
```

```
    SHORT            sDesMaxPkt;          /*   Desired
MaxPkt size          */
    SHORT            sResMaxPkt;          /* MaxPkt from
host                 */
    SHORT            sCurMaxPkt;          /*   Current
MaxPkt size          */

/* For Result processing */
    SHORT            sCurMan;             /* Used for transfer
to ROS               */
    SHORT            sCurPOI;             /*   "           "
    "                */
    SHORT            sCurRegion;          /*   "
    "       "        */

/* ProcRoute() inits ManInfo, then ProcAlts() will add any
arm data,*/
    /* and finally, ProcRoute() will add maneuver data    */
    CI_MAN_REC       ManInfo;             /* Temp. until Man.
complete */

/* Communication buffers */
    BYTE *           pbyOutputBuf;
    SHORT            sOutBufLen;          /*   Current
length of output buf */
    SHORT            sOutBufSize;         /* Max length of
output buf   */
    BYTE *           pbyInputBuf;
    SHORT            sInBufLen;           /*   Current
length of input buf  */
    SHORT            sInBufSize;          /* Max length
of input buf    */

/* Result Packet info */
    BYTE *           pbyResBuf;           /* Stores msgs
from pkt     */
    SHORT            sResBufLen;          /*   Current
length of resbuf */
    SHORT            sResBufSize;         /* Max length of
resbuf       */
    BYTE *           pbyResPktStart;      /* Start of
Packet        */
    SHORT            sResPktDataLen;      /* Len of data
in Pkt        */
    SHORT            sResPktHdrLen;       /* Len of header in
Pkt          */
    BYTE             byResCompMode;       /* Compression Mode */
    LONG             lCRC;                /* CRC of data */

/* Message Queue */
    CI_MSGQ          msgQ;

/* Error Queue */
    SHORT            sErrQHead;
    SHORT            sErrQTail;
    SHORT            sErrQSize;
```

```
        CI_ERR_DATA *   paErrQ;

/* User supplied function pointers */
        PS_ON_IDLE         pfsOnIdle;
        PS_ON_MESSAGE      pfsOnMessage;
        PS_DEV_OPEN        pfsDevOpen;
        PS_DEV_CLOSE       pfsDevClose;
        PS_DEV_READ        pfsDevRead;
        PS_DEV_WRITE       pfsDevWrite;
        PS_MEM_ALLOC       pfpvMemAlloc;
        PS_MEM_FREE        pfvMemFree;

BYTE            byCommMode;             /* Communications
mode    */
        VOID *          pvCD;                   /       *
Communications device.  */
        VOID *          pvUserData;

/* Registration info */
        SubscriberId    acSubscriberId;
        ClientId        acClientId;
        DOUBLE          dTimeout;

/* Result Data info */
        BYTE            byAck;                  /* Acknowledgement
from host */
        USHORT          usExpMsgId;
        BYTE            byExpMsgType;
        BYTE            byExpQueryType;         /* Type of Query
(Msg Type = Query) */
        BOOL            bResAltMore;            /* Records state of alt
"MORE=" */
        BOOL            bResAltContinue;        /* Records  state  of
CONTCONF=" */
        BOOL            bResultComplete;        /* State  of  current
result          */

/* Request Info */
        BYTE            byReqType;
        BYTE            byReqCompMode;
        BYTE *             pbyReqBuf;
        SHORT           sReqBufLen;             /* Amount of
data in buf    */
        SHORT              sReqBufSize;         /* Max size of req
buf             */

/* Request alternates */
        SHORT           sReqNumAlts;
        CI_REQ_ALT      aReqAlt[eReqAltMaxAlts];

/* Request fields */
        BYTE            abyReqFldState[eReqFldMaxFlags];
        ReqLL              acReqOrgLat;         /* Origin Latitude
*/
        ReqLL              acReqOrgLong;        / *    O r i g i n
Longitude */
```

```
        ReqODName       acReqOrgName;        /* Origin Name       */
        ReqODType       acReqOrgType;        /* Origin Type       */
        ReqODName       acReqDestName;       /* Destination Name  */
        ReqODType       acReqDestType;       /* Destination Type  */
        ReqLimit        acReqLimit;              /* Limit         */
        ReqLimitType    acReqLimitType;          /* Limit Type    */

/* Misc. Info. */
        SHORT           sPktsRcvd;
        LONG            lBytesRcvd;
        SHORT           sPktsSent;
        LONG            lBytesSent;

/* BTRF translation */
        CI_BTRF_INFO    BTRFInfo;
} CI_STATE_DATA;

#endif    /* _CI_TYPES_H */
```

```
/* _sccs_   $Source: /ids/cvs/host/libut/src/errhand.h,v $ Ver:
$Revision: 1.1 $ Date: $Date: 1994/12/20 16:19:09 $ */
/* Copyright (C) 1994,1995 SEI Information Technology, Inc. */
/************************   Start    of    ERRHAND.H
***********************/ ifndef _ERRHAND_H
define _ERRHAND_H ifdef __STDC__ void fatal_error( char *fmt, ... );

else   /* __STDC__ */ void fatal_error();

endif  /* __STDC__ */ endif  /* _ERRHAND_H */

/************************   End    of    ERRHAND.H
***********************/
```

```c
static    char *  _sccs_   =   { "   $ S o u r c e :
/ids/cvs/host/fe_spif/src/fe_climsg.c,v $ Ver: $Revision: 1.10
$ Date: $Date: 1995/05/26 22:50:37 $"};
/* Copyright (C) 1994,1995 SEI Information Technology, Inc. */

/*:::::::::::::::::::::::::::::::::::::::::::::::::::::::::::::
::::::::::::::::
:: FileName:    fe_climsg.c
::
:: Purpose :    Function that handle Passthrough client messages.
::
:: Revision:
:: WHO          --WHEN--   WHAT
:: DAB & VI                Original
:: Raju         08/20/94   Modified for Message Queue and SPIF
:::::::::::::::::::::::::::::::::::::::::::::::::::::::::::::::
::::::::::::*/ include <stdio.h>
include <signal.h>
#include <errno.h>
#include <fcntl.h>
include <netinet/in.h>
#include <sys/types.h>
include <sys/stat.h> include "gdefines.h"
include "gerror.h"
#include "mq_pub.h"
#include "queue.h"
#include "spif.h"
#include "fe_common.h"
#include "ut_audit.h"

#define    MAX_LOCUS_SIZE      128
#define    MAX_TMPFILE_SIZE    128
define    MAX_TMPBUFF_SIZE    1024 extern long      lQID;
extern long         lFID;
extern long         lSize;
extern int       iDebug;
extern int       argcnt;
extern short     sMsglen;
extern long         lg_addr;
extern int          bit_map;
extern long      lfe_tcp;
extern long      lFrontID;
extern long         lAddress;
extern int          iDataPort;
extern int          last_baud;
extern time_t       start_time;
extern long         lHeartbeat;
extern int          iListenPort;
extern short        sMaxPackets;
extern short        sPacketFlag;
```

```
extern int        ipacketflag;
extern short      sBurstflag;
extern short      sConfirmMax;
extern short      sAckPending;
extern long       lMap_format;
extern long       lFormat_mode;
extern short      sDefaultBaud;
extern short      sPacketLimit;
extern short      sMinPacketLimit;
extern int        iQueue_master;
extern long       lLastCommtime;
extern long       lLastCommtime;
extern long       lConstantBaud;
extern long       lCompress_mode;
extern long       lDisplay_panes;
extern short      sTransmitLimit;
extern short      sMinPacketLimit;
extern long       lHeartbeat_wait;
extern int        socket_port_num;
extern short      sInterPacketGap;
extern struct     sockaddr_in addr;
extern short      sProcess_heartbeat;
extern short      sTerm_After_Service;
extern long       lExit_on_disconnect;
extern unsigned long    ulSessionID;

extern void       *pMQU_master;
extern void       *pvMQ_master;

extern char       *cpQID;
extern char       *cpFrontID;
extern char       *cpConfigPath;
extern char       *caCommDevice;
extern char       *caDeviceConfig;
extern char       *cpDownload_dir;
extern char       *cpDictionary_dir;

extern char       caID[];
extern char       caBuff[];
extern char       caHangup[];
extern char       caOrigin[];
extern char       caOriginType[];
extern char       caLimitValue[];
extern char       caDestination[];
extern char       caNoAutoAnswer[];
extern char       caDestinationType[];

extern char       *caAlternative[];

extern Q_HEAD     sHead;
extern Q_HEAD     sConfig;
extern Q_HEAD     *pQhead;
extern Q_HEAD     *pQConfig;
extern FILE       *pMsgsfile;
extern SUBSCRIBER *pGSub;
extern void vDeleteTmpfile();
```

```
extern short sFeFindPOIMapping();

#ifdef ANSI
short sFeFileCheck(char *cpFile);
void vReset_status_flags(SUBSCRIBER *pSub);
#else
short sFeFileCheck();
void vReset_status_flags()
endif /*::::::::::::::::::::::::::::::::::::::::::::::::::::::::::::::
::::::::::::::::
:: Function: vFePassThrough_all
::
:: Purpose :
::        This is the main routine which parses the message from
the SPIF
::        and updates the subscriber structure based on the
request.
::        The SPIF request is parsed and appropriate action is
taken here.
::        If request has to be sent to DBE for POI or for ROUTE
it is done here.
::        If next maneuver has to be sent it is done here.
::
:: Returns: None.
::
:: Input:   Pointer to SPIF header and Message buffer.
::
:: Output: None.
::
:: Globals:
::
:: Called Routines:
::
:: Revision:
:: WHO     --WHEN--  WHAT
:: Raju    08/20/94  Original  Coded for Message Queue and SPIF
::::::::::::::::::::::::::::::::::::::::::::::::::::::::::::::::
::::::::::::::*/ void vFePassThrough_all(pspif_header, cpbuff)
SPIF_HEADER    *pspif_header;
char           *cpbuff;
{
    short         sLen;
    short         sagain;
    short         sStep;
    short         status;
    short         sPktsize;
    long          lMatch, i;
    char          *cpalt;
    char          *cp, *cpnewbuff;
    char          casxlocuso[MAX_LOCUS_SIZE];
    char          casxlocusd[MAX_LOCUS_SIZE];
```

APPENDIX A — PAGE 73 OF 279

```c
      char     caBuffer[MAX_TMPBUFF_SIZE];
      char     caUserID[MAX_TMPFILE_SIZE];
      char     caTBuff[MAX_TMPFILE_SIZE];
      char         caTmpFile[MAX_FILENAME_SIZE];
      char     caReadBuf[MAX_FILENAME_SIZE];
      FILE     *fp, *to;
      struct stat    *pStat;
      SUBSCRIBER    *pSub;

vMQ_Log(NULL,NULL,20,"[FE%ld] vFePassThrough_all spifid %ld
msglen%d\n",
             lAddress, pspif_header->lSpifID, strlen(cpbuff));
      cp = cpbuff;

/* Check if the Gateway has already logged and validated.
*/
      if( (pGSub == NULL) || (pGSub->iValidated == 0) ||
                (pGSub->sGatewayFlag == 0))
      {
            /* Error response is sent if gateway has not logged */
            vMQ_Log( NULL, NULL, 0,
                  "[FE%ld]   Invalid    Request.    Gateway    not
validated\n", lAddress);
            /*
            vFeLogout_Sub(  pspif_header->lSpifID,
LOGOUT_BY_OPERATOR );
            */
            return;
      }

/* check the SPIFID and if it is not found then it is an
error */
      /* Passthrough for a subscriber  */
      if((pSub = pFindSpifID(pspif_header->lSpifID)) == NULL)
      {
            sprintf( caBuffer, "[FE%ld] Invalid SPIFID/SubscriberID
%ld\n",
                  lAddress, pspif_header->lSpifID);
            vMQ_Log( NULL, NULL, 0, "%s",caBuffer);
            vFeLogout_Sub(  pspif_header->lSpifID,
LOGOUT_BY_OPERATOR );
            return;
      }

/*
      ** increment the receiving count of that subscriber and the
gateway
      ** receive counter.
      */
#ifdef DEBUG
      vMQ_Log( NULL, NULL, 20, "[FE%ld] sub SpifID %ld\n",
lAddress,
                      pSub->lSpifID);
#endif
      pSub->lRcv_count++;
      pGSub->lRcv_count++;
```

```c
    /* Check if the subscriber has already been validated */
    if( pSub->iValidated == 0)
    {
        /* If not validated already then the next request
cannot be accepted */
        vMQ_Log( NULL, NULL, 0, "[FE%ld] Subscriber not yet
validated %ld\n",
            lAddress, pSub->lSpifID);

if(pSub->sResultCode<1) pSub->sResultCode=FEERR_SUVA;
        vSendErrorResponse(pSub,   "Subscriber Not   Yet
Validated");

return;
    }
    else if( pSub->lResponsePending )
    {
        /* Old request is being processed. Next request is
stored. */
        strcpy(pSub->caMsg,cpbuff);
        pSub->lRequestPending = 1;
        vMQ_Log( NULL, NULL, 10, "[FE%ld] Pending request for
SPIFID %ld\n",
            lAddress, pSub->lSpifID);
        return;
    } ifdef DEBUG
    vMQ_Log(NULL, NULL, 20,
        "[FE%ld] Parsing Passthrough message! size %ld\n",
        lAddress, strlen(cpbuff));
endif /* check for the correctness of CRC */
    if((sMsglen = sCheckCRC( cpbuff )) == 0)
    {
        vMQ_Log( NULL, NULL, 0, "[FE%ld] Invalid CRC\n",
            lAddress, pSub->lSpifID);
        vFeLogout_Sub( pSub->lSpifID, LOGOUT_BY_OPERATOR );
        return;
    }
    sLen = strlen( cpbuff ) - sMsglen;
    cpbuff = cpbuff + sLen;

vMakeUpper( cpbuff );

strcpy( caUserID, pSub->ServerRequest.caID);

/* Initialize the pSub structure */
    memset((char *)&pSub->OriginLocus, -1, sizeof(ALOCUS));
    memset((char *)&pSub->DestinationLocus, -1, sizeof(ALOCUS));
    memset((char *)&pSub->ServerRequest, 0, sizeof(SPIFPARSE));

/* 0 indicates parse message from client to server */
    if ((status = sHandleSPIFParse(cpbuff, &pSub->ServerRequest,
0)) != SUCCESS)
```

```
        {
            /* Error in the format of the message. */
            vMQ_Log(NULL,    NULL,    0,    "[FE%ld]    SPIF    msg    parse
failed\n", lAddress);

if(pSub->sResultCode<1) pSub->sResultCode=FEERR_INFO;
            vSendErrorResponse(pSub,    "Invalid    Request    string
format");

}    /* end if parse NOT OK */
        else
        {
            /* check so that user does not change subscriberID or
userid */
            /* within a session */
            if( (strcmp( caUserID, pSub->ServerRequest.caID) != 0
) ||
                ( s t r c m p (    p S u b - > c a S C R ,
pSub->ServerRequest.caSubscriber) != 0))
            {
                vMQ_Log(NULL, NULL, 0,
                    "[FE%ld]    ERROR:    SubscriberID/UserID
Mismatch\n", lAddress);
                vMQ_EventLog(NULL, NULL, MQ_EVB_ATTEMPT,
                    pSub->caSCR, strlen(pSub->caSCR));
                vMQ_Log(NULL, NULL, 0,
                    "[FE%ld] Current SUBID %s User %s, New SUBID
%s user %s\n",
                    lAddress, pSub->caSCR, caUserID,
                    pSub->ServerRequest.caSubscriber,
                    pSub->ServerRequest.caID);
                pSub->lErrorCount++;

if( pSub->lErrorCount >= MAX_ERROR_COUNT )
                {
                    pSub->lMsgtype = SPIF_SUBSCRIBER_DISCONNECT;
                    pSub->sResultCode = LOGOUT_BY_OPERATOR;
                    vMQ_Log(NULL, NULL, 0,
                        "[FE%ld] ERROR: Disconnecting after max.
attempts\n",
                        lAddress);
                    v H a n d l e A u d i t L o g ( N U L L ,    N U L L ,
MQ_MTS_AUDIT_CLLOGOUT,
                        lFID, (void *)pSub, NULL, 1);
                    sSendHeader( 8, pSub->lSpifID, pSub->lMsgtype
);

/* Delete the subscriber */
                    if( iDelSub( pSub->lSpifID) != SUCCESS)
                    {
                        vMQ_Log(NULL, NULL, 0,
                            "[FE%ld] ERROR: Unable to delete
subscriber\n",
                            lAddress);
                    }
                }
```

```
                else
                {
                        if ( pSub->sResultCode<1 )
pSub->sResultCode=FEERR_SUMI;
                        vSendErrorResponse(pSub, "SubscriberID/UserID
Mismatch");

strcpy(pSub->ServerRequest.caID, caUserID);
                        strcpy(   pSub->ServerRequest.caSubscriber,
pSub->caSCR);
                }
                return;
        } if( ((pSub->ServerRequest.lLatitude < MIN_LAT) ||
                (pSub->ServerRequest.lLatitude > MAX_LAT)) &&
                (pSub->ServerRequest.lLatitude    !=
DEFAULT_LAT_LONG))
                {
                pSub->ServerRequest.lLatitude = DEFAULT_LAT_LONG;

if ( pSub->sResultCode<1 )
pSub->sResultCode=FEERR_INLA;
                vSendErrorResponse(pSub, "Invalid Latitude");

return;
        } if( ((pSub->ServerRequest.lLongitude < MIN_LONG) ||
                (pSub->ServerRequest.lLongitude > MAX_LONG)) &&
                (pSub->ServerRequest.lLongitude    !=
DEFAULT_LAT_LONG))
                {
                pSub->ServerRequest.lLongitude       =
DEFAULT_LAT_LONG;

if ( pSub->sResultCode<1 )
pSub->sResultCode=FEERR_INLO;
                vSendErrorResponse(pSub, "Invalid Longitude");

return;
        }

/* print out serverRequest */
#ifdef DEBUG
        vMQ_Log(NULL, NULL, 30, "[FE%ld] ID %s\n",
                lAddress, pSub->ServerRequest.caID);
        vMQ_Log(NULL, NULL, 30, "[FE%ld] Origin %s\n",
                lAddress, pSub->ServerRequest.caOrigin);
        vMQ_Log(NULL, NULL, 30, "[FE%ld] Origin type %s\n",
                lAddress, pSub->ServerRequest.caOriginType);
        vMQ_Log(NULL, NULL, 30, "[FE%ld] Destination %s\n",
                lAddress, pSub->ServerRequest.caDestination);
        vMQ_Log(NULL,   NULL,  30,   "[FE%ld]  Destination type
%s\n",
```

```
            lAddress, pSub->ServerRequest.caDestinationType);
        vMQ_Log(NULL, NULL, 30, "[FE%ld] Origin lat %ld\n",
            lAddress, pSub->ServerRequest.lLatitude);
        vMQ_Log(NULL, NULL, 30, "[FE%ld] Origin long %ld\n",
            lAddress, pSub->ServerRequest.lLongitude);
        for (sagain = 0; sagain < 8; sagain++)

if(pSub->ServerRequest.aAlternatives[sagain].caAlternatives != NULL)
            {
                vMQ_Log(NULL, NULL, 30, "[FE%ld]  %s\n",
lAddress,
pSub->ServerRequest.aAlternatives[sagain].caAlternatives);
            }
endif
        /* Reset heartbeat_sent flag to indicate that a message
has */
        /* been received from client */
        pSub->lStatus = (pSub->lStatus & ~SS_SEND_HBEAT);
        pSub->lStatus = (pSub->lStatus & ~SS_HBEAT_SENT);
        pSub->ServerRequest.sOriginBearing = -1;
        pSub->ServerRequest.sDestinationBearing = -1;

/* Check if the Origintype and/or Destination type
length is equal to */
        /* Four. If so then External to internal translation
of POI names */
        /* needs to be done.  */
        if( strlen( pSub->ServerRequest.caOriginType ) == 4 )
        {
            /* POI Mapping translation is required. */
            /* Check if there is actually any translation
possible */
            if ( sFeFindPOIMapping(pSub->ServerRequest.caOriginType,
                    &caTBuff) != SUCCESS)
            {
                vMQ_Log(NULL, NULL, 0,"[FE%ld] Src No
Matching POI for <%s>\n",
                    lAddress,
pSub->ServerRequest.caOriginType);
            }
            else
            {
                vMQ_Log(NULL, NULL, 21, "[FE%ld] Src POI for
<%s> is <%s>\n",
                    lAddress,
pSub->ServerRequest.caOriginType, caTBuff);
                strcpy( pSub->ServerRequest.caOriginType,
caTBuff);
            }
        }
        else
        {
```

```c
                vMQ_Log(NULL, NULL, 21, "[FE%ld] origin type is
<%s>\n",
                        lAddress, pSub->ServerRequest.caOriginType);
        }

/* Check if the Destination type length is equal to */
        /* Four. If so then External to internal translation
of POI names */
        /* needs to be done. */
        if( strlen( pSub->ServerRequest.caDestinationType ) ==
4 )
        {
                /* POI Mapping translation is required. */
                /* Check if there is actually any translation
possible */
                if                      (
sFeFindPOIMapping(pSub->ServerRequest.caDestinationType,
                        &caTBuff) != SUCCESS)
                {
                        vMQ_Log(NULL,   NULL,   0,"[FE%ld] Dst  No
Matching POI for <%s>\n",
                                l    A    d    d    r    e    s    s    ,
pSub->ServerRequest.caDestinationType);
                }
                else
                {
                        vMQ_Log(NULL, NULL, 21, "[FE%ld] Dst POI for
<%s> is <%s>\n",
                                l    A    d    d    r    e    s    s    ,
pSub->ServerRequest.caDestinationType, caTBuff);
                                s    t    r    c    p    y    (
pSub->ServerRequest.caDestinationType, caTBuff);
                }
        }
        else
        {
                vMQ_Log(NULL, NULL, 21, "[FE%ld] Destination type
is <%s> \n",
                        lAddress, pSub->ServerRequest.caOriginType);
        }

/* If the type of origin is not ADDR or similar,
        ** then change the comma to (or add) a colon.
        */
        if(strncmp(pSub->ServerRequest.caOriginType, "ADDR",
4) != 0
                || strchr(pSub->ServerRequest.caOrigin, ':') !=
NULL )
        {
                if (strncmp(pSub->ServerRequest.caOriginType,
                        "POSITION", 8) != 0 )
                {
                        /* We need to put it in the form of....
                        ** CITY:NAME
                        */
```

```c
                       if      (      ( cp       =
strchr(pSub->ServerRequest.caOrigin, ':')) != NULL )
                       {
                               *cp = '\0';
                               strcpy( caBuffer,
pSub->ServerRequest.caOrigin );
                               *cp = ':';
                       }
                       else
                               strcpy(caBuffer, "\0");

/* Is there a city given? */
                       i  f     (      ( cp       =
strchr(pSub->ServerRequest.caOrigin, ',')) != NULL)
                               strcat(caBuffer, cp+1);
                       strcat(caBuffer, ":");

if (cp != NULL)
                       {
                               /* There is a city component */
                               *cp = '\0';
                               strcat( caBuffer,
pSub->ServerRequest.caOrigin);
                               *cp = ',';    /* Restore the comma */
                       }
                       else
                               strcat( caBuffer,
pSub->ServerRequest.caOrigin);

strcpy(pSub->ServerRequest.caOrigin,
caBuffer);
               }
       }
       vMQ_Log(NULL, NULL, 30, "[FE%ld] Done with origin
ADDR\n", lAddress);

if     (strncmp(pSub->ServerRequest.caDestinationType,
"ADDR", 4) != 0
               || strchr(pSub->ServerRequest.caDestination, ':')
!= NULL )
       {
               if (strncmp(pSub->ServerRequest.caDestinationType, "POSITION", 8) != 0 )
               {
                       /* We need to put it in the form of....
                       ** CITY:NAME
                       */
                       i  f     (      (        cp       =
strchr(pSub->ServerRequest.caDestination, ':'))
                                       != NULL )
                       {
                               *cp = '\0';
                               strcpy( caBuffer,
pSub->ServerRequest.caDestination );
                               *cp = ':';
```

```c
            }
            else
                strcpy(caBuffer, "\0");

/* Is there a city given? */
            if ((cp
=strchr(pSub->ServerRequest.caDestination,',')) != NULL)
                    strcat(caBuffer, cp+1);
            strcat(caBuffer, ":");

if (cp != NULL)
            {
                /* There is a city component */
                *cp = '\0';
                strcat(caBuffer,
pSub->ServerRequest.caDestination);
                *cp = ',';    /* Restore the comma */
            }
            else
                strcat(caBuffer,
pSub->ServerRequest.caDestination);

strcpy(pSub->ServerRequest.caDestination,
caBuffer);
        }
    }
    vMQ_Log(NULL, NULL, 30, "[FE%ld] Done with Destination ADDR\n",
            lAddress);

pSub->bit_map &= ~( BIT_NEXT_MAN | BIT_PREV_MAN |
BIT_CURR_MAN |
            BIT_ACK | BIT_QUERY | BIT_SXOLOCUS | BIT_BRBF |
BIT_BTRF |
            BIT_SXDLOCUS | BIT_NORESPONSE | BIT_DOWNLOAD |
BIT_BINARY);

for (sagain = 0; sagain < 8; sagain++)
    {
        if (strncmp(
pSub->ServerRequest.aAlternatives[sagain].caAlternatives,
            "CONFIG=", 7) == 0)
        {
            /* New config file wanted */
            if (
*(pSub->ServerRequest.aAlternatives[sagain].caAlternatives+7)
                == '\0')
            {
                vMQ_Log(NULL, NULL, 0,"[FE%ld] Invalid Metro Region \n",
                        lAddress);

if (pSub->sResultCode<1)
pSub->sResultCode=FEERR_INME;
```

```
                                vSendErrorResponse(pSub, "Invalid Metro
Region ");
                                return;
                        }
                        else
                        {
                                strcpy(caBuffer,
pSub->ServerRequest.aAlternatives[sagain].caAlternatives+7);

if(strstr(caBuffer,".CFG") != NULL)
                                {
                                        caBuffer[strlen(caBuffer) - 4] =
'\0';
                                }
                        } errno = 0;
                        vMQ_Log(NULL, NULL, 10,
                                "[FE%ld]   config  <%s>:%s\n",lAddress,
pSub->caSCR, caBuffer);

if( strlen(pSub->caConfig) != 0)
                        {
                                if    (lMQU_ValidateName(pMQU_master,
caBuffer) == FAILURE)
                                {
                                        sprintf(cpbuff,
                                                "Metro    Region    %s    not
available at this time.",
                                                caBuffer);
                                        vMQ_Log(NULL, NULL, 0, "[FE%ld]
%s\n",lAddress, cpbuff);

if(pSub->sResultCode<1)
pSub->sResultCode=FEERR_SVGD;
                                        vSendErrorResponse(pSub, cpbuff);

return;
                                }
                        } strcpy(pSub->caConfig,caBuffer);

vHandleAuditLog(NULL, NULL,
                                MQ_MTS_AUDIT_SELMETRO_I , lFID, (void
*)pSub, NULL, 1);
                        pSub->lInternalQuery_count++;
                        pGSub->lInternalQuery_count++;
                        pSub->bit_map |= BIT_ACK;
                        continue;
                } if (strncmp(
```

```
            pSub->ServerRequest.aAlternatives[sagain].caAlternatives,
                    "BURST=", 6) == 0)
            {
                    i                                                         f
(pSub->ServerRequest.aAlternatives[sagain].caAlternatives[6]
                        == 'Y')
                        pSub->lStatus |= SS_BURST_MODE;
                    else
                        pSub->lStatus &= ~SS_BURST_MODE;

pSub->bit_map |= BIT_ACK;
                    continue;
            } if (strncmp(
pSub->ServerRequest.aAlternatives[sagain].caAlternatives,
                    "LANGUAGE=", 9) == 0)
            {
                    strcpy(pSub->caLanguage,
pSub->ServerRequest.aAlternatives[sagain].caAlternatives+9);
                    errno = 0;
                    vMQ_Log(NULL, NULL, 10, "[FE%ld] language
<%s>:%s\n",
                        lAddress,    pSub->caSCR,
pSub->caLanguage);

/* Check if the Language file exists now. */
                    if (sCheckLanguage(pSub->caLanguage) < 0)
                    {
                        vMQ_Log(NULL, NULL, 0,
                            "[FE%ld]    LANGUAGE    unknown
<%s>:%s\n",
                            lAddress,    pSub->caSCR,
pSub->caLanguage);
                        sprintf(cpbuff,    "Invalid    language
request.\n");

if(pSub->sResultCode<1)
pSub->sResultCode=FEERR_INNA;
                        vSendErrorResponse(pSub,    "Invalid
Language name");

return;
                    } vHandleAuditLog(NULL, NULL,
                        MQ_MTS_AUDIT_SELLANGUAGE, lFID, (void
*)pSub, NULL, 1);

pSub->bit_map |= BIT_LANGUAGE ;
                    continue;
            }
```

```c
                if (strncmp(
pSub->ServerRequest.aAlternatives[sagain].caAlternatives,
                "DOWNLOAD=", 9) == 0)
                {
                    vReset_status_flags(pSub);

if( pSub->sStateflag == 0 )
                    {
                        pSub->sStateflag = 1;
                    }
                    else
                    {
                        vDeleteTmpfile( pSub );
                    } sprintf(pSub->caDownload,    "%s/%s",
cpDownload_dir,
pSub->ServerRequest.aAlternatives[sagain].caAlternatives+9);

vMQ_Log(NULL,   NULL,   0,"[FE%ld]   Download
request for [%s]\n",lAddress,pSub->caDownload);

i                                          f
(sFeFileCheck(pSub->ServerRequest.aAlternatives[sagain].caAlte
rnatives+9)<0)
                    {
                        sprintf(cpbuff,"SEI/EnRoute    cannot
transfer %s", pSub->caDownload);
                        vMQ_Log(NULL, NULL, 0, "[FE%ld] %s\n",
lAddress, cpbuff);

if ( p S u b - > s R e s u l t C o d e < 1 )
pSub->sResultCode=FEERR_SEFO;
                        vSendErrorResponse(pSub, cpbuff);

pSub->bit_map |= BIT_NORESPONSE;
                    }
                    else
                    {
                        pSub->lStatus    =    (pSub->lStatus    &
~SS_SEND_QMASK)
                                        | SS_SEND_DWNL;

pSub->bit_map |= BIT_DOWNLOAD;

vHandleAuditLog(NULL, NULL,
                                    MQ_MTS_AUDIT_DOWNLOAD_I, lFID,
(void *)pSub, NULL, 1);
                    }
                    continue;
                } if (strncmp(
```

```
            pSub->ServerRequest.aAlternatives[sagain].caAlternatives,
                        "SESSION=", 8) == 0)
                {
                        strcpy(caBuffer,
pSub->ServerRequest.aAlternatives[sagain].caAlternatives+8);
                        sscanf(caBuffer,    "%2d%2d%2d%2d",
&lFormat_mode,
                                &lCompress_mode,    &lDisplay_panes,
&lMap_format);

/* We do not support Phrase compression --
VI */
                        if( lCompress_mode == FE_COMPRESS_LZ )
                              pSub->lStatus |= SS_LZ_COMPRESS;
                        else if( lCompress_mode == FE_COMPRESS_NONE
)
                              pSub->lStatus &= ~SS_LZ_COMPRESS;

pSub->bit_map |= BIT_ACK;
                        continue;
                }

/* Specifies the maximum packet size from the
client end. */
                /* The lesser of the 2 sizes( client, server) will
be used */
                if (
strncmp(pSub->ServerRequest.aAlternatives[sagain].caAlternatives,
                        "MAXPKT=", 7) == 0)
                {
                        strcpy(cpbuff,
pSub->ServerRequest.aAlternatives[sagain].caAlternatives+7);
                        sPktsize = atoi(cpbuff);

ipacketflag = 0;

if( sPktsize > sPacketLimit )
                        {
                              ipacketflag = 1;
                              pSub->sPacketLimit = sPacketLimit;
                        }
                        else
                        if( sPktsize < sMinPacketLimit)
                        {
                              ipacketflag = 1;
                              pSub->sPacketLimit = sMinPacketLimit;
                        }
                        else
                        {
                              pSub->sPacketLimit = sPktsize;
                        }
```

```
                        pSub->bit_map |= BIT_ACK;
                        continue;
                }
                /* Specifies the maximum burst count from the
client end. */
                /* The lesser of the 2 sizes( client, server) will
be used */
                if (
strncmp(pSub->ServerRequest.aAlternatives[sagain].caAlternatives,
                        "MAXBURST=", 9) == 0)
                {
                        strcpy(cpbuff,
pSub->ServerRequest.aAlternatives[sagain].caAlternatives+9);
                        sPktsize = atoi(cpbuff);

sBurstflag = 0;

if(( sPktsize > sConfirmMax ) || ( sPktsize
< 1))
                        {
                                sBurstflag = 1;
                                pSub->sBurstCount = sConfirmMax;
                        }
                        else
                        {
                                pSub->sBurstCount = sPktsize;
                        } pSub->bit_map |= BIT_ACK;
                        continue;
                }
                /* Termination request from client */
                if (
strncmp(pSub->ServerRequest.aAlternatives[sagain].caAlternatives,
                        "LOGOUT=", 7) == 0)
                {
                        if( strncmp(
pSub->ServerRequest.aAlternatives[sagain].caAlternatives+7,
                                "Y", 1) == 0 )
                        {
                                pSub->lMsgtype       =
SPIF_SUBSCRIBER_DISCONNECT;
                                sSendHeader(    8,    pSub->lSpifID,
pSub->lMsgtype );
                                vMQ_Log(NULL, NULL, 10,
                                        "[FE%ld] Delete subscriber request
from client\n",
                                        lAddress);
                                pSub->sResultCode = LOGOUT_BY_USER;
                                vHandleAuditLog(NULL, NULL,
```

```
                                MQ_MTS_AUDIT_CLLOGOUT, lFID, (void
*)pSub, NULL, 1);
                                vMQ_EventLog(NULL, NULL, MQ_EVB_LOGOUT,
                                    pSub->caSCR,   strlen(pSub->caSCR)
);

if( iDelSub( pSub->lSpifID) != SUCCESS)
                                {
                                    vMQ_Log(NULL, NULL, 0,
                                            "[FE%ld]  Unable  to  delete
subscriber %ld\n",
                                            lAddress, pSub->lSpifID );
                                }
                                pSub->bit_map |= BIT_NORESPONSE;
                                break;
                            }
                        } if(strncmp(pSub->ServerRequest.aAlternatives[sagain].caAlterna
tives,
                    "QUERY=", 6) == 0)
                {
                    vReset_status_flags(pSub);

if( pSub->sStateflag == 0 )
                    {
                        pSub->sStateflag = 1;
                    }
                    else
                    {
                        vDeleteTmpfile( pSub );
                    } pSub->bit_map |= BIT_QUERY;
                    /* Determine the type of query.
                    ** Currently,   only  configs,   pois    and
languages allowed.
                    */
                    c                                          p    =
pSub->ServerRequest.aAlternatives[sagain].caAlternatives+6;

/* What type of query ? */
                    if (strncmp(cp, "CONFIG", 6) == 0)
                    {
                        /* A type we like */
                        if ((fp = fopen(pSub->caTmpfile, "w"))
== (FILE*)NULL)
                        { if(pSub->sResultCode<1)
pSub->sResultCode=FEERR_SEFO;
                                vSendErrorResponse(pSub,
"SEI/EnRoute file open error");
```

APPENDIX A — PAGE 87 OF 279

```
                                vMQ_Log(NULL, NULL, 0,
                                        "[FE%ld] CONFIG Unable to open
Tempfile\n",
                                        lAddress);
                                pSub->bit_map |= BIT_NORESPONSE;
                        }
                        else
                        {
                                (void)sGenerateConfigQuery(fp);
                                pSub->lStatus = (pSub->lStatus &
~SS_SEND_QMASK)
                                        | SS_SEND_QCONF;
                                fclose(fp);

vHandleAuditLog(NULL, NULL,
MQ_MTS_AUDIT_QUMETRO_I,lFID,(void *)pSub,NULL, 1 );
                        }
                }
                else if (strncmp(cp, "POIS", 4) == 0)
                {
                        vMQ_Log( NULL, NULL, 20,
                                " [ F E % l d ]      c a l l
sFeRequestPOIQuery_all %ld\n",
                                lAddress, pSub->lSpifID);
                        if( strlen( pSub->caConfig ) != 0 )
                        {
                                if( sFeRequestPOIQuery_all( pSub
) == FAILURE )
                                {
                                        vMQ_Log( NULL, NULL, 20,
                                                " [ F E % l d ]
sFeRequestPOIQuery_all failed\n",
                                                lAddress);
                                }
                                else
                                {
                                        pSub->lResponsePending = 1;
                                }
                        }
                        else
                        {
                                /* empty metroregion */
                                vMQ_Log( NULL, NULL, 0,
                                "[FE%ld] INVALID Metroregion by
%ld\n",
                                        lAddress, pSub->lSpifID);

strcpy( caBuffer, "Insufficient
Data(Metroregion)");

if(pSub->sResultCode<1)
pSub->sResultCode=FEERR_SVGD;
                                vSendErrorResponse(pSub, caBuffer);

}
```

```c
                                        return;
                    }
                    else if (strncmp(cp, "LANG", 4) == 0)
                    {
                            /* Template languages */
                            /* A type we like */
                            if ((fp = fopen(pSub->caTmpfile, "w"))
== (FILE*)NULL)
                            {
                                    if(pSub->sResultCode<1)
pSub->sResultCode=FEERR_SEFO;
                                    vSendErrorResponse(pSub,
"SEI/EnRoute file open error");

vMQ_Log(NULL, NULL, 0,
                                           "[FE%ld] LANG Unable to open
Tempfile\n", lAddress);
                                    pSub->bit_map |= BIT_NORESPONSE;
                            }
                            else
                            {
                                    (void)sGenerateLanguageQuery(fp);
                                    pSub->lStatus = (pSub->lStatus &
~SS_SEND_QMASK)
                                            | SS_SEND_QLANG;
                                    fclose(fp);

vHandleAuditLog(NULL, NULL,
                                         MQ_MTS_AUDIT_QULANGUAGE_I, lFID,
(void *)pSub, NULL, 1);
                            }
                            break;
                    }
                    else if (strncmp(cp, "FILES",5)==0)
                    {
                            sprintf(caTmpFile,   "%s/%s",
cpDownload_dir, FE_DOWNLOAD_CAT);

if ((fp=fopen(caTmpFile,"r"))==NULL)
                            {
                                    if(pSub->sResultCode<1)
pSub->sResultCode=FEERR_SEFO;

vSendErrorResponse(pSub,"SEI/EnRoute file open error");
                                    pSub->bit_map |= BIT_NORESPONSE;
                            }
                            else
                            {
                                    /* First Copy the catalog file in
order to avoid transmission
                                            during updates */
```

```
sprintf(pSub->caTmpfile,"%s/download.bak",cpDownload_dir);

if((to=fopen(pSub->caTmpfile,"w+"))!=NULL)
                    {
while(fgets(caReadBuf,MAX_FILENAME_SIZE,fp)!=NULL)
                                        fputs(caReadBuf,to);

fflush(to);
                                        pSub->lStatus = (pSub->lStatus
& ~ SS_SEND_QMASK)
                                            | SS_SEND_QFILES;

fclose(to);
                    }
                    else
                    {
                            if(pSub->sResultCode<1)
pSub->sResultCode=FEERR_SEFO;

vSendErrorResponse(pSub,"SEI/EnRoute file create error");
                                        pSub->bit_map      |=
BIT_NORESPONSE;
                    } fclose(fp);
vHandleAuditLog(NULL,NULL,AU_QUERY_FILE,lFID,(void *)pSub,1);
                        }
                                continue;

}
                    else
                    {
                            if(pSub->sResultCode<1)
pSub->sResultCode=FEERR_QUSU;
                                vSendErrorResponse(pSub, "Query type not
supported\r");

pSub->bit_map |= BIT_NORESPONSE;
                    }
                            break;
                }

/* If a heartbeat response is received from the
client */
                /* update the time and reset status flags.      */
                if ( strncmp(
pSub->ServerRequest.aAlternatives[sagain].caAlternatives,
                        "HEARTBEAT=", 10) == 0)
                {
                        vReset_status_flags(pSub);
```

```c
                /* HEARTBEAT response from client */
                pSub->lStatus &= ~SS_SEND_HBEAT;
                pSub->lStatus &= ~SS_HBEAT_SENT;
                pSub->bit_map |= BIT_NORESPONSE;
                pSub->lLastCommtime = time(0L);
                continue;
        }

/* In case a bug is reported then log it */
if(strncmp(pSub->ServerRequest.aAlternatives[sagain].caAlternatives,
                "BGRPT=", 6) == 0)
        {
                vReset_status_flags(pSub);

/* Bug report data - cannot mix with other requests */
                strcpy( caBuffer,
pSub->ServerRequest.aAlternatives[sagain].caAlternatives +6);
                vMQ_Log(NULL, NULL, 0, "[FE%ld] BUGREPORT %s \n",
                        lAddress, caBuffer );
                vHandleAuditLog(NULL, NULL,
                        MQ_MTS_AUDIT_BUGRPT, lFID, (void *)pSub, NULL, 1);
                pSub->bit_map |= BIT_ACK;
                continue;
        }

/* In case a bearing data */
if(strncmp(pSub->ServerRequest.aAlternatives[sagain].caAlternatives,
                "BEARING=0;", 10) == 0)
        {
                pSub->ServerRequest.sOriginBearing = atoi(
pSub->ServerRequest.aAlternatives[sagain].caAlternatives +10);
                vMQ_Log(NULL, NULL, 29, "[FE%ld] Origin Bearing %d \n",
                        l    A    d    d    r    e    s    s    ,
pSub->ServerRequest.sOriginBearing );

if( ( pSub->ServerRequest.sOriginBearing <
0 ) ||
                    ( pSub->ServerRequest.sOriginBearing > 255
) )
                {
                        pSub->ServerRequest.sOriginBearing = -1;
                }
                pSub->bit_map |= BIT_ACK;
                continue;
        }
```

```c
if(strncmp(pSub->ServerRequest.aAlternatives[sagain].caAlterna
tives,
                "BEARING=D;", 10) == 0)
        {
                pSub->ServerRequest.sDestinationBearing  =
atoi(
pSub->ServerRequest.aAlternatives[sagain].caAlternatives +10);
                vMQ_Log(NULL,   NULL,   29,   "[FE%ld]   Dest.
Bearing %d \n",
                        l   A   d   d   r   e   s   s   ,
pSub->ServerRequest.sDestinationBearing );

if( ( pSub->ServerRequest.sDestinationBearing
< 0 ) ||
                    ( pSub->ServerRequest.sDestinationBearing >
255 ) )
                {
                        pSub->ServerRequest.sDestinationBearing
= -1;
                }
                pSub->bit_map |= BIT_ACK;
                continue;
        }

/* If the request is for a maneuver the next,
previous or current */
        /* maneuvers are supported. */ if(strncmp(pSub->ServerRequest.aAlternatives[sagain].caAlterna
tives,
                "MANEUVER=", 9) == 0)
        {
                if(pSub->sStateflag == 0)
                { if(pSub->sResultCode<1)
pSub->sResultCode=FEERR_INRE;
                                vSendErrorResponse(pSub,
"Invalid Maneuver Request");

return;
                }

/* Requesting maneuver information -
                ** not a route request.
                */
                if (strncmp(
pSub->ServerRequest.aAlternatives[sagain].caAlternatives+9,
                        "NEXT", 4) == 0)
                {
                        /* Requesting next one */
                        pSub->bit_map |= BIT_NEXT_MAN;
                        sStep = 1;
```

```
                }
                else if (strncmp(
pSub->ServerRequest.aAlternatives[sagain].caAlternatives+9,
                "CURRENT", 7) == 0)
                {
                        /* Retry the current */
                        pSub->bit_map |= BIT_CURR_MAN;
                        sStep = -1;
                        pSub->lMsgid--;
                }
                else if (strncmp(
pSub->ServerRequest.aAlternatives[sagain].caAlternatives+9,
                "PREVIOUS", 8) == 0)
                {
                        if(
pSub->ServerRequest.aAlternatives[sagain].caAlternatives[17]
                        == '=' )
                        {
                                /* sStep represents previous msgid
*/
                                sStep = atoi(
pSub->ServerRequest.aAlternatives[sagain].caAlternatives+18);
                        }
                        else
                        {
                                /* If previous msgid not given,
assume the
                                previous msgid */
                                s   S    t    e   p           =
pSub->lMsgidsent[pSub->lMsgid-1];
                        }
                        pSub->bit_map |= BIT_PREV_MAN;
                }
                else
                {
                        if(pSub->sResultCode<1)
pSub->sResultCode=FEERR_INRE;
                        vSendErrorResponse(pSub, "Invalid
Maneuver Request Directive");

pSub->bit_map |= BIT_NORESPONSE;
                }
            }

/* 4/17/95 ND Check for STRIPMAP, FORMAT and
ROUTEBAND options */ if(strncmp(pSub->ServerRequest.aAlternatives[sagain].caAlterna
tives,"STRIPMAP=",9)==0)
            {
```

```
if(strncmp(pSub->ServerRequest.aAlternatives[sagain].caAlterna
tives+9,"Y",1)==0)
                {
                        pSub->lStatus  |= SS_STRIPMAP;
                        continue;
                }
        } if(strncmp(pSub->ServerRequest.aAlternatives[sagain].caAlterna
tives,"FORMAT=",7)==0)
                { if(strncmp(pSub->ServerRequest.aAlternatives[sagain].caAlterna
tives+7,"BTRF,DL",7)==0)
                        {
                                pSub->lStatus  |= SS_BTRF;
                                pSub->lStatus  |= SS_ROUTE_DWNL;
                                pSub->bit_map  |= BIT_BINARY;
                                pSub->bit_map  |= BIT_BTRF;
                                pSub->lStatus  &= ~SS_SEND_DWNL;
                                pSub->bit_map  &= ~BIT_DOWNLOAD;

continue;
                        }
                        e      l       s      e      i       f
(strncmp(pSub->ServerRequest.aAlternatives[sagain].caAlternati
ves+7,"BRF,DL",6)==0)
                        {
                                pSub->lStatus  |= SS_ROUTE_DWNL;
                                pSub->lStatus  &= ~SS_SEND_DWNL;
                                pSub->bit_map  &= ~BIT_DOWNLOAD;
                                pSub->bit_map  |= BIT_BINARY;

continue;
                        }
                        e      l       s      e      i       f
(strncmp(pSub->ServerRequest.aAlternatives[sagain].caAlternati
ves+7,"DL",2)==0)
                        {
                                pSub->bit_map  |= BIT_BINARY;
                                pSub->lStatus  |= SS_SEND_DWNL;
                                pSub->lStatus  |= SS_SEND_BINARY;
                                pSub->lStatus  |= SS_ROUTE_DWNL;

continue;
                        }
                } i                                                f
(strncmp(pSub->ServerRequest.aAlternatives[sagain].caAlternati
ves,"ROUTEBAND=",10)==0)
                {
```

```
                    /* STRIPMAP and BTRF in previous request
required for ROUTEMAP */
                    if((pSub->lStatus    &    SS_STRIPMAP)    &&
(pSub->lStatus & SS_BTRF))
                        {
                            pSub->lStatus  |= SS_BRBF;
                            pSub->bit_map  |= BIT_BRBF;
                            continue;
                        }
                }

}
        vMQ_Log(NULL, NULL, 25, "[FE%ld] Done with Alternatives
\n", lAddress);

pSub->bit_map &= ~(BIT_ARMS | BIT_MAP);

for (sagain = 0; sagain < 8; sagain++)
        { if(strncmp(pSub->ServerRequest.aAlternatives[sagain].caAlterna
tives,
                    "ARMS=Y", 6) == 0)
                    pSub->bit_map |= BIT_ARMS;

if(strncmp(pSub->ServerRequest.aAlternatives[sagain].caAlterna
tives,
                    "MAP=Y", 5) == 0)
                    pSub->bit_map |= BIT_MAP;

/* in case of origin locus the information is
written into */
            /* the structure elements */ if(strncmp(pSub->ServerRequest.aAlternatives[sagain].caAlterna
tives,
                    "SXLOCUS=O", 9) == 0)
                {
                    pSub->bit_map |= BIT_SXOLOCUS;
                    strcpy( casxlocuso, pSub->ServerRequest.aAlternatives[sagain].caAlternatives+10);
                    vMQ_Log(NULL,  NULL,  29,  "[FE%ld]  olocus
%s\n",
                            lAddress, casxlocuso);

sscanf(casxlocuso,"%hd-%hd-%hd-%hd;%c;%c",
                            &pSub->OriginLocus.sMap,
                            &pSub->OriginLocus.sLayer,
                            &pSub->OriginLocus.sParcel,
                            &pSub->OriginLocus.sIndex,
                            &pSub->OriginLocus.spot,
                            &pSub->OriginLocus.side);
```

```c
                    vMQ_Log(NULL,    NULL,    29,    "[FE%ld]
m%d,l%d,p%d,i%d,s%c,sd%c\n",
                            lAddress, pSub->OriginLocus.sMap,
                            pSub->OriginLocus.sLayer,
                            pSub->OriginLocus.sParcel,
                            pSub->OriginLocus.sIndex,
                            pSub->OriginLocus.spot,
                            pSub->OriginLocus.side);
                }

/* in case of destination locus the information
is written into */
                /* the structure elements */ if(strncmp(pSub->ServerRequest.aAlternatives[sagain].caAlterna
tives,
                    "SXLOCUS=D", 9) == 0)
                {
                    pSub->bit_map |= BIT_SXDLOCUS;
                    strcpy( casxlocusd,
pSub->ServerRequest.aAlternatives[sagain].caAlternatives+10);
                    vMQ_Log(NULL,    NULL,    29,    "[FE%ld]   dlocus
%s\n",
                            lAddress, casxlocusd);

sscanf(casxlocusd,"%hd-%hd-%hd-%hd;%c;%c",
                            &pSub->DestinationLocus.sMap,
                            &pSub->DestinationLocus.sLayer,
                            &pSub->DestinationLocus.sParcel,
                            &pSub->DestinationLocus.sIndex,
                            &pSub->DestinationLocus.spot,
                            &pSub->DestinationLocus.side);

vMQ_Log(NULL,    NULL,    29,    "[FE%ld]
m%d,l%d,p%d,i%d,s%c,sd%c\n",
                            lAddress, pSub->DestinationLocus.sMap,
                            pSub->DestinationLocus.sLayer,
                            pSub->DestinationLocus.sParcel,
                            pSub->DestinationLocus.sIndex,
                            pSub->DestinationLocus.spot,
                            pSub->DestinationLocus.side);
                }
            } vMQ_Log(NULL, NULL, 25, "[FE%ld] bit_map is %.8x\n",
                    lAddress, pSub->bit_map );

if (pSub->bit_map & BIT_NORESPONSE)
            {
                return;
            } vMQ_Log(NULL, NULL, 25, "[FE%ld] BIT_NORESPONSE not
set!\n", lAddress);
```

```
        if (pSub->bit_map & BIT_DOWNLOAD)
        {
            sGenerateDownload(pSub);
            return;
        } if (pSub->bit_map & BIT_QUERY)
        {
            /* Start the query response back */
            vMQ_Log(NULL, NULL, 10, "[FE%ld] sending query file!\n", lAddress);
            vSendQueryFile(pSub);
            return;
        } vMQ_Log(NULL, NULL, 25, "[FE%ld] BIT_QUERY not set!\n", lAddress);

if (pSub->bit_map & (BIT_NEXT_MAN))
        {
            if(pSub->lStatus & SS_SEND_DWNL)
                sprintf(caTmpFile, "%s",pSub->caDownload);
            else
                sprintf(caTmpFile,"%s",pSub->caTmpfile);

if(stat(caTmpFile, pStat) < 0 )
            {
                if( errno == ENOENT )
                {
                                    if(pSub->sResultCode<1)
pSub->sResultCode=FEERR_INRE;
                                    vSendErrorResponse(pSub,
"Invalid Next Maneuver Request");

return;
                }
            } if(pSub->lManeuverOffsets[pSub->lMsgid]    >
pSub->lQueryFilesize )
                    {
                                    if(pSub->sResultCode<1)
pSub->sResultCode=FEERR_ALME;
                                    vSendErrorResponse(pSub, "Already
at the last message");

return;
                    }
                if (pSub->lStatus & SS_BURST_MODE)
                {
                        short sBurstCount;
```

```
                            sBurstCount = 0;
                       while( pSub->lManeuverOffsets[pSub->lMsgid]
<=
                       pSub->lQueryFilesize && sBurstCount <
pSub->sBurstCount )
                       {
                              if((pSub->lStatus & SS_ROUTE_DWNL) ||
(pSub->lStatus & SS_SEND_DWNL))
vSendDownload(pSub,1,++sBurstCount);
                              else
                                     vSendManeuver(pSub,      1,
++sBurstCount);
                              if (sInterPacketGap > 0)
                                     sleep(sInterPacketGap);
                       }
                }
                else
                       if((pSub->lStatus   &   SS_ROUTE_DWNL)     ||
(pSub->lStatus & SS_SEND_DWNL))
                              vSendDownload(pSub,sStep,0);
                       else
                              vSendManeuver(pSub, sStep, 0);
                return;
         }
         else if (pSub->bit_map & (BIT_CURR_MAN))
         {
                if(pSub->lStatus & SS_SEND_DWNL)
                       sprintf(caTmpFile, "%s",pSub->caDownload);
                else
                       sprintf(caTmpFile,"%s",pSub->caTmpfile);

if(stat(caTmpFile, pStat) < 0 )
                {
                       if( errno == ENOENT )
                       {
                                     if(pSub->sResultCode<1)
pSub->sResultCode=FEERR_INRE;
                                     vSendErrorResponse(pSub,
"Invalid Current Maneuver Request");

return;
                       }
                }
                       if(pSub->lManeuverOffsets[pSub->lMsgid]    >
pSub->lQueryFilesize )
                       {
                                     if(pSub->sResultCode<1)
pSub->sResultCode=FEERR_ALME;
                                     vSendErrorResponse(pSub, "Already
at the last message");
```

```c
                                        return;
                }
                if((pSub->lStatus   &   SS_ROUTE_DWNL)   ||
(pSub->lStatus & SS_SEND_DWNL))
                        vSendDownload(pSub,sStep,0);
                else
                        vSendManeuver(pSub, sStep, 0);

return;
        }
        else if( pSub->bit_map & (BIT_PREV_MAN))
        {
                if(pSub->lStatus & SS_SEND_DWNL)
                        sprintf(caTmpFile, "%s",pSub->caDownload);
                else
                        sprintf(caTmpFile,"%s",pSub->caTmpfile);

if(stat(caTmpFile, pStat) < 0 )
                {
                        if( errno == ENOENT )
                        {
                                        if(pSub->sResultCode<1)
pSub->sResultCode=FEERR_INRE;
                                        vSendErrorResponse(pSub,
"Invalid Previous Maneuver Request");

return;
                        }
                }

/* sStep represents msgid to start from */
                /* if sStep == -1, start from beginning of file
*/
                if( sStep == -1 )
                {
                        if( pSub->bit_map & BIT_QUERY )
                                vSendQueryFile(pSub);
                        else
                        {
                                if((pSub->lStatus & SS_ROUTE_DWNL)  ||
(pSub->lStatus & SS_SEND_DWNL))
                                {
                                        vMQ_Log(NULL, NULL, 8, "About to
download route file\n");
                                        vMQ_Log(NULL, NULL, 12, "LSTATUS
= %08x\n",pSub->lStatus);
                                        sGenerateDownload(pSub);
                                }
                                else
                                {
                                        if(stat(pSub->caTmpfile, pStat) <
0 )
                                        {
```

```
                                        if( errno == ENOENT )
                                        { if(pSub->sResultCode<1) pSub->sResultCode=FEERR_INRE;

vSendErrorResponse(pSub, "Invalid Previous Maneuver Request");

return;
                                        }
                                }
                                        vSendRouteFile(pSub);
                                }
                        }
                }
                else
                {
                        /* Get corresponding msgid */
                        lMatch = 0;
                        for( i=0; i<pSub->lNum_msgs; i++)
                        {
                                if( pSub->lMsgidsent[i] == sStep )
                                {
                                        lMatch = 1;
                                        break;
                                }
                        }
                        if( lMatch == 1 )
                        {
                                pSub->lMsgid = i;
                                if (pSub->lStatus & SS_BURST_MODE)
                                {
                                        short sBurstCount;
                                        sBurstCount = 0;

while (
        pSub->lManeuverOffsets[pSub->lMsgid] <=
                                                pSub->lQueryFilesize &&
                                                sBurstCount    <
        pSub->sBurstCount )
                                        {
                                                if((pSub->lStatus    &
        SS_ROUTE_DWNL) || (pSub->lStatus & SS_SEND_DWNL))

vSendDownload(pSub,1,++sBurstCount);
                                                else vSendManeuver(pSub,1,++sBurstCount);

if (sInterPacketGap > 0)
                                                        sleep(sInterPacketGap);
                                        }
                                }
                                else
                                {
```

```
                              if((pSub->lStatus & SS_ROUTE_DWNL)
|| (pSub->lStatus & SS_SEND_DWNL))
                                        vSendDownload(pSub,
pSub->lMsgid,0);
                              else
                                        vSendManeuver(pSub,
pSub->lMsgid, 0);
                        }
                }
                else
                {
                        /* Illegal message id with PREVIOUS
message */
                        if(pSub->sResultCode<1)
pSub->sResultCode=FEERR_NOMS;
                        vSendErrorResponse(pSub, "Non existent
msgid\r");
                }
            }
            return;    /* Handled MANEUVER request */
        } if (pSub->bit_map & BIT_BRBF)
        {
            if( pSub->sStateflag == 0 )
            {
                pSub->sStateflag = 1;
            }
            else
            {
                vDeleteTmpfile( pSub );
            }

/* Send route request */
            vMQ_Log(   NULL,   NULL,   10,"[FE%ld]    call
sFeRequestRoute_all %ld\n",
                    lAddress, pSub->lSpifID);
            if( sFeRequestRoute_all( (SUBSCRIBER *)pSub ) ==
FAILURE)
            {
                vMQ_Log( NULL, NULL, 20,
                        "[FE%ld] sFeRequestRoute_all failed\n",
lAddress);
            }
            else
                    pSub->lResponsePending = 1;

return;
        }
        else

APPENDIX A — PAGE 101 OF 279
```

```
        {
            vReset_status_flags(pSub);
        }

/* Check if a map of exploration is wanted */
        pSub->lStatus &= ~SS_SEND_QMASK;

if( ( (strlen( pSub->ServerRequest.caOriginType ) ==
0 )     ||
            (strlen( pSub->ServerRequest.caDestinationType )
== 0 ) ||
            (strlen( pSub->caConfig ) == 0 ) ) ||
            ((strlen( pSub->ServerRequest.caOrigin ) == 0 )
&&
                ((pSub->ServerRequest.lLatitude      ==
DEFAULT_LAT_LONG ) &&
                (pSub->ServerRequest.lLongitude      ==
DEFAULT_LAT_LONG ))))
        {
            if (pSub->bit_map & BIT_ACK )
            {
                pSub->lMsgtype = SPIF_PASS_THROUGH;
                vSendOkResponse(pSub);
                return;
            } vMQ_Log(NULL, NULL, 25, "[FE%ld] BIT_ACK not
set!\n", lAddress);

/* empty origintype/ destinationtype/ metroregion
*/
            vMQ_Log( NULL, NULL, 0,
            " [ F E % l d ]      I N V A L I D
Origin/DestinationType/Metroregion by %ld\n",
            lAddress, pSub->lSpifID);

strcpy( caBuffer,
            " I n s u f f i c i e n t
Data(Origin/OriginType/DestinationType/Metroregion)");

if ( p S u b - > s R e s u l t C o d e < 1 )
pSub->sResultCode=FEERR_SVGD;
            vSendErrorResponse(pSub, caBuffer);

}
        else
        {
            if( pSub->sStateflag == 0 )
            {
                pSub->sStateflag = 1;
            }
            else
            {
                vDeleteTmpfile( pSub );
```

```
                }
                if(strlen( pSub->ServerRequest.caOrigin ) == 0 )
                {
                    if    ((pSub->ServerRequest.lLatitude      ==
DEFAULT_LAT_LONG ) ||
                        (pSub->ServerRequest.lLongitude      ==
DEFAULT_LAT_LONG ))
                    {
                        if(pSub->sResultCode<1)
pSub->sResultCode=FEERR_INLA;
                        vSendErrorResponse(pSub,    "Invalid
Latitude/Longitude");

return;
                    }
                    strcpy(   pSub->ServerRequest.caOriginType,
"POSITION" );
                }
                /* Send route request */
                vMQ_Log(   NULL,   NULL,    10,"[FE%ld]    call
sFeRequestRoute_all %ld\n",
                    lAddress, pSub->lSpifID);
                if( sFeRequestRoute_all( (SUBSCRIBER *)pSub ) ==
FAILURE)
                {
                    vMQ_Log( NULL, NULL, 20,
                        "[FE%ld] sFeRequestRoute_all failed\n",
lAddress);
                }
                else
                    pSub->lResponsePending = 1;
            }
        }   /* end if(parse OK) */
        return;
}

/*::::::::::::::::::::::::::::::::::::::::::::::::::::::::::::::::
:::::::::::::::
:: Function:    vReset_status_flags
::
:: Purpose :
::      Reset Status flags
::
:: Returns:    None.
::
:: Input:      Pointer to Subscriber Structure
::
:: Output:     None.
::
::
:: Revision:
:: WHO         --WHEN--   WHAT
```

APPENDIX A — PAGE 103 OF 279

```
::  Norik    04/26/95   From Nippon Denso Code
::::::::::::::::::::::::::::::::::::::::::::::::::::::::::::::::
:::::::::::::*/ ifdef ANSI
void vReset_status_flags(
SUBSCRIBER *pSub)
#else
void vReset_status_flags(pSub)
SUBSCRIBER *pSub;
#endif
{
     if(!(pSub->bit_map  &  BIT_BTRF)   &&  !(pSub->bit_map  &
BIT_BRBF))
        {
             pSub->lStatus &= ~SS_BTRF;
             pSub->lStatus &= ~SS_BRBF;
             pSub->lStatus &= ~SS_STRIPMAP;
        } if(!(pSub->bit_map  &  BIT_BINARY)  &&  !(pSub->bit_map  &
BIT_BRBF))
        {
             pSub->lStatus &= ~SS_ROUTE_DWNL;
             pSub->lStatus &= ~SS_SEND_BINARY;
        }

}

/*::::::::::::::::::::::::::::::::::::::::::::::::::::::::::::::
::::::::::::::
:: Function:    sFeFileCheck
::
:: Purpose :
::        This routine validates a file before a download can
::        take place.
::
:: Returns:    Negative value if file cannot be downloaded.
::
:: Input:      Pointer File Name
::
:: Output:     None.
::
::
:: Revision:
:: WHO          --WHEN--   WHAT
:: Norik    04/20/95  Original
::::::::::::::::::::::::::::::::::::::::::::::::::::::::::::::::
:::::::::::::*/ ifdef ANSI
short sFeFileCheck(char *cpFile)
#else
short sFeFileCheck(cpFile)
char *cpFile;
```

APPENDIX A — PAGE 104 OF 279

```c
#endif
{
    char        caDwnFiles[MAX_FILENAME_SIZE];
    char        caBuffer[MAX_FILENAME_SIZE];
    struct stat stbuf;
    FILE        *fp;

/* Does file exist? */ sprintf(caDwnFiles, "%s/%s", cpDownload_dir, cpFile);

if (stat(caDwnFiles, &stbuf)<0)
    {
        vMQ_Log( NULL, NULL, 20, "[FE%ld] sFeFileCheck stat failed for %s\n", lAddress, caDwnFiles);
        return(-1);
    }

/* if file is a symbolic link, don't transfer it */ if ((stbuf.st_mode & S_IFMT) == S_IFLNK)
    {
        vMQ_Log( NULL, NULL, 20, "[FE%ld] sFeFileCheck %s is a linked file\n", lAddress, caDwnFiles);
        return(-1);
    } sprintf(caDwnFiles,   "%s/%s",   cpDownload_dir, FE_DOWNLOAD_CAT);

/* Can we open file list? */ if ((fp=fopen(caDwnFiles,"r"))<0)
    {
        vMQ_Log( NULL, NULL, 20, "[FE%ld] sFeFileCheck open fialed for %s\n", lAddress, caDwnFiles);
        return(-1);
    }

/* Is requested file in our list? */ while (fgets(caBuffer, MAX_FILENAME_SIZE, fp) != NULL)
    {
        if(strstr(caBuffer,cpFile) != NULL)
        {
            fclose(fp);
            return(1);
        }
    } fclose(fp);
    return(-1);
}
```

```
static          char                *_sccs_    =    {"   $Source:
/ids/cvs/host/fe_spif/src/fe_common.c,v $ Ver: $Revision: 1.4 $
Date: $Date: 1995/04/26 17:12:50 $"};
/* Copyright (C) 1994,1995 SEI Information Technology, Inc. */
/*::::::::::::::::::::::::::::::::::::::::::::::::::::::::::::::
:::::::::::::::
:: Filename:   fe_common.c
::
:: Purpose:    This is the front end driver for the message queue
front
::             end program.
::
::             Usage:
::             fe_spif [-f FrontID] [-q QID]
::
::             FrontID: Front End ID
::                     The default for tcp is MQ_MTLOW_FE_NET
(2000)
::
::             QID: Queue ID
::                     The     default    QID    is
MQ_MT_DEFAULT_QUEUE_ID (1)
::
::             The following options should be given on
RESET from the Monitor.
::
::             config: The config file.
::
::              device: communication device/port number.
::
::             debug :  debuglevel( 0 to 99) default is '0'.
::
:: Revision:
:: WHO         --WHEN--  WHAT
:: Raju        08/08/94  Original
::::::::::::::::::::::::::::::::::::::::::::::::::::::::::::::::
:::::::::::::*/ include <stdio.h>
include <stdlib.h>
#include <string.h>
#include <time.h>
#include <sys/signal.h>
#include <sys/types.h>
#include <sys/time.h>
include <sys/ipc.h>
#include <errno.h>
include <netinet/in.h>
include <sys/msg.h> include "gdefines.h"
include "gerror.h"
#include "mq_pub.h"
#include "utdispm.h"
#include "queue.h"
#include "spif.h"
```

APPENDIX A — PAGE 106 OF 279

```c
#include "fe_common.h"

#define INIT_RESET_WAIT  300   /* Initial reset wait time */
define TEMP_BUFF_SIZE   128 short    sMsglen      = 0;    /* Actual message length */
int      iDebug       = 0;  /* Default Debug level. */
int      iDataPort    = -1;   /* Initial data port number */
int      iListenPort  = -1;   /* Initial Listen port number */
short    sMaxPackets  = 2;  /* Maximum maneuvers per packet */
short    sPacketFlag  = 1;    /* By default, each packet gets a header */
int      ipacketflag  = 0;    /* Flag to indicate if packet size is changed */
short    sBurstflag   = 0;  /* Flag to indicate if burst size is changed */
short    sConfirmMax  = 5;    /* Maximum packets before confirm in burst */
short    sPacketLimit = 220; /* Maximum packet size (Default ARDIS size) */
short    sMinPacketLimit = MINPACKETSIZE ; /* Minimum packet size (Phase1) */
short    sMultipleFlag = 0;       /* Flag to indicate more read needed */
short    sInterPacketGap = 0;   /* Indicates if interpacket gap is needed */
short    sDefaultBaud = 4800;  /* Default baud rate */
short    sTransmitLimit = 220; /* Maximum transmission limit */
int   socket_port_num = {0};   /* Socket port number accept from config file */
long      lfe_tcp = MQ_MTLOW_FE_NET;        /* Default Front End TCP ID */
long      lQID = MQ_DEFAULT_QUEUE_ID;       /* Default Queue ID */
long      lDBETimeout = DBETIMEOUT;         /* Default value if server guide */
                                            /*  response times out */
unsigned long  ulSessionID = 0;       /* stores the session id */ short    sAckPending = 0;  /*  Flag   to    indicate   if Acknowledgements are */
                                /* pending */
long     lHeartbeat  = 300;   /* Heartbeat time after which a heart beat is */
                                            /* sent to the client to check if awake */
long    lHeartbeat_wait = 30;    /* heartbeat waits for this time after */
                                            /* heartbeat is sent. */
short     sTerm_After_Service = 0; /* Flag to indicate if service should be */
                                            /* terminated after service */
```

```
short    sGateDisconnectFlag = 0; /* Flag to indicate if system
will accept */
                                   /* any message  from
client */

Q_HEAD    sHead;       /* Queue head for the subscriber queue */
Q_HEAD    sConfig;     /* Queue head for the valid DBEs list */
Q_HEAD   *pQConfig;    /* Pointer to the first element in the valid
DBEs list */
Q_HEAD   *pQhead = &sHead;  /* Pointer to first element in
subscriber list */ long    lFID;    /* Front End ID */
long    lSize;   /* Global size variable */
int     argcnt;  /* Arguments count */
long    lg_addr; /* Global address variable */
int     bit_map; /* Global variable to indicate the status */
                 /* bits are used to indicate ack and
response required */
long       lFrontID; /* Original Front end ID specified at command
line */
long       lAddress;  /* Global address variable */
int     last_baud;
time_t  start_time;
long    lMap_format;
long    lFormat_mode;
void   *pMQU_master;
void    *pvMQ_master;
long    lLastCommtime;         /*  Store  the  last  Acknowledge
received time */
int     iQueue_master;
long    lCompress_mode;
long    lDisplay_panes;
struct  sockaddr_in addr;
char    caBuff[MAX_MSG_SIZE];
char    caExtBuff[MAX_MSG_SIZE];
char  caID[FE_SUBSCRIBER_LEN+1];
char  caOrigin[MAX_ORIGIN_SIZE];
char  caLimitValue[MAX_LIMIT_SIZE];
char  caOriginType[MAX_ORIGIN_TYPE_SIZE];
char  caDestination[MAX_DESTINATION_SIZE];
char  caCompression_marker[COMP_MARKER_SIZE];
char  caDestinationType[MAX_DESTINATION_TYPE_SIZE];
char  caAlternative[MAX_ALTERNATIVES][MAX_ALTERNATIVE_SIZE];

char    *cpQID;
char    *cpFrontID;
char *cpConfigPath;
char     *caCommDevice;
char    *caDeviceConfig;

FILE    *pMsgsfile = NULL;
SUBSCRIBER *pGSub = NULL;   /*  Pointer  to  the  Gateway
subscriber structure */ extern UT_DISPATCHTABLE DTable[];

APPENDIX A — PAGE 108 OF 279
```

```
extern void *vFeHandleSigUsr1();

void    vDispatch(void *, void *);

/*::::::::::::::::::::::::::::::::::::::::::::::::::::::::::::::::
:::::::::::::::
:: Function:    vFeHandleSigTerm
::
:: Purpose:     Process Terminate signal
::
:: Returns: None.
::
:: Input: Signal number.
::
:: Output: None.
::
:: Globals: None.
::
:: Called Routines: vFeHandleTerminate
::
:: Revision:
:: WHO          --WHEN--  WHAT
:: Raju     08/08/94      Original
::::::::::::::::::::::::::::::::::::::::::::::::::::::::::::::::::
:::::::::::*/
void    vFeHandleSigTerm(int   sig)
{
    vMQ_Log(NULL, NULL, 0, "[FRONTEND] Terminating by Signal\n");
     vFeHandleTerminate(TERMINATE_ABORT);
}

/*::::::::::::::::::::::::::::::::::::::::::::::::::::::::::::::::
:::::::::::::::
:: Function:    vAlarm_proc
::
:: Purpose:
::
:: Returns: None.
::
:: Input:  Name of the executable.
::
:: Output: None.
::
:: Globals: None.
::
:: Called Routines: None.
::
:: Revision:
:: WHO          --WHEN--  WHAT
:: Raju     10/10/94      Original
::::::::::::::::::::::::::::::::::::::::::::::::::::::::::::::::::
:::::::::::*/
```

APPENDIX A — PAGE 109 OF 279

```
void vAlarm_proc()
{
    vMQ_Log(NULL, NULL, 21, "[FRONTEND] alarm proc\n");
    vFeHandleTimeout_all();
    alarm( lHeartbeat_wait );
    signal( SIGALRM, vAlarm_proc);
}

/*::::::::::::::::::::::::::::::::::::::::::::::::::::::::::::::::::
::::::::::::::
:: Function:    vFePrintUsage
::
:: Purpose:     Print usage message
::
:: Returns: None.
::
:: Input:   Name of the executable.
::
:: Output:  None.
::
:: Globals: None.
::
:: Called Routines: None.
::
:: Revision:
:: WHO            --WHEN--   WHAT
:: Raju      08/08/94    Original
::::::::::::::::::::::::::::::::::::::::::::::::::::::::::::::::::::
:::::::::::*/ void vFePrintUsage(char *name)
{
    fprintf(stderr, "Usage:  %s [-f FID] [-q QID]   \n\n",name);
    fprintf(stderr, "        QID (Queue ID) range (1 to 10)\n");
    fprintf(stderr, "        FID (Front End ID) range 1000 to 2999 \n\n");
}

/*::::::::::::::::::::::::::::::::::::::::::::::::::::::::::::::::::
::::::::::::::
:: Function:    pReceiveExtMsg
::
:: Purpose:     Receives message from SPIF
::
:: Returns:
::
:: Input:
::
:: Output:
::
:: Globals:
::
:: Called Routines:
::
```

```
::  Revision:
::  WHO           --WHEN--  WHAT
::  Raju          10/10/94  Original
::::::::::::::::::::::::::::::::::::::::::::::::::::::::::::::
:::::::::::*/

SPIF_HEADER *pReceiveExtMsg( Qwatch, lLength )
void    *Qwatch;
long     lLength;
{
    long len;
    static short count=0;
    static long    lmsgsize;
    static long    lmsgtype;
    static long    lspifID;
    SPIF_HEADER    spif;
    SPIF_HEADER *pSpif_header = &spif;

/* initialize multiple read to zero */
    sMultipleFlag = 0;

/* check if there is something to read */
    if( lLength <= 0 )
    {
        return (NULL);
    }

/* check If we have read the first four bytes */
    while( count < 4 )
    {
        /* read one byte at a time */
        if (lMQ_GetData(Qwatch, iDataPort, caBuff, 1 ) != 1 )
        {
            vMQ_Log(NULL,NULL,0,
                "[FRONTEND] Couldn't read spifsync. byte
%d\n", count );
            count = 0;
            return (NULL);
        }

/* decrement number of bytes to be read */
        lLength -= 1;

/* check if the first byte matches */
        if( caBuff[0] != sync[count] )
        {
            vMQ_Log(NULL,NULL,0,
                "[FRONTEND] Invalid spifsync. byte %d %x\n", count, caBuff[0] );
            lMQ_GetData(Qwatch, iDataPort, caBuff, lLength );
            count = 0;
            return (NULL);
        } count++;
```

```
            if( lLength == 0)
                return (NULL);
    } if( count < 8 )
    {
        if( lLength < 4 )
            return (NULL);

/* read msgsize */
        if ( lMQ_GetData(Qwatch, iDataPort, (void*)&lmsgsize,
            sizeof(long)) != sizeof(long))
        {
            count = 0;
            vMQ_Log(NULL, NULL, 0, "[FRONTEND] Couldn't read
spifmsgsize.\n");
            lMQ_GetData(Qwatch, iDataPort, caBuff, lLength );
            return (NULL);
        }

/* decrement number of bytes to be read and increment
bytes read */
        lLength -= 4;
        count += 4;
    } if( lLength < lmsgsize )
    {
        return (NULL);
    }
    else
    {
        /* read SPIFID */
        if (lMQ_GetData(Qwatch, iDataPort, (void*)&lspifID,
            sizeof(long)) != sizeof(long))
        {
            vMQ_Log(NULL, NULL, 0,"[FRONTEND] Couldn't read
spifID.\n");
            count = 0;
            lMQ_GetData(Qwatch, iDataPort, caBuff, lLength );
            return (NULL);
        }

/* decrement number of bytes to be read and increment
bytes read */
        lLength -= 4;
        count += 4;

/* read msgtype */
        if (lMQ_GetData(Qwatch, iDataPort, (void*)&lmsgtype,
            sizeof(long)) != sizeof(long))
        {
            vMQ_Log(NULL, NULL, 0, "[FRONTEND] Couldn't read
SPIFmsgtype.\n");
            lMQ_GetData(Qwatch, iDataPort, caBuff, lLength );
            count = 0;
```

```
                    return (NULL);
            }

/* decrement number of bytes to be read and increment
bytes read */
            lLength -= 4;
            count += 4;

/* check if the message is from SPIF */
            if( lmsgsize == 8 )
            {
                /* update SPIF_HEADER structure and return */
                pSpif_header->lMsgsize = lmsgsize;
                pSpif_header->lSpifID = lspifID;
                pSpif_header->lMsgtype = lmsgtype;
                caBuff[0] = '\0';
                count = 0;

if( lLength > 0)
                    sMultipleFlag = 1;

return(pSpif_header);
            }

/* read message */
            if (lMQ_GetData(Qwatch, iDataPort, caBuff,
                            (lmsgsize - 8)) != (lmsgsize - 8))
            {
                vMQ_Log(NULL, NULL, 0, "[FRONTEND] Couldn't read
private data.\n");
                count = 0;
                return (NULL);
            }
            caBuff[lmsgsize -8] = '\0';
            lLength = lLength - lmsgsize + 8;
        }

/* update SPIF_HEADER structure and return */
        pSpif_header->lMsgsize = lmsgsize;
        pSpif_header->lSpifID = lspifID;
        pSpif_header->lMsgtype = lmsgtype;
        count = 0;

if( lLength > 0)
            sMultipleFlag = 1;

return(pSpif_header);
}

/*::::::::::::::::::::::::::::::::::::::::::::::::::::::::::::::::
:::::::::::::::
:: Function:    Main
::
:: Purpose:     Main process starts.
::
```

APPENDIX A — PAGE 113 OF 279

```
::  Returns:
::
::  Input: Input parameters.
::
::  Output:
::
::  Globals:
::
::  Called Routines:
::
::  Revision:
::   WHO            --WHEN--    WHAT
::   Raju       08/08/94    Original
::::::::::::::::::::::::::::::::::::::::::::::::::::::::::
:::::::::::*/ void main(argc, argv)
int argc;
char **argv;
{
    char            caTempFilename[36];
    char            *cp;
    short                 sagain = 1;
    void            *mqwatch = NULL;
    void            *mqu = NULL;
     short                stype;
     long           now;
    long            lSelected;
    long            lLength;
    long            lLen;
    MQ_HEADER       *mqHeader;
    struct  timeval timeout;
     struct tm      *pTime;
     SPIF_HEADER        tspif;
     SPIF_HEADER    *spif_head;
     SPIF_HEADER    *Newspif_head = &tspif;

/* So that all temp files are commonly usable */
    umask(0);

/* create a new linked list head for subscribers */
    q_newlist(pQhead);
    signal(SIGALRM, vAlarm_proc);

#ifdef DEBUG
    if( iDebug > 5 )
    {
        sprintf( caTempFilename,"msgs.%ld",getpid());
        if (( pMsgsfile = fopen(caTempFilename,"w")) == NULL)
        {
            fprintf(stderr,"\n Unable to open msgs.pid\n");
            fprintf(stderr, "Exiting\n");
            exit(0);
        }
```

```
/*************************************************************
        fprintf(pMsgsfile,"\nSIZE MQ_HEADER %ld, MQ_TERMINATE \
%ld, MQ_RESET \
                %ld, ", sizeof(MQ_HEADER), sizeof(MQ_TERMINATE),
sizeof(MQ_RESET));
        fprintf(pMsgsfile, "MQ_OP_ADDSERVICE %ld, MQ_STATUS_FE
%ld, ",
                sizeof(MQ_OP_ADDSERVICE), sizeof(MQ_STATUS_FE));

*************************************************************/
    }
endif

/* Parse the command line options */
    while (sagain)
    {
        switch (getopt(argc, argv, "f:q:"))
        {
        case    'f':        /* FrontID Frontend ID */
            cpFrontID = optarg;
            break;

case    'q':        /* QID Queue ID */
            cpQID = optarg;
            break;

case    '?':        /* Unknown argument */
            fprintf(stderr, "%s: Unknown argument %s\n", argv[0],
argv[optind]);
            vFePrintUsage(argv[0]);

fprintf(stderr, "Exiting\n");
            exit(GERR_USAGE);

default:
            sagain = 0;
            break;
        }
    }

/* if a QID is specified then use it otherwise use default
QID */
    if( cpQID != NULL )
    {
        lQID = atoi(cpQID);
    }

/* check if QID is within range */
    if( lQID < MQ_DEFAULT_QUEUE_ID || lQID > MQ_MAX_QUEUE_ID )
    {
        fprintf(stderr, "[FRONTEND] Invalid QID. ValidRange 1
to 10 \n");
        fprintf(stderr, "Exiting\n");
        exit(GERR_PROCESSING);
    }
```

```c
    /* check if the FID is within range */
    if( sFeCheckFID() < 0 )
    {
        fprintf(stderr,
            "[FRONTEND] Invalid FrontEnd ID. ValidRange 1000 to 2999 \n");
        fprintf(stderr, "Exiting\n");
        exit (GERR_PROCESSING);
    }

/* Get unique frontend id */
    lAddress = getpid();
    lFID = lAddress;
    lFID = (lFrontID << 16) | lFID;

/* attach the frontend to the queue */
    if ((iMQ_AttachQueueEx ( &mqwatch, lQID, lAddress, 0, lFID)) < 0)
    {
        fprintf(stderr, "[FRONTEND] Cannot attach to queue main\n");
        fprintf(stderr, "Exiting\n");
        exit (GERR_QATTACH);
    }

/* read the queconfiguration file */
    if (iMQU_ReadConfig (&mqu) < 0)
    {
        fprintf(stderr,"[FRONTEND] iMQU_ReadConfig error\n");
        iMQ_Terminate(mqwatch);
        fprintf(stderr, "Exiting\n");
        exit(GERR_PROCESSING);
    }

/* assign the pointer to global variables */
    pvMQ_master = (void *)mqwatch;
    pMQU_master = (void *)mqu;

/* terminate handler */
    signal(SIGTERM, vFeHandleSigTerm);

/* Timeout for initial RESET is 5 minutes */
    timeout.tv_usec = 0;
    timeout.tv_sec  =   INIT_RESET_WAIT;

/* Inital call for vMQ_log with high debug value */
    vMQ_Log(pvMQ_master, pMQU_master, 90, "[FRONTEND] Dummy Call \n");

/* Initial RESET while loop */
    while(1)
    {
        /* Look for a private reset message only */
        if ((lSelected =
            lMQ_QueueWatch(mqwatch,   MQ_PRIVATE_ONLY, &timeout)) == FAILURE )
```

```
                {
                    vMQ_Log(NULL,    NULL,    0,    "[FRONTEND]    error
lMQ_QueueWatch private\n");
                    vFeHandleTerminate(TERMINATE_ABORT);
                }
                else if( lSelected == (FAILURE -1) )
                {
                    vMQ_Log(NULL,    NULL,    0,    "[FRONTEND]    Private
Listener Died\n");
                    vFeHandleTerminate(TERMINATE_ABORT);
                }
                else if( lSelected < 0 )
                {
                    vMQ_Log(NULL,    NULL,    0,    "[FRONTEND]    External
Listener Died\n");
                    vFeHandleTerminate(TERMINATE_ABORT);
                }
                else if (lSelected == 0)
                {
                    /* timed out on reset */
                    vMQ_Log(NULL, NULL, 0, "[FRONTEND]   TIMEOUT for
RESET\n");
                    vFeHandleTerminate(TERMINATE_ABORT);
                }

/* Expecting first Reset message */
                /* Here when there is data available */
                if ((lSelected & MQ_PRIVATE_FD) != 0)
                {
                    /* get data from the queue */
                    lLength   =    lMQ_GetQueueMessage(mqwatch,
MQ_PRIVATE_FD,caBuff,
                            sizeof(caBuff), MSG_NOERROR );

if( lLength < 0 )
                    {
                        /* Error has occured */
                        vMQ_Log(NULL, NULL, 0,
                            "[FRONTEND] Insufficient buffersize OR
Invalid \
                            value/address OR bad mqwatch \n");
                        vFeHandleTerminate(TERMINATE_ABORT);
                    }
                    else
                    if( lLength == 0 )
                    {
                        /* no message continue */
                        vMQ_Log(NULL, NULL, 5, "[FRONTEND] No message
yet try again\n");
                        continue;
                    }
                    else
                    {
                        /* received the message */
                        mqHeader = (MQ_HEADER *)caBuff;
```

```
                        /* check if it is a reply or a command and
dispatch it */
                        /* If ReplyID is zero then it is a command
*/
                        if( mqHeader->tReplyID.tOriginTime != 0 ||
                            mqHeader->tReplyID.lOriginSequence !=
0 )
                        {
                            vMQ_Log(NULL, NULL, 0,
                                "[FRONTEND] Reply is not expected
here.\n");
                            continue;
                        }

/* RESET is a command */
                        if( mqHeader->lMessageType == MQ_MT_RESET)
                        {
                            /*  Dispatching   the   message   to
appropriate handle */
                            /* to the reset handle in this case. */
                            vMQ_Log(NULL, NULL, 5,
                                "[FRONTEND] Dispatch message to
RESET\n");
                            vDispatch(mqwatch, caBuff);
                            break;
                        }
                        else
                        {
                            /* Command other than RESET should not
be processed */
                            vMQ_Log(NULL, NULL, 0,
                                "[FRONTEND] Only Reset command
Expected here\n");
                            continue;
                        }
                    }
                }
        } signal(SIGUSR1, vFeHandleSigUsr1);

/* time out parameter is set to a value read from config
file on reset */
    timeout.tv_usec = 0;
    timeout.tv_sec = lHeartbeat;

/* main while loop accepting messages from queue and */
    /* from external devices. */
    while(1)
    {
        vMQ_Log(NULL, NULL, 20, "[FRONTEND] QWatch looking for
messages \n");

/* if sMultipleFlag is set then the previous message
has not */
        /* been read completely */
```

```
              if( sMultipleFlag == 0 )
              {
                      /* watch out for External and private messages.
*/
                      /* Private messages are received from the message
queue */
                      /* While the external messages are received from
the SPIF */
                      if    ((lSelected    =    lMQ_QueueWatch(mqwatch,
MQ_PRIVATE_EXTERNAL,
                              &timeout)) == FAILURE)
                      {
                              if( errno == EINTR )
                                  continue;

/* Error has occured */
                              vMQ_Log(NULL, NULL, 0,
                                      "[FRONTEND]    error    lMQ_QueueWatch
PRIVATE_EXTERNAL\n");
                              vFeHandleTerminate(TERMINATE_ABORT);
                      }
                      else if( lSelected == (FAILURE -1) )
                      {
                              vMQ_Log(NULL, NULL, 0, "[FRONTEND] Private
Listener Died\n");
                              vFeHandleTerminate(TERMINATE_ABORT);
                      }
                      else if( lSelected < 0 )
                      {
                              vMQ_Log(NULL, NULL, 0, "[FRONTEND] External
Listener Died\n");
                              vFeHandleTerminate(TERMINATE_ABORT);
                      }
                      else if (lSelected == 0)
                      {
                              /* Frontend has timed out on messages */
                              vMQ_Log(NULL, NULL, 12, "[FRONTEND] Handling
Timeout\n");
                              vFeHandleTimeout_all();
                              continue;
                      }
              }

/* Here when there is data available */
              /* check if the data is from the private port */
              if ((lSelected & MQ_PRIVATE_FD) != 0)
              {
                      /* get the private port message */
                      lLength    =    lMQ_GetQueueMessage(mqwatch,
MQ_PRIVATE_FD,caBuff,
                              sizeof(caBuff), MSG_NOERROR );

vMQ_Log(NULL, NULL, 12,
                              "[FRONTEND] Received Private Message size
%ld\n", lLength);
```

```
                if( lLength < 0 )
                {
                        /* Error in getting the message */
                        vMQ_Log(NULL, NULL, 0,
                                "[FRONTEND] Insufficient buffersize OR
Invalid MQ_FD \
                            value/address OR bad mqwatch \n");
                        vFeHandleTerminate(TERMINATE_NORMAL);
                }
                else
                if( lLength == 0 )
                {
                        /* no message */
                        vMQ_Log(NULL, NULL, 5, "[FRONTEND] No message
yet try again\n");
                }
                else
                {
                        /* Dispatch the message */
                        vDispatch(mqwatch, caBuff);
                } lSelected &=   ~(MQ_PRIVATE_FD);
        }   /* end private messages */ if ((lSelected & ~(MQ_PRIVATE_FD | MQ_PUBLIC_FD)) !=
0)
        {
                /* Initially iDataPort is -1 */
                if( iDataPort == -1 )
                {
                    iFeAccept();
                    continue;
                }

/* could be disconected or there is a message */
                if(( lLength = lMQ_QueueTell(mqwatch, iDataPort))
==0)
                {
                        vMQ_Log(NULL, NULL, 0,
                        "[FRONTEND] No data(Disconnected). Disconnect
Gateway\n");

/* Died abruptly disconnect all subscribers
and */
                        /* gateway for audit purposes            */
vFeGateDisconnect_all(GATEDISCONNECT_BY_CARRIER);
                }
                else
                {
                        /* received an external message */
                        vMQ_Log(NULL, NULL, 12,
                                "[FRONTEND] Received ExtMsg dataport %d
datalength %ld\n",
```

APPENDIX A — PAGE 120 OF 279

```c
                                    iDataPort, lLength);
                    /* Read message from SPIF */
                    if( (spif_head = pReceiveExtMsg( mqwatch,
lLength )) == NULL )
                    {
                            /* mesage not complete continue */
                            continue;
                    }
                    else
                    {
                            Newspif_head->lMsgsize      =
spif_head->lMsgsize;
                            Newspif_head->lMsgtype      =
spif_head->lMsgtype;
                            Newspif_head->lSpifID       =
spif_head->lSpifID;
#ifdef DEBUG
                            vMQ_Log(NULL, NULL, 20,
                                "[FRONTEND] tp %ld sz %ld id %ld
\n",
                                    spif_head->lMsgtype,
                                    spif_head->lMsgsize,
spif_head->lSpifID);

if( iDebug > 5 )
                            {
                                /* file fe_spif.msgs */
                                /* check if file size exceeds the
limit */
                                if( ftell(pMsgsfile) > SIZELIMIT
)
                                {
                                    if   ((    pMsgsfile  =
fopen(caTempFilename,"w"))
                                                == NULL)
                                    {
                                        fprintf(stderr,      "\n
Unable to open msgs.pid\n");
                                    }
                                } now = time(0L);
                                pTime = localtime( &now);

fprintf(pMsgsfile,"\n
%.2d/%.2d/%.2d %.2d:%.2d:%.2d",
                                        pTime->tm_mon+1,
                                        pTime->tm_mday,
                                        pTime->tm_year,
                                        pTime->tm_hour,
                                        pTime->tm_min,
                                        pTime->tm_sec);

fprintf(pMsgsfile,
```

```
                                            " RECEIVED Header [ID %ld Type
%ld Size %ld]",
                                                Newspif_head->lSpifID,
                                                Newspif_head->lMsgtype,
                                                Newspif_head->lMsgsize);
                                        fprintf(pMsgsfile,"\n RECEIVED Msg
[%s]", caBuff);
                                        fflush( pMsgsfile );
                                    }
endif
                                    vMQ_Log( NULL, NULL, 10,
                                    "[FRONTEND] RECEIVED Header [ID %ld Type
%ld Size %ld]\n",
                                                Newspif_head->lSpifID,
                                                Newspif_head->lMsgtype,
                                                Newspif_head->lMsgsize);
                                    cp = &caBuff[0];
                                    lLen = Newspif_head->lMsgsize - 8;
                                    if( lLen < 220 )
                                    {
                                            vMQ_Log( NULL, NULL, 10,
                                                "[FRONTEND]    RECEIVED    Msg
[%s]", cp);
                                    }

/* check if the message is an internal
message from SPIF */
                                    if( Newspif_head->lSpifID == -1 )
                                    {
                                            /* internal SPIF message */
                                            if(sFeProcessSpifMsg(Newspif_head,
caBuff) != SUCCESS)
                                            {
                                                /* unable to process client
message */
                                                vMQ_Log(NULL, NULL, 0,
                                                    "[FRONTEND]  Unable    to
Process SPIF msg\n");
vFeGateDisconnect_all(GATEDISCONNECT_BY_OPERATOR);
                                            }
                                    }
                                    else
                                    {
                                            if( (Newspif_head->lMsgsize == 8)
&&
                                                (Newspif_head->lMsgtype     !=
SPIF_SUBSCRIBER_DISCONNECT))
                                            {
                                                /* just log the information
do not delete */
                                                /* subscriber(may be invalid)
since audit */
                                                /* record cannot be written
*/
                                                vMQ_Log(NULL, NULL, 0,
```

```
                                         "[FRONTEND]  ERROR:  Invalid
message only header\n");

vFeLogout_Sub(Newspif_head->lSpifID,

LOGOUT_BY_OPERATOR);
                                  }
                                  else
if(sFeProcessClientMsg(Newspif_head, caBuff) != SUCCESS)
                        {
                                  /* unable to process client
message */
                                  /* just log the information
do not delete */
                                  /* subscriber(may be invalid)
since audit */
                                  /* record cannot be written
*/
                                  vMQ_Log(NULL, NULL, 0,
                                       "[FRONTEND] Unable  to
Process client msg\n");

vFeLogout_Sub(Newspif_head->lSpifID,

LOGOUT_BY_OPERATOR);
                                  } /* end processing client message
*/
                          } /* end message from client */
                    } /* end receive external messages */
                } /* end QueueTell */
        } /* end external messages processing */
      } /* end main while loop */
}

/*:::::::::::::::::::::::::::::::::::::::::::::::::::::::::::::::::
::::::::::::::::
:: Function:    vDispatch
::
:: Purpose:    Basic message type dispatcher from message Queue
::
:: Returns: None.
::
:: Input: Pointer to qwatch structure and message from SPIF.
::
:: Output: None.
::
:: Globals:
::
:: Called Routines:
::
:: Revision:
:: WHO           --WHEN--   WHAT
:: Raju      08/08/94      Original
```

APPENDIX A — PAGE 123 OF 279

```c
:::::::::::::::::::::::::::::::::::::::::::::::::::::::::::::::::
:::::::::::*/ void    vDispatch(void *pmq, void *pdata)
{
    MQ_HEADER    *pHeader;
    struct tm    *tm;
     char        buff[TEMP_BUFF_SIZE];
     static          short      sCounter = 0;

pHeader = (MQ_HEADER *)pdata;
    tm = localtime(&pHeader->tSendTime);

sprintf(buff,"[FRONTEND] Dispatching type %ld subtype %ld sent by PID %ld",
            pHeader->lMessageType, pHeader->lMessageSubType,
            pHeader->lSenderPID);

vMQ_Log(NULL, NULL, 15, buff);

vMQ_Log(NULL, NULL, 30,
        "[F R O N T E N D]    s e n d e r = % l d    s s t = % l d tm=%.2d/%.2d/%.2d-%.2d:%.2d:%.2d seq=%ld\n",
            pHeader->lSenderPID,
            pHeader->lSenderSubType,
            tm->tm_mon+1,
            tm->tm_mday,
            tm->tm_year,
            tm->tm_hour,
            tm->tm_min,
            tm->tm_sec,
            pHeader->lSequenceNumber);
    vMQ_Log(NULL, NULL, 30,
            "[FRONTEND]cont.   mt=%ld [0x%lx] mst=%ld rc=%d rt=%ld rs=%ld\n",
            pHeader->lMessageType, pHeader->lMessageType,
            pHeader->lMessageSubType,
            pHeader->lReturnCode,
            pHeader->tReplyID.tOriginTime,
            pHeader->tReplyID.lOriginSequence);

/* If acknowledge required, do it here */
    if ((pHeader->lMessageType & MQ_MT_ACKNOWLEDGE_REQUIRED) != 0)
    {
        vMQ_Log(NULL, NULL, 20, "[FRONTEND] Acknowledging\n");
        vMQ_SendAck ( pmq, pHeader );
    } if( sGateDisconnectFlag == 1 )
    {
        if( pHeader->lMessageType == MQ_MT_OPCOMMAND )
        {
            if( ( pHeader->lMessageSubType == MQ_MTS_OP_ROUTE ) ||
```

```
                        (    pHeader->lMessageSubType    ==
MQ_MTS_OP_POIQUERY ) ||
                        (    pHeader->lMessageSubType    ==
MQ_MTS_OP_VALIDATE_Q ) )
                    {
                    vMQ_Log(NULL, NULL, 0,
                            "[FE%ld]  Discarding  Queue  Message.
Waiting to disconnect\n",
                            lAddress);
                    return;
                    }
                }
        } if (sUtDispatchMessage ( pvMQ_master, (void*)pMQU_master,
DTable,
            pHeader->lMessageType, pHeader->lMessageSubType,
               (void*)pHeader) != SUCCESS)
    {
        /* just log the information do not delete subscriber,
we may not */
        /* find a subscriber and since audit record cannot be
written */
        vMQ_Log(NULL, NULL, 0,
            "[FRONTEND] INVALID Message received. From Queue.\n");
    }

}
```

```c
static   char *  _sccs_  =  { "   $ S o u r c e :
/ids/cvs/host/fe_spif/src/fe_conf.c,v $ Ver: $Revision: 1.2 $
Date: $Date: 1995/01/13 08:39:01 $"};
/* Copyright (C) 1994,1995 SEI Information Technology, Inc. */

/*:::::::::::::::::::::::::::::::::::::::::::::::::::::::::::
::::::::::::::
:: Filename:      fe_conf.c
::
:: Purpose:        Init known languages and queries known
languages.
::
:: Revision:
:: WHO         --WHEN--  WHAT
:: DAB & VI              Original
:: Raju      09/09/94    Modified for message queue and SPIF
::::::::::::::::::::::::::::::::::::::::::::::::::::::::::::
:::::::::::::*/ include <stdio.h>
include <stdlib.h>
#include <string.h>
#include <sys/types.h>
#include <fcntl.h>
include <netinet/in.h> ifndef   DIRENT                   /* sun uses sys/dirent */
include <sys/dirent.h>
#else
#include <sys/dir.h>               /* RS/6000 uses sys/dir */
endif include "gdefines.h"
include "gerror.h"
#include "mq_pub.h"
#include "queue.h"
#include "spif.h"
#include "fe_common.h"

#define   MAX_KNOWN_LANGUAGES    16
#define   MAX_LANGUAGE_NAME_LEN  128
define   MAX_PATH_LEN           256 extern long      lQID;
extern long          lFID;
extern long          lSize;
extern int       iDebug;
extern int       argcnt;
extern long          lg_addr;
extern int       bit_map;
extern long      lfe_tcp;
extern long      lFrontID;
extern long          lAddress;
extern int       iDataPort;
extern int       last_baud;
extern time_t        start_time;
```

APPENDIX A — PAGE 126 OF 279

```
extern long           lHeartbeat;
extern int            iListenPort;
extern short          sMaxPackets;
extern short          sPacketFlag;
extern int    ipacketflag;
extern short          sConfirmMax;
extern short  sAckPending;
extern long   lMap_format;
extern long   lFormat_mode;
extern short          sDefaultBaud;
extern short          sPacketLimit;
extern int            iQueue_master;
extern long           lLastCommtime;
extern long           lLastCommtime;
extern long           lConstantBaud;
extern long   lCompress_mode;
extern long           lDisplay_panes;
extern short          sTransmitLimit;
extern long           lHeartbeat_wait;
extern int            socket_port_num;
extern short          sInterPacketGap;
extern struct         sockaddr_in addr;
extern short          sProcess_heartbeat;
extern short  sTerm_After_Service;
extern long           lExit_on_disconnect;
extern unsigned long     ulSessionID;

extern void           *pMQU_master;
extern void           *pvMQ_master;

extern char           *cpQID;
extern char           *cpFrontID;
extern char   *cpConfigPath;
extern char           *caCommDevice;
extern char           *caDeviceConfig;
extern char   *cpDownload_dir;
extern char   *cpDictionary_dir;

extern char           caID[];
extern char           caBuff[];
extern char           caHangup[];
extern char           caOrigin[];
extern char           caOriginType[];
extern char           caLimitValue[];
extern char           caDestination[];
extern char           caNoAutoAnswer[];
extern char           caDestinationType[];

extern char           *caAlternative[];

extern Q_HEAD         sHead;
extern Q_HEAD         sConfig;
extern Q_HEAD         *pQhead;
extern Q_HEAD         *pQConfig;
extern FILE           *pMsgsfile;
extern SUBSCRIBER     *pGSub;
```

```c
typedef struct KnownLanguages {
    char caLanguagePath[MAX_LANGUAGE_NAME_LEN];
    char caDescription[MAX_LANGUAGE_NAME_LEN];
}   KNOWNLANGUAGES;

static    short              sKnownLanguageCount;
static    KNOWNLANGUAGES KnownLanguages[MAX_KNOWN_LANGUAGES];

/*:::::::::::::::::::::::::::::::::::::::::::::::::::::::::::::::::::::::::
:::::::::::::::
:: Function:   getargument
::
:: Purpose:    internal function that looks for the first
non-white
::             character following the first equals sign (=) and
::             returns its position, or NULL if no such exists.
::
:: Returns: NULL or position of first character after = sign.
::
:: Input: character string.
::
:: Output: None.
::
:: Globals: None.
::
:: Called Routines: None.
::
:: Revision:
:: WHO          --WHEN--  WHAT
:: DAB                    Original
::::::::::::::::::::::::::::::::::::::::::::::::::::::::::::::::::::::::::
:::::::::::::*/ static char *getargument(char *cp)
{
    /* Look for = */
    while (*cp != '=' && *cp != '\0')
        cp++;

/* Now look for non-white following */
    if (*cp != '\0')
    {
        cp++;
        while (*cp == '\t' || *cp == ' ')
            cp++;
    } if (*cp == '\0')
        return NULL;
    else
        return cp;
}
```

```
/*::::::::::::::::::::::::::::::::::::::::::::::::::::::::::::::
:::::::::::::::
:: Function:    trim
::
:: Purpose:     internal function to trim leading/trailing blanks
and tabs
::
:: Returns: None.
::
:: Input: character string
::
:: Output: character string  without blanks and tabs.
::
:: Globals:  None.
::
:: Called Routines:  None.
::
:: Revision:
:: WHO          --WHEN--  WHAT
:: DAB                    Original
:::::::::::::::::::::::::::::::::::::::::::::::::::::::::::::::::
::::::::::::*/
static void trim(char *cp)
{
    char *dst, *src;

dst = src = cp;

while (*src == ' ' || *src == '\t')
        src++;

while (*src != ' ' && *src != '\t' && *src != '\0')
        *dst++ = *src++;

*dst = '\0';
}

/*::::::::::::::::::::::::::::::::::::::::::::::::::::::::::::::
:::::::::::::::
:: Function:    alphasort
::
:: Purpose:    seems this is not present in all systems .
Compares the directory
::             names.
::
:: Returns:   0 if same else nonzero.
::
:: Input: pointers to two directory structures.
::
:: Output: None.
::
:: Globals: None.
::
:: Called Routines: None.
```

```
::
:: Revision:
:: WHO          --WHEN--  WHAT
:: DAB                    Original
::::::::::::::::::::::::::::::::::::::::::::::::::::::::::::
:::::::::::*/ int alphasort(struct dirent d1, struct dirent d2)
{
    return strcmp((*d1)->d_name, (*d2)->d_name);
}

/*::::::::::::::::::::::::::::::::::::::::::::::::::::::::::::
:::::::::::::
:: Function:    iDirFilter
::
:: Purpose:     This function is used as the filter function to
the directory search
::              function call. It validates only the name of the
file being
::              presented namely that it ends in '.CFG'. If it
does, the filter
::              selects the file, otherwise it ignores the file.
::
:: Returns:
::
:: Input:
::
:: Output:
::
:: Globals:
::
:: Called Routines:
::
:: Revision:
:: WHO          --WHEN--  WHAT
:: DAB                    Original
::::::::::::::::::::::::::::::::::::::::::::::::::::::::::::
:::::::::::*/ int  iDirFilter(struct dirent *thisDir)
{
    int  len;

/* The name must be at least 5 characters long to qualify
*/
    if (((len = strlen(thisDir->d_name)) > 4) &&
        strcmp(thisDir->d_name+len-4, ".CFG") == 0)
        return 1;
    else
        return 0;
}
```

```
/*:::::::::::::::::::::::::::::::::::::::::::::::::::::::::::::::::::
:::::::::::::::
:: Function:    iDirLanguageFilter
::
:: Purpose:     Like iDirFilter, but for language files
::
:: Returns:
::
:: Input:
::
:: Output:
::
:: Globals:
::
:: Called Routines:
::
:: Revision:
:: WHO          --WHEN--  WHAT
:: DAB                    Original
:::::::::::::::::::::::::::::::::::::::::::::::::::::::::::::::::::::
:::::::::::*/ int  iDirLanguageFilter(struct dirent *thisDir)
{
     int  len;

/* The name must be at least 5 characters long to qualify
*/
     if (((len = strlen(thisDir->d_name)) > 4) &&
         strcmp(thisDir->d_name+len-4, ".FEB") == 0)
          return 1;
     else
          return 0;
}

/*:::::::::::::::::::::::::::::::::::::::::::::::::::::::::::::::::::
:::::::::::::::
:: Function:    sInitKnownLanguages
::
:: Purpose:    This    is    the    initialization/reconfiguration
process. Its only
::             parameter is the path of the directory to examine
(and is
::             typically '.').   It returns the number of
validated language
::             files found. -1 is returned if there was an error.
It is possible
::             to return 0 valid languages.  Only files ending
in '.FEB' are
::             considered.
::
:: Returns:
::
:: Input:
::
```

```
::  Output:
::
::  Globals:
::
::  Called Routines:
::
::  Revision:
::  WHO           --WHEN--  WHAT
::  DAB                     Original
::::::::::::::::::::::::::::::::::::::::::::::::::::::::::::::::::
:::::::::::*/ short    sInitKnownLanguages(char *dirpath)
{
    struct   dirent   **dir_head = NULL, *current_dir;
    int      dir_count;
    int      loop_count;
    int      temp_configs = 0;
    char     caFpath[MAX_PATH_LEN];
    char     caBuffer[MAX_LANGUAGE_NAME_LEN];
    int      fd;

dir_count = scandir(dirpath, &dir_head, iDirLanguageFilter,
alphasort);

if (dir_count < 0)
    {
        /* There was an error. In this case, leave the
        ** current list alone.
        */
        return -1;
    }

/* We have to now examine each file and extract the
description.  */
    current_dir = dir_head[0];
    for (loop_count = 0; loop_count < dir_count;
        loop_count++, current_dir = dir_head[loop_count])
    {
        strcpy(caFpath, dirpath);
        strcat(caFpath, "/");
        strcat(caFpath, current_dir->d_name);
        if ((fd = open(caFpath, O_RDONLY)) < 0)
            /* bad file */
            continue;

if (read(fd, caBuffer, sizeof(caBuffer)) !=
sizeof(caBuffer))
        {
            sprintf(caBuffer,
                "Bad file length in language file <%s>\n",
caFpath);
            close(fd);
            continue;
        }
```

```c
            close(fd);
            /* At this point, it looks like it's probably a good
config. */
            if (temp_configs < MAX_KNOWN_LANGUAGES)
            { strcpy(KnownLanguages[temp_configs].caLanguagePath,
                    current_dir->d_name);

strcpy(KnownLanguages[temp_configs++].caDescription, caBuffer);
            }
        }
        if (temp_configs > 0)
            sKnownLanguageCount = temp_configs;

/* We need to free the memory malloced by scandir now */
    for (current_dir = dir_head[0], loop_count = 0; loop_count
< dir_count;
            loop_count++, current_dir = dir_head[loop_count])
        {
            free(current_dir);
        }
        if (dir_head != NULL)
            free(dir_head);
        return temp_configs;
}

/*::::::::::::::::::::::::::::::::::::::::::::::::::::::::::::::
:::::::::::::::
:: Function:    sGenerateLanguageQuery
::
:: Purpose:     This function produces the formatted output file
which contains
::              the list of currently known language files. Each
line of output
::              represents one language file in the form:
::              'description text' ':' 'language file name' '\n'
::
:: Returns:
::
:: Input:
::
:: Output:
::
:: Globals:
::
:: Called Routines:
::
:: Revision:
:: WHO          --WHEN--  WHAT
:: DAB                    Original
::::::::::::::::::::::::::::::::::::::::::::::::::::::::::::::::
:::::::::::::*/ short    sGenerateLanguageQuery(FILE *fp)
```

```c
{
    int sCount;

for (sCount = 0; sCount < sKnownLanguageCount; sCount++)
    {
        fprintf(fp, "%s:%s\n",
            KnownLanguages[sCount].caDescription,
            KnownLanguages[sCount].caLanguagePath);
    } return sKnownLanguageCount;
}

/*:::::::::::::::::::::::::::::::::::::::::::::::::::::::::::::::
:::::::::::::::
:: Function:    sCheckLanguage
::
:: Purpose:     Check if a particular language exists or not.
::
:: Returns:
::
:: Input:
::
:: Output:
::
:: Globals:
::
:: Called Routines:
::
:: Revision:
:: WHO          --WHEN--   WHAT
:: DAB                     Original
:::::::::::::::::::::::::::::::::::::::::::::::::::::::::::::::::
:::::::::::*/
short sCheckLanguage( name)
char *name;
{
    int sCount;

for (sCount = 0; sCount < sKnownLanguageCount; sCount++)
    {
        if(strcmp(name,KnownLanguages[sCount].caLanguagePath)
== 0)
        {
            return SUCCESS;
        }
    }
    return FAILURE;
}
```

```
static    char *  _sccs_   =   { "    $ S o u r c e :
/ids/cvs/host/fe_spif/src/fe_down.c,v $ Ver: $Revision: 1.6 $
Date: $Date: 1995/05/10 16:32:18 $"};
/* Copyright (C) 1994,1995 SEI Information Technology, Inc. */

/*::::::::::::::::::::::::::::::::::::::::::::::::::::::::::
:::::::::::::::::
:: Filename : fe_down.c
::
:: Purpose  :
::
:: Revision :
:: WHO           --WHEN--  WHAT
:: DAB                     Original
:: Raju         09/09/94   Modified for MessageQueue and SPIF
::::::::::::::::::::::::::::::::::::::::::::::::::::::::::::
:::::::::::::::::*/ include <stdio.h>
include <signal.h>
#include <fcntl.h>
#include <sys/stat.h>
include <netinet/in.h> include "gdefines.h"
include "gerror.h"
#include "mq_pub.h"
#include "queue.h"
#include "spif.h"
#include "fe_common.h"
#include "bf_pub.h"

#define MAX_TEMPBUFF_SIZE       128
#define DATA_SIZE               142   /* Assumption based on
data size */ extern long     lQID;
extern long         lFID;
extern long         lSize;
extern int          iDebug;
extern int          argcnt;
extern long         lg_addr;
extern int          bit_map;
extern long     lfe_tcp;
extern long     lFrontID;
extern long         lAddress;
extern int          iDataPort;
extern int          last_baud;
extern time_t       start_time;
extern long         lHeartbeat;
extern int          iListenPort;
extern short        sMaxPackets;
extern short        sPacketFlag;
extern int      ipacketflag;
extern short        sConfirmMax;
```

APPENDIX A — PAGE 135 OF 279

```
extern short    sAckPending;
extern long     lMap_format;
extern long     lFormat_mode;
extern short        sDefaultBaud;
extern short        sPacketLimit;
extern int          iQueue_master;
extern long         lLastCommtime;
extern long         lLastCommtime;
extern long         lConstantBaud;
extern long     lCompress_mode;
extern long         lDisplay_panes;
extern short        sTransmitLimit;
extern long         lHeartbeat_wait;
extern int          socket_port_num;
extern short        sInterPacketGap;
extern struct       sockaddr_in addr;
extern short        sProcess_heartbeat;
extern short    sTerm_After_Service;
extern long         lExit_on_disconnect;
extern unsigned long    ulSessionID;

extern void         *pMQU_master;
extern void         *pvMQ_master;

extern char         *cpQID;
extern char         *cpFrontID;
extern char     *cpConfigPath;
extern char         *caCommDevice;
extern char         *caDeviceConfig;
extern char     *cpDownload_dir;
extern char     *cpDictionary_dir;

extern char         caID[];
extern char         caBuff[];
extern char         caHangup[];
extern char         caOrigin[];
extern char         caOriginType[];
extern char         caLimitValue[];
extern char         caDestination[];
extern char         caNoAutoAnswer[];
extern char         caDestinationType[];

extern char         *caAlternative[];

extern Q_HEAD       sHead;
extern Q_HEAD       sConfig;
extern Q_HEAD       *pQhead;
extern Q_HEAD       *pQConfig;
extern FILE         *pMsgsfile;
extern SUBSCRIBER   *pGSub;

/*::::::::::::::::::::::::::::::::::::::::::::::::::::::::::::::::
:::::::::::::::::::
:: Function :   cpFillDownBuffer
::
```

```
:: Purpose   :  Fill the buffer which as much of the query
::              file as will fit.  return end of buffer
filled.
::
:: Returns:
::
:: Input:
::
:: Output:
::
:: Globals:
::
:: Revision :
:: WHO          --WHEN--  WHAT
:: DAB                    Original
:: Raju         09/09/94  Modified for MessageQueue and SPIF
:::::::::::::::::::::::::::::::::::::::::::::::::::::::::::::
:::::::::::::::::*/
char *cpFillDownBuffer(fd, buff, pSub)
int       fd;
char      *buff;
SUBSCRIBER    *pSub;
{
    long now;
    long lI;
    long byte_cnt;
    long lBufflen;
    long lCurr_fileoffs;
    long num_bytes;
    char *cp;
    char tmpBuf[MAX_MSG_SIZE];
    FILE *fp;

cp = buff;

lBufflen = lFillMsgFields(pSub, cp);
    cp += lBufflen;

sprintf(cp, "D|");
    cp +=2;

/* As long as the current file offset is less than the query
file size */
    lCurr_fileoffs = pSub->lManeuverOffsets[pSub->lMsgid];
    fp = fdopen(fd, "r");

lseek(fd, lCurr_fileoffs, SEEK_SET);

/* Approximate number of characters to read - this will be
half of
        the actual capacity remaining since every byte is
represented in
        hexadecimal */
    /* Making the foll. assumptions for data sizes .... */
    /*
```

```
    msglen:4, crc:4, timestamp:8, subscriberID:16, msgID:4,
ID:72: type:1,
    filename:20, fileoffset:8, data bytes:4, delimiters:11
    */
    if ((pSub->lStatus & SS_ROUTE_DWNL)||(pSub->lStatus &
SS_SEND_BINARY))
        byte_cnt = (pSub->sPacketLimit - DATA_SIZE);
    else
        byte_cnt = (pSub->sPacketLimit - DATA_SIZE)/2;

pSub->sCurrentManeuver++;

if((byte_cnt+lCurr_fileoffs)>pSub->lQueryFilesize)
    {
        byte_cnt = pSub->lQueryFilesize-lCurr_fileoffs+1;
    } if ((num_bytes = read(fd, &tmpBuf[0], byte_cnt)) <= 0 )
    {
        vMQ_Log( NULL, NULL, 0,
            "[FRONTEND] Cannot read file %s",pSub->caTmpfile);
        return NULL;
    } if(pSub->lStatus & SS_SEND_DWNL)
        sprintf(cp,"%s:%ld:%ld:",    pSub->caDownload,
lCurr_fileoffs, num_bytes);
    else
        sprintf(cp,"%s:%ld:%ld:",    pSub->caTmpfile,
lCurr_fileoffs, num_bytes);

cp+=strlen(cp);

if ((pSub->lStatus & SS_ROUTE_DWNL)||(pSub->lStatus &
SS_SEND_BINARY))
    {
        memcpy(cp,tmpBuf,num_bytes);
        cp += num_bytes;
    }
    else
        for( lI=0; lI<num_bytes; lI++, cp+=2 )
            sprintf(cp,"%.2x", tmpBuf[lI]);

lCurr_fileoffs = ftell(fp);
    pSub->lMsgidsent[pSub->lMsgid] = pSub->ServerRequest.lMsgid;
    pSub->lMsgid++;
    pSub->lManeuverOffsets[pSub->lMsgid] = lCurr_fileoffs;

return cp;
}

/*:::::::::::::::::::::::::::::::::::::::::::::::::::::::::::::::
::::::::::::::::::
:: Function :   vSendDownload
```

```
::
:: Purpose  :  Prepare to send a download message back to
::            the client process.
::
:: Returns:
::
:: Input:
::
:: Output:
::
:: Globals:
::
:: Revision :
:: WHO          --WHEN--  WHAT
:: DAB                    Original
:: Raju         09/09/94  Modified for MessageQueue and SPIF
::::::::::::::::::::::::::::::::::::::::::::::::::::::::::::::::
:::::::::::::::::*/ vSendDownload(pSub, sStep, sBurstCount)
SUBSCRIBER  *pSub;
short       sStep;
short       sBurstCount;
{
    char buff[MAX_MSG_SIZE];
    char caBuf[MAX_TEMPBUFF_SIZE];
    short   sDeletefile;
    short   msglen;
    char *cp;
    int  fdesc;
    signal(SIGUSR1, SIG_IGN);
    signal(SIGUSR2, SIG_IGN);

/*
    if (!(pSub->lStatus & SS_BTRF) && !(pSub->lStatus & SS_BRBF))
*/
    if (pSub->lStatus & SS_SEND_DWNL)
    {
        if( (fdesc = open( pSub->caDownload, O_RDONLY)) < 0 )
        {
            sprintf( caBuf," Cannot open file %s",pSub->caDownload);
            vMQ_Log( NULL, NULL, 0, "[FRONTEND] %s\n", caBuf);

if ( pSub->sResultCode < 1 )
pSub->sResultCode=FEERR_SVGD;
            vSendErrorResponse(pSub, caBuf);

return(-1);
        }
    }
    else if ((fdesc = open(pSub->caTmpfile, O_RDONLY)) == -1)
    {
        sprintf( caBuf," Cannot read file %s",pSub->caTmpfile);
```

```c
            vMQ_Log( NULL, NULL, 0, "[FRONTEND] %s\n", caBuf);

if(pSub->sResultCode<1) pSub->sResultCode=FEERR_SVGD;
            vSendErrorResponse(pSub, caBuf);

return(-1);
        } cp = cpFillDownBuffer(fdesc, buff, pSub);

if(cp==NULL)
        {
            sprintf( caBuf," Cannot read file %s",pSub->caTmpfile);
            vMQ_Log( NULL, NULL, 0, "[FRONTEND] %s\n", caBuf);

if(pSub->sResultCode<1) pSub->sResultCode=FEERR_SVGD;
            vSendErrorResponse(pSub, caBuf);
            close(fdesc);
            return(-1);
        } if(    (pSub->lManeuverOffsets[pSub->lMsgid]      <=
pSub->lQueryFilesize) &&
            (sBurstCount < pSub->sBurstCount))
        {
            sDeletefile = 0;
        }
        else
        {
            sDeletefile = 1;
        } sprintf(cp, "|MORE=%c|", (sDeletefile) ? 'N' : 'Y' );

cp += strlen(cp);

if        ((pSub->lManeuverOffsets[pSub->lMsgid]     <=
pSub->lQueryFilesize) &&
                ( sBurstCount >= pSub->sBurstCount))

strcat(cp, "CONFCONT=Y|\n");
        else
        {
            strcat(cp, "\n");
            if( sDeletefile == 1 )
            {
                pSub->lResponsePending = 0;
            }
        } strcat(cp, "\r");

sDeletefile = 0;
        cp +=strlen(cp);
        msglen = cp - buff;
```

```
        close(fdesc);
        sSendMsg( pSub, (void *)buff, msglen);
}

/*:::::::::::::::::::::::::::::::::::::::::::::::::::::::::::::::::::::
:::::::::::::::::::
:: Function :  sGenerateDownload
::
:: Purpose  :  Generates a download file
::
:: Returns:
::
:: Input:
::
:: Output:
::
:: Globals:
::
:: Revision :
:: WHO            --WHEN--  WHAT
:: DAB                      Original
:: Raju           09/09/94  Modified for MessageQueue and SPIF
::::::::::::::::::::::::::::::::::::::::::::::::::::::::::::::::::::::
:::::::::::::::::*/ short sGenerateDownload(pSub)
SUBSCRIBER    *pSub;
{
      int       fdesc;
      short             burst_count;
      char      caBuf[MAX_TEMPBUFF_SIZE];
      struct stat   Status;

pSub->sManeuverCount = 0;
      pSub->lMsgid = 0;
      memset((char *)&pSub->lMsgidsent,0,MAX_MANEUVER_MSGS);
      memset((char *)&pSub->lManeuverOffsets,0,MAX_MANEUVER_MSGS);

vMQ_Log( NULL, NULL, 0, "[FRONTEND] sGenerateDownload: port
number %d\n", pSub->iCommPort);

/* Check to make sure that file exists,   */
      /* open the file, read it and format messages */
/*
      if  (!(pSub->lStatus  &  SS_BTRF)  &&  !(pSub->lStatus  &
SS_BRBF))
*/
      if (pSub->lStatus & SS_SEND_DWNL)
      {
            if( (fdesc = open( pSub->caDownload, O_RDONLY)) == -1
)
            {
                  sprintf( caBuf," Cannot  open  download  file
%s",pSub->caDownload);
                  vMQ_Log( NULL, NULL, 0, "[FRONTEND] %s\n", caBuf);
```

APPENDIX A — PAGE 141 OF 279

```
                if ( p S u b - > s R e s u l t C o d e < 1 )
pSub->sResultCode=FEERR_SVGD;
            vSendErrorResponse(pSub, caBuf);

return(-1);
        }
    }
    else if ((fdesc = open(pSub->caTmpfile, O_RDONLY)) == -1 )
    {
        sprintf( caBuf," Cannot    read   download    file
%s",pSub->caTmpfile);
        vMQ_Log( NULL, NULL, 0, "[FRONTEND] %s\n", caBuf);

if(pSub->sResultCode<1) pSub->sResultCode=FEERR_SVGD;
        vSendErrorResponse(pSub, caBuf);

return(-1);
    } if( fstat(fdesc,&Status) == -1 )
    {
        sprintf( caBuf," Cannot access download file");
        vMQ_Log( NULL, NULL, 0, "[FRONTEND] %s\n", caBuf);

if(pSub->sResultCode<1) pSub->sResultCode=FEERR_SVGD;
        vSendErrorResponse(pSub, caBuf);

return(-1);
    } if   (!(pSub->lStatus  &   SS_STRIPMAP)||(pSub->lStatus    &
SS_BRBF))
        pSub->lQueryFilesize = Status.st_size - 1;

close(fdesc);

/* Read in the maximum allowable size */
    if (pSub->lStatus & SS_BURST_MODE)
    {
        burst_count = 0;
        while   (   pSub->lManeuverOffsets[pSub->lMsgid]    <
pSub->lQueryFilesize &&
            burst_count < pSub->sBurstCount)
        {
            vSendDownload(pSub, 1, ++burst_count);
            if (sInterPacketGap > 0)
                sleep(sInterPacketGap);
        }
    }
    else
        vSendDownload(pSub, 0, 0);

return(SUCCESS);
}
```

APPENDIX A — PAGE 142 OF 279

```c
static   char *  _sccs_  =   { "   $ S o u r c e :
/ids/cvs/host/fe_spif/src/fe_func.c,v $ Ver: $Revision: 1.8 $
Date: $Date: 1995/05/10 16:32:19 $"};
/* Copyright (C) 1994,1995 SEI Information Technology, Inc. */

/*:::::::::::::::::::::::::::::::::::::::::::::::::::::::::::
:: Filename: fe_func.c
::
:: Purpose :
::
:: Revision:
:: WHO           --WHEN--  WHAT
:: DAB & VI                Original
:: Raju          09/09/94  Modified for Message queue and SPIF
:::::::::::::::::::::::::::::::::::::::::::::::::::::::::::::*/ include   <stdio.h>
include   <errno.h>
#include   <sys/termio.h>
#include   <sys/socket.h>
#include   <sys/socketvar.h>
#include   <netinet/in.h>
#include   <sys/wait.h>
#include   <sys/resource.h>
#include   <time.h>
#include   <sys/time.h>
#include   <signal.h>
include   <fcntl.h> include   "gdefines.h"
include   "gerror.h"
#include   "db_spars.h"
#include   "dbaccess.h"
#include   "database.h"
#include   "gr_init.h"
#include   "pclalloc.h"
#include   "gstructs.h"
#include   "db_parse.h"
#include   "sxglob.h"
#include   "dg_int.h"
#include   "utdispm.h"
#include   "mq_pub.h"
#include   "queue.h"
#include   "spif.h"
#include   "fe_common.h"

/* Modem configuration file keyword definitions */
#define     MC_PACKETSIZE       1
#define     MC_PACKETHEADER         2
#define     MC_BAUD                 3
#define     MC_INTERPACKETGAP   4
#define     MC_TRANSMITSIZE         5
#define     MC_HANGUP           6
#define     MC_RESET            7
#define     MC_INIT                 8
#define     MC_CONFIRMREQMAX    9
```

APPENDIX A — PAGE 143 OF 279

```
#define    MC_SOCKETPORT        10
#define    MC_CONSTANTBAUD            11
#define    MC_HEARTBEAT         12
#define    MC_HEARTBEAT_WAIT    13
#define    MC_DOWNLOAD_DIR            14
#define    MC_EXIT_ON_DISCONNECT 15
define    MC_DBETIMEOUT        16 define    MAX_ADDRESS_SIZE     80
define    DATA_SIZE            152   /*   Assumption    based    on
datasizes */ struct    sDecodeTable    {
    char *name;
    short       sValue;
    }    sDecodeTable[] = {
    "PACKETSIZE",          MC_PACKETSIZE,
    "PACKETHEADER",           MC_PACKETHEADER,
    "BAUD",                   MC_BAUD,
    "INTERPACKETGAP",      MC_INTERPACKETGAP,
    "TRANSMITSIZE",           MC_TRANSMITSIZE,
    "HANGUP",              MC_HANGUP,
    "RESET",               MC_RESET,
    "INIT",                   MC_INIT,
    "CONFIRMREQMAX",       MC_CONFIRMREQMAX,
    "SOCKETPORT",          MC_SOCKETPORT,
    "CONSTANTBAUD",           MC_CONSTANTBAUD,
    "HEARTBEAT_WAIT",      MC_HEARTBEAT_WAIT,
    "HEARTBEAT",           MC_HEARTBEAT,
    "DOWNLOAD_DIR",           MC_DOWNLOAD_DIR,
    "EXIT_ON_DISCONNECT", MC_EXIT_ON_DISCONNECT,
    "DBETIMEOUT",          MC_DBETIMEOUT,
    NULL,                  0
    };

extern long     lQID;
extern long         lFID;
extern long         lSize;
extern int          iDebug;
extern int          argcnt;
extern long         lg_addr;
extern int          bit_map;
extern long     lfe_tcp;
extern long     lFrontID;
extern long         lAddress;
extern int          iDataPort;
extern int          last_baud;
extern time_t       start_time;
extern long         lHeartbeat;
extern int          iListenPort;
extern short        sMaxPackets;
extern short        sPacketFlag;
extern int      ipacketflag;
extern short        sBurstflag;
extern short        sConfirmMax;
extern short    sAckPending;
```

```
extern long            lDBETimeout;
extern long     lMap_format;
extern long     lFormat_mode;
extern short           sDefaultBaud;
extern short           sPacketLimit;
extern int             iQueue_master;
extern long            lLastCommtime;
extern long            lLastCommtime;
extern long            lConstantBaud;
extern long     lCompress_mode;
extern long            lDisplay_panes;
extern short           sTransmitLimit;
extern short           sMinPacketLimit;
extern long            lHeartbeat_wait;
extern int             socket_port_num;
extern short           sInterPacketGap;
extern struct          sockaddr_in addr;
extern short           sProcess_heartbeat;
extern short    sTerm_After_Service;
extern long            lExit_on_disconnect;
extern unsigned long    ulSessionID;

extern void            *pMQU_master;
extern void            *pvMQ_master;

extern char            *cpQID;
extern char            *cpFrontID;
extern char     *cpConfigPath;
extern char            *caCommDevice;
extern char            *caDeviceConfig;
extern char     *cpDownload_dir;
extern char     *cpDictionary_dir;

extern char            caID[];
extern char            caBuff[];
extern char            caHangup[];
extern char            caOrigin[];
extern char            caOriginType[];
extern char            caLimitValue[];
extern char            caDestination[];
extern char            caNoAutoAnswer[];
extern char            caDestinationType[];

extern char            *caAlternative[];

extern Q_HEAD          sHead;
extern Q_HEAD          sConfig;
extern Q_HEAD          *pQhead;
extern Q_HEAD          *pQConfig;
extern FILE            *pMsgsfile;
extern SUBSCRIBER      *pGSub;

extern void *vFeHandleSigUsr1();

/*::::::::::::::::::::::::::::::::::::::::::::::::::::::::::::::::::::::
```

APPENDIX A — PAGE 145 OF 279

```
::  Function: vSkipManeuver
::
::  Purpose :   Skips a maneuver.
::
::  Returns:
::
::  Input:
::
::  Output:
::
::  Globals:
::
::  Revision:
::  WHO            --WHEN--   WHAT
::  DAB & VI                  Original
::  Raju           09/09/94   Modified for Message queue and SPIF
::::::::::::::::::::::::::::::::::::::::::::::::::::::::::::::::*/ void vSkipManeuver(fd, pManeuver)
int                 fd;
VBDG_MANEUVER       *pManeuver;
{
    long pos;
    short    len;

pos = lseek(fd, 0L, SEEK_CUR);

/* Finish reading the maneuver information. The original structure
    ** has already been read in order to determine that this one needs
    ** to be skipped.
    */
    pos +=pManeuver->sTextLength; /* The maneuver text */
    lseek(fd, pos, SEEK_SET);

/* Now the from/two strings that are there (may be zero) */
    if (read(fd, &len, sizeof(len)) != sizeof(len))
    {
        /* Technically an error. We'll just assume eof */
        return;
    } pos += sizeof(len) + len;
    lseek(fd, pos, SEEK_SET);

/* TO */
    if (read(fd, &len, sizeof(len)) != sizeof(len))
    {
        /* Technically an error. We'll just assume eof */
        return;
    } pos += sizeof(len) + len;
    /* Now position past the arms */
    pos += sizeof(VBDG_FINGER) * pManeuver->cFingerCount;
```

```
        lseek(fd, pos, SEEK_SET);
        return;
}

/*:::::::::::::::::::::::::::::::::::::::::::::::::::::::::::::::::::
:: Function: vFixCR
::
:: Purpose : Change CR's to escaped characters if they are
::           preceeded by a blank.
::
:: Returns:
::
:: Input:
::
:: Output:
::
:: Globals:
::
:: Revision:
:: WHO          --WHEN--  WHAT
:: DAB & VI               Original
:: Raju         09/09/94  Modified for Message queue and SPIF
:::::::::::::::::::::::::::::::::::::::::::::::::::::::::::::::::::*/ void vFixCR(buff)
char *buff;
{
    if (buff == NULL || *buff == '\0')
        return;         /* Null string, nothing to do */ buff++;
    while (*buff != '\0')
    {
        if (*buff == '\r' && *(buff-1) == ' ')
        {
            *(buff-1) = '\\';
            *buff = 'r';
        }
        buff++;
    }
}

/*:::::::::::::::::::::::::::::::::::::::::::::::::::::::::::::::::::
:: Function: vSendOkResponse
::
:: Purpose : Format and send an ACK message to the client
::           process. This message is currently sent for
requests that
::           have at least one of the BURST, MAXPKT or SESSION
options.
::
:: Returns:
::
:: Input:
```

APPENDIX A — PAGE 147 OF 279

```
::
:: Output:
::
:: Globals:
::
:: Revision:
:: WHO          --WHEN--  WHAT
:: DAB & VI               Original
:: Raju         09/09/94  Modified for Message queue and SPIF
::::::::::::::::::::::::::::::::::::::::::::::::::::::::::::::::*/ void vSendOkResponse(pSub)
SUBSCRIBER *pSub;
{
    time_t  now;
    char  buff[1024];
    char *cpBuff;
    long lLen;

time(&now);

cpBuff = &buff[0];
    lLen = lFillMsgFields(pSub, cpBuff);
    cpBuff += lLen;
    sprintf(cpBuff, "E|OK|");

if( (ipacketflag == 1) && (sBurstflag == 1))
    {
        ipacketflag = 0;
        sBurstflag = 0;
        sprintf(cpBuff, "E|OK|MAXPKT=%d|MAXBURST=%d|\n",
            pSub->sPacketLimit, pSub->sBurstCount);
    }
    else
    if( ipacketflag == 1 )
    {
        ipacketflag = 0;
        sprintf(cpBuff,
"E|OK|MAXPKT=%d|\n",pSub->sPacketLimit);
    }
    else
    if( sBurstflag == 1 )
    {
        sBurstflag = 0;
        sprintf(cpBuff,
"E|OK|MAXBURST=%d|\n",pSub->sBurstCount);
    }
    else
    {
        sprintf(cpBuff, "E|OK|\n");
    } vFixCR(buff);

strcat(buff, "\r");
    sSendMsg( pSub, buff, strlen(buff) );
```

```
    vMQ_Log(NULL,    NULL,   20,    "[FRONTEND]    DATAOK[%d]:
\n",strlen(buff));
    return;
}

/*:::::::::::::::::::::::::::::::::::::::::::::::::::::::::::::::::
:: Function: vSendErrorResponse
::
:: Purpose : Format and send a single error message to the
::           client process. Will add a new line to the message
::             if not already present.
::
:: Returns:
::
:: Input:
::
:: Output:
::
:: Globals:
::
:: Revision:
:: WHO           --WHEN--   WHAT
:: DAB & VI                 Original
:: Raju          09/09/94   Modified for Message queue and SPIF
:: Norik         03/09/95       Error Code Passthrough to SPIF
:::::::::::::::::::::::::::::::::::::::::::::::::::::::::::::::::*/ void vSendErrorResponse(pSub, cpMsg)
SUBSCRIBER *pSub;
char *cpMsg;
{
    time_t   now;
    char buff[MAX_MSG_SIZE];
    char buff2[3];
    char *cpBuff;
    long lLen;
    int  hasNL;

memset(buff,'\0',MAX_MSG_SIZE);     /* nullify errorstring
buffer */ time(&now);

if (cpMsg[strlen(cpMsg)-1] != '\n')
        hasNL = 0;
    else
        hasNL = 1;

buff2[0] = '|';
    buff2[1] = *cpMsg;
    buff2[2] = '\0';

cpBuff = &buff[0];
    lLen = lFillMsgFields(pSub, cpBuff);
    cpBuff += lLen;
```

```
        sprintf(cpBuff, "E%s%s%sFEERR=%hd|\n",
                cpMsg[0] == '\n' ? "|\\\\n" : buff2,
                cpMsg+1,
                hasNL == 0 ? "|" : "\\n|",
                pSub->sResultCode);

vFixCR(buff);

/* Reset sResultCode because we used it to report an fe_spif
error */
        i                                                           f
((pSub->sResultCode>FEERR_MINERR)&&(pSub->sResultCode<FEERR_MA
XERR))
            pSub->sResultCode = 0;

strcat(buff, "\r");
        sSendMsg( pSub, buff, strlen(buff) );
        vMQ_Log(NULL, NULL, 20, "[FRONTEND]  DATAERROR[%d]:  \n",
strlen(buff));
}

/*::::::::::::::::::::::::::::::::::::::::::::::::::::::::::::::::
:: Function: vSendErrorFile
::
:: Purpose : Reads and transmits the error message in the
::           file to the client process. More than one msg
::           may be sent if there is more than one line in the
file.
::           A default message will be used if the file is
zero in length.
::
:: Returns:
::
:: Input:
::
:: Output:
::
:: Globals:
::
:: Revision:
:: WHO           --WHEN--  WHAT
:: DAB & VI                Original
:: Raju          09/09/94  Modified for Message queue and SPIF
::::::::::::::::::::::::::::::::::::::::::::::::::::::::::::::::*/ void vSendErrorFile(pSub)
SUBSCRIBER *pSub;
{
    int  fpIn;
    int  len;
    char buffIn[200];

if ((fpIn = open(pSub->caTmpfile, O_RDONLY)) >= 0)
    {
```

```
            if ((len = read(fpIn, buffIn, sizeof(buffIn)-1)) <= 0)
            {
                strcpy(buffIn, "SEI/EnRoute Internal Error");
            }
            else
                buffIn[len] = '\0';

if(pSub->sResultCode<1) pSub->sResultCode=FEERR_SEER;
            vSendErrorResponse(pSub, buffIn);

close(fpIn);
#ifdef DELETE
            unlink(pSub->caTmpfile);
#endif
        }
        else
        { if(pSub->sResultCode<1) pSub->sResultCode=FEERR_SEER;
            vSendErrorResponse(pSub, "SEI/EnRoute Internal Error");

}
}

/*:::::::::::::::::::::::::::::::::::::::::::::::::::::::::::::::::::::::::
:: Function: vDumpCurrSCR
::
:: Purpose : Dump the current subscriber information into the
::            log file, if the debug level is 15 or greater.
::            Mostly used for debugging purposes.
::
:: Returns:
::
:: Input:
::
:: Output:
::
:: Globals:
::
:: Revision:
:: WHO            --WHEN--   WHAT
:: DAB & VI                  Original
:: Raju           09/09/94   Modified for Message queue and SPIF
:::::::::::::::::::::::::::::::::::::::::::::::::::::::::::::::::::::::::*/ vDumpCurrSCR(pSub)
SUBSCRIBER *pSub;
{
    vMQ_Log(NULL, NULL, 31, "[FRONTEND] Subscriber ID %s\n",
pSub->caSCR);
    vMQ_Log(NULL,   NULL,   31,    "[FRONTEND]   Unit    ID
%s\n",pSub->ServerRequest.caID);
    vMQ_Log(NULL,  NULL,  31,   "[FRONTEND]  MsgID  ID  %.4x\n",
pSub->lMsgid);
```

APPENDIX A -- PAGE 151 OF 279

```
        vMQ_Log(NULL,   NULL,   31,   "[FRONTEND]   TmpFile   %s\n",
pSub->caTmpfile);
        vMQ_Log(NULL,   NULL,   31,   "[FRONTEND]   lStatus   %.8x\n",
pSub->lStatus);
}

/*:::::::::::::::::::::::::::::::::::::::::::::::::::::::::::::::::::
:: Function: vShiftManeuvers
::
:: Purpose : This function is called when the number of messages
::              exceed MAX_MANEUVER_MSGS.
::              Move the maneuver offsets and msgids up by 1.
This
::              means that the number of previous messages that
are
::              lost is equal to the number of messages exceeding ::              MAX_MANEUVER_MSGS.
::
:: Returns:
::
:: Input:
::
:: Output:
::
:: Globals:
::
:: Revision:
:: WHO           --WHEN--   WHAT
:: DAB & VI                 Original
:: Raju          09/09/94   Modified for Message queue and SPIF
:::::::::::::::::::::::::::::::::::::::::::::::::::::::::::::::::::*/
void vShiftManeuvers(pSub)
SUBSCRIBER *pSub;
{
     long lI;

for( lI=0; lI<MAX_MANEUVER_MSGS-1; lI++ )
     {
          pSub->lMsgidsent[lI] = pSub->lMsgidsent[lI+1];
          pSub->lManeuverOffsets[lI]   =
pSub->lManeuverOffsets[lI+1];
     }
     pSub->lMsgid--;
     return;
}

/*:::::::::::::::::::::::::::::::::::::::::::::::::::::::::::::::::::
:: Function: cpFillQueryBuffer
::
:: Purpose : Fill the buffer which as much of the query
::              file as will fit. return end of buffer filled.
::              The buffer size is limited by sPacketLimit.
```

APPENDIX A — PAGE 152 OF 279

```
::
:: Returns:
::
:: Input:
::
:: Output:
::
:: Globals:
::
:: Revision:
:: WHO          --WHEN--   WHAT
:: DAB & VI                Original
:: Raju         09/09/94   Modified for Message queue and SPIF
::::::::::::::::::::::::::::::::::::::::::::::::::::::::::::::*/ char *cpFillQueryBuffer(FILE   *fp,   char   *buff,   SUBSCRIBER
*pSub,int burst_cnt)
{
    time_t   now;
    short    charcount,
             cplen;
    char *cp;
    long lCurr_fileoffs;

cp = buff;
    charcount = 0;

time(&now);
    if( burst_cnt > 1 )
    {
        pSub->ServerRequest.lMsgid++;
    }
    cplen = lFillMsgFields(pSub, cp);
    cp += cplen;
    sprintf(cp,"Q|");
    cp += 2;

/* As long as the current file offset is less than the query
file size */
    lCurr_fileoffs = pSub->lManeuverOffsets[pSub->lMsgid];
    while ( lCurr_fileoffs <= pSub->lQueryFilesize )
    {
        fseek(fp, lCurr_fileoffs, SEEK_SET);
        if (charcount > 0) {
            strcat(cp, ";");
        }
        else
            cp--;

if (fgets(cp+1, 128, fp) == NULL)
        {
            break;
        } charcount = strlen(cp) - 1;
        cp[charcount] = '\0';     /* remove nl */
```

```c
            /* Making the foll. assumptions for data sizes .... */
            /*
            msglen:4+1,  crc:4,   timestamp:8,   subscriberID:16,
msgID:4, ID:16: type:1,
            MORE:6,  CONTCONF=10,  delimiters(15)  =  total(with
delimiters approx 100)
            */
            if ((cp - buff + charcount) >= (pSub->sPacketLimit -
DATA_SIZE))
            {
                /* Back up one to redo this entry the next time
*/
                *cp = '\0';
                break;
            } cp += charcount;
            lCurr_fileoffs = ftell(fp);
        } pSub->lMsgidsent[pSub->lMsgid] = pSub->ServerRequest.lMsgid;
    pSub->lMsgid++;                 /* counter  for  number  of
messages sent */
    pSub->lNum_msgs++;

/* If the number of messages exceed the max size, get rid
of the the
        first message */
    if( pSub->lMsgid >= MAX_MANEUVER_MSGS )
        vShiftManeuvers(pSub);

pSub->lManeuverOffsets[pSub->lMsgid] = lCurr_fileoffs;
    return cp;
}

/*:::::::::::::::::::::::::::::::::::::::::::::::::::::::::::::::
:: Function: vSendManeuver
::
:: Purpose : Send a single maneuver, after positioning by the
step amount.
::              If this is the last maneuver, MORE=N is sent,
::              otherwise MORE=Y is sent.
::              For packaging - more than one maneuver will be
::              sent - up to 3 will be packed together with the
::              compression.
::      6/6/94    V.I  The number of maneuvers sent per message
will
::                      depend  upon  the  value  of  the
sPacketLimit field
::                      in the subscriber structure. This
value is negotiated
::                      between the front-end and client.
Each "maneuver" can
::                      contain more than one step. File
offsets are built
```

```
::                              for each message sent out.
::
:: Returns:
::
:: Input:
::
:: Output:
::
:: Globals:
::
:: Revision:
:: WHO          --WHEN--  WHAT
:: DAB & VI               Original
:: Raju         09/09/94  Modified for Message queue and SPIF
::::::::::::::::::::::::::::::::::::::::::::::::::::::::::::::*/ void vSendManeuver(pSub, relStep, sBurstCount)
SUBSCRIBER *pSub;
short relStep;
short sBurstCount;
{
    FILE *fp;
    int     fd = -1;
    int     armcnt;
    int     cnt;
    char prebuff[MAX_ALTERNATIVE_SIZE];
    char buff[MAX_MSG_SIZE];  /* buff and armtext must be same size */
    char armtext[MAX_MSG_SIZE];  /* armtext and buff must be same size */
    char fromstreet[MAX_ADDRESS_SIZE];
    char tostreet[MAX_ADDRESS_SIZE];
    char *cp;
    char *cp_prev;
    char *cpa;
    short   len;
    short   sThisStep;
    short   packcount;
    short   sDeletefile = 0;
    VBDG_MANEUVER   maneuver;
    VBDG_FINGER     arms[MAX_ALTERNATIVES];
    long cplen, lCurr_fileoffs, lMnvr_overflow, lPrev_fileoffs;

if (pSub->sManeuverCount == 0)
    {
        vMQ_Log(NULL, NULL, 0, "[FRONTEND] ManeuverCount Zero\n");
        return;
    } vMQ_Log(NULL, NULL, 20, "[FRONTEND] ManeuverCount %d status 0x%x\n",
        pSub->sManeuverCount, pSub->lStatus);
    signal(SIGUSR1, SIG_IGN);
    signal(SIGUSR2, SIG_IGN);
```

```
        /* Switch depending on type of data to be transmitted.
        ** maneuvers, QCONF, etc.
        */
        if (pSub->lStatus & (SS_SEND_QCONF | SS_SEND_QPOIS |
SS_SEND_QLANG
            | SS_SEND_QVER | SS_SEND_QFILES ))
        {
            if ((fp = fopen(pSub->caTmpfile, "r")) == (FILE*)NULL)
            {
                vMQ_Log(NULL, NULL, 0, "[FRONTEND] Unable to open
file\n");
                return;
            } ifdef DEBUG
            vMQ_Log(NULL,    NULL,    20,    "[FRONTEND]   Call   to
cpFillQueryBuffer!\n");
endif cp = cpFillQueryBuffer(fp, buff, pSub, sBurstCount);
            fclose(fp);
        }
        else /* default is maneuver */
        {
            if ((fd = open(pSub->caTmpfile, O_RDONLY)) < 0)
            {
                vMQ_Log(NULL, NULL, 0, "[FRONTEND] Unable to open
file %s\n",
                        pSub->caTmpfile);
                return;
            } cp = buff;
            packcount = 0;

lCurr_fileoffs = pSub->lManeuverOffsets[pSub->lMsgid];
            fp = fdopen(fd,"r");

vMQ_Log(NULL, NULL, 21,
                "[FRONTEND] MxPkts %d Msgid %ld Fnm %s Foffs %ld fsz
%ld\n",
                sMaxPackets,    pSub->lMsgid,    pSub->caTmpfile,
lCurr_fileoffs,
                pSub->lQueryFilesize);

lMnvr_overflow = 0;

/* Increment the serverrequest.msgid here */
            if( pSub->lMsgid > 0 && sBurstCount > 1 )
                pSub->ServerRequest.lMsgid++;

while ( lCurr_fileoffs <= pSub->lQueryFilesize )
            {
                ++packcount;
                sThisStep = -20;
                cp_prev = cp;
```

```
                    lseek(fd, lCurr_fileoffs, SEEK_SET);
                    if (packcount > 1) {
                        sprintf(cp, "|\n");
                        cp = cp + strlen(cp);
                    }
                    cplen = lFillMsgFields(pSub, cp);
                    cp += cplen;
                    sprintf(cp,"R|");
                    cp += 2;

armtext[0] = '\0';
                    lPrev_fileoffs = ftell(fp);

while (read(fd, &maneuver, sizeof(maneuver)) ==
                           sizeof(maneuver) &&
                           (sThisStep  ==  -20  ||  maneuver.sStep  ==
sThisStep))
                    {
                        vMQ_Log(NULL, NULL, 21, "[FRONTEND] step %d
length %d\n",
                                maneuver.sStep, maneuver.sTextLength);
                        if (maneuver.sStep != -1 && maneuver.sStep
!= -2 &&
                            maneuver.sStep < 0)
                        {
                            /* This is not an interesting maneuver,
so skip it */
#ifdef DEBUG
                            vMQ_Log(NULL, NULL, 21,
                                    "[FRONTEND] Skip maneuver #%d\n",
maneuver.sStep);
#endif
                            vSkipManeuver(fd, &maneuver);
                            continue;
                        }

/* Get the maneuver text */
                        if (maneuver.sTextLength > 0)
                        {
                            if (*(cp-1) == '|')
                            {
                                /* Need to make sure that a newline
does not
                                ** immediately follow a vertical
bar in text.
                                */
                                read(fd, cp, 1);
                                maneuver.sTextLength--;
                                if (*cp == '\n')
                                {
                                    *cp++ = '\\';
                                    *cp++ = 'n';
                                }
                                else
                                    cp++;
                            }
```

```
                                /* Also want to translate any blank/CR
pairs to an
                                **   escaped   carriage   return   for
transmission.
                                */
                                if (*(cp-1) == ' ' && *cp == '\r')
                                {
                                        *(cp-1) = '\\';
                                        *cp = 'r';
                                } if (maneuver.sTextLength > 0)
                                        cp   +=   read(fd,   cp,
maneuver.sTextLength);
                        }
                        *cp = '\0';

/* Read FROM and TO streets */
                        read(fd, &len, sizeof(len));
#ifdef DEBUG
                        vMQ_Log(NULL, NULL, 21,
                                "[FRONTEND] sThisStep = %d, buflen %d
fromlen %d\n",
                                sThisStep, strlen(buff), len);
endif if (sThisStep == -20 && len > 0)
                        {
                                read(fd, fromstreet, len);
                                fromstreet[len] = '\0';
                                vMQ_Log(NULL, NULL, 21,
                                        "[FRONTEND] FROM STREET <%s>\n",
fromstreet);
                        }
                        else
                                lseek(fd, (long)len, SEEK_CUR);

read(fd, &len, sizeof(len));

if (sThisStep == -20 && len > 0)
                        {
                                read(fd, tostreet, len);
                                tostreet[len] = '\0';
                                vMQ_Log(NULL, NULL, 21,
                                        "[FRONTEND] TO STREET <%s>\n",
tostreet);
                        }
                        else
                                lseek(fd, (long)len, SEEK_CUR);

#ifdef DEBUG
                        vMQ_Log(NULL, NULL,21, "[FRONTEND] token %d,
fingercount %d\n",
                                len, maneuver.cFingerCount);
#endif
```

APPENDIX A — PAGE 158 OF 279

```
                        /* If there are any arms - output that info
*/
                    if (maneuver.cFingerCount > 0)
                    {
                            vMQ_Log(NULL, NULL, 21,
                            "[FRONTEND]   cFingerCount   =   %d\n",
maneuver.cFingerCount);

r e a d ( f d ,         a r m s ,
sizeof(VBDG_FINGER)*maneuver.cFingerCount);

/* There are fingers, so the from/to
streets
                            ** need to be output as part of the arms
info.
                            */
                            cpa = armtext;

if (sThisStep == -20)
                        {
                                vMQ_Log(NULL, NULL, 21, "[FRONTEND]
Add Arms\n");
                                sprintf(cpa,
                                    "|ARM=%s;%s;",   fromstreet,
tostreet);
                                cpa = cpa + strlen(cpa);
                        } for   (armcnt    =    0;    armcnt    <
maneuver.cFingerCount;
                                armcnt++)
                        {
                            /* Do we need ; delimiter? */
                            if (armcnt > 0)
                                *cpa++ = ';';

for (cnt = 0; cnt < 3; cnt++)
                            {
                                if ((cnt > 0 && (
                                        arms[armcnt].X[cnt]   !=
arms[armcnt].X[cnt-1] ||
                                        arms[armcnt].Y[cnt]   !=
arms[armcnt].Y[cnt-1])) ||
                                        cnt == 0)
                                {
                                    /* This set goes out */
                                    if (sThisStep == -20)
                                    {
                                            if (cnt > 0)
                                                *cpa++ = ',';
                                            s p r i n t f ( c p a ,
"%d,%d",
arms[armcnt].X[cnt],
```

```
                                                  arms[amout].Y[cnt]);
                                        cpa    =    cpa    +
strlen(cpa);
                                    }
                                }
                            }
                        }
                    }
                    sThisStep = maneuver.sStep;
                } vMQ_Log(NULL, NULL, 21,
                        "[FRONTEND] offset %ld, ftell %ld size
%ld\n",
                        lCurr_fileoffs, ftell(fp), sizeof(maneuver));

/* Reset the file offset */
                lCurr_fileoffs = ftell(fp) - sizeof(maneuver);
                vMQ_Log(NULL, NULL, 21,
                        "[FRONTEND] bit_map & BIT_ARMS = 0x%x offset
%ld\n",
                        pSub->bit_map & BIT_ARMS, lCurr_fileoffs);

if (pSub->bit_map & BIT_ARMS)
                {
                    strcat(buff, armtext);
                    cp += strlen(armtext);
                }
                cplen = cp - &buff[0];

#ifdef DEBUG
                vMQ_Log(NULL, NULL, 21,
                        "[FRONTEND] is maneuver overflow %ld pack
%ld\n",
                            cplen, pSub->sPacketLimit);
endif /* subtract 15 to accomdate the first two fields
of message */
                /* length and crc and 10 for MORE and 15 for
CONFCONT*/
                if( cplen > (pSub->sPacketLimit - 40) )
                {
                    vMQ_Log(NULL, NULL, 21,
                            "[FRONTEND] maneuver overflow %ld pack
%ld\n",
                            cplen, pSub->sPacketLimit);
                    lMnvr_overflow = 1;
                    break;
                }
            } pSub->lMsgidsent[pSub->lMsgid]    =
pSub->ServerRequest.lMsgid;
        pSub->lNum_msgs++;
```

APPENDIX A — PAGE 160 OF 279

```c
            pSub->lMsgid++;              /* counter for number of messages sent */

/* If the number of messages exceed the max limit, get rid of the
             first one */
          if( pSub->lMsgid > MAX_MANEUVER_MSGS )
              vShiftManeuvers(pSub);

if( lMnvr_overflow == 1 )
          {
              pSub->lManeuverOffsets[pSub->lMsgid]   = lPrev_fileoffs;
              /* Reset cp to point to previous maneuver */
              cp = cp_prev;
          }
          else
              pSub->lManeuverOffsets[pSub->lMsgid]   = lCurr_fileoffs;
          fclose (fp);
      }

/* Are there more maneuvers after this one? */
      if( (pSub->lManeuverOffsets[pSub->lMsgid]   <= pSub->lQueryFilesize) &&
              ( sBurstCount < pSub->sBurstCount ))
      {
          sprintf(cp, "|MORE=Y|");
      }
      else
      {
          sprintf(cp, "|MORE=N|");
          sDeletefile = 1;
      }
      cp = cp + strlen(cp);

if   ((pSub->lManeuverOffsets[pSub->lMsgid]   <= pSub->lQueryFilesize) &&
              (sBurstCount >= pSub->sBurstCount))
      {
          strcat(cp, "CONFCONT=Y|\n");
      }
      else
      {
          strcat(cp, "\n");
          if( sDeletefile == 1)
          {
              pSub->lResponsePending = 0;
          }
      }
      cp = cp + strlen(cp);
      sDeletefile = 0;

/* Compress the maneuver(s) */
      vFixCR(buff);
```

```
        strcat(buff, "\r");
        strcpy(armtext, buff);

vMQ_Log(NULL, NULL, 21, "[FRONTEND] vSendManeuver: Sending
%ld bytes\n",
                strlen(buff));

if( iDebug >= 10 )
        {
            len = strlen(buff);
            cp = &buff[0];
            while( len > 0)
            {
                if( len > 222 )
                {
                    strncpy( armtext, cp, 222);
                    armtext[222] = '\0';
                }
                else
                {
                    strcpy( armtext, cp);
                }
                vMQ_Log(NULL, NULL, 10, "[FRONTEND] MSG [%s]\n",
armtext);
                len = len - 222;
                if( len > 0 )
                    cp = cp + 222;
            }
        } sSendMsg(pSub, (void *)buff, strlen(buff));

if (fd >= 0)
            close(fd);
        return;
}

/*::::::::::::::::::::::::::::::::::::::::::::::::::::::::::::::::
:: Function: vSendRouteFile
::
:: Purpose : Initializes the sending of route maneuvers, and
::           sends the first maneuver.
::
:: Returns:
::
:: Input:
::
:: Output:
::
:: Globals:
::
:: Revision:
:: WHO         --WHEN--  WHAT
:: DAB & VI              Original
:: Raju        09/09/94  Modified for Message queue and SPIF
```

APPENDIX A — PAGE 162 OF 279

```
:::::::::::::::::::::::::::::::::::::::::::::::::::::::::::::*/
vSendRouteFile(pSub)
SUBSCRIBER *pSub;
{
    int     fd;
    long    pos;
    short   len;
    short   sCurrentManeuver;
    short   sBurstCount;
    VBDG_MANEUVER  maneuver;
    char    buff[MAX_ALTERNATIVE_SIZE];

vMQ_Log(NULL, NULL, 21,
            "[FRONTEND] Sending  route  file  to  spifid  %ld\n",
pSub->lSpifID);
    pSub->sManeuverCount = 0;
    pSub->lQueryFilesize = -1;
    sCurrentManeuver = -3;
    pSub->lMsgid = 0;
    memset((char *)&pSub->lMsgidsent, 0, MAX_MANEUVER_MSGS);
    memset((char    *)&pSub->lManeuverOffsets,       0,
MAX_MANEUVER_MSGS);
    pos = 0L;

if ((fd = open(pSub->caTmpfile, O_RDONLY)) < 0) {
        sprintf(buff,"Error   opening   file   %s    [%d]\n",
pSub->caTmpfile, errno );
        vMQ_Log(NULL, NULL, 0,"[FRONTEND] %s\n", buff);
        if(pSub->sResultCode<1) pSub->sResultCode=FEERR_SEER;
        vSendErrorResponse (pSub, buff);
        return;
    } while   (read(fd,    &maneuver,   sizeof(maneuver))    ==
sizeof(maneuver))
    {
        pos = lseek(fd, 0L, SEEK_CUR);

/* Make sure it is a maneuver and not an interloping
        ** text file (error output file) instead. We can infer
        ** this from the latitude - if it is >9,000,000 or
        ** < -9,000,000 then it must be a text file.
        */
        if (maneuver.lLatitude > 9000000 ||
            maneuver.lLatitude < -9000000)
        {
            /* Can't be a route - so send it as an error */
            vMQ_Log(NULL,  NULL,  0,"[FRONTEND]  Can't  be  a
route.\n");
            close(fd);
            vSendErrorFile(pSub);
            return;
        }

/* If this is an interesting maneuver, then remember
```

```
                ** its position in the offset array. It's only
interesting
                ** if it's an actual manuever, or it's the footer
entry.
                ** Backup by the sizeof(maneuver) though, to get the
start.
                */
                if ((maneuver.sStep == -1 || maneuver.sStep == -2 ||
                    maneuver.sStep >= 0) &&
                    sCurrentManeuver != maneuver.sStep)
                {
                    /* Dump maneuver */
#ifdef DEBUG
                    vMQ_Log(NULL, NULL, 21,
                        "[FRONTEND] Interesting maneuver: %ld %ld %d
%d\n",
                        maneuver.lLatitude,
                        maneuver.lLongitude,    maneuver.sStep,
maneuver.sTextLength);
#endif
                    /* An interesting one */
                    pSub->lQueryFilesize = pos - sizeof(maneuver);
                    if( pSub->sManeuverCount == 0 )
                        pSub->lManeuverOffsets[pSub->sManeuverCount]
                                = pSub->lQueryFilesize;
                    pSub->sManeuverCount++;
                    sCurrentManeuver = maneuver.sStep;
                }

/* Now finish reading the maneuver information */
                pos += maneuver.sTextLength;   /* The maneuver text */
                lseek(fd, pos, SEEK_SET);

/* Now the from/two strings that are there (may be
zero) */
                if (read(fd, &len, sizeof(len)) != sizeof(len))
                {
                    /* Technically an error. We'll just assume eof */
                    vMQ_Log(NULL, NULL, 0,"[FRONTEND] Read error.\n");

break;
                }

/* SANITY CHECK ON LENGTH and latitude */
                if (len > 512 || maneuver.lLatitude > 8999999 ||
                    maneuver.lLatitude < -8999999)
                {
                    /* This signals that the file is probably NOT
                    ** a binary route file, but is instead a textual
                    ** i.e. error response file.
                    */
                    vMQ_Log(NULL, NULL, 0,"[FRONTEND] Sanity check
failed.\n");
                    close(fd);
                    vSendErrorFile(pSub);
                    return;
```

APPENDIX A — PAGE 164 OF 279

```c
        } pos += sizeof(len) + len;
        lseek(fd, pos, SEEK_SET);

/* TO */
        if (read(fd, &len, sizeof(len)) != sizeof(len))
        {
            /* Technically an error. We'll just assume eof */
            vMQ_Log(NULL,   NULL,   0,"[FRONTEND]   TO   read error.\n");
            break;
        } pos += sizeof(len) + len;

/* Now position past the arms */
        pos += sizeof(VBDG_FINGER) * maneuver.cFingerCount;
        lseek(fd, pos, SEEK_SET);
    } close(fd);

pSub->sItemCount = pSub->sManeuverCount;
    vHandleAuditLog( NULL, NULL, MQ_MTS_AUDIT_ROUTE_I, lFID, (void *)pSub,
            NULL, 1);
    pSub->lCpu_usage    = 0;

/* Send the first maneuver */
    if (pSub->lStatus & SS_BURST_MODE)
    {
        sBurstCount = 0;
        while((pSub->lManeuverOffsets[pSub->lMsgid]    <= pSub->lQueryFilesize) &&
              ( sBurstCount < pSub->sBurstCount))
        {
            /* Real routes do not have burst limits */
            vSendManeuver(pSub, 1, ++sBurstCount);
            if (sInterPacketGap > 0)
                sleep(sInterPacketGap);
        }
    }
    else
    {
        vMQ_Log(NULL,   NULL,   21,"[FRONTEND]   SendManeuver   0 0.\n");
        vSendManeuver(pSub, 0, 0);
    }
}

/*::::::::::::::::::::::::::::::::::::::::::::::::::::::::::::::::::
:: Function: vSendQueryFile
::
:: Purpose : Prepare to send a query response file back to
```

APPENDIX A — PAGE 165 OF 279

```
::              the client process.
::
:: Returns:
::
:: Input:
::
:: Output:
::
:: Globals:
::
:: Revision:
:: WHO          --WHEN--   WHAT
:: DAB & VI                Original
:: Raju         09/09/94   Modified for Message queue and SPIF
::::::::::::::::::::::::::::::::::::::::::::::::::::::::::::*/ vSendQueryFile(pSub)
SUBSCRIBER *pSub;
{
    FILE *fp;
    long pos = 0L;
    long lTmpsize;
    short    len;
    short    burst_count;
    char buff[MAX_ALTERNATIVE_SIZE];

vMQ_Log(NULL, NULL, 21,
        "[FRONTEND] Sending  Query  file  to  spifid  %ld\n",
pSub->lSpifID);
    pSub->sManeuverCount = 0;
    pSub->lMsgid = 0;
    pSub->lQueryFilesize = 0;
    memset((char *)&pSub->lMsgidsent, 0, MAX_MANEUVER_MSGS);
    memset((char   *)&pSub->lManeuverOffsets,   0,
MAX_MANEUVER_MSGS);

/* Check for possible message file instead */
    buff[0] = 'm';
    strcpy(buff+1, pSub->caTmpfile);
    if ((fp = fopen(buff, "r")) != (FILE*)NULL)
    {
        fclose(fp);
        vSendErrorFile(pSub);
        return;
    } if ((fp = fopen(pSub->caTmpfile, "r")) == (FILE*)NULL)
    {
        sprintf(buff, "Error  opening  query  file  name  %s
[%d]\n",
            pSub->caTmpfile, errno );

if(pSub->sResultCode<1) pSub->sResultCode=FEERR_SVGD;
        vSendErrorResponse( pSub, buff );

return;
```

APPENDIX A — PAGE 166 OF 279

```c
        } lTmpsize = -1;
        while( fgets(buff, sizeof(buff), fp) != NULL)
        {
            pSub->sManeuverCount++;
            lTmpsize = pSub->lQueryFilesize;
            pSub->lQueryFilesize = ftell(fp);
        }
        pSub->lQueryFilesize = lTmpsize;

/* Send the first maneuver */
        if ( lTmpsize == -1 )
        {
            if(pSub->sResultCode<1) pSub->sResultCode=FEERR_NOAV;
            vSendErrorResponse( pSub, "No POIs available");
        }
        else if (pSub->lStatus & SS_BURST_MODE)
        {
            burst_count = 0;
            while((pSub->lManeuverOffsets[pSub->lMsgid]      <=
pSub->lQueryFilesize) &&
                (burst_count < pSub->sBurstCount))
            {
                vSendManeuver(pSub, 1, ++burst_count);
                if (sInterPacketGap > 0)
                    sleep(sInterPacketGap);
            }
        }
        else
            vSendManeuver(pSub, 0, 0);

}

/*::::::::::::::::::::::::::::::::::::::::::::::::::::::::::::::::::
:: Function: vMakeUpper
::
:: Purpose : Make a string all upper case
::
:: Returns:
::
:: Input:
::
:: Output:
::
:: Globals:
::
:: Revision:
:: WHO           --WHEN--   WHAT
:: DAB & VI                 Original
:: Raju          09/09/94   Modified for Message queue and SPIF
::::::::::::::::::::::::::::::::::::::::::::::::::::::::::::::::::::*/ void vMakeUpper(buff)
```

```c
char *buff;
{
    while (*buff != '\0')
    {
        if (islower(*buff))
            *buff = toupper(*buff);
        buff++;
    }
}

/*::::::::::::::::::::::::::::::::::::::::::::::::::::::::::::::::
:: Function: sDecodeLine
::
:: Purpose : Decodes the buffer and sends it to appropiate
routine.
::
:: Returns:
::
:: Input:
::
:: Output:
::
:: Globals:
::
:: Revision:
:: WHO          --WHEN--  WHAT
:: DAB & VI               Original
:: Raju         09/09/94  Modified for Message queue and SPIF
::::::::::::::::::::::::::::::::::::::::::::::::::::::::::::::::*/ short    sDecodeLine(char *buff, char **param, long *lValue)
{
    struct    sDecodeTable    *sp;
    char                      *cp;

sp = sDecodeTable;

while (sp->name != NULL)
    {
        if (strncasecmp(buff, sp->name, strlen(sp->name)) == 0)
        {
            /* Remove trailing comments and white space */
            if ((cp = strrchr(buff, '#')) != NULL)
            {
                *cp = '\0';
            }

/* Now the trailing white space */
            cp = buff + strlen(buff) - 1;
            while (*cp == ' ' || *cp == '\t')
                *(cp--) = '\0';

if ((cp = strchr(buff, '=')) == NULL)
            {
```

```c
                    *lValue = 0L;
                    cp = buff + strlen(buff) - 1;
                    *param = cp;
                    return sp->sValue;
                }
                else
                {
                    cp++;
                    while (*cp == ' ' || *cp == '\t')
                        cp++;
                    *lValue = strtol(cp, NULL, 0);
                    *param = cp;
                    return sp->sValue;
                }
            }
            sp++;
        } return 0;
}

/*::::::::::::::::::::::::::::::::::::::::::::::::::::::::::::::::::::::
:: Function: lRead_config
::
:: Purpose : Reads the config file.
::
:: Returns:
::
:: Input:
::
:: Output:
::
:: Globals:
::
:: Revision:
:: WHO           --WHEN--   WHAT
:: DAB & VI                 Original
:: Raju          09/09/94   Modified for Message queue and SPIF
::::::::::::::::::::::::::::::::::::::::::::::::::::::::::::::::::::::*/ long lRead_config(ifp)
FILE *ifp;
{
    char buff[128];
    char *cp;
    long again = 1;
    long    lValue;

/* Read until we get to the init strings */
    while (again != 0 && fgets(buff, sizeof(buff), ifp) != NULL)
    {
        if (buff[0] == '#')
            continue;    /* A comment line */
        buff[strlen(buff)-1] = '\0';
        switch(sDecodeLine(buff, &cp, &lValue))
```

```
            {
         case MC_PACKETSIZE:
                vMQ_Log(NULL,     NULL,     20,     "[FRONTEND]
MC_PACKETSIZE: %ld\n",
                        lValue);
                if   ((sPacketLimit   =    lValue)    <
sMinPacketLimit)
                {
                    vMQ_Log(NULL, NULL, 0,
                        "[FRONTEND] Packet size %ld not >=
512. Using 512\n",
                        lValue);
                    sPacketLimit = sMinPacketLimit;
                }
                break;

case MC_PACKETHEADER:
                sPacketFlag = (short)lValue;
                vMQ_Log(NULL,     NULL,     20,     "[FRONTEND]
MC_PACKETHEADER: %ld\n",
                        lValue);
                break;

case MC_BAUD:
                sDefaultBaud = (short)lValue;
                vMQ_Log(NULL, NULL, 20, "[FRONTEND] MC_BAUD:
%ld\n", lValue);
                break;

case MC_INTERPACKETGAP:
                sInterPacketGap = (short)lValue;
                vMQ_Log(NULL,     NULL,     20,     "[FRONTEND]
MC_INTERPACKETGAP: %ld\n",
                        lValue);
                break;

case MC_TRANSMITSIZE:
                sTransmitLimit = (short)lValue;
                vMQ_Log(NULL,     NULL,     20,     "[FRONTEND]
MC_TRANSMITSIZE: %ld\n",
                        lValue);
                break;

case MC_CONFIRMREQMAX:
                sConfirmMax = (short)lValue;
                vMQ_Log(NULL,     NULL,     20,     "[FRONTEND]
MC_CONFIRMREQMAX: %ld\n",
                        lValue);
                break;

case MC_INIT:
                vMQ_Log(NULL,     NULL,     20,     "[FRONTEND]
MC_INIT:\n");
                again = 0;
                break;
```

```
                case MC_SOCKETPORT:
                        vMQ_Log(NULL,    NULL,20,"[FRONTEND]
MC_SOCKETPORT: %d\n", lValue);
                        socket_port_num = (int)lValue;
                        break;

case    MC_HEARTBEAT:
                        vMQ_Log(NULL,    NULL,20,    "[FRONTEND]
MC_HEARTBEAT: %d\n", lValue);
                        lHeartbeat = lValue;
                        break;

case    MC_HEARTBEAT_WAIT:
                        vMQ_Log(NULL,    NULL,20,    "[FRONTEND]
MC_HEARTBEAT_WAIT: %d\n",
                                lValue);
                        lHeartbeat_wait = lValue;
                        break;

case    MC_DBETIMEOUT:
                        vMQ_Log(NULL,    NULL,20,    "[FRONTEND]
MC_DBETIMEOUT: %d\n",
                                lValue);
                        lDBETimeout = lValue;
                        break;
            }
        }
        return( 1 );
}

/*::::::::::::::::::::::::::::::::::::::::::::::::::::::::::::::::::
:: Function: lFillMsgFields
::
:: Purpose : Fills the message fields for sending the message.
::
:: Returns:
::
:: Input:
::
:: Output:
::
:: Globals:
::
:: Revision:
:: WHO          --WHEN--  WHAT
:: DAB & VI               Original
:: Raju         09/09/94  Modified for Message queue and SPIF
::::::::::::::::::::::::::::::::::::::::::::::::::::::::::::::::::*/ long lFillMsgFields(SUBSCRIBER *pSub, char *cp)
{
    time_t   now;
    char *cp_start;

vMQ_Log(NULL, NULL, 21, "[FRONTEND] Filling Message\n");
```

```c
      /* Put in timestamp for message */
      time(&now);
      cp_start = cp;

sprintf(cp, "|%.8x|%s|%.4x|%s|",now, pSub->caSCR,
            pSub->ServerRequest.lMsgid, pSub->ServerRequest.caID);

cp += strlen(cp);
      return(cp - cp_start);
}

/*:::::::::::::::::::::::::::::::::::::::::::::::::::::::::::::::::::
:: Function: vDeleteTmpfile
::
:: Purpose : Deletes temporary file if present.
::
:: Returns:
::
:: Input:
::
:: Output:
::
:: Globals:
::
:: Revision:
:: WHO            --WHEN--   WHAT
:: Raju           12/27/94   Original
:::::::::::::::::::::::::::::::::::::::::::::::::::::::::::::::::::*/
void vDeleteTmpfile(SUBSCRIBER *pSub)
{
      time_t   now;
      char  caTmpfile[100];

vMQ_Log(NULL, NULL, 21, "[FRONTEND] Deleting tempfile %s\n",
            pSub->caTmpfile );
      sprintf( caTmpfile, "tmp.%ld.%ld", getpid(), pSub->lSpifID);
      if( strcmp( pSub->caTmpfile, caTmpfile ) != 0 )
      {
#ifdef DELETE
            unlink(pSub->caTmpfile);
#endif
            strcpy(pSub->caTmpfile, caTmpfile);
            pSub->sManeuverCount = 0;
      } return;
}
```

```
/* Copyright (C) 1994,1995 SEI Information Technology, Inc. */
static    char *  _ s c c s _   =   { "    $ S o u r c e :
/ids/cvs/host/fe_spif/src/fe_handles.c,v $ Ver: $Revision: 1.10
$ Date: $Date: 1995/05/26 00:12:15 $"};

/*:::::::::::::::::::::::::::::::::::::::::::::::::::::::::::::
:::::::::::::::::
:: Filename:   fe_handles.c
::
:: Purpose :   Handles for requests and responses from the SPIF
::             and requests and responses from backend.
::
:: Revision:
:: WHO         --WHEN--   WHAT
:: Raju        08/28/94   Original
:::::::::::::::::::::::::::::::::::::::::::::::::::::::::::::::
::::::::::::::::*/ include <stdio.h>
include <errno.h>
#include <sys/socket.h>
#include <sys/socketvar.h>
#include <netinet/in.h>
#include <sys/wait.h>
#include <sys/resource.h>
#include <time.h>
#include <signal.h>
#include <fcntl.h>
#include <string.h>
#include <ctype.h>
#include <sys/time.h>
include <sys/ipc.h> include "gdefines.h"
include "gerror.h"
#include "utdispm.h"
#include "mq_pub.h"
#include "queue.h"
#include "spif.h"
#include "fe_common.h"
#include "fe_spif.h"

define   TEMP_BUFF_SIZE      80 extern long     lQID;
extern long        lFID;
extern long        lSize;
extern int         iDebug;
extern int         argcnt;
extern long        lg_addr;
extern int         bit_map;
extern long     lfe_tcp;
extern long     lFrontID;
extern long        lAddress;
extern int         iDataPort;
```

APPENDIX A — PAGE 173 OF 279

```
extern int          last_baud;
extern time_t       start_time;
extern long         lHeartbeat;
extern int          iListenPort;
extern short        sMaxPackets;
extern short        sPacketFlag;
extern int       ipacketflag;
extern short        sConfirmMax;
extern short     sAckPending;
extern long      lMap_format;
extern long      lFormat_mode;
extern short            sDefaultBaud;
extern short            sPacketLimit;
extern int          iQueue_master;
extern long             lLastCommtime;
extern long             lLastCommtime;
extern long             lConstantBaud;
extern long      lCompress_mode;
extern long             lDisplay_panes;
extern short            sTransmitLimit;
extern long             lHeartbeat_wait;
extern int          socket_port_num;
extern short            sInterPacketGap;
extern struct           sockaddr_in addr;
extern short            sProcess_heartbeat;
extern short     sTerm_After_Service;
extern long             lExit_on_disconnect;
extern unsigned long    ulSessionID;
extern short     sGateDisconnectFlag;

extern void         *pMQU_master;
extern void         *pvMQ_master;

extern char         *cpQID;
extern char         *cpFrontID;
extern char      *cpConfigPath;
extern char             *caCommDevice;
extern char             *caDeviceConfig;
extern char      *cpDownload_dir;
extern char      *cpDictionary_dir;

extern char         caID[];
extern char         caBuff[];
extern char         caHangup[];
extern char         caOrigin[];
extern char         caOriginType[];
extern char         caLimitValue[];
extern char         caDestination[];
extern char         caNoAutoAnswer[];
extern char         caDestinationType[];

extern char         *caAlternative[];

extern Q_HEAD       sHead;
extern Q_HEAD       sConfig;
extern Q_HEAD       *pQhead;
```

```
extern Q_HEAD      *pQConfig;
extern FILE        *pMsgsfile;
extern SUBSCRIBER  *pGSub;

void vFeGateDisconnect_all();

/*::::::::::::::::::::::::::::::::::::::::::::::::::::::::::::::::::
::::::::::
:: Function:   sSendHeader
::
:: Purpose: Send the SPIF header.
::
:: Returns:    SUCCESS or FAILURE.
::
:: Input:
::
:: Output :
::
:: Globals:
::
:: Called routines :
::
:: Revision:
:: WHO          --WHEN--  WHAT
:: Raju         10/19/94  Original
::::::::::::::::::::::::::::::::::::::::::::::::::::::::::::::::::::
:::::::::*/
short sSendHeader( lMsgsize, lSpifID, lMsgtype )
long lMsgsize;
long lSpifID;
long lMsgtype;
{
    char    caBuffer[TEMP_BUFF_SIZE];
    long    now;
    struct tm *pTime;
    SPIF_HEADER spif_header;

if( lSpifID == -1 )
    {
        pGSub->lTrx_count++;
    }

/* write the header information first */
    sprintf(caBuffer,"%c",sync[0]);
    mod_write(pGSub->iCommPort, caBuffer, 1);
    sprintf(caBuffer,"%c",sync[1]);
    mod_write(pGSub->iCommPort, caBuffer, 1);
    sprintf(caBuffer,"%c",sync[2]);
    mod_write(pGSub->iCommPort, caBuffer, 1);
    sprintf(caBuffer,"%c",sync[3]);
    mod_write(pGSub->iCommPort, caBuffer, 1);

vMQ_Log(NULL, NULL, 10,
```

```
                      "[FRONTEND] SENT HEADER size %ld SPIFID %ld type
%ld \n",
                   lMsgsize, lSpifID, lMsgtype);
     mod_write(pGSub->iCommPort, &lMsgsize, sizeof(long));
     mod_write(pGSub->iCommPort, &lSpifID, sizeof(long));
     mod_write(pGSub->iCommPort, &lMsgtype, sizeof(long));

#ifdef DEBUG
     /* file fe_spif.msgs */
     if( iDebug > 5 )
     {
          now = time(0L);
          pTime = localtime(&now);

fprintf( pMsgsfile,"\n %.2d/%.2d/%.2d  %.2d:%.2d:%.2d
",
                pTime->tm_mon+1,
                pTime->tm_mday,
                pTime->tm_year,
                pTime->tm_hour,
                pTime->tm_min,
                pTime->tm_sec);

fprintf( pMsgsfile," SENT Header [ID %ld Type %ld Size
%ld]\n",
                lSpifID, lMsgtype, lMsgsize);
          fflush( pMsgsfile );
     }
endif return(SUCCESS);
}

/*:::::::::::::::::::::::::::::::::::::::::::::::::::::::::::::::
:::::::::::
:: Function:   vLoadVariablesFe
::
:: Purpose:    This routine loads the variable overlay area with
data when
::                    r e c o r d    t y p e    i s    r o u t e
request(lRecordType=AU_ROUTE) or POI query
::                    (AU_QUERY_POI). Most of the data are found
in the subscriber
::                    structure.
::
:: Returns: none
::
:: Input :  pointer to Audit record
::          pointer to Subscriber data
::
:: Output:  none
::
:: Globals:
::
:: Called Routines:
```

APPENDIX A - PAGE 176 OF 279

```
::
:: Revision:
:: WHO         --WHEN--   WHAT
:: Raju        08/28/94   Original
::::::::::::::::::::::::::::::::::::::::::::::::::::::::::::::::
:::::::::::::::*/ void vLoadVariablesFe(pAudFe, pSub)
MQ_AUDIT_FE    *pAudFe;
SUBSCRIBER     *pSub;
{
    if (pSub == NULL)
        return;

#ifdef DEBUG
    vMQ_Log(NULL, NULL, 20,
        "[FRONTEND] vLoadVariablesFe o %s, ot %s, d %s, dt %s,
 l %ld, lt %s\n",
        pSub->ServerRequest.caOrigin,
        pSub->ServerRequest.caOriginType,
        pSub->ServerRequest.caDestination,
        pSub->ServerRequest.caDestinationType,
        pSub->ServerRequest.lDestinationLimit,
        pSub->ServerRequest.caDestinationLimitType);
endif /* update the audit structure with information in the
subscriber struct */
    strcpy(pAudFe->vars.RouteInfo.caOrigin,
pSub->ServerRequest.caOrigin);
    strcpy(pAudFe->vars.RouteInfo.caOriginType, pSub->ServerRequest.caOriginType);
    strcpy(pAudFe->vars.RouteInfo.caDestination, pSub->ServerRequest.caDestination);
    strcpy(pAudFe->vars.RouteInfo.caDestinationType, pSub->ServerRequest.caDestinationType);
    pAudFe->vars.RouteInfo.usDestinationLimit= pSub->ServerRequest.lDestinationLimit;
    strcpy(pAudFe->vars.RouteInfo.caDestinationLimitType, pSub->ServerRequest.caDestinationLimitType);
ifdef DEBUG
    vMQ_Log(NULL, NULL, 20,
        "[FRONTEND] ret vLoadVariablesFe o %s ot %s d %s dt %s
 l %ld lt %s\n",
        pAudFe->vars.RouteInfo.caOrigin,
pAudFe->vars.RouteInfo.caOriginType,
        pAudFe->vars.RouteInfo.caDestination,
        pAudFe->vars.RouteInfo.caDestinationType,
        pAudFe->vars.RouteInfo.usDestinationLimit,
        pAudFe->vars.RouteInfo.caDestinationLimitType);
#endif
```

APPENDIX A — PAGE 177 OF 279

```
    return·
}

/*::::::::::::::::::::::::::::::::::::::::::::::::::::::::::::::
:::::::::
:: Function:    vAuditLogFe
::
:: Purpose:     This routine loads the data for the audit log. The
record layout
::              can be found in the auditlog.doc design document.
This record
::              is binary.  Most of the data are supplied by the
subscriber
::              struture.
::
:: Returns:     None.
::
:: Input:
::         long lRecordType - values, begin with AU_ are defined
in
::                         audit.h
::         long  lFID       -
::         SUBSCRIBER *pSubscriber - pointer the subscriber data
::         void *pVariable  - pointer to the variable information
that
::                         is not part of the subscriber data.
::                         For example, client message.
::             long lMySubType  - Front end ID.
::             short sflag      - Flag  to  indicate  acknowledge
required or not
::                              0 indicates acknowledge not
needed and
::                              1  indicates  acknowledge
needed.
::
:: Output : none
::
:: Globals:
::
:: Called routines :    vLoadVariablesFe
::
:: Revision:
:: WHO          --WHEN--  WHAT
:: Raju         08/28/94  Original
:::::::::::::::::::::::::::::::::::::::::::::::::::::::::::::::::
:::::::::*/ void    vAuditLogFe(pwatch,   lRecordType,   lFID,   pSubscriber,
pVariable, lMySubType,
sflag)
void            *pwatch;
long            lRecordType;
long            lFID;
SUBSCRIBER      *pSubscriber;
void            *pVariable;
```

APPENDIX A — PAGE 178 OF 279

```c
long        lMySubType;
short       sflag;
{
    int             i;
    FILE            *fp;
    MQ_AUDIT_FE     *pAuditFe;
    SUBSCRIBER      *pSub;
    MQ_HEADER       *mqHeader;
    long            lsize, lLength;
    time_t          now;

lsize = sizeof(MQ_HEADER)+sizeof(MQ_AUDIT_FE)-sizeof(mqHeader->caBody);

vMQ_Log(NULL, NULL, 20,
            "[FRONTEND] vAuditLogFe type %ld, fid %ld \n",
    lRecordType, lFID);

if ((mqHeader = (MQ_HEADER *)malloc(lsize)) == NULL)
    {
        vMQ_Log(NULL,   NULL,   0,   "[FRONTEND]   Could   not
allocate\n");
        vFeGateDisconnect_all(GATEDISCONNECT_BY_OPERATOR);
    }
    pAuditFe = (MQ_AUDIT_FE *)mqHeader->caBody;
    pSub = pSubscriber;

/*
    ** Load data for the audit record
    */
    if( sflag == 1)
    {
        mqHeader->lMessageType     =    MQ_MT_AUDIT      |
MQ_MT_ACKNOWLEDGE_REQUIRED;
    }
    else
    {
        mqHeader->lMessageType  = MQ_MT_AUDIT;
    } mqHeader->lMessageSubType = lRecordType;         /* record
type  */
    mqHeader->lSenderNode   = gethostid();  /* IP Address of
host */ if (pSub != (SUBSCRIBER *)NULL)
    {
    pAuditFe->lResultCode = pSub->sResultCode; /* calculation
result code */
    strcpy(pAuditFe->caSubscriberID, pSub->caSCR);
    strcpy(pAuditFe->caUnitID, pSub->ServerRequest.caID);
    pAuditFe->lSessionID    = pSub->lSessionID; /* Session ID
*/
        pAuditFe->lCPUTime = 0;
    pAuditFe->lTxCnt = pSub->lTrx_count;      /* tramsmission
count */
```

APPENDIX A — PAGE 179 OF 279

```c
      pAuditFe->lRxCnt = pSub->lRcv_count;    /* receiving count
*/
      pAuditFe->sInformationCount = pSub->sManeuverCount;
      }
ifdef DEBUG
      vMQ_Log(NULL, NULL, 20,
         "[FRONTEND] Audit %s, %s, %ld, %ld, %ld, %ld, %d\n",
            pAuditFe->caSubscriberID,
            pAuditFe->caUnitID,
            pAuditFe->lResultCode,
            pAuditFe->lSessionID,
            pAuditFe->lTxCnt,
            pAuditFe->lRxCnt,
            pAuditFe->sInformationCount);
endif /*
      ** Load  data  for  the  variable  portion,  record  type
dependent, of
      ** the audit record.
      */ switch(lRecordType)
      {
            case   MQ_MTS_AUDIT_QUMETRO_I:
            case   MQ_MTS_AUDIT_QULANGUAGE_I:
            case   MQ_MTS_AUDIT_CLLOGIN:
                   pAuditFe->lCPUTime = 0;
                   break;

case   MQ_MTS_AUDIT_ROUTE_I:
              case   MQ_MTS_AUDIT_QUPOI_I:
                    /* CPU time for calculation */
                  pAuditFe->lCPUTime = pSub->lCpu_usage;
                  vLoadVariablesFe(pAuditFe, pSubscriber);

vMQ_Log(NULL, NULL, 21,
                        "[FRONTEND] VariablesFe o %s ot %s d %s dt
%s l %ld lt %s\n",
                           pAuditFe->vars.RouteInfo.caOrigin,
                           pAuditFe->vars.RouteInfo.caOriginType,
                           pAuditFe->vars.RouteInfo.caDestination,
                           pAuditFe->vars.RouteInfo.caDestinationType,
                           pAuditFe->vars.RouteInfo.usDestinationLimit, pAuditFe->vars.RouteInfo.caDestinationLimitType);
                  break;

case   MQ_MTS_AUDIT_BUGRPT:
                   if (pSub != (SUBSCRIBER *)NULL)
                   {
                        for( i = 0; i < 8; i++)
                        {
                              if(strncmp(
```

```
                pSub->ServerRequest.aAlternatives[i].caAlternatives,
                            "BGRPT=", 6) == 0)
                        {
                        strcpy(pAuditFe->vars.Bugrpt.caBugrpt,
pSub->ServerRequest.aAlternatives[i].caAlternatives+6);
                        break;
                        }
                    }
                }
            break;

case  MQ_MTS_AUDIT_DOWNLOAD_I:
                if (pSub != (SUBSCRIBER *)NULL)
                {
                strcpy(pAuditFe->vars.DownLoad.caPath,
pSub->caTmpfile);
                        pAuditFe->vars.DownLoad.lFileSize   =
pSub->lQueryFilesize;
                }
            break;

case  MQ_MTS_AUDIT_SELMETRO_I:
                if (pSub != (SUBSCRIBER *)NULL)
                {
                strcpy(pAuditFe->vars.SelMetro.caMetro,
pSub->caConfig);
                }
            break;

case  MQ_MTS_AUDIT_SELLANGUAGE:
                if (pSub != (SUBSCRIBER *)NULL)
                {
                strcpy(pAuditFe->vars.SelLang.caLanguage,
pSub->caLanguage);
                }
            break;

case  MQ_MTS_AUDIT_CLLOGOUT:
                if (pSub !=(SUBSCRIBER *)NULL)
                {
                    now = time(0L);
                pAuditFe->vars.LogoutInfo.lTotalTime   =    now   -
pSub->tstart_time;
                pAuditFe->vars.LogoutInfo.lTotalRouteReq   =
pSub->lRoute_count;
                    pAuditFe->vars.LogoutInfo.lTotalQueryReq =
                            pSub->lExternalQuery_count    +
pSub->lInternalQuery_count;
                }
            break;
    } vMQ_FillHeader    (mqHeader,    MQ_GADDR_AUDIT,    0,
mqHeader->lMessageType,
```

APPENDIX A — PAGE 181 OF 279

```
            lRecordType, lMySubType);

/*
    ** send the mesage to the Audit logger
    */
    if((lLength = lMQ_QueueWrite(pvMQ_master, (void *)mqHeader,
lsize, 0))
            != lsize)
    {
        vMQ_Log(NULL, NULL, 0,
                "[FRONTEND] QWrite audit message failed wrote %ld
actual len %ld\n",
                lLength, lsize);
        vFeHandleTerminate(TERMINATE_NORMAL);
    } free( mqHeader );
    return;
}

/*::::::::::::::::::::::::::::::::::::::::::::::::::::::::::::::::
::::::::::
:: Function:    vHandleAuditLog
::
:: Purpose:     Handle for auditlog.
::
:: Returns:     None.
::
:: Input:
::      long lRecordType - values, begin with AU_ are defined
in
::                         audit.h
::      long   lFID      -
::      SUBSCRIBER *pSubscriber - pointer the subscriber data
::      void *pVariable  - pointer to the variable information
that
::                         is not part of the subscriber data.
::                         For example, client message.
::          long lMySubType  - Front end ID.
::          short sflag      - Flag to indicate acknowledge
required or not
::                             0 indicates acknowledge not
needed and
::                             1 indicates acknowledge
needed.
::
:: Output : none
::
:: Globals:
::
:: Called routines :
::
:: Revision:
:: WHO           --WHEN--  WHAT
:: Raju          08/28/94  Original
```

APPENDIX A — PAGE 182 OF 279

```
:::::::::::::::::::::::::::::::::::::::::::::::::::::::::::::::::::
::::::::*/ void    vHandleAuditLog(void   *qwatch,   void   *config,   long
lRecordType, long  lFID,
        SUBSCRIBER *pSub, void *pVariable, short sflag)
{
    vMQ_Log(NULL, NULL, 21,
            "[FRONTEND] AUDITREQ request %d from frontend %ld\n",
            sAckPending, lRecordType);

vAuditLogFe(qwatch, lRecordType, lFID, pSub, pVariable,
lFrontID, sflag);

if(sAckPending == 0)
    {
        lLastCommtime = time(0L);
    } sAckPending++;
    return;
}

/*:::::::::::::::::::::::::::::::::::::::::::::::::::::::::::::::::
::::::::::
:: Function:    vFeHandleAcknowledge_all
::
:: Purpose: Acknowledge handle for audit/Route/POI etc.
::
:: Returns:     None.
::
:: Input:       Pointer to Dispatch table, message type, message
subtype and
::              mq_header pointer.
::
:: Output : none
::
:: Globals:
::
:: Called routines :
::
:: Revision:
:: WHO          --WHEN--  WHAT
:: Raju         08/28/94  Original
:::::::::::::::::::::::::::::::::::::::::::::::::::::::::::::::::::
::::::::*/ void    vFeHandleAcknowledge_all(pconfig, pqwatch, ptDTable,
lMessageType,
            lMessageSubType, plHeader)
void    *pconfig, *pqwatch, *ptDTable;
long lMessageType, lMessageSubType;
void *plHeader;
{
    MQ_HEADER       *pHeader;
```

```
      pHeader = (MQ_HEADER *)plHeader;
      sAckPending--;
      vMQ_Log(NULL, NULL, 21,
              "[FRONTEND] Received Acknowledgement from %ld.\n",
pHeader->lSenderPID);
      vMQ_Log(NULL, NULL, 51,
              "[FRONTEND] Yet to receive %d acknowledgements\n",
sAckPending);
      lLastCommtime = time(0L);
      return;
}

/*:::::::::::::::::::::::::::::::::::::::::::::::::::::::::::::::::
:::::::::::
:: Function:    vFeHandleSetdebug_all
::
:: Purpose: setdebug handle.
::
:: Returns:     None.
::
:: Input:       Pointer to Dispatch table, message type, message
subtype and
::              mq_header pointer.
::
:: Output : none
::
:: Globals:
::
:: Called routines :
::
:: Revision:
:: WHO          --WHEN--  WHAT
:: Raju         08/28/94  Original
:::::::::::::::::::::::::::::::::::::::::::::::::::::::::::::::::::
::::::::*/
void        vFeHandleSetdebug_all(pconfig, pqwatch, ptDTable,
lMessageType,
            lMessageSubType, plHeader)
void    *pconfig, *pqwatch, *ptDTable;
long lMessageType, lMessageSubType;
void *plHeader;
{
      MQ_HEADER     *pHeader;
      char          caTempFilename[36];

pHeader = (MQ_HEADER *)plHeader;
      iDebug = *(long *)pHeader->caBody;
      vMQ_Log(NULL, NULL, 10, "[FRONTEND]setdebug debug level to
%d\n", iDebug);

#ifdef DEBUG
      if( (iDebug > 5) && (pMsgsfile == NULL))
      {
           sprintf( caTempFilename,"msgs.%ld",getpid());
```

```c
            if((pMsgsfile = fopen(caTempFilename,"w")) == NULL)
            {
                fprintf(stderr,"\n Unable to open msgs.pid\n");
                fprintf(stderr," Exiting\n");
                exit(0);
            }
        }
endif return;
}

/*:::::::::::::::::::::::::::::::::::::::::::::::::::::::::::::::::::::::
:::::::::::
:: Function:    vFeHandleAddservice_all
::
:: Purpose: AddService handle.
::
:: Returns:     None.
::
:: Input:       Pointer to Dispatch table, message type, message
subtype and
::              mq_header pointer.
::
:: Output : none
::
:: Globals:
::
:: Called routines :
::
:: Revision:
:: WHO          --WHEN--  WHAT
:: Raju         08/28/94  Original
:::::::::::::::::::::::::::::::::::::::::::::::::::::::::::::::::::::::
::::::::*/ void    vFeHandleAddservice_all(pconfig, pqwatch, ptDTable, lMessageType,
            lMessageSubType, plHeader)
void    *pconfig, *pqwatch, *ptDTable;
long    lMessageType, lMessageSubType;
void    *plHeader;
{
    MQ_OP_ADDSERVICE *pAddService;
    MQ_HEADER         *pHeader;
    Q_ELEM              *pconfig_elem;
    Q_HEAD              *pConfig;
    CONFIGTABLE         sTable, *pTable = &sTable;

vMQ_Log(NULL, NULL, 20, "[FRONTEND] Received AddService request\n");

/* Get the request from the monitor */
    pHeader = (MQ_HEADER *)plHeader;
```

APPENDIX A — PAGE 185 OF 279

```
        pAddService = (MQ_OP_ADDSERVICE *)pHeader->caBody;
        strcpy( pTable->caName, pAddService->caName);
        strcpy(pTable->caDescription, pAddService->caDescription);

pconfig_elem = q_new(pTable,sizeof(CONFIGTABLE));

pConfig = pQConfig;
        q_atail(pConfig,pconfig_elem);

return;
}

/*::::::::::::::::::::::::::::::::::::::::::::::::::::::::::::::::
:::::::::::
:: Function:    vFeSubConnect_all
::
:: Purpose: Handle to connect the subscriber.
::
:: Returns:    None.
::
:: Input:       SPIF header, message and flag to indicate gateway
or subscriber.
::
:: Output : none
::
:: Globals:
::
:: Called routines :
::
:: Revision:
:: WHO          --WHEN--  WHAT
:: Raju         08/28/94  Original
:::::::::::::::::::::::::::::::::::::::::::::::::::::::::::::::::
::::::::*/
void    vFeSubConnect_all(pSpifHeader, Msg, flag)
SPIF_HEADER *pSpifHeader;
char *Msg;
short flag;
{
    SUBSCRIBER *pSub;
    MQ_HEADER *mqHeader;
    MQ_OP_VALIDATE_Q *pValidate;
    long lg_addr;
    long lSize;

/* increment the global session ID counter */
    ulSessionID++;

/* check if gateway is logged in and validated. */
    if( (pGSub->sGatewayFlag == 0) || (pGSub->iValidated == 0)
            || pGSub == NULL)
    {
        vMQ_Log(NULL,   NULL,  0,   "[FRONTEND]  Gateway  not
logged/Validated\n");
```

APPENDIX A — PAGE 186 OF 279

```
            vFeHandleTerminate(TERMINATE_ABORT);
    } vMQ_Log(NULL, NULL, 21, "[FRONTEND] Calling AddSub\n");
    /* Add the subscriber to the subscriber list */
    if( (pSub = pAddSub(pSpifHeader, Msg)) == NULL);
    {
        /* Get a pointer to the subscriber */
        if( (pSub = pFindSpifID( pSpifHeader->lSpifID )) ==
NULL)
        {
            vMQ_Log(NULL, NULL, 0, "[FRONTEND] Subscriber not
Added\n");
            vFeHandleTerminate(TERMINATE_NORMAL);
        }
    } vMQ_Log(NULL,    NULL,    21,    "[FRONTEND]    VALIDATE
scr=%s,spifid=%ld\n",
                pSub->caSCR, pSub->lSpifID);

/* Global Address of Validate process */
    lg_addr = MQ_GADDR_VALIDATE;
    lSize = MQ_MESSAGE_SIZE2(MQ_OP_VALIDATE_Q,mqHeader);

if((mqHeader = (MQ_HEADER *)malloc(lSize)) == NULL)
    {
        vMQ_Log(NULL, NULL, 0, "[FRONTEND] Unable to alocate
memory");
        vFeHandleTerminate(TERMINATE_NORMAL);
    }

/* Fill up the validation request structure */
    mqHeader->lMessageType = MQ_MT_OPCOMMAND;
    mqHeader->lMessageSubType = MQ_MTS_OP_VALIDATE_Q;
    pValidate = (MQ_OP_VALIDATE_Q *)mqHeader->caBody;
    strcpy(pValidate->caSubscriberID, pSub->caSCR );
    strcpy(pValidate->caUnitID, pSub->ServerRequest.caID);

/* fill the message header */
    vMQ_FillHeader(mqHeader, lg_addr, 0, mqHeader->lMessageType, mqHeader->lMessageSubType, lFID );

/* store the sendtime and sequence number to refer to them
on */
    /* receiving a message */
    pSub->tReplyTime = mqHeader->tSendTime;
    pSub->lSequence = mqHeader->lSequenceNumber;

vMQ_Log(NULL,    NULL,    21,    "[FRONTEND]
time=%ld,sequence=%ld,file=%s\n",
            pSub->tReplyTime, pSub->lSequence, pSub->caTmpfile);

/* Send a validation request to validate process */
```

```
    if( lMQ_QueueWrite( pvMQ_master, (void *)mqHeader, lSize,
0) != lSize)
    {
        vMQ_Log(NULL, NULL, 0, "[FRONTEND] Unable to write
queue Validate\n");
        vFeHandleTerminate(TERMINATE_NORMAL);
    } free( mqHeader );
    return;
}

/*:::::::::::::::::::::::::::::::::::::::::::::::::::::::::::::::::
::::::::::
:: Function:    vFeSubDisconnect_all
::
:: Purpose: Handle to disconnect a subscriber.
::
:: Returns:    None.
::
:: Input:      Pointer to SPIFheader and message.
::
:: Output : none
::
:: Globals:
::
:: Called routines :
::
:: Revision:
:: WHO          --WHEN--  WHAT
:: Raju         08/28/94  Original
:::::::::::::::::::::::::::::::::::::::::::::::::::::::::::::::::::
::::::::*/ void    vFeSubDisconnect_all(pSpifHeader)
SPIF_HEADER *pSpifHeader;
{
    SUBSCRIBER *pSub;

/* Get the specified subscriber */
    if((pSub = pFindSpifID( pSpifHeader->lSpifID)) == NULL)
    {
        vMQ_Log(NULL, NULL, 0, "[FRONTEND] Subscriber not
found\n");
        return;
    } vMQ_Log(NULL,NULL,10,"[FRONTEND] Delete Subscriber request
from SPIF\n");
    pSub->sResultCode = LOGOUT_BY_CARRIER;
    vHandleAuditLog(NULL,    NULL,    MQ_MTS_AUDIT_CLLOGOUT,
lFID,(void *)pSub,
        NULL, 1);
    vMQ_EventLog(NULL,NULL,    MQ_EVB_LOGOUT,    pSub->caSCR,
strlen(pSub->caSCR) );
```

```c
    /* Delete the subscriber */
    if(iDelSub( pSpifHeader->lSpifID) != SUCCESS)
    {
        vMQ_Log(NULL,NULL,0,"[FRONTEND]    Unable    to    Delete Subscriber\n");
    }
    return;
}

/*::::::::::::::::::::::::::::::::::::::::::::::::::::::::::::::::::::::::::
:: Function:    vFeGateDisconnect_all
::
:: Purpose: Handle to disconnect the Gateway.
::          Gateway disconnect should disconnect all current active subscribers
::          before actually disconnecting the Gateway.
::          0    Indicates direct request from SPIF.
::          1    Indicates   because   of   other   reasons   like terminate or errors.
::          2    Indicates SPIF is dead.  So auditlog all subscribers
::               and Gateway  for logout without any messages to the SPIF.
::          0    GATEDISCONNECT_BY_SPIF
::          1    GATEDISCONNECT_BY_OPERATOR
::          2    GATEDISCONNECT_BY_CARRIER
::
:: Returns:    None.
::
:: Input:      flag to indicate proper or abrupt disconnect.
::
:: Output : none
::
:: Globals:
::
:: Called routines :
::
:: Revision:
:: WHO           --WHEN--    WHAT
:: Raju          08/28/94    Original
::::::::::::::::::::::::::::::::::::::::::::::::::::::::::::::::::::::::::*/ void    vFeGateDisconnect_all(sflag)
short sflag;
{
    Q_ELEM        *pq_elem;
    Q_HEAD        *pq;
    SUBSCRIBER    *pSub;

/* Check if anyone is logged in */
    if( pQhead != NULL)
    {
        pq = pQhead;
```

```
            vMQ_Log(NULL,   NULL,   10,    "[FRONTEND]    Gateway
disconnect\n");
            /* Traverse the subscriber list */
            Q_FORWTRAV(pq_elem, pq)
            {
                pSub = (SUBSCRIBER *) q_data(pq_elem);

/* If the subscriber is not a gateway then
disconnect. */
                if(pSub->sGatewayFlag != 1)
                {
                    /* Disconnect the subscriber after sending
a Ok response */
                    pSub->lMsgtype = SPIF_SUBSCRIBER_DISCONNECT;

/* if SPIF has died abruptly  then sflag is
2 */
                    if( sflag != GATEDISCONNECT_BY_CARRIER )
                    {
                        sSendHeader(    8,    pSub->lSpifID,
pSub->lMsgtype );
                    } pSub->sResultCode = LOGOUT_BY_OPERATOR;
                    vHandleAuditLog(NULL,    NULL,
MQ_MTS_AUDIT_CLLOGOUT, lFID,
                        (void *)pSub, NULL, 1);
                    vMQ_EventLog(NULL,NULL, MQ_EVB_LOGOUT,
                        pSub->caSCR, strlen(pSub->caSCR) );
                    vMQ_Log(NULL,NULL,10,"[FRONTEND]   Deleting
subscriber\n");

/* delete the subscriber */
                    if( iDelSub(pSub->lSpifID) != SUCCESS)
                    {
                        vMQ_Log(NULL,NULL,0,
                            "[FRONTEND]   Unable   to   delete
subscriber\n");
                    }
                }
            } if( (pGSub == NULL) || (pGSub->iValidated == 0) ||
                (pGSub->sGatewayFlag == 0))
            {
                vMQ_Log(NULL,NULL,0,"[FRONTEND] Invalid request.
No Gateway\n");
            }
            else
            {
                /* Delete the gateway after deleting all the
subscribers */
                if( (sflag == GATEDISCONNECT_BY_OPERATOR) ||
                        (sTerm_After_Service == 1))
                {
```

APPENDIX A — PAGE 190 OF 279

```
                    sSendHeader(    8,    pGSub->lSpifID,
SPIF_GATEWAY_DISCONNECT );
            } vHandleAuditLog(NULL,    NULL,
MQ_MTS_AUDIT_DISCONNECT, lFID,
                (void *)pGSub, NULL, 1);
            vMQ_EventLog(NULL,NULL,   MQ_EVB_LOGOUT,
pGSub->caSCR,
                strlen(pGSub->caSCR) );

pGSub->sGatewayFlag = 0;
            vMQ_Log(NULL,NULL,10,"[FRONTEND]    Deleting
Gateway\n");
            if( iDelSub(pGSub->lSpifID) != SUCCESS)
            {
                vMQ_Log(NULL,NULL,0,"[FRONTEND]   Unable   to
delete Gateway\n");
            }
        }
    }

/* create a new empty list of subscribers */
    pGSub = NULL;
    pQhead = NULL;

/* Terminate after disconnecting all subscribers and Gateway
*/
    /* if the sTerm_After_Service flag is set. */
    if( sTerm_After_Service == 1)
    {
        vMQ_Log(NULL,NULL,0,"[FRONTEND] Exiting After Service
completion.\n");
        vFeHandleTerminate( TERMINATE_ABORT);
    } pQhead = &sHead;
    q_newlist( pQhead);
    sAckPending = 0;

if( sflag == GATEDISCONNECT_BY_CARRIER )
    {
        /* delete the dataport and add listen port to the
queuewatch */
        iFeListen();
    }
    else
    {
        sGateDisconnectFlag = 1;
    }
    return;
}

/*::::::::::::::::::::::::::::::::::::::::::::::::::::::::::::::
::::::::::
```

APPENDIX A — PAGE 191 OF 279

```
::  Function:    vFeGateConnect_all
::
::  Purpose: Handle gateway connect request.
::
::  Returns:    None.
::
::  Input:       Pointer to SPIF header and the message.
::
::  Output : none
::
::  Globals:
::
::  Called routines :
::
::  Revision:
::  WHO          --WHEN--   WHAT
::  Raju         08/28/94   Original
::::::::::::::::::::::::::::::::::::::::::::::::::::::::::::
::::::::*/ void    vFeGateConnect_all(pSpifHeader, Msg)
SPIF_HEADER *pSpifHeader;
char *Msg;
{
    SUBSCRIBER *pSub;
    MQ_HEADER *mqHeader;
    MQ_OP_VALIDATE_Q *pValidate;
    long lg_addr;
    long lSize;

/* increment the global session ID counter */
    ulSessionID++;

vMQ_Log(NULL, NULL, 21, "[FRONTEND] Calling AddGate\n");
    /* Add the subscriber to the subscriber list */
    if(  (pSub = pAddGate(Msg)) == NULL);
    {
        /* Get a pointer to the subscriber */
        if( (pSub = pFindSpifID( pSpifHeader->lSpifID )) ==
NULL)
        {
            vMQ_Log(NULL, NULL, 0, "[FRONTEND] Subscriber not
Added\n");
            vFeHandleTerminate(TERMINATE_NORMAL);
        }
    } vMQ_Log(NULL,   NULL,   21,   "[FRONTEND]   VALIDATE
scr=%s,spifid=%ld\n",
                pSub->caSCR, pSub->lSpifID);
    /* Global Address of Validate process */
    lg_addr = MQ_GADDR_VALIDATE;
    lSize = MQ_MESSAGE_SIZE2(MQ_OP_VALIDATE_Q,mqHeader);

if((mqHeader = (MQ_HEADER *)malloc(lSize)) == NULL)
    {
```

```
            vMQ_Log(NULL, NULL, 0, "[FRONTEND] Unable to alocate
memory");
            vFeHandleTerminate(TERMINATE_NORMAL);
      }

/* Fill up the validation request structure */
      mqHeader->lMessageType = MQ_MT_OPCOMMAND;
      mqHeader->lMessageSubType = MQ_MTS_OP_VALIDATE_Q;
      pValidate = (MQ_OP_VALIDATE_Q *)mqHeader->caBody;
      strcpy(pValidate->caSubscriberID, pSub->caSCR );
      strcpy(pValidate->caUnitID, pSub->ServerRequest.caID);

/* fill the message header */
      vMQ_FillHeader(mqHeader, lg_addr, 0, mqHeader->lMessageType, mqHeader->lMessageSubType, lFID );

/* store the sendtime and sequence number to refer to them
on */
      /* receiving a message */
      pSub->tReplyTime = mqHeader->tSendTime;
      pSub->lSequence = mqHeader->lSequenceNumber;

vMQ_Log(NULL,    NULL,   21,    "[FRONTEND]
time=%ld,sequence=%ld,file=%s\n",
            pSub->tReplyTime, pSub->lSequence, pSub->caTmpfile);

pGSub  = pSub;

/* Send a validation request to validate process */
      if( lMQ_QueueWrite( pvMQ_master, (void *)mqHeader, lSize,
0) != lSize)
      {
            vMQ_Log(NULL, NULL, 0, "[FRONTEND] Unable to write
queue Validate\n");
            vFeHandleTerminate(TERMINATE_NORMAL);
      } free( mqHeader );
      return;
}

/*:::::::::::::::::::::::::::::::::::::::::::::::::::::::::::::::
:::::::::::
:: Function:    vFeHandleStatus_all
::
:: Purpose: Handle for status of the front end.
::          The monitor could request for the status of the front
end.
::
:: Returns:    None.
::
:: Input:      Pointer to Dispatch table, message type, message
subtype and
::             mq_header pointer.
```

APPENDIX A — PAGE 193 OF 279

```
::
:: Output : none
::
:: Globals:
::
:: Called routines :
::
:: Revision:
:: WHO          --WHEN--  WHAT
:: Raju         08/28/94  Original
::::::::::::::::::::::::::::::::::::::::::::::::::::::::::::::::
:::::::::*/ void       vFeHandleStatus_all(pconfig,  pqwatch,  ptDTable,
lMessageType,
              lMessageSubType, plHeader)
void    *pconfig, *pqwatch, *ptDTable;
long lMessageType, lMessageSubType;
void *plHeader;
{
    MQ_STATUS_FE *pStatusFe;
    long lg_addr;
    long lSize;
    SUBSCRIBER *pSub;
    MQ_HEADER *pHeader = (MQ_HEADER *)plHeader, *pReply;

vMQ_Log(NULL, NULL, 21, "[FRONTEND] Received Status request
\n");

lSize = MQ_MESSAGE_SIZE2(MQ_STATUS_FE, pHeader);

if((pReply = (MQ_HEADER *)malloc(lSize)) == NULL)
    {
         vMQ_Log(NULL, NULL, 0, "[FRONTEND] Unable to alocate
memory\n");
         vFeGateDisconnect_all(GATEDISCONNECT_BY_OPERATOR);
    } vMQ_FillReply(pqwatch, pHeader, pReply);

vMQ_Log(NULL, NULL, 21, "[FRONTEND] subtype %ld fid %ld \n",
             lFID, ( lFID >> 16));
    pReply->lSenderSubType = lFID;
    pReply->lMessageType = MQ_MT_STATUS;
    pReply->lReturnCode  = SUCCESS;
    pStatusFe = (MQ_STATUS_FE *)pReply->caBody;

/* update the subscriber structure */
    if(pGSub != NULL)
    {
         pStatusFe->lTxCount = pGSub->lTrx_count ;
         pStatusFe->lRxCount = pGSub->lRcv_count ;
         pStatusFe->lRouteCount = pGSub->lRoute_count ;
         p S t a t u s F e - > l E x t e r n a l Q u e r y C o u n t   =
pGSub->lExternalQuery_count    ;
```

```
            pStatusFe->lInternalQueryCount   =
pGSub->lInternalQuery_count   ;
            pStatusFe->lSessionSettings    = 0 ;
            pStatusFe->tLogin = pGSub->tstart_time  ;
            strcpy(pStatusFe->caUnitID,pGSub->ServerRequest.caID
);
            strcpy(pStatusFe->caSubscriberID,pGSub->caSCR );
        }
        else
        {
            /* If the gate way is not yet logged in then there is
no infromation */
            pStatusFe->lTxCount = 0;
            pStatusFe->lRxCount = 0;
            pStatusFe->lRouteCount = 0;
            pStatusFe->lExternalQueryCount = 0;
            pStatusFe->lInternalQueryCount = 0;
            pStatusFe->lSessionSettings   = 0 ;
            pStatusFe->tLogin = 0;
            strcpy(pStatusFe->caUnitID,"\0");
            strcpy(pStatusFe->caSubscriberID,"\0");
        }

/* Send back the message to the requester. */
        if( lMQ_QueueWrite( pvMQ_master, (void *)pReply, lSize, 0)
!= lSize)
        {
            vMQ_Log(NULL, NULL, 0, "[FRONTEND] Unable to write
queue status\n");
            vFeHandleTerminate(TERMINATE_NORMAL);
        } vMQ_Log(NULL, NULL, 21, "[FRONTEND] Returned Status to
%ld\n",
                    pHeader->lDestinationPID);
        free(pReply);

return;
}

/*:::::::::::::::::::::::::::::::::::::::::::::::::::::::::::::::
::::::::::
:: Function:    vFeHandleRoute_all
::
:: Purpose: Handle the route reply from the queue.
::
:: Returns:     None.
::
:: Input:       Pointer to Dispatch table, message type, message
subtype and
::              mq_header pointer.
::
:: Output : none
::
:: Globals:

APPENDIX A — PAGE 195 OF 279
```

```
::
:: Called routines :
::
:: Revision:
:: WHO          --WHEN--  WHAT
:: Raju         08/28/94  Original
::::::::::::::::::::::::::::::::::::::::::::::::::::::::::::::::
::::::::*/ void        vFeHandleRoute_all(pconfig,  pqwatch,  ptDTable,
lMessageType,
            lMessageSubType, plHeader)
void    *pconfig, *pqwatch, *ptDTable;
long lMessageType, lMessageSubType;
void *plHeader;
{
    SUBSCRIBER    *pSub;
    SPIF_HEADER   sSpif_head;
    SPIF_HEADER   *pSpif_head = &sSpif_head;
    MQ_HEADER *pHeader;
    char       *pcExt;

pHeader = (MQ_HEADER *)plHeader;
    vMQ_Log(NULL, NULL, 10, "[FRONTEND] received route code %ld
\n",
            pHeader->lReturnCode);

/* Find the subscriber to whom the message is meant to */
    if((pSub = pFindResponse(pHeader->tReplyID.tOriginTime,
        pHeader->tReplyID.lOriginSequence) ) == NULL)
    {
        vMQ_Log(NULL, NULL, 0, "[FRONTEND] subscriber not
found\n");
        return;
    }
    vMQ_Log(NULL, NULL, 21, "[FRONTEND] received route in file
%s\n",
            pSub->caTmpfile);

/* get the cpuusage and return code and audit the response
*/
    pSub->lCpu_usage  = pHeader->lResourceUsage;
    pSub->sResultCode = (short)pHeader->lReturnCode ;
    pSub->lLastCommtime = time(0L);

/* check if a request is pending */
    /* if request is pending, forget the route for the previous
request */
    /* and parse the next request */
    if( pSub->lRequestPending)
    {
        /* so signify discarded route */
        pSub->sManeuverCount = 99999;
        vHandleAuditLog(NULL, NULL, MQ_MTS_AUDIT_ROUTE_I, lFID,
                            (void *)pSub, NULL, 1);
        pSub->sManeuverCount = 0;
```

```c
              pSub->lCpu_usage  = 0;

/* Parse the pending request */
              pSub->lStatus = 0;
#ifdef DELETE
              unlink(pSub->caTmpfile);
              unlink(pSub->caBtrfFile);
endif
              sprintf(pSub->caTmpfile,"tmp.%ld.%ld",getpid(),
pSub->lSpifID);
              pSub->lResponsePending = 0;
              pSpif_head->lMsgsize = strlen(pSub->caMsg) + 8;
              pSpif_head->lSpifID = pSub->lSpifID;
              pSpif_head->lMsgtype = pSub->lMsgtype;
              vFePassThrough_all(pSpif_head, pSub->caMsg);
              pSub->lRequestPending = 0;
              return;
        } pSub->lResponsePending = 0;

/* If no request is pending then check the return code */
        if( pHeader->lReturnCode != 0)
        {
              vHandleAuditLog(NULL, NULL, MQ_MTS_AUDIT_ROUTE_I, lFID,
(void *)pSub,
                   NULL, 1);
              pSub->lCpu_usage  = 0;
              pSub->sResultCode = (short)pHeader->lReturnCode;

/* There was an error in the route - in
              ** this case the file should contain the
              ** error message, not route structures.
              */
              errno = pHeader->lReturnCode;
              vMQ_Log(NULL, NULL, 29, "[FRONTEND] Route failed code
%ld\n",
                    pHeader->lReturnCode);
              vSendErrorFile(pSub);

#ifdef DELETE
              unlink(pSub->caTmpfile);
              unlink(pSub->caBtrfFile);
endif
              sprintf(pSub->caTmpfile,"tmp.%ld.%ld",getpid(),
pSub->lSpifID);
        }     /* end if status - not OK path */
        else
        {
              /* Increment successful route count var */
              pSub->lRoute_count++;
              pGSub->lRoute_count++;
              /* Send route file */
              vMQ_Log(NULL, NULL, 21,
                    "[FRONTEND]   Route   successful   -   sending
message!\n");
```

APPENDIX A — PAGE 197 OF 279

```
                if(!(pSub->lStatus & SS_BRBF))
                {
                        vReset_status_flags(pSub);
#ifdef DELETE
                        unlink(pSub->caBtrfFile);
endif
                } if (pSub->lStatus & SS_ROUTE_DWNL)
                {
                        pSub->lQueryFilesize = pHeader->lBTRFDataSize;
                        sGenerateDownload(pSub);
                        /* if btrf make a copy of the route file */
                        if ((pSub->lStatus & SS_BTRF)&&(!(pSub->lStatus
& SS_BRBF)))
                                i f ( ( p c E x t        =
strchr(pSub->caTmpfile,'.'))!=NULL)
                                {
                                        strcpy(pSub->caBtrfFile,"./btrf");
                                        strcat(pSub->caBtrfFile,pcExt);
                                        link(pSub->caTmpfile,pSub->caBtrfFile);
                                }
                }
                else
                        vSendRouteFile(pSub);

}       /* end else status - is OK path */ vReset_status_flags(pSub);

return;
}

/*::::::::::::::::::::::::::::::::::::::::::::::::::::::::::::::::::
::::::::::
:: Function:    vFeHandlePOIQuery_all
::
:: Purpose: Handle the POIQuery reply from the queue.
::
:: Returns:     None.
::
:: Input:       Pointer to Dispatch table, message type, message
subtype and
::              mq_header pointer.
::
:: Output : none
::
:: Globals:
::
:: Called routines :
::
:: Revision:
:: WHO          --WHEN--  WHAT
:: Raju         08/28/94  Original
```

```
:::::::::::::::::::::::::::::::.:::::::::::::::::::::::::::::::::
::::::::*/ void        vFeHandlePOIQuery_all(pconfig,  pqwatch,  ptDTable,
lMessageType,
            lMessageSubType, plHeader)
void    *pconfig, *pqwatch, *ptDTable;
long lMessageType, lMessageSubType;
void *plHeader;
{
    SUBSCRIBER *pSub;
    MQ_HEADER *pHeader;
    SPIF_HEADER    sSpif_head;
    SPIF_HEADER    *pSpif_head = &sSpif_head;

pHeader = (MQ_HEADER *)plHeader;
    vMQ_Log(NULL, NULL, 10, "[FRONTEND] POIs return code %ld
count %ld\n",
            pHeader->lReturnCode, pHeader->lItemCount);

/* Get the subscriber to whom the reply is meant to */
    if((pSub = pFindResponse(pHeader->tReplyID.tOriginTime,
            pHeader->tReplyID.lOriginSequence) ) == NULL)
    {
        vMQ_Log(NULL, NULL, 0, "[FRONTEND] subscriber not
found\n");
        return;
    }

/* get the cpuusage and result code */
    pSub->lLastCommtime = time(0L);
    pSub->lCpu_usage  = pHeader->lResourceUsage;
    pSub->sResultCode = (short)pHeader->lReturnCode ;
    pSub->sManeuverCount =   pHeader->lItemCount ;
    vHandleAuditLog(NULL, NULL,  MQ_MTS_AUDIT_QUPOI_I, lFID,
            (void *)pSub, NULL, 1 );
    pSub->lCpu_usage  = 0;
    pSub->sManeuverCount  = 0;

/* check if a request is pending */
    /* if request is pending, forget the reply for the previous
request */
    /* and parse the next request */
    if( pSub->lRequestPending)
    {
        /* Parse the pending request */
        pSub->lStatus = 0;
#ifdef DELETE
        unlink(pSub->caTmpfile);
#endif
        sprintf(pSub->caTmpfile,"tmp.%ld.%ld",getpid(),
pSub->lSpifID);
        pSub->lResponsePending = 0;
        pSpif_head->lMsgsize = strlen(pSub->caMsg) + 8;
        pSpif_head->lSpifID = pSub->lSpifID;
        pSpif_head->lMsgtype = pSub->lMsgtype;
```

```
            vFePassThrough_all(pSpif_head, pSub->caMsg);
            pSub->lRequestPending = 0;
            return;
     } pSub->lResponsePending = 0;
     /* Check the result code and send appropriate response */
     if( pHeader->lReturnCode != 0)
     {
            errno = pHeader->lReturnCode;
            vMQ_Log(NULL, NULL, 29, "[FRONTEND] POIQuery Failed
code %ld\n",
                  pHeader->lReturnCode);
            vSendErrorFile(pSub);
#ifdef DELETE
            unlink(pSub->caTmpfile);
#endif
            sprintf(pSub->caTmpfile,"tmp.%ld.%ld",getpid(),
pSub->lSpifID);
          }
          else
          {
            vMQ_Log(NULL,    NULL,    21,    "[FRONTEND]    POIQuery
Successful\n");
            pSub->lExternalQuery_count++;
            pGSub->lExternalQuery_count++;
            vSendQueryFile(pSub);
     } return;
}

/*:::::::::::::::::::::::::::::::::::::::::::::::::::::::::::::::::
:::::::::
:: Function:   sFeRequestPOIQuery_all
::
:: Purpose: Handle to send the POIrequest to the backend.
::
:: Returns:    None.
::
:: Input:      Pointer to Subscriber Structure.
::
:: Output : none
::
:: Globals:
::
:: Called routines :
::
:: Revision:
:: WHO          --WHEN--   WHAT
:: Raju         08/28/94   Original
:::::::::::::::::::::::::::::::::::::::::::::::::::::::::::::::::::
:::::::::*/ short sFeRequestPOIQuery_all( pSub )
```

```
SUBSCRIBER *pSub;
{
    MQ_HEADER *mqHeader;
    MQ_OP_POIQUERY *pPOIQuery;
    long lg_addr;
    long lSize;
    char tempBuff[200];
    short    sIndex;

/* get the address from the monitor for this config. */
    if( (lMQU_ValidateName( pMQU_master, pSub->caConfig)   ==
FAILURE) ||
      ((lg_addr   =    lMQU_TranslateName(   pMQU_master,
pSub->caConfig)) == FAILURE))
    {
        sprintf(tempBuff,"Metro region %s not available now\n",
            pSub->caConfig );
        vMQ_Log(NULL, NULL, 0, "[FRONTEND] %s", tempBuff);

if(pSub->sResultCode<1) pSub->sResultCode=FEERR_SVGD;
        vSendErrorResponse(pSub, tempBuff);

return FAILURE;
    } lSize = MQ_MESSAGE_SIZE2(MQ_OP_POIQUERY, mqHeader);

if((mqHeader = (MQ_HEADER *)malloc(lSize)) == NULL)
    {
        vMQ_Log(NULL, NULL, 0, "[FRONTEND] Unable to alocate
memory\n");
        vFeGateDisconnect_all(GATEDISCONNECT_BY_OPERATOR);
    }

/* Update the request structure for POI request */
    mqHeader->lMessageType   =   MQ_MT_OPCOMMAND   |
MQ_MT_ACKNOWLEDGE_REQUIRED;
    mqHeader->lMessageSubType = MQ_MTS_OP_POIQUERY;
    pPOIQuery = (MQ_OP_POIQUERY *)mqHeader->caBody;

if(sAckPending == 0)
    {
        lLastCommtime = time(0L);
    } sAckPending++;

memset(pPOIQuery->caSort,'\0',MQ_ALT_SZ);

for(sIndex=0;sIndex<AR_MAX_ALTS;sIndex++)
    {
        if(strncmp(pSub->ServerRequest.
aAlternatives[sIndex].caAlternatives,"SORT=",5)==0)
        {
            strncpy(pPOIQuery->caSort,
```

```c
                              pSub->ServerRequest.
                              aAlternatives[sIndex].caAlternatives+5,
                              FE_ALT_LEN-5);
            }
      } pPOIQuery->lQueryType  =  MQ_QT_NORMAL;
      pPOIQuery->lMaximumPOIs = 0    ;
      pPOIQuery->sDestinationLimit =
pSub->ServerRequest.lDestinationLimit;
      pPOIQuery->sOriginBearing     =
pSub->ServerRequest.sOriginBearing;
      pPOIQuery->lOriginLatitude    =
pSub->ServerRequest.lLatitude;
      pPOIQuery->lOriginLongitude   =
pSub->ServerRequest.lLongitude;
      strcpy(pPOIQuery->caOrigin, pSub->ServerRequest.caOrigin);
      s t r c p y ( p P O I Q u e r y - > c a O r i g i n T y p e ,
pSub->ServerRequest.caOriginType );

strcpy(pPOIQuery->caDestination,pSub->ServerRequest.caDestination
);

strcpy(pPOIQuery->caDestinationType,pSub->ServerRequest.caDest
inationType );

switch( pSub->ServerRequest.caDestinationLimitType[0])
      {
            case 'M':
                  pPOIQuery->sDestinationLimitType = 0;
                  break;
            case 'D':
                  pPOIQuery->sDestinationLimitType = 1;
                  break;
            case 'T':
                  pPOIQuery->sDestinationLimitType = 2;
                  break;
            default:
                  pPOIQuery->sDestinationLimitType = 0;
                  break;
      }

/* Fill the header */
      vMQ_FillHeader(mqHeader, lg_addr, 0, mqHeader->lMessageType, mqHeader->lMessageSubType, lFID );

pSub->tReplyTime = mqHeader->tSendTime;
      pSub->lSequence = mqHeader->lSequenceNumber;
      pSub->lStatus   =  (pSub->lStatus  &  ~SS_SEND_QMASK)    |
SS_SEND_QPOIS;
      sprintf(  pSub->caTmpfile,   "tmp.%ld.%ld",   getpid(),
pSub->lSequence);
      strcpy(pPOIQuery->caTempPath, pSub->caTmpfile );

#ifdef DEBUG2
```

```c
        printf("\nPOIQuery:\noutfile=%s\n",pPOIQuery->caTempPath);
        printf("querytype=%ld\n",pPOIQuery->lQueryType);
        printf("origin =%s",pPOIQuery->caOrigin);
        printf("origintype =%s",pPOIQuery->caOriginType);
        printf("destination =%s",pPOIQuery->caDestination);
        printf("destinationtype=%s",pPOIQuery->caDestinationType);
        printf("destlimit =%d\n",pPOIQuery->sDestinationLimit);

printf("destlimittype=%d\n",pPOIQuery->sDestinationLimitType);
        printf("maxpois=%ld\n",pPOIQuery->lMaximumPOIs);
#endif
        vMQ_Log(NULL, NULL, 29,
            "[FRONTEND] poi orlat orlong orb %ld %ld %d \n",
            pPOIQuery->lOriginLatitude,
            pPOIQuery->lOriginLongitude,
            pPOIQuery->sOriginBearing);
        vMQ_Log(NULL, NULL, 29,
            "[FRONTEND] poi qtype %ld, maxpois %ld, destlmt %d, desttype %d \n",
            pPOIQuery->lQueryType,
            pPOIQuery->lMaximumPOIs,
            pPOIQuery->sDestinationLimit,
            pPOIQuery->sDestinationLimitType);
        vMQ_Log(NULL, NULL, 29,
            "[FRONTEND] poi or %s, otyp %s, dest %s, destyp %s, tmpfile %s \n",
            pPOIQuery->caOrigin,
            pPOIQuery->caOriginType,
            pPOIQuery->caDestination,
            pPOIQuery->caDestinationType,
            pPOIQuery->caTempPath);

vMQ_Log(NULL, NULL, 21, "[FRONTEND] POIRequest type %ld subtype %ld\n",
            mqHeader->lMessageType, mqHeader->lMessageSubType);
        /* Send it to the queue */
        if( lMQ_QueueWrite( pvMQ_master, (void *)mqHeader, lSize, 0) != lSize)
        {
            vMQ_Log(NULL, NULL, 0, "[FRONTEND] Unable to write queue poiquery\n");
            vFeHandleTerminate(TERMINATE_NORMAL);
        } free( mqHeader );
        return SUCCESS;
}

/*::::::::::::::::::::::::::::::::::::::::::::::::::::::::::::::::::
::::::::::
:: Function:    sFeRequestRoute_all
::
:: Purpose: Handle to send the route request to the backend.
::
:: Returns:     Success or FAILURE.
```

APPENDIX A — PAGE 203 OF 279

```
::
:: Input:     Pointer to Subscriber Structure.
::
:: Output : none
::
:: Globals:
::
:: Called routines :
::
:: Revision:
:: WHO          --WHEN--  WHAT
:: Raju         08/28/94  Original
::::::::::::::::::::::::::::::::::::::::::::::::::::::::::::::::
::::::::*/ short sFeRequestRoute_all( pSub )
SUBSCRIBER *pSub;
{
    MQ_HEADER *mqHeader;
    MQ_OP_ROUTE *pRoute;
    long lg_addr;
    long lSize;
    char *cp, *altcp;
    char tempBuff[200];
    short    sIndex;

vMQ_Log(NULL, NULL, 20, "[FRONTEND] Request route by spifid %ld\n",
            pSub->lSpifID);
    if( (lMQU_ValidateName( pMQU_master, pSub->caConfig) == FAILURE) ||
        ((lg_addr  =   lMQU_TranslateName( pMQU_master, pSub->caConfig)) == FAILURE))
    {
        sprintf(tempBuff,"Metro region %s not available now\n",
            pSub->caConfig );
        vMQ_Log(NULL, NULL, 0, "[FRONTEND] %s", tempBuff);

if(pSub->sResultCode<1) pSub->sResultCode=FEERR_SVGD;
        vSendErrorResponse(pSub, tempBuff);

return FAILURE;
    } lSize = MQ_MESSAGE_SIZE2(MQ_OP_ROUTE, mqHeader);
    if((mqHeader = (MQ_HEADER *)malloc(lSize)) == NULL)
    {
        vMQ_Log(NULL, NULL, 0, "[FRONTEND] Unable to alocate memory\n");
        vFeGateDisconnect_all(GATEDISCONNECT_BY_OPERATOR);
    }

/* update the route request structure */
    mqHeader->lMessageType    =   MQ_MT_OPCOMMAND  | MQ_MT_ACKNOWLEDGE_REQUIRED;
    mqHeader->lMessageSubType = MQ_MTS_OP_ROUTE;
```

```
    pRoute = (MQ_OP_ROUTE *)mqHeader->caBody;

if(sAckPending == 0)
    {
        lLastCommtime = time(0L);
    } sAckPending++;

pRoute->lSpecials = 0;
    memset(pRoute->caRouteBandParam,'\0',MQ_ALT_SZ);

if(pSub->lStatus & SS_STRIPMAP)
        pRoute->lSpecials |= MQ_ROUTE_SP_STRIP;

if(pSub->lStatus & SS_BTRF)
        pRoute->lSpecials |= MQ_ROUTE_SP_BTRF;

if(pSub->bit_map & BIT_ARMS)
        pRoute->lSpecials |= MQ_ROUTE_SP_ARMS;

if(pSub->lStatus & SS_BRBF)
    { pRoute->lSpecials |= MQ_ROUTE_SP_BAND;
        strcpy(pRoute->caBtrfFile,pSub->caBtrfFile);

} for(sIndex=0;sIndex<AR_MAX_ALTS;sIndex++)
    {
        if(strncmp(pSub->ServerRequest.
            aAlternatives[sIndex].caAlternatives,
            "ROUTEBAND=",10)==0)
            {
                strncpy(pRoute->caRouteBandParam,
                    pSub->ServerRequest.
                    aAlternatives[sIndex].caAlternatives+10,
                    FE_ALT_LEN-10);
            }
    } pRoute->sDestinationLimit =
pSub->ServerRequest.lDestinationLimit;
    pRoute->sDestinationBearing =
pSub->ServerRequest.sDestinationBearing;
    pRoute->sOriginBearing      =
pSub->ServerRequest.sOriginBearing;
    pRoute->lOriginLatitude   =    pSub->ServerRequest.lLatitude;
    pRoute->lOriginLongitude  =
pSub->ServerRequest.lLongitude;

strcpy(pRoute->caOrigin, pSub->ServerRequest.caOrigin);
    s t r c p y ( p R o u t e - > c a O r i g i n T y p e ,
pSub->ServerRequest.caOriginType );
```

```
        strcpy(pRoute->caDestination,
pSub->ServerRequest.caDestination );
        strcpy( pRoute->caDestinationType,
pSub->ServerRequest.caDestinationType );
        strcpy(pRoute->caLanguage, pSub->caLanguage );

pRoute->OriginLocus.sMap    =   pSub->OriginLocus.sMap;
        pRoute->OriginLocus.sLayer  =   pSub->OriginLocus.sLayer;
        pRoute->OriginLocus.sParcel =   pSub->OriginLocus.sParcel;
        pRoute->OriginLocus.sIndex  =   pSub->OriginLocus.sIndex;
        pRoute->OriginLocus.spot    =   pSub->OriginLocus.spot;
        pRoute->OriginLocus.side    =   pSub->OriginLocus.side;

pRoute->DestinationLocus.sMap =
pSub->DestinationLocus.sMap;
        pRoute->DestinationLocus.sLayer   =
pSub->DestinationLocus.sLayer;
        pRoute->DestinationLocus.sParcel  =
pSub->DestinationLocus.sParcel;
        pRoute->DestinationLocus.sIndex   =
pSub->DestinationLocus.sIndex;
        pRoute->DestinationLocus.spot = pSub->DestinationLocus.spot;
        pRoute->DestinationLocus.side = pSub->DestinationLocus.side;

vMQ_Log(NULL, NULL, 29,
            "[FRONTEND] route Size %ld orlat orlong orb db dlmt %ld
%ld %d %d %s\n",
            lSize,
            pRoute->lOriginLatitude,
            pRoute->lOriginLongitude,
            pRoute->sOriginBearing,
            pRoute->sDestinationBearing,
            pRoute->sDestinationLimit);
        vMQ_Log(NULL, NULL, 29,
            "[FRONTEND]   route   or   M-L-P-I-sp(decimal)-sd(dec)
%d-%d-%d-%d-%d-%d \n",
            pRoute->OriginLocus.sMap,
            pRoute->OriginLocus.sLayer,
            pRoute->OriginLocus.sParcel,
            pRoute->OriginLocus.sIndex,
            pRoute->OriginLocus.spot,
            pRoute->OriginLocus.side);

vMQ_Log(NULL, NULL, 29,
            "[FRONTEND]   route   dest   M-L-P-I-sp(dec)-sd(dec)
%d-%d-%d-%d-%d-%d \n",
            pRoute->DestinationLocus.sMap,
            pRoute->DestinationLocus.sLayer,
            pRoute->DestinationLocus.sParcel,
            pRoute->DestinationLocus.sIndex,
            pRoute->DestinationLocus.spot,
            pRoute->DestinationLocus.side);

switch( pSub->ServerRequest.caDestinationLimitType[0])
        {
            case 'M':
```

```
                    pRoute->sDestinationLimitType = 0;
                    break;
            case 'D':
                    pRoute->sDestinationLimitType = 1;
                    break;
            case 'T':
                    pRoute->sDestinationLimitType = 2;
                    break;
            default:
                    pRoute->sDestinationLimitType = 0;
                    break;
        }

/* fill the header */
        vMQ_FillHeader(mqHeader, lg_addr, 0,mqHeader->lMessageType,
                mqHeader->lMessageSubType, lFID );

pSub->tReplyTime = mqHeader->tSendTime;
        pSub->lSequence = mqHeader->lSequenceNumber;

sprintf(  pSub->caTmpfile,   "tmp.%ld.%ld",   getpid(),
pSub->lSequence);
        strcpy( pRoute->caTempPath, pSub->caTmpfile);

vMQ_Log(NULL, NULL, 29,
        "[FRONTEND] routeDBE %ld  tmpfile %s btrf file %s\n",
                mqHeader->lDestinationPID,
                pRoute->caTempPath,
                pRoute->caBtrfFile);

vMQ_Log(NULL, NULL, 29,
        "[FRONTEND] routeDBE or %s, otyp %s\n",
                pRoute->caOrigin,
                pRoute->caOriginType);

vMQ_Log(NULL, NULL, 29,
        "[FRONTEND] routeDBE dest %s, destyp %s\n",
                pRoute->caDestination,
                pRoute->caDestinationType);

/* Send the message to the queue */
        if( lMQ_QueueWrite( pvMQ_master, (void *)mqHeader, lSize,
0) != lSize)
        {
                vMQ_Log(NULL, NULL, 0, "[FRONTEND] Write queue error
routerequest\n");
                vFeHandleTerminate(TERMINATE_NORMAL);
        } free( mqHeader );
        return SUCCESS;
}
```

```c
/*::::::::::::::::::::::::::::::::::::::::::::::::::::::::::::::::
::::::::::
:: Function:    vFeRequestUnRegistry_all
::
:: Purpose: Handle to request unregister of the front end on
terminate.
::
:: Returns:    None.
::
:: Input:   None.
::
:: Output : none
::
:: Globals:
::
:: Called routines :
::
:: Revision:
:: WHO           --WHEN--  WHAT
:: Raju          08/28/94  Original
::::::::::::::::::::::::::::::::::::::::::::::::::::::::::::::::::
::::::::::*/ void    vFeRequestUnRegistry_all()
{
    MQ_HEADER *mqHeader;
    MQ_REG_QUREGISTRYP *pRegistryDel;
    long lg_addr;
    long lSize;

lg_addr = MQ_GADDR_MONITOR;
    lSize = MQ_MESSAGE_SIZE2(MQ_REG_QUREGISTRYP, mqHeader);

if((mqHeader = (MQ_HEADER *)malloc(lSize)) == NULL)
    {
        vMQ_Log(NULL, NULL, 0, "[FRONTEND] Unable to alocate memory\n");
        return;
    }

/* Update the unregister structure */
    mqHeader->lMessageType = MQ_MT_REGISTRY;
    mqHeader->lMessageSubType = MQ_MTS_REG_REGISTRY_DEL;
    pRegistryDel = (MQ_REG_QUREGISTRYP *)mqHeader->caBody;

sprintf(pRegistryDel->caName,"%ld",lFID );

vMQ_FillHeader(mqHeader, lg_addr, 0, mqHeader->lMessageType,
        mqHeader->lMessageSubType, lFID );

/* Send the message to the monitor */
    if( lMQ_QueueWrite( pvMQ_master, (void *)mqHeader, lSize,
IPC_NOWAIT)
        != lSize)
    {
```

APPENDIX A — PAGE 208 OF 279

```
              vMQ_Log(NULL, NULL, 0, "[FRONTEND] Unable to write
queue unregister\n");
              vFeHandleTerminate(TERMINATE_ABORT);
       } free( mqHeader );
       return;
}

/*::::::::::::::::::::::::::::::::::::::::::::::::::::::::::::::
:::::::::
:: Function:    vFeRequestRegistry_all
::
:: Purpose: Handle to send register request fro front end
::
:: Returns:     None.
::
:: Input:    None.
::
:: Output : none
::
:: Globals:
::
:: Called routines :
::
:: Revision:
:: WHO           --WHEN--   WHAT
:: Raju          08/28/94   Original
::::::::::::::::::::::::::::::::::::::::::::::::::::::::::::::::
:::::::::*/ void    vFeRequestRegistry_all()
{
     MQ_HEADER *mqHeader;
     MQ_REG_REGISTRYADD *pRegistryAdd;
     long lg_addr;
     long lSize;

vMQ_Log(NULL, NULL, 21, "[FRONTEND] registering\n");
     lg_addr = MQ_GADDR_MONITOR;
     lSize = MQ_MESSAGE_SIZE2(MQ_REG_REGISTRYADD, mqHeader);

if((mqHeader = (MQ_HEADER *)malloc(lSize)) == NULL)
     {
            vMQ_Log(NULL, NULL, 0, "[FRONTEND] Unable to alocate
memory\n");
            vFeHandleTerminate(TERMINATE_NORMAL);
     }

/* Update register add structure */
     mqHeader->lMessageType = MQ_MT_REGISTRY;
     mqHeader->lMessageSubType = MQ_MTS_REG_REGISTRY_ADD;
     pRegistryAdd = (MQ_REG_REGISTRYADD *)mqHeader->caBody;

pRegistryAdd->lAddress = 0;
```

APPENDIX A — PAGE 209 OF 279

```
        strcpy(pRegistryAdd->caName,"\0");
        sprintf(pRegistryAdd->caDescription,"%ld",socket_port_num
);

vMQ_FillHeader(mqHeader, lg_addr, 0, mqHeader->lMessageType, mqHeader->lMessageSubType, lFID );

/* Send the request to the monitor */
        if( lMQ_QueueWrite( pvMQ_master, (void *)mqHeader, lSize,
0) != lSize)
        {
                vMQ_Log(NULL, NULL, 0, "[FRONTEND] Unable to write
queue Register\n");
                vFeHandleTerminate(TERMINATE_NORMAL);
        } free( mqHeader );
        return;
}

/*::::::::::::::::::::::::::::::::::::::::::::::::::::::::::::::
::::::::::
:: Function:    vFeHandleTerminate_all
::
:: Purpose: Handle to terminate the front end.
::
:: Returns:    None.
::
:: Input:      Pointer to Dispatch table, message type, message
subtype and
::             mq_header pointer.
::
:: Output : none
::
:: Globals:
::
:: Called routines :
::
:: Revision:
:: WHO           --WHEN--  WHAT
:: Raju          08/28/94  Original
::::::::::::::::::::::::::::::::::::::::::::::::::::::::::::::::
::::::::::*/ void     vFeHandleTerminate_all(pconfig, pqwatch, ptDTable,
lMessageType,
                lMessageSubType, plHeader)
void     *pconfig, *pqwatch, *ptDTable;
long lMessageType, lMessageSubType;
void *plHeader;
{
    MQ_HEADER      *mqHeader;
    MQ_TERMINATE   *mqTerminate;
```

APPENDIX A — PAGE 210 OF 279

```
      /* receive the Terminate request */
      mqHeader = (MQ_HEADER *)plHeader;
      mqTerminate = (MQ_TERMINATE *)mqHeader->caBody;
      vMQ_Log(NULL,  NULL,  10,  "[FRONTEND]  Received  Terminate
request %ld\n",
           mqTerminate->lTerminateType);
      vMQ_EventLog(NULL,NULL, MQ_EVB_TERMINATE,
           &mqTerminate->lTerminateType, sizeof(long) );

switch( mqTerminate->lTerminateType)
      {
           case MQ_MTS_TERM_NOW :
                vFeHandleTerminate(TERMINATE_ABORT);
                break;
           case MQ_MTS_TERM_GRACEFUL :
                vFeHandleTerminate(TERMINATE_NORMAL);
                break;
           case MQ_MTS_TERM_AFTERSERVICE :
                sTerm_After_Service = 1;
                break;
      } if( mqTerminate->lTerminateType > 0 )
      {
           sTerm_After_Service = 1;
      } if((pGSub != (SUBSCRIBER *)NULL) && (sTerm_After_Service ==
1))
           sSendHeader(8, -1, SPIF_FESPIF_SHUTDOWN);

return;
}

/*:::::::::::::::::::::::::::::::::::::::::::::::::::::::::::::::
::::::::::
:: Function:    vFeHandleHeartbeat_all
::
:: Purpose: Handle to receive and reply for a heart beat request.
::
:: Returns:    None.
::
:: Input:      Pointer to Dispatch table, message type, message
subtype and
::             mq_header pointer.
::
:: Output : none
::
:: Globals:
::
:: Called routines :
::
:: Revision:
:: WHO          --WHEN--  WHAT
:: Raju         08/28/94  Original
```

APPENDIX A — PAGE 211 OF 279

```
:::::::::::::::::::::::::::::::::::::::::::::::::::::::::::::::::::::
::::::::*/ void     vFeHandleHeartbeat_all(pconfig,  pqwatch,  ptDTable,
lMessageType,
             lMessageSubType, plHeader)
void    *pconfig, *pqwatch, *ptDTable;
long lMessageType, lMessageSubType;
void *plHeader;
{
    MQ_HEADER *mqHeader;
    MQ_HEADER *mqReply;
    long      lg_addr;
    char      buffer[TEMP_BUFF_SIZE];

/* receive the heart beat request */
    mqHeader = (MQ_HEADER *)plHeader;
    if((mqReply = (MQ_HEADER *)malloc(sizeof(MQ_HEADER))) ==
NULL)
    {
        vMQ_Log(NULL, NULL, 0,
              "[FRONTEND] Unable  to  allocate   memory   in
HandleHeartbeat \n");
        vFeGateDisconnect_all(GATEDISCONNECT_BY_OPERATOR);
        return;
    } sprintf(buffer,"[FRONTEND] heartbeat received\n");
    vMQ_Log(NULL, NULL, 21, buffer);

/* Reply for the heart beat request */
    vMQ_FillReply(pqwatch, mqHeader, mqReply );

if(  lMQ_QueueWrite(   pvMQ_master,   (void    *)mqReply,
sizeof(MQ_HEADER), 0)
             != sizeof(MQ_HEADER))
    {
        vMQ_Log(NULL, NULL, 0, "[FRONTEND] Unable to write
queue Heartbeat\n");
        vFeHandleTerminate(TERMINATE_NORMAL);
    } free( mqReply );
    return;
}

/*:::::::::::::::::::::::::::::::::::::::::::::::::::::::::::::::::
::::::::::
:: Function:   vFeHandleValidate_all
::
:: Purpose: Handle to receive response from the validation
process.
::
:: Returns:    None.
::
```

```
::  Input:     Pointer to Dispatch table, message type, message
subtype and
::             mq_header pointer.
::
:: Output : none
::
:: Globals:
::
:: Called routines :
::
:: Revision:
:: WHO           --WHEN--  WHAT
:: Raju          08/28/94  Original
:::::::::::::::::::::::::::::::::::::::::::::::::::::::::::::::::
::::::::*/ void       vFeHandleValidate_all(pconfig, pqwatch, ptDTable,
lMessageType,
           lMessageSubType, plHeader)
void    *pconfig, *pqwatch, *ptDTable;
long lMessageType, lMessageSubType;
void *plHeader;
{
    SUBSCRIBER    *pSub;
    MQ_HEADER *pHeader;
    SPIF_HEADER spif, *pSpifHeader = &spif;
    MQ_EV_LOGIN    GLogin;

pHeader = (MQ_HEADER *)plHeader;
    vMQ_Log(NULL, NULL, 21,
        "[FRONTEND]    Msg    from    validate    process
time=%ld,sequence=%ld\n", pHeader->tReplyID.tOriginTime,pHeader->tReplyID.lOriginSequence);

/* get the subscriber structure to whom the reply was meant
*/
    if((pSub = pFindResponse(pHeader->tReplyID.tOriginTime,
        pHeader->tReplyID.lOriginSequence) ) == NULL)
    {
        vMQ_Log(NULL, NULL, 0, "[FRONTEND] Subscriber not
found\n");
        return;
    } pSub->sResultCode = (short)pHeader->lReturnCode ;

/* Audit log the information */
    vHandleAuditLog(NULL, NULL, MQ_MTS_AUDIT_CLLOGIN,
            lFID,pSub , NULL, 1);

strcpy( GLogin.caName, pSub->caSCR);
    GLogin.lAccessLevel = 0;
    vMQ_EventLog(NULL,NULL,  MQ_EVB_LOGIN,  &GLogin,  sizeof(
MQ_EV_LOGIN) );
```

APPENDIX A — PAGE 213 OF 279

```
        /* Check if the validation is success or not */
        if( pHeader->lReturnCode != 0)
        {
              /* Subscriber invalid */
              vMQ_Log(NULL,    NULL,    0,    "[FRONTEND]    Validation
failed\n");

/*Delete subscriber from linked list */
              if( pSub->sGatewayFlag == 1)
              {
                    vMQ_Log(NULL,NULL,0,"[FRONTEND] Deleting Invalid
Gateway\n");
                    pSub->lMsgtype = SPIF_NAK;
                    sSendHeader( 8, pSub->lSpifID, pSub->lMsgtype );
                    vFeGateDisconnect_all(GATEDISCONNECT_BY_OPERATOR);
              }
              else
              {
                    i f ( p S u b - > s R e s u l t C o d e < 1 )
pSub->sResultCode=FEERR_INNU;
                    vSendErrorResponse(pSub, "Invalid Serial Number");

pSub->lMsgtype = SPIF_SUBSCRIBER_DISCONNECT;
                    pSub->sResultCode = LOGOUT_BY_OPERATOR;
                    vMQ_Log(NULL,NULL,0,"[FRONTEND] Deleting Invalid
Subscriber\n");
                    vMQ_EventLog(NULL,NULL, MQ_EVB_ATTEMPT,
                         pSub->caSCR, strlen(pSub->caSCR) );
                    vHandleAuditLog(NULL, NULL, MQ_MTS_AUDIT_CLLOGOUT, lFID,(void *)pSub, NULL, 1);

s S e n d H e a d e r (    8,    p S u b - > l S p i f I D ,
SPIF_SUBSCRIBER_DISCONNECT );

/* Delete the subscriber */
                    if(iDelSub( pSub->lSpifID) != SUCCESS)
                    {
                         vMQ_Log(NULL,NULL,0,"[FRONTEND]    Unable    to
Delete Subscriber\n");
                    }
              }
        }
      else
      {
           /* Subscriber is valid check if it is a gateway or
subscriber */
           pSub->iValidated = 1;
           if( pSub->sGatewayFlag == 1)
           {
                 vMQ_Log(NULL, NULL, 5,
                      "[FRONTEND]    Valid    GATEWAY.    Sending    OK
Response\n");
                 pSub->lMsgtype = SPIF_ACK;
```

APPENDIX A — PAGE 214 OF 279

```
                    sSendHeader( 8, pSub->lSpifID, pSub->lMsgtype );
            }
            else
            {
                    vMQ_Log(NULL,    NULL,    5,    "[FRONTEND]    Valid
SUBSCRIBER\n");
                    pSpifHeader->lMsgtype = SPIF_PASS_THROUGH;
                    pSpifHeader->lSpifID = pSub->lSpifID;
                    vFePassThrough_all(pSpifHeader, pSub->caMsg);
            }
       }
       return;
}

/*:::::::::::::::::::::::::::::::::::::::::::::::::::::::::::::::
:::::::::
:: Function:     sFeProcessClientMsg
::
:: Purpose: Process the SPIF messages
::
:: Returns:      short SUCCESS or FAILURE.
::
:: Input:        Pointer to SPIF header and message.
::
:: Output : none
::
:: Globals:
::
:: Called routines :
::
:: Revision:
:: WHO           --WHEN--  WHAT
:: Raju          08/28/94  Original
:::::::::::::::::::::::::::::::::::::::::::::::::::::::::::::::::
::::::::*/ short sFeProcessClientMsg(pSpifHeader, Msg )
SPIF_HEADER *pSpifHeader;
void *Msg;
{
     vMQ_Log(NULL, NULL, 20, "[FRONTEND] Clientmsg msgsize %ld
type %ld \n",
                pSpifHeader->lMsgsize, pSpifHeader->lMsgtype);

if( sGateDisconnectFlag == 1 )
     {
            vMQ_Log(NULL, NULL, 0,
                  "[FE%ld]   DISCARDING   message.   Waiting   to
Disconnect.\n", lAddress);
            return SUCCESS;
     }

/* Update the subscriber lascommtime */
     vFeUpdate_Sub(pSpifHeader->lSpifID);
```

APPENDIX A — PAGE 215 OF 279

```
    /* Handle timeout */
    vFeHandleTimeout_all();

/* Check the type of SPIF message  add process accordingly
*/
    switch( pSpifHeader->lMsgtype )
    {
        case SPIF_SUBSCRIBER_DISCONNECT:
            vFeSubDisconnect_all(pSpifHeader);
            break;
        case SPIF_SUBSCRIBER_CONNECT:
            if( sTerm_After_Service == 0)
            {
                vFeSubConnect_all(pSpifHeader, Msg, 0);
            }
            else
            {
                vMQ_Log(NULL, NULL, 0,
                "[FRONTEND] ERROR: No Server. Disconnect
subscriber\n");
                sSendHeader( 8, pSpifHeader->lSpifID,
                    SPIF_SUBSCRIBER_DISCONNECT );
            }
            break;
        case SPIF_PASS_THROUGH:
            vFePassThrough_all(pSpifHeader, Msg);
            break;
        default:
        vMQ_Log(NULL, NULL, 0, "[FRONTEND] Unknown messagetype
%ld\n",
                pSpifHeader->lMsgtype);
            sSendHeader(8,    pGSub->lSpifID,
pSpifHeader->lMsgtype);
            break;
    }
    return SUCCESS;
}

/*::::::::::::::::::::::::::::::::::::::::::::::::::::::::::::::::
::::::::::
:: Function:    sFeProcessSpifMsg
::
:: Purpose: Process the SPIF messages
::
:: Returns:     short SUCCESS or FAILURE.
::
:: Input:       Pointer to SPIF header and message.
::
:: Output : none
::
:: Globals:
::
:: Called routines :
::
:: Revision:
```

APPENDIX A — PAGE 216 OF 279

```
:: WHO         --WHEN-- WHAT
:: Raju        08/28/94 Original
::::::::::::::::::::::::::::::::::::::::::::::::::::::::::::::::
::::::::*/ short sFeProcessSpifMsg(pSpifHeader, Msg)
SPIF_HEADER *pSpifHeader;
char *Msg;
{
    vMQ_Log(NULL, NULL, 20, "[FRONTEND] SPIFmsg msgsize %ld type
%ld \n",
            pSpifHeader->lMsgsize, pSpifHeader->lMsgtype);

if( sGateDisconnectFlag == 1 )
    {
        vMQ_Log(NULL, NULL, 0,
                "[FE%ld]   DISCARDING    message.    Waiting   to
Disconnect.\n", lAddress);
        return SUCCESS;
    }

/* Update the subscriber lascommtime */
    vFeUpdate_Sub(pSpifHeader->lSpifID);

/* Handle timeout */
    vFeHandleTimeout_all();

/* Check the type of SPIF message  add process accordingly
*/
    switch( pSpifHeader->lMsgtype )
    {
        case SPIF_SUBSCRIBER_DISCONNECT:
            vFeSubDisconnect_all(pSpifHeader);
            break;
        case SPIF_GATEWAY_DISCONNECT:
            vFeGateDisconnect_all(GATEDISCONNECT_BY_SPIF);
            break;
        case SPIF_LOGIN:
            if( (pGSub == NULL) && ( Msg[0] != '\0' ))
            {
                vFeGateConnect_all(pSpifHeader, Msg);
            }
            else
            {
            vMQ_Log(NULL, NULL, 0,
                    "[FRONTEND]   ERROR:   GATEWAY   Already
logged in.\n");
            }
            break;
        case SPIF_AVAILABLE:
            if(pGSub != (SUBSCRIBER *)NULL)
            {
                if(sTerm_After_Service == 0)
                    sSendHeader(8, -1, SPIF_ACK);
                else
```

```
                         sSendHeader(8,    -1,
SPIF_FESPIF_SHUTDOWN);
            }
            break;
        default:
            vMQ_Log(NULL, NULL, 0, "[FRONTEND] Unknown messagetype
%ld\n",
                    pSpifHeader->lMsgtype);
            sSendHeader(8,    pGSub->lSpifID,
GATEDISCONNECT_BY_OPERATOR);
            break;
    }
    return SUCCESS;
}

/*:::::::::::::::::::::::::::::::::::::::::::::::::::::::::::::::
::::::::::
:: Function:   sSendMsg
::
:: Purpose: Send the actual message to the SPIF.
::
:: Returns:    SUCCESS or FAILURE.
::
:: Input:      Pointer to Subscriber structure, message and
message length.
::
:: Output : none
::
:: Globals:
::
:: Called routines :
::
:: Revision:
:: WHO         --WHEN--   WHAT
:: Raju        08/28/94   Original
:::::::::::::::::::::::::::::::::::::::::::::::::::::::::::::::::
:::::::::*/ short sSendMsg( pSub, pvMsg, lLength )
SUBSCRIBER    *pSub;
void          *pvMsg;
short         lLength;
{
    int   iPort, i;
    short     sLen, sLength, sCompress_msglen, sCnt, sArmcnt;
    char *caCompMsg, *cp, *cpTemp, outbuf[MAX_MSG_SIZE];
    long  lCrcval, lRet;
    long  lFinalLength;
    SPIF_HEADER spif_header;

iPort = pSub->iCommPort;

/* Compute message length and CRC */
    lCrcval = lCrc16( (unsigned char *)pvMsg, lLength, 0 );
```

```c
        /* Only LZ compression is supported as of now - 5/26/94 */
        if( (pSub->lStatus & SS_LZ_COMPRESS ) && !(pSub->lStatus &
SS_OVRD_MODE) )
        {
            /* If compression is not overriden, LZ compression will
be used */
            vMQ_Log(NULL, NULL, 0, "[FRONTEND] SendMsg: Compression
ON!\n");

if( (caCompMsg = malloc(sizeof(char) * lLength)) ==
NULL )
            {
                vMQ_Log(NULL, NULL, 0,
                    "[FRONTEND] Unable to allocate memory in
sSendMsg \n");
                vFeGateDisconnect_all(GATEDISCONNECT_BY_OPERATOR);
                return(FAILURE);
            }
            /* Return value of 0 or higher gives size of compressed
data
                                    -1 - no compression */
            lRet = lCompressData( pvMsg, lLength, (void *)caCompMsg
);
            sprintf( outbuf, "|%04d%c|%04x%s", lRet,
                FE_LZ_COMPRESS, lCrcval, caCompMsg );

lFinalLength = strlen(outbuf);
        }
        else
        {
            cp = outbuf;
            sprintf(cp,"|%.4d|%.4x", lLength, lCrcval);
            cp += 10;

if ((pSub->lStatus & SS_ROUTE_DWNL)||(pSub->lStatus &
SS_SEND_BINARY))
            {
                memcpy(cp, (char *)pvMsg, lLength);
                lFinalLength = lLength+10;
            }
            else
            {
                sprintf( cp, "%s", (char *)pvMsg );
                lFinalLength = strlen(cp)+10;
            }
        } if( sPacketFlag & 1 )
        {
            sLen = strlen( pSub->caSCR ) + lFinalLength;
        }
        else
        {
            sLen = lFinalLength;
        }
```

APPENDIX A — PAGE 219 OF 279

```c
        if( sLen > 4080)
        {
                vMQ_Log(NULL, NULL, 10, "[FRONTEND] Message longer than 4096\n");
        }

/* write the header information first */
        sSendHeader( sLen + 8, pSub->lSpifID, pSub->lMsgtype );

pSub->lTrx_count++;
        pGSub->lTrx_count++;

/* Send the maneuver now */
        /* We must not send more than 250 characters at one time,
        otherwise it seems
        ** the modem will not send the extra characters. 220 is the norm for
        ** ARDIS, because we need to account for the ARDIS header field.
        */
        sLen = strlen( pSub->caSCR );

#ifdef DEBUG
        /* file fe_spif.msgs */
        if( iDebug > 5)
        {
                fprintf( pMsgsfile,"\n SENT Msg ");
                fflush( pMsgsfile );
        }
endif /* If packet header is to be written */
        if( sPacketFlag & 1 )
        {
                mod_write(iPort, pSub->caSCR, sLen);

#ifdef DEBUG
            /* file fe_spif.msgs */
            if( iDebug > 5)
            {
                fprintf( pMsgsfile,"%s", pSub->caSCR);
                fflush( pMsgsfile );
            }
endif
        }

/* If length of message exceeds packet size ... */
/*
        for (cp = outbuf, sArmcnt = strlen(outbuf); sArmcnt > 0;
sArmcnt -= sCnt)
*/
        for (cp = outbuf, sArmcnt = lFinalLength; sArmcnt > 0;
sArmcnt -= sCnt)
        {
                if ((sCnt = sArmcnt) > sTransmitLimit)
                    sCnt = sTransmitLimit;
```

APPENDIX A — PAGE 220 OF 279

```
            if (sPacketFlag & 1)
            {
                    mod_write(iPort, pSub->caSCR, sLen);            /*
Destination ID */ ifdef DEBUG
                /* file fe_spif.msgs */
                if( iDebug > 5)
                {
                        fprintf( pMsgsfile,"%s", pSub->caSCR);
                        fflush( pMsgsfile );
                }
endif
            } mod_write(iPort, cp, sCnt);                             /*
The data */ if( sCnt < 220)
            {
                    vMQ_Log(NULL, NULL, 10,
                         "[FRONTEND] MSG [%s]\n", cp);
            } ifdef DEBUG
            /* file fe_spif.msgs */
            if( iDebug > 5)
            {
                    cpTemp = cp;
                    for( i = 0; i < sCnt; i++)
                    {
                            fprintf( pMsgsfile,"%c", *cpTemp);
                            cpTemp++;
                    }
                    fflush( pMsgsfile );
            }
endif vMQ_Log(NULL, NULL, 21,
                    "[FRONTEND] Outbound message length is %d\n",
sCnt);

if (sPacketFlag & 1)
            {
                    mod_write(iPort, "\r", 1);                      /*  The
trigger */ ifdef DEBUG
                /* file fe_spif.msgs */
                if( iDebug > 5)
                {
                        fprintf( pMsgsfile,"\r");
                        fflush( pMsgsfile );
                }
endif
```

APPENDIX A — PAGE 221 OF 279

```
            } cp += sCnt;
        vMQ_Log(NULL, NULL, 21, "[FRONTEND] WROTE: [%d]\n",
sCnt+sLen);
        } free( caCompMsg );
    return(SUCCESS);
}
```

```c
static    char *  _ sccs_   =   { "   $ S o u r c e :
/ids/cvs/host/fe_spif/src/fe_parse.c,v $ Ver: $Revision: 1.2 $
Date: $Date: 1995/01/13 08:37:43 $"};
/* Copyright (C) 1994,1995 SEI Information Technology, Inc. */

/*::::::::::::::::::::::::::::::::::::::::::::::::::::::::::
::::::::::::::
:: Filename:   fe_parse.c
::
:: Purpose:         Parse the client message
::
:: Revision:
:: WHO          --WHEN--  WHAT
:: Raju         09/09/94  Modified for message queue and SPIF
::::::::::::::::::::::::::::::::::::::::::::::::::::::::::::
:::::::::::::*/ include <stdio.h>
include <stdlib.h>
#include <string.h>
#include <ctype.h>
include <time.h> include "gdefines.h"
include "gerror.h"
#include "queue.h"
#include "mq_pub.h"
#include "spif.h"
#include "fe_common.h"

#ifndef   ERROR
#define   ERROR     1
endif define TEMP_BUFF_SIZE    128
define TIME_SIZE         16
#define MSGID_SIZE        16
#define MSG_LEN                   5
define CRC_LEN                   5 extern long     lQID;
extern long             lFID;
extern long             lSize;
extern int              iDebug;
extern int              argcnt;
extern long             lg_addr;
extern int              bit_map;
extern long     lfe_tcp;
extern long     lFrontID;
extern long             lAddress;
extern int              iDataPort;
extern int              last_baud;
extern time_t           start_time;
extern long             lHeartbeat;
extern int              iListenPort;
extern short            sMaxPackets;
```

APPENDIX A — PAGE 223 OF 279

```
extern short          sPacketFlag;
extern int     ipacketflag;
extern short          sConfirmMax;
extern short     sAckPending;
extern long      lMap_format;
extern long      lFormat_mode;
extern short          sDefaultBaud;
extern short          sPacketLimit;
extern int            iQueue_master;
extern long           lLastCommtime;
extern long           lLastCommtime;
extern long           lConstantBaud;
extern long      lCompress_mode;
extern long           lDisplay_panes;
extern short          sTransmitLimit;
extern long           lHeartbeat_wait;
extern int       socket_port_num;
extern short     sInterPacketGap;
extern struct         sockaddr_in addr;
extern short          sProcess_heartbeat;
extern short     sTerm_After_Service;
extern long           lExit_on_disconnect;
extern unsigned long     ulSessionID;

extern void      *pMQU_master;
extern void      *pvMQ_master;

extern char      *cpQID;
extern char      *cpFrontID;
extern char     *cpConfigPath;
extern char          *caCommDevice;
extern char          *caDeviceConfig;
extern char      *cpDownload_dir;
extern char      *cpDictionary_dir;

extern char           caID[];
extern char           caBuff[];
extern char           caHangup[];
extern char           caOrigin[];
extern char           caOriginType[];
extern char           caLimitValue[];
extern char           caDestination[];
extern char           caNoAutoAnswer[];
extern char           caDestinationType[];
extern char           caCompression_marker[];

extern char           *caAlternative[];

extern Q_HEAD    sHead;
extern Q_HEAD    sConfig;
extern Q_HEAD    *pQhead;
extern Q_HEAD    *pQConfig;
extern FILE      *pMsgsfile;
extern SUBSCRIBER     *pGSub;
```

```
/*::::::::::::::::::::::::::::::::::::::::::::::::::::::::::::::
:::::::::::::
:: Function:    sMoveLatLong
::
:: Purpose:
::
:: Returns:
::
:: Input:
::
:: Output:
::
:: Globals:
::
:: Revision:
:: WHO          --WHEN--  WHAT
:: Raju         12/29/94  Original
::::::::::::::::::::::::::::::::::::::::::::::::::::::::::::::::
:::::::::::::*/ short sMoveLatLong( cppBuff, lReturn, base)
char **cppBuff;
long *lReturn;
int       base;
{
    short sLength1, sLength2;

vMQ_Log(NULL,NULL, 30,"[FRONTEND] LatLong buffer %s \n",
*cppBuff);

*lReturn = 0L;

if( **cppBuff != '|')
        return FAILURE;

if( *(*cppBuff + 1) == '\n')
        return SUCCESS;

(*cppBuff)++;
    sLength1 = strlen( *cppBuff );

*lReturn = strtol( *cppBuff, cppBuff, base);

sLength2 = strlen( *cppBuff );

if( sLength1 == sLength2 )
        *lReturn = DEFAULT_LAT_LONG;

if( **cppBuff != '|')
        return FAILURE;
    else
        return SUCCESS;
}
```

```
/*:::::::::::::::::::::::::::::::::::::::::::::::::::::::::::::::
:::::::::::::::
:: Function:    fe_parse.c
::
:: Purpose:           Parse the client message
::
:: Returns:
::
:: Input:
::
:: Output:
::
:: Globals:
::
:: Revision:
:: WHO          --WHEN--  WHAT
:: DAB                    Original
:: Raju         09/09/94  Modified for message queue and SPIF
:::::::::::::::::::::::::::::::::::::::::::::::::::::::::::::::::
:::::::::::::*/ ifdef   ANSI
short sHandleSPIFParse(char *cpInBuff, SPIFPARSE *pServerRequest,
short method)
#else
short sHandleSPIFParse(cpInBuff, pServerRequest, method)
char        *cpInBuff;              /* The incoming string to parse */
SPIFPARSE   *pServerRequest;
short       method;                 /*    0=remote->server,
1=server->remote */
#endif
{
    char *cp, *cp2;
    char tbuff[TEMP_BUFF_SIZE];
    short   sReturn = SUCCESS;
    short   stemp = 2;
    short   sublen, userlen, originlen, origintypelen,
            destlen, desttypelen, altlen;

userlen = FE_ID_LEN + 1;
    altlen = FE_ALT_LEN + 1;
    destlen = FE_DEST_LEN + 1;
    originlen = FE_ORIGIN_LEN + 1;
    sublen   = FE_SUBSCRIBER_LEN + 1;
    desttypelen = FE_DEST_TYPE_LEN + 1;
    origintypelen = FE_ORIGIN_TYPE_LEN + 1;

cp = cpInBuff;
    _strupr(cpInBuff);  /* We only want upper case letters */
    vMQ_Log(NULL,NULL,  30,"[FRONTEND]    Parse   len   %d   \n",
strlen(cpInBuff));

/* Initialize the error code to indicate a bad parse for
syntax */
    pServerRequest->caDestinationLimitType[0] = '\0';
```

```c
    /* Look for first delimiter character. This should be the first one,
    ** but just in case, ignore any leading garbage.
    */
    while (*cp != '|' && *cp != '\0')
        cp++;

/* If we did not find a delimiter, we are done with a failure */
    if (*cp != '|')
    {
        vMQ_Log(NULL,NULL,0,"[FRONTEND]    Parse    found    no delimiter\n");
        return FAILURE;
    }

/* Start parsing the fields */
    if ((sReturn = sMoveLong(&cp, &pServerRequest->tTimeStamp, TIME_SIZE))
            != SUCCESS)
    {
        vMQ_Log(NULL,NULL,0,"[FRONTEND]    Parse    Error    in timestamp\n");
        pServerRequest->caDestinationLimitType[0] = -1;
    }
    else if ((sReturn =
        sMoveField(&cp, pServerRequest->caSubscriber, &sublen))
            != SUCCESS)
    {
        vMQ_Log(NULL,NULL,0,"[FRONTEND]    Parse    error    in subscriberid\n");
        pServerRequest->caDestinationLimitType[0] = -1;
    }
    else if ((sReturn = sMoveLong(&cp, &pServerRequest->lMsgid, MSGID_SIZE))
            != SUCCESS)
    {
        vMQ_Log(NULL,NULL,0,"[FRONTEND]    Parse    error messageid\n");
        pServerRequest->caDestinationLimitType[0] = -1;
    }
    else if ((sReturn = sMoveField(&cp, pServerRequest->caID, &userlen))
                != SUCCESS)
    {
        vMQ_Log(NULL,NULL,0,"[FRONTEND] Parse error userid\n");
        pServerRequest->caDestinationLimitType[0] = -1;
    }
    else if (method == 0 && (sReturn =
            sMoveLatLong(&cp, &pServerRequest->lLatitude, 0))
        != SUCCESS)
    {
        pServerRequest->caDestinationLimitType[0] = -2;
        vMQ_Log(NULL,NULL,0,"[FRONTEND]    Parse    error latitude\n");
```

```
        }
        else if (method == 0 && (sReturn =
                 sMoveLatLong(&cp, &pServerRequest->lLongitude, 0))
!= SUCCESS)
        {
             pServerRequest->caDestinationLimitType[0] = -3;
             vMQ_Log(NULL,NULL,0,"[FRONTEND]     Parse      error
longitude\n");
        }
        else if ((sReturn =
                 sMoveField(&cp,    pServerRequest->caOrigin,
&originlen))
                 != SUCCESS)
        {
             pServerRequest->caDestinationLimitType[0] = -4;
             vMQ_Log(NULL,NULL,0,"[FRONTEND] Parse error origin\n");
        }
        else    if    ((sReturn    =    sMoveField(&cp,
pServerRequest->caOriginType,
                     &origintypelen)) != SUCCESS)
        {
             pServerRequest->caDestinationLimitType[0] = -5;
             vMQ_Log(NULL,NULL,0,"[FRONTEND]     Parse      error
origintype\n");
        }
        else if (method == 0 && (sReturn =
                 sMoveField(&cp,    pServerRequest->caDestination,
&destlen))
                     != SUCCESS)
        {
             pServerRequest->caDestinationLimitType[0] = -6;
             vMQ_Log(NULL,NULL,0,"[FRONTEND]     Parse      error
destination\n");
        }
        else if (method == 0 && (sReturn =
                 s   M   o   v   e   F   i   e   l   d   (   &   c   p  ,
pServerRequest->caDestinationType,&desttypelen))
                 != SUCCESS)
        {
             pServerRequest->caDestinationLimitType[0] = -7;
             vMQ_Log(NULL,NULL,0,"[FRONTEND] Parse error destination
type\n");
        }
        else if (method == 0 && (sReturn = sMoveLong(&cp,
                 &pServerRequest->lDestinationLimit,     10))      !=
SUCCESS ||
                 pServerRequest->lDestinationLimit < 0)
        {
             vMQ_Log(NULL,NULL,0,"[FRONTEND]     Parse      error
destinationlimit\n");
             sReturn = FAILURE;
             pServerRequest->caDestinationLimitType[0] = -8;
        }
        else if ((sReturn = sMoveField(&cp,
                 pServerRequest->caDestinationLimitType, &stemp))
!= SUCCESS)
```

```c
        {
                vMQ_Log(NULL,NULL,0,"[FRONTEND]    Parse    error
destinationlimittype\n");
                pServerRequest->caDestinationLimitType[0] = -9;
        }
        else
        {
                vMQ_Log(NULL,NULL, 30,"[FRONTEND] Parse Processing
alternate fields\n");
                /* Process alternative fields */
                for (stemp = 0; stemp < AR_MAX_ALTS; stemp++)
                {
#ifdef DEBUG
                        vMQ_Log(NULL,NULL, 30, "[FRONTEND] Parsing
%s len %d \n",
                                cp, altlen);
endif sReturn |= sMoveField(&cp, pServerRequest->aAlternatives[stemp].caAlternatives, &altlen);

ifdef DEBUG
                        vMQ_Log(NULL,NULL, 30, "[FRONTEND]   parsed
%s len %d \n", pServerRequest->aAlternatives[stemp].caAlternatives,
                                altlen);
#endif
                        altlen = FE_ALT_LEN + 1;
                        if(sReturn != SUCCESS)
                                vMQ_Log(NULL,NULL,0, "[FRONTEND] Parse
error stemp %d \n",
                                stemp);

}
        }

/* NOTE: If there are more fields which may follow, place
them here */
        /* No more fields to process, do final checks. */
        if (sReturn == SUCCESS)
        {
                /* Final field is destination limit type */
                cp2 = pServerRequest->caDestinationLimitType;
                if (*cp2 == '\0')
                        *cp2 = 'M';

if (*cp2 != 'M' && *cp2 != 'D' && *cp2 != 'T')
                {
                        vMQ_Log(NULL,NULL,0,"[FRONTEND]    Parse    error
Invalidlimittype\n");
                        sReturn = FAILURE;      /* Not a valid limit type
*/
                        pServerRequest->caDestinationLimitType[0] = -9;
                }
```

```
            /* We better be at the terminating delimiter sequence
now */
            if (sReturn == SUCCESS && (*cp != '|' || *(cp+1) !=
'\n'))
            {
                    vMQ_Log(NULL,NULL,0,"[FRONTEND] Parse error Longer
message\n");
                    sReturn = FAILURE;
                    /* Do not set reason code as this is case of too
many fields */
            }
        }
        else
        {
            vMQ_Log(NULL,NULL,0,"[FRONTEND] Parse error \n");
        }
        return sReturn;
}

/*:::::::::::::::::::::::::::::::::::::::::::::::::::::::::::::::
:::::::::::::::
:: Function:    sCheckCRC
::
:: Purpose:         Get message length and check CRC
::
:: Returns:     0        If string is incorrect or if CRC is
invalid.
::              msglen   If buffer is correct.
::
:: Input: message.
::
:: Output:      compression marker.
::
:: Globals:
::
:: Revision:
:: WHO          --WHEN--  WHAT
:: Raju         10/25/94  Original
::::::::::::::::::::::::::::::::::::::::::::::::::::::::::::::::::
:::::::::::::*/ short sCheckCRC(Inbuff)
char *Inbuff;
{
    int     i=0, j=0;
    int     msglen = 0;
    int     delim_count=0;
    long    lCrc_sent = 0;
    long    lComputed_crc = 0;
    char    *cp;
    char    cp_msglen[MSG_LEN];
    char    crcval_sent[CRC_LEN];
    char    buff[MAX_MSG_SIZE];
```

```
    /* check if the firstcharacter is a delimiter | */
    /* If not the message is incorrect */
    if( Inbuff[0] != 0x7c )
    {
        return( 0 );
    } caCompression_marker[0] = '\0';
    cp = Inbuff;
    cp++;

/* Parse the buffer to get message length, compression
marker if any */
    /* and get the crc.  Compute the crc and check if they match
*/
    for( i = 1; i < strlen( Inbuff ); i++)
    {
        /* If the delimiter count is 1 then we are looking for
crc */
        if( delim_count == 1 )
        {
            /* looking for crc.  It cammot be greater than 4
bytes */
            if( j > 5 )
            {
                return(0);
            }

/* untill the delimiter copy the string */
            if ( Inbuff[i] != 0x7c )
            {
                buff[j] = Inbuff[i];
                j++;
            }
            else
            {
                /* get the crc that was received */
                buff[j] = '\0';
                lCrc_sent = strtol( buff, NULL, 16);

/* get the remaining buffer */
                for( j = 0; i < strlen(Inbuff); i++,j++)
                {
                    buff[j] = Inbuff[i];
                } buff[j] = '\0';

/* compute CRC */
                lComputed_crc = lCrc16( buff, msglen, 0);
                vMQ_Log(NULL,NULL, 25,"[FRONTEND]   CRC sent
%ld compute %ld\n",
                        lCrc_sent, lComputed_crc);

/* check if CRC match */
                if( lComputed_crc == lCrc_sent)
```

```c
                {
                        /* return message length */
                        return( msglen );
                }

/* CRC did not match */
                return(0);
            }
            continue;
        }

/* look for the message length */
        /* read buffer untill a delimiter */
        if( Inbuff[i] != 0x7c )
        {
                /* message cannot be bigger than 5 bytes */
                if(( i > 5 ) && (delim_count == 0))
                {
                        return( 0 );
                }

/* 4th or 5th byte could be a compression marker
*/
                if((( i == 4) || (i == 5))  &&
                        ((Inbuff[i] == 'P') || (Inbuff[i] == 'D') ||
(Inbuff[i] == 'L')))
                {
                        caCompression_marker[0] = Inbuff[i];
                }
                else if( i == 5 )
                {
                        return (0);
                }
        }
        else
        {
                /* get the message length based on compression
markers presence */
                if( caCompression_marker[0] == '\0' )
                {
                        strncpy( cp_msglen, cp, i - 1);
                        cp_msglen[i - 1] = '\0';
                }
                else
                {
                        strncpy( cp_msglen, cp, i - 2);
                        cp_msglen[i - 2] = '\0';
                }
                msglen = atoi( cp_msglen );
                delim_count++;
#ifdef DEBUG
                vMQ_Log(NULL,NULL,30,"[FRONTEND] compress %s msg
%s msglen %d\n",
                        caCompression_marker, cp_msglen, msglen);
#endif
        }
```

APPENDIX A — PAGE 232 OF 279

```
         }

/* Invalid input buffer */
         return(0);
}
```

```
static    char *  _ sccs _  =   { "    $ S o u r c e :
/ids/cvs/host/fe_spif/src/fe_spif.c,v $ Ver: $Revision: 1.5 $
Date: $Date: 1995/04/24 15:54:32 $"};
/* Copyright (C) 1994,1995 SEI Information Technology, Inc. */

/*::::::::::::::::::::::::::::::::::::::::::::::::::::::::::::
:::::::::::::::
:: Filename:       fe_spif.c
::
:: Purpose:        This module contains functions that provide
the
::                 RESET   function,  accept   and   listen
functions
::                 for the front-end.
::
:: Revision:
:: WHO          --WHEN--  WHAT
:: Raju         09/09/94  Original
::::::::::::::::::::::::::::::::::::::::::::::::::::::::::::::
::::::::::::::*/ include  <stdio.h>
include  <signal.h>
#include  <fcntl.h>
#include  <errno.h>
#include  <netinet/in.h>
include  <sys/socket.h> include  "gdefines.h"
include  "gerror.h"
#include  "utdispm.h"
#include  "mq_pub.h"
#include  "queue.h"
#include  "spif.h"
#include  "fe_common.h"
#include  "fe_spif.h"

extern long      lQID;
extern long          lFID;
extern long          lSize;
extern int           iDebug;
extern int           argcnt;
extern long          lg_addr;
extern int           bit_map;
extern long      lfe_tcp;
extern long      lFrontID;
extern long          lAddress;
extern int           iDataPort;
extern int           last_baud;
extern time_t        start_time;
extern long          lHeartbeat;
extern int           iListenPort;
extern short         sMaxPackets;
extern short         sPacketFlag;
extern int       ipacketflag;
extern short         sConfirmMax;
```

APPENDIX A — PAGE 234 OF 279

```
extern short    sAckPending;
extern long     lMap_format;
extern long     lFormat_mode;
extern short        sDefaultBaud;
extern short        sPacketLimit;
extern int          iQueue_master;
extern long         lLastCommtime;
extern long         lLastCommtime;
extern long         lConstantBaud;
extern long     lCompress_mode;
extern long         lDisplay_panes;
extern short        sTransmitLimit;
extern long         lHeartbeat_wait;
extern int          socket_port_num;
extern short        sInterPacketGap;
extern struct       sockaddr_in addr;
extern short        sProcess_heartbeat;
extern short    sTerm_After_Service;
extern long         lExit_on_disconnect;
extern unsigned long    ulSessionID;
extern short    sGateDisconnectFlag;

extern void         *pMQU_master;
extern void         *pvMQ_master;

extern char         *cpQID;
extern char         *cpFrontID;
extern char     *cpConfigPath;
extern char         *caCommDevice;
extern char         *caDeviceConfig;
extern char     *cpDownload_dir;
extern char     *cpDictionary_dir;

extern char         caID[];
extern char         caBuff[];
extern char         caHangup[];
extern char         caOrigin[];
extern char         caExtBuff[];
extern char         caOriginType[];
extern char         caLimitValue[];
extern char         caDestination[];
extern char         caNoAutoAnswer[];
extern char         caDestinationType[];

extern char         *caAlternative[];

extern Q_HEAD       sHead;
extern Q_HEAD       sConfig;
extern Q_HEAD       *pQhead;
extern Q_HEAD       *pQConfig;
extern FILE         *pMsgsfile;
extern SUBSCRIBER   *pGSub;

extern int optind;
extern char *optarg;
```

```
/*::::::::::::::::::::::::::::::::::::::::::::::::::::::::::::
:::::::::::::::
:: Function: sFeCheckFID
::
:: Purpose: Checks to see if the front end ID is between the
least serial/dial
::           ID and the maximum net/tcp front end ID.
::
:: Returns:
::
:: Input:
::
:: Output:
::
:: Globals:
::
:: Revision:
:: WHO          --WHEN--  WHAT
:: Raju         09/09/94  Original
:::::::::::::::::::::::::::::::::::::::::::::::::::::::::::::
:::::::::::::::*/ short sFeCheckFID()
{
    /* Assign the least tcp frontend ID as the default ID */
    lFrontID = lfe_tcp;

/* check to see if a frontId was specified at command line
*/
    if( cpFrontID != NULL )
    {
        /* If specified at command line then this is the front
end ID */
        lFrontID = atoi(cpFrontID);
    }

/* Check if the front end ID is within limits */
    if(  lFrontID   <   MQ_MTLOW_FE_SERIAL   ||   lFrontID   >
MQ_MTHI_FE_NET)
    {
        vMQ_Log(NULL,NULL, 0,
            "[FRONTEND]    Invalid    FrontID.(Valid    range
1000-2999)\n");
        return(FAILURE);
    } return(SUCCESS);
}

/*::::::::::::::::::::::::::::::::::::::::::::::::::::::::::::
:::::::::::::::
:: Function: vFeHandleReset_all
::
:: Purpose:  Handle for RESET messages.  Reset could be either
0 or 1.
```

APPENDIX A — PAGE 236 OF 279

```
::                 0 Reset is a complete reset, It logs out all
current subscribers
::                 and the gateway and restarts with new argumnets.
::                 1 Reset is partial reset in which it updates the
current available
::                 services.
::
:: Returns:
::
:: Input:
::
:: Output:
::
:: Globals:
::
:: Revision:
:: WHO           --WHEN--  WHAT
:: Raju          09/09/94  Original
::::::::::::::::::::::::::::::::::::::::::::::::::::::::::::::::::
:::::::::::::*/ void       vFeHandleReset_all(pconfig,  pqwatch,  ptDTable,
lMessageType,
           lMessageSubType, plHeader)
void    *pconfig, *pqwatch, *ptDTable;
long lMessageType, lMessageSubType;
void *plHeader;
{
    int         again = 1;
    char        caTempFilename[36];
    char        **argv;
    MQ_HEADER   *pHeader;
    MQ_RESET    *pReset;
    FILE        *fp;
    int         itest;

optind = 1;
    pHeader = (MQ_HEADER *)plHeader;
    pReset = (MQ_RESET *)(pHeader->caBody );
    vMQ_Log(NULL, NULL, 10, "[FRONTEND] Received Reset %ld\n",
            pReset->lResetType);
    vMQ_EventLog(NULL, NULL, MQ_EVB_RESET,
            &pReset->lResetType, sizeof( long ));

/* Check if it is a full reset request. 0 Full and 1 Partial
reset */
    if ( pReset->lResetType == 0)
    {
        /* Full RESET requested. Read the arguments */
        argv = cppUtResetToArgv(pReset);

if(argv == NULL)
        {
        vMQ_Log(NULL, NULL, 0,
                "[FRONTEND] No Reset Parameters specified
\n");
```

```
                vFeHandleTerminate(TERMINATE_ABORT);
        }

/* the debug level, external device , config file are
supplied */
        /* by the reset request by the monitor. */
        while(again)
        {
                switch (getopt(pReset->lArgc + 1, argv, "c:d:e:"))
                {
                        case 'c': /* The config file */
                                caDeviceConfig = optarg;
                                break;
                        case 'd': /* The debug level */
                                iDebug= strtol(optarg, NULL, 0);
#ifdef DEBUG
                                if( ( iDebug > 5 ) && ( pMsgsfile ==
NULL ) )
                                {
                                        s  p  r  i  n  t  f  (
caTempFilename,"msgs.%ld",getpid());
                                        if ( (    pMsgsfile    =
fopen(caTempFilename,"w")) == NULL)
                                        {
                                                fprintf( stderr,"\n Unable to
open msgs.pid\n");
                                                fprintf( stderr," Exiting\n");
                                                exit(0);
                                        }
                                }
endif
                                break;
                        case 'e':
                                caCommDevice = optarg;
                                break;
                        default:
                                again = 0;
                                break;
                }
        } vMQ_Log(NULL,NULL, 10,
                "[FRONTEND]    config    %s    device    %s\n",
caDeviceConfig, caCommDevice);

/* Read the appropriate device config file */
    if ((fp = fopen(caDeviceConfig,"r")) == (FILE*)NULL)
    {
                vMQ_Log(NULL,NULL, 0, "[FRONTEND] Unable to open
caDeviceConfig\n");
                vFeHandleTerminate(TERMINATE_ABORT);
    } if ( lRead_config(fp) == -1 )
    {
        vMQ_Log(NULL, NULL, 0,
```

APPENDIX A — PAGE 238 OF 279

```
                              "[FRONTEND]  lRead_config  failed  [%d]\n",
errno);
                vFeHandleTerminate(TERMINATE_ABORT);
        } fclose( fp );

if(pGSub != NULL)
        {
                vFeGateDisconnect_all(GATEDISCONNECT_BY_OPERATOR);
        }

/* Open the communications port */
    /* iCommPort is initially -1, but subsequent usages will be
> 0 */
        if ((iFeOpenCommPort(pvMQ_master, caCommDevice)) < 0)
        {
            vMQ_Log(NULL, NULL, 0,
                        "[FRONTEND]  iOpenCommPort  failed  [%d]\n",
errno);
                vFeHandleTerminate(TERMINATE_ABORT);
        } if ((itest=sInitKnownLanguages(".")) < 0)
        {
            vMQ_Log(NULL,   NULL,   0,   "[FRONTEND]   Cannot   init
languages\n");
                vFeHandleTerminate(TERMINATE_ABORT);
        } vMQ_Log(NULL,    NULL,    0,    "[FRONTEND]    [%d]
Languages.\n",itest);

if (( iMQU_QueryServices(pMQU_master, pvMQ_master)) ==
FAILURE )
        {
                vMQ_Log(NULL,    NULL,    0,    "[FRONTEND]
iMQU_QueryServices Failed.\n");
                vFeHandleTerminate(TERMINATE_ABORT);
        } vCreate_Configtable();
        vFeRequestRegistry_all();

vMQ_Log(NULL, NULL, 5, "[FRONTEND] Processed Full Reset
\n");
        }
        else
        if ( pReset->lResetType == 1)
        {
                vMQ_Log(NULL,    NULL,    25,    "[FRONTEND]    calling
iMQU_QueryServices.\n");
            /* query the available services. */
            if (( iMQU_QueryServices(pMQU_master, pvMQ_master)) ==
FAILURE )
            {
```

```
                vMQ_Log(NULL,    NULL,    0,    "[FRONTEND]
iMQU_QueryServices Failed.\n");
                vFeHandleTerminate(TERMINATE_ABORT);
        } vMQ_Log(NULL,    NULL,    25,    "[FRONTEND]    calling
vCreate_Configtable.\n");
        vCreate_Configtable();
    }
    else
    {
        vMQ_Log(NULL, NULL, 0, "[FRONTEND] Invalid reset type
request\n");
        vFeHandleTerminate(TERMINATE_NORMAL);
    }
}

/*::::::::::::::::::::::::::::::::::::::::::::::::::::::::::::::
:::::::::::::::
:: Function: iFeOpenCommPort
::
:: Purpose: Open and initialize a socket.
::          Returns the file descriptor on a successful open.
::
:: Returns:
::
:: Input:
::
:: Output:
::
:: Globals:
::
:: Revision:
:: WHO           --WHEN--  WHAT
:: Raju          09/09/94  Original
::::::::::::::::::::::::::::::::::::::::::::::::::::::::::::::::
::::::::::::::*/ int   iFeOpenCommPort(mqwatch, cpDevice)
void *mqwatch;
char *cpDevice;
{
    vMQ_Log(NULL,    NULL,    20,    "[FRONTEND]    About    to    call
socket!!\n");

/* Using sockets - special operations for them */
    if ((iListenPort = socket(AF_INET, SOCK_STREAM, 0)) < 0)
    {
        vMQ_Log(NULL, NULL, 0,
            "[FRONTEND] Cannot obtain socket [%d]\n", errno);
        return FAILURE;
    }

/* Initialize addr structure */
```

```
    memset((void*)&addr, 0, sizeof(addr));
    addr.sin_family = AF_INET;
    addr.sin_port   = socket_port_num;

vMQ_Log(NULL,  NULL,  20,   "[FRONTEND]  About   to   bind
socket!!\n");
    if  (  bind(iListenPort,  (struct  sockaddr  *)&addr,
sizeof(addr)) < 0 )
    {
        vMQ_Log(NULL, NULL, 0, "[FRONTEND] Cannot bind socket
to %d [%d]\n",
                addr.sin_port, errno);
        close(iListenPort);
        return FAILURE;
    } vMQ_Log(NULL, NULL, 20, "[FRONTEND] ready to listen!!\n");
    /* Set to accept incoming connections */
    if ( listen(iListenPort, 1) < 0)
    {
        vMQ_Log(NULL, NULL, 0,
                "[FRONTEND]  Cannot  set  listen  mode  [%d]\n",
errno);
        close(iListenPort);
        return FAILURE;
    }

/* Add listenport to the queuewatch */
    if(iMQ_AddQueueWatch(mqwatch,    iListenPort,    caExtBuff,
MAX_MSG_SIZE,
                MQ_LISTEN_EXTERNAL) != SUCCESS)
    {
        vMQ_Log(NULL, NULL, 0,   "[FRONTEND] Unable to add to
queue watch\n");
        return FAILURE;
    } sGateDisconnectFlag = 0;

/* Wait for a connection */
    vMQ_Log(NULL,     NULL,     10,     "[FRONTEND]     Wait     for
connections\n");
    return SUCCESS;
}

/*::::::::::::::::::::::::::::::::::::::::::::::::::::::::::::::
::::::::::::::::
:: Function: iFeAccept
::
:: Purpose: Accept the connection if this is the first time data
is available
::              on the listen port.
::
:: Returns:
::
```

```
::  Input:
::
::  Output:
::
::  Globals:
::
::  Revision:
::  WHO          --WHEN--  WHAT
::  Raju         09/09/94  Original
:::::::::::::::::::::::::::::::::::::::::::::::::::::::::::::::::
::::::::::::::*/ int iFeAccept()
{
    int     len;

if( iDataPort == -1)
    {
        len = sizeof(addr);

vMQ_Log(NULL,  NULL,20,"[FRONTEND]  About  to  accept
socket %d port %d\n",
                addr.sin_port, iListenPort);
        if ( (iDataPort =
                accept(iListenPort, (struct sockaddr *)&addr,
&len)) < 0)
        {
            /* Oops - shouldn't happen */
            vMQ_Log(NULL, NULL, 0,
                "[FRONTEND] Accept on socket failed [%d]\n",
errno);
            vFeHandleTerminate(TERMINATE_ABORT);
        }

/* Have a connection - switch to it */
        vMQ_Log(NULL, NULL, 5,
            "[FRONTEND] Have a connection from %d.%d.%d.%d\n",
            (addr.sin_addr.s_addr >> 24) & 0xff,
            (addr.sin_addr.s_addr >> 16) & 0xff,
            (addr.sin_addr.s_addr >> 8) & 0xff,
            addr.sin_addr.s_addr  & 0xff);

/* Remove the listen port from the queue */
        if(iMQ_DelQueueWatch(pvMQ_master,   iListenPort)   !=
SUCCESS)
        {
            vMQ_Log(NULL, NULL, 0,
                "[FRONTEND] DelQueuewatch failed for listen
port\n");
            return FAILURE;
        }

/* Add the data port to queue */
        if(   iMQ_AddQueueWatch(pvMQ_master,    iDataPort,
caExtBuff,
                MAX_MSG_SIZE, MQ_NORMAL_EXTERNAL) != SUCCESS)
```

APPENDIX A — PAGE 242 OF 279

```
            {
                vMQ_Log(NULL, NULL, 0,
                    "[FRONTEND] AddQueuewatch failed for data
port\n");
                return FAILURE;
            } sGateDisconnectFlag = 0;
            vMQ_Log(NULL, NULL, 10,
                "[FRONTEND] External dataport added to queue watch
%ld\n",
                iDataPort);
        } return(SUCCESS);
}

/*:::::::::::::::::::::::::::::::::::::::::::::::::::::::::::::::::
:::::::::::::::
:: Function: iFeListen
::
:: Purpose: After all the subscribers and the Gateway are
disconnected then
::              the dataport is removed from the queue and the
listen port is added
::              to the queue.
::
:: Returns:
::
:: Input:
::
:: Output:
::
:: Globals:
::
:: Revision:
:: WHO          --WHEN--   WHAT
:: Raju         09/09/94   Original
:::::::::::::::::::::::::::::::::::::::::::::::::::::::::::::::::::
::::::::::::::*/ int iFeListen()
{
    /* All subscribers and gateways are disconnected so delete
dataport */
    if(iMQ_DelQueueWatch(pvMQ_master, iDataPort) != SUCCESS)
    {
        vMQ_Log(NULL, NULL, 0,
            "[FRONTEND]  DelQueuewatch  failed  for  data
port\n");
        return FAILURE;
    } close( iDataPort);
    iDataPort = -1;
```

APPENDIX A — PAGE 243 OF 279

```
    /* Add the listen port to the queue */ iMQ_AddQueueWatch(pvMQ_master,iListenPort,caExtBuff,MAX_MSG_SIZE,
            MQ_LISTEN_EXTERNAL);

sGateDisconnectFlag = 0;

vMQ_Log(NULL, NULL, 10,
         "[FRONTEND] Dataport deleted and listenport added to
queuewatch\n");
    return SUCCESS;
}

/*::::::::::::::::::::::::::::::::::::::::::::::::::::::::::::::::
:::::::::::::::
:: Function: mod_write
::
:: Purpose: Like write() but handles if the write does not
::               output all of the characters.
::
:: Returns:
::
:: Input:
::
:: Output:
::
:: Globals:
::
:: Revision:
:: WHO          --WHEN--  WHAT
:: DAB                    Original
:: Raju         09/09/94  Modified for msg queue and SPIF
:::::::::::::::::::::::::::::::::::::::::::::::::::::::::::::::::::
:::::::::::::::*/
int  mod_write(fd, buff, len)
int  fd;
char *buff;
int  len;
{
    int  cnt;
    int  total = 0;

errno = 0;
#ifdef DEBUG
    vMQ_Log(NULL, NULL, 30, "[FRONTEND]   In mod_write %d\n",
fd);
endif while (len > 0)
    {
        cnt = write(fd, buff, len);
        if (cnt > 0)
        {
            if (len > 0)
```

APPENDIX A — PAGE 244 OF 279

```c
                    {
#ifdef DEBUG
                        vMQ_Log(NULL, NULL, 30, "[FRONTEND] mod_write wrote %d\n",cnt);
#endif
                    }
                    len -= cnt;
                    total += cnt;
                    buff += cnt;
            }
            else if (cnt < 0)
            {
                    /* Some error - report it */
                    vMQ_Log(NULL, NULL, 0, "[FRONTEND]  mod_write failed\n");
                    break;
            }
            else
            {
                    vMQ_Log(NULL, NULL, 0, "[FRONTEND] mod_write wrote 0\n");
            }
      } return total;
}
```

```c
/* _sccs_ $Source: /ids/cvs/host/fe_spif/src/fe_spif.h,v $ Ver:
$Revision: 1.2 $ Date: $Date: 1995/04/24 15:54:33 $ */
/*:::::::::::::::::::::::::::::::::::::::::::::::::::::::::::
:::::::::::::::
:: Filename:       fe_spif.h
::
:: Purpose:        This file defines structures that are global
::                 to the spif.
::
:: Revision:       08/18/94    Raju      Original

:::::::::::::::::::::::::::::::::::::::::::::::::::::::::::::
:::::::::::::*/ void    vFeHandleRoute_all();
void    vFeHandleReset_all();
void    vFeHandleStatus_all();
void    vFeHandlePOIQuery_all();
void    vFeHandleValidate_all();
void    vFeHandleHeartbeat_all();
void    vFeHandleTerminate_all();
void    vFeHandleAcknowledge_all();
void    vFeHandleSetdebug_all();
void    vFeHandleAddservice_all();

char *cpDownload_dir = "./download";

/* DISPATCH TABLE with messagetype, messagesubtype and handle
name */
UT_DISPATCHTABLE    DTable[] = {
    MQ_MT_HEARTBEAT,        -1,
vFeHandleHeartbeat_all,
    MQ_MT_RESET,            -1,
vFeHandleReset_all,
    MQ_MT_TERMINATE,        -1,
vFeHandleTerminate_all,
    MQ_MT_ACKNOWLEDGE,              -1,
vFeHandleAcknowledge_all,
    MQ_MT_QUERY,                    MQ_MTS_QUERY_STATUS,
vFeHandleStatus_all,
    MQ_MT_OPCOMMAND,        MQ_MTS_OP_ROUTE,
vFeHandleRoute_all,
    MQ_MT_OPCOMMAND,        MQ_MTS_OP_POIQUERY,
vFeHandlePOIQuery_all,
    MQ_MT_OPCOMMAND,        MQ_MTS_OP_VALIDATE_Q,
vFeHandleValidate_all,
    MQ_MT_OPCOMMAND,        MQ_MTS_OP_SETDEBUG,
vFeHandleSetdebug_all,
    MQ_MT_OPCOMMAND,        MQ_MTS_OP_ADDSERVICE,
vFeHandleAddservice_all,
    0,                              0,              NULL
};
```

```c
static   char *  _sccs_  =  { "    $ S o u r c e :
/ids/cvs/host/fe_spif/src/fe_sub.c,v $ Ver: $Revision: 1.9 $
Date: $Date: 1995/05/05 17:12:19 $"};
/* Copyright (C) 1994,1995 SEI Information Technology, Inc. */

/*:::::::::::::::::::::::::::::::::::::::::::::::::::::::::
::::::::::::::
:: Filename:       fe_sub.c
::
:: Purpose:        This module contains functions that provide
the
::                 Subscriber list creation and access
functions
::
:: Revision:
:: WHO          --WHEN--   WHAT
:: Raju         09/06/94   Original
:::::::::::::::::::::::::::::::::::::::::::::::::::::::::::::
::::::::::::::*/ include <stdio.h>
include <stdlib.h>
#include <string.h>
#include <time.h>
#include <sys/signal.h>
#include <sys/types.h>
#include <sys/time.h>
include <sys/ipc.h>
#include <errno.h>
include <netinet/in.h> include "gdefines.h"
include "gerror.h"
#include "mq_pub.h"
#include "queue.h"
#include "spif.h"
#include "fe_common.h"

#define DESCRIPTION_LEN 128
define NAME_LEN        128 extern long     lQID;
extern long         lFID;
extern long         lSize;
extern int          iDebug;
extern int          argcnt;
extern long         lg_addr;
extern int          bit_map;
extern long     lfe_tcp;
extern long     lFrontID;
extern long         lAddress;
extern int          iDataPort;
extern int          last_baud;
extern time_t       start_time;
extern long         lHeartbeat;
extern long         lDBETimeout;
```

```
extern int            iListenPort;
extern short          sMaxPackets;
extern short          sPacketFlag;
extern int        ipacketflag;
extern short          sConfirmMax;
extern short      sAckPending;
extern long       lMap_format;
extern long       lFormat_mode;
extern short          sDefaultBaud;
extern short          sPacketLimit;
extern int            iQueue_master;
extern long           lLastCommtime;
extern long           lLastCommtime;
extern long           lConstantBaud;
extern long       lCompress_mode;
extern long           lDisplay_panes;
extern short          sTransmitLimit;
extern long           lHeartbeat_wait;
extern int            socket_port_num;
extern short          sInterPacketGap;
extern struct         sockaddr_in addr;
extern short          sProcess_heartbeat;
extern short      sTerm_After_Service;
extern long           lExit_on_disconnect;
extern unsigned long      ulSessionID;

extern void           *pMQU_master;
extern void           *pvMQ_master;

extern char           *cpQID;
extern char           *cpFrontID;
extern char       *cpConfigPath;
extern char           *caCommDevice;
extern char           *caDeviceConfig;
extern char       *cpDownload_dir;
extern char       *cpDictionary_dir;

extern char           caID[];
extern char           caBuff[];
extern char           caHangup[];
extern char           caOrigin[];
extern char           caOriginType[];
extern char           caLimitValue[];
extern char           caDestination[];
extern char           caNoAutoAnswer[];
extern char           caDestinationType[];

extern char           *caAlternative[];

extern Q_HEAD         sHead;
extern Q_HEAD         sConfig;
extern Q_HEAD         *pQhead;
extern Q_HEAD         *pQConfig;
extern FILE           *pMsgsfile;
extern SUBSCRIBER     *pGSub;
```

APPENDIX A — PAGE 248 OF 279

```c
#define POI_EXTNAME_SIZE    64
#define POI_INTNAME_SIZE    64
define BUFF_SIZE           256 typedef struct poimap
{
    char    caExtName[POI_EXTNAME_SIZE+1];
    char    caIntName[POI_INTNAME_SIZE+1];
} POIMAP;

char    *cpPOIMapConfig = "POIMAP.DAT";
Q_HEAD   qhPOIMap;
void vFeCreatePOIMapping();

/*::::::::::::::::::::::::::::::::::::::::::::::::::::::::::::::
::::::::::::::::
:: Function:       vPrint_Subq
::
:: Purpose: This routine is just for debug purposes to check the
subscriber
::              list elements
::
:: Returns:
::
:: Input:
::
:: Output:
::
:: Globals:
::
:: Called Routines:
::
:: Revision:
:: WHO           --WHEN--   WHAT
:: Raju          09/06/94   Original
::::::::::::::::::::::::::::::::::::::::::::::::::::::::::::::::
:::::::::::::::*/ void vPrint_Subq()
{
    Q_ELEM       *pq_elem;
    Q_HEAD       *pq;
    SUBSCRIBER   *pSub;

vMQ_Log(NULL,NULL, 30,"[FRONTEND] Printing Subq\n");
    if( pQhead == NULL)
    {
        vMQ_Log(NULL,NULL, 10,"[FRONTEND] Subq empty \n");
        return;
    }

/* Get the global pointer to the subscriber list */
    pq = pQhead;

/* Traverse the subscriber list */
```

```
      Q_FORWTRAV(pq_elem,pq)
      {
            pSub = (SUBSCRIBER *) q_data(pq_elem);

/* Print each list elements */
            vMQ_Log(NULL,NULL, 30,"[FRONTEND] Subq elem %ld %ld
%s\n",
                  pSub->lSpifID, pSub->lSequence, pSub->caSCR);
      } vMQ_Log(NULL,NULL, 30,"[FRONTEND] End of Subq\n");
      return;
}

/*:::::::::::::::::::::::::::::::::::::::::::::::::::::::::::::
:::::::::::::::
:: Function:      pFindSpifID
::
:: Purpose: Traverses through the list of subscribers and returns
a pointer to
::          the subscriber structure if it is found based on
the SPIFID. If
::          subscriber is not found NULL is returned.
::
:: Returns:
::
:: Input:
::
:: Output:
::
:: Globals:
::
:: Called Routines:
::
:: Revision:
:: WHO          --WHEN--  WHAT
:: Raju         09/06/94  Original
:::::::::::::::::::::::::::::::::::::::::::::::::::::::::::::::
::::::::::::::*/
SUBSCRIBER *pFindSpifID(long spifid)
{
      Q_ELEM         *pq_elem;
      Q_HEAD         *pq;
      SUBSCRIBER     *pSub;

vMQ_Log(NULL,NULL, 21,"[FRONTEND] In pFindSpifID looking for
%ld\n",spifid);

if( pQhead == NULL)
      {
            vMQ_Log(NULL,NULL,0,"[FRONTEND]   Qhead   null   in
pFindSpifID \n");
            return NULL;
      }
```

APPENDIX A — PAGE 250 OF 279

```
    /* Get the global pointer to the subscriber list */
    pq = pQhead;

/* Traverse the subscriber list */
    Q_FORWTRAV(pq_elem,pq)
    {
        pSub = (SUBSCRIBER *) q_data(pq_elem);
        vMQ_Log(NULL,NULL, 30,
                "[FRONTEND]    pFindSpifID    found
%ld\n",pSub->lSpifID);

/* check if the SPIFID matches */
        if ( spifid == pSub->lSpifID )
        {
            vMQ_Log(NULL,NULL,  21,"[FRONTEND]   pFindSpifID
found match %ld\n",
                    pSub->lSpifID);
            pSub->lLastCommtime = time(0L);

if( pGSub != NULL)
                pGSub->lLastCommtime = pSub->lLastCommtime;
            return ((SUBSCRIBER *)pSub);
        }
    }

/* Matching SPIFID is not found */
    vMQ_Log(NULL,NULL,20,"[FRONTEND]    pFindSpifID    returning
Null\n");
    return NULL;
}

/*:::::::::::::::::::::::::::::::::::::::::::::::::::::::::::::::
:::::::::::::::
:: Function:      pFindResponse
::
:: Purpose: Traverses through the list of subscribers and returns
a pointer to
::               the subscriber structure if it is found based on
the Sequence
::               number and replytime. If subscriber is not found
NULL is returned.
::
:: Returns:
::
:: Input:
::
:: Output:
::
:: Globals:
::
:: Called Routines:
::
:: Revision:
:: WHO           --WHEN--   WHAT
:: Raju          09/06/94   Original
```

APPENDIX A — PAGE 251 OF 279

```
:::::::::::::::::::::::::::::::::::::::::::::::::::::::::::::::::
::::::::::::::*/

SUBSCRIBER *pFindResponse(time_t ltime, long lsequence )
{
    Q_ELEM      *pq_elem;
    Q_HEAD      *pq;
    SUBSCRIBER  *pSub;

vMQ_Log(NULL,NULL,21,"[FRONTEND] In FindResponse time %ld seq %ld\n",
            ltime, lsequence);

if( pQhead == NULL)
    {
        vMQ_Log(NULL,NULL,0,"[FRONTEND] No elements in queue \n");
        return NULL;
    }

/* Get a pointer to global subscriber list */
    pq = pQhead;

/* Traverse the subscriber list */
    Q_FORWTRAV(pq_elem,pq)
    {
        pSub = (SUBSCRIBER *) q_data(pq_elem);
        vMQ_Log(NULL,NULL,30,"[FRONTEND] FindResponse found time %ld seq %ld\n",
                pSub->tReplyTime, pSub->lSequence);

/* compare the sequencenumber and replytime for reply match */
        if ( (lsequence == pSub->lSequence) && (ltime == pSub->tReplyTime) )
        {
            vMQ_Log(NULL,NULL,21,"[FRONTEND]  FindResponse match t %ld s %ld\n",
                    pSub->tReplyTime, pSub->lSequence);
            return ((SUBSCRIBER *)pSub);
        }
    }

/* Matching sequence number and replytime is not found */
    vMQ_Log(NULL,NULL,0,"[FRONTEND] FindResponse No match \n");
    return NULL;
}

/*:::::::::::::::::::::::::::::::::::::::::::::::::::::::::::::::::
::::::::::::::
:: Function:    iDelSub
::
:: Purpose: Traverses through the list of subscribers and delete
a subscriber
```

APPENDIX A — PAGE 252 OF 279

```
::              based on the SPIFID and return SUCCESS. If
subscriber is not found
::              FAILURE is returned.
::
:: Returns:
::
:: Input:
::
:: Output:
::
:: Globals:
::
:: Called Routines:
::
:: Revision:
:: WHO           --WHEN--  WHAT
:: Raju          09/06/94  Original
::::::::::::::::::::::::::::::::::::::::::::::::::::::::::::::
:::::::::::::*/ int iDelSub(long spifid)
{
    Q_ELEM          *pq_elem;
    Q_HEAD          *pq;
    SUBSCRIBER      *pSub;
    char            buff[128];

vMQ_Log(NULL,NULL,21,"[FRONTEND] In iDelSub looking for id
%ld \n", spifid);

if( pQhead == NULL)
    {
        vMQ_Log(NULL,NULL,0,"[FRONTEND] No elements in queue
\n");
        return FAILURE;
    }

/* Get the pointer to global subscriber list */
    pq = pQhead;

/* Traverse the subscriber list */
    Q_FORWTRAV(pq_elem,pq)
    {
        pSub = (SUBSCRIBER *) q_data(pq_elem);
        vMQ_Log(NULL,NULL,30,"[FRONTEND] iDelSub found %ld \n",
pSub->lSpifID);

/* look for a match for the SPIFID and not a gateway
*/
        if (( spifid == pSub->lSpifID ) && ( pSub->sGatewayFlag
!= 1))
        {
#ifdef DELETE
            sprintf(buff,"tmp.%ld.%ld",   getpid(),
pSub->lSpifID);
            if( strcmp(buff,pSub->caTmpfile) != 0)
```

```c
                {
                        unlink(pSub->caTmpfile);
                } unlink(buff);
                unlink(pSub->caBtrfFile);
endif q_delete(pq, pq_elem);
                vMQ_Log(NULL,NULL,21,"[FRONTEND] iDelSub deleted %ld \n",
                        pSub->lSpifID);
                return SUCCESS;
            }
        }

/* Matching SPIFID is not found */
    vMQ_Log(NULL,NULL,0,"[FRONTEND] iDelSub No Match \n");
    return FAILURE;
}

/*:::::::::::::::::::::::::::::::::::::::::::::::::::::::::::::::::::::::::::
:::::::::::::::
:: Function:      pAddGate
::
:: Purpose: Adds a gateway
::
:: Returns:
::
:: Input:
::
:: Output:
::
:: Globals:
::
:: Called Routines:
::
:: Revision:
:: WHO           --WHEN--  WHAT
:: Raju          09/06/94  Original
:::::::::::::::::::::::::::::::::::::::::::::::::::::::::::::::::::::::::::::
:::::::::::::::*/
SUBSCRIBER *pAddGate( Msg )
char *Msg;
{
    SUBSCRIBER  sSub, *pSub;
    SPIFPARSE ServerRequest;
    Q_ELEM        *pq_elem;
    Q_HEAD        sHead, *pq;
    char        *cp;
    short         sStartLen, sEndLen;

/* Initailize the subscriber structure */
```

```
    vMQ_Log(NULL,NULL,21,"[FRONTEND] Creating Gateway structure
\n");
    pSub = &sSub;
    memcpy((char *)&pSub->ServerRequest, (char *)&ServerRequest,
            sizeof(SPIFPARSE));

pSub->lStatus = 0;
    pSub->bit_map = 0;
    pSub->sStateflag = 0;
    pSub->lTrx_count = 0;
    pSub->sItemCount = 0;
    pSub->lRcv_count = 0;
    pSub->iValidated = 0;
    pSub->lRoute_count = 0;
    pSub->sManeuverCount = 0;
    pSub->lRequestPending = 0;
    pSub->lResponsePending = 0;
    pSub->lExternalQuery_count = 0;
    pSub->lInternalQuery_count = 0;

memset((char *)&pSub->OriginLocus, -1, sizeof(ALOCUS));
    memset((char *)&pSub->DestinationLocus, -1, sizeof(ALOCUS));

pSub->lMsgtype = SPIF_LOGIN;
    pSub->iCommPort = iDataPort;
    pSub->lSessionID = ulSessionID;
    pSub->sBurstCount = sConfirmMax;
    pSub->sPacketLimit = sPacketLimit;
    pSub->lLastCommtime = pSub->tstart_time = time(0L);
    pSub->lMsgid = 0;

strcpy(pSub->caSCR, Msg);
    vMakeUpper(pSub->caSCR);

strcpy(pSub->caMsg, Msg);
    strcpy(pSub->caConfig, "\0");
    strcpy(pSub->caLanguage,"ENGLISH.FEB");
    sprintf(pSub->caTmpfile,"tmp.%ld.GATEWAY",getpid());

pSub->lSpifID = -1;
    pSub->sGatewayFlag = 1;
    strcpy(pSub->ServerRequest.caID, "GATEWAY");

vMQ_Log(NULL,NULL,21, "[FRONTEND] user %s, file %s, msgid
%ld scr %s\n",
        pSub->ServerRequest.caID,   pSub->caTmpfile,
pSub->lMsgid, pSub->caSCR);

/* add this to the q */
    pq_elem = (Q_ELEM *)q_new(pSub,sizeof(SUBSCRIBER));
    pq = pQhead;
    q_atail(pq,pq_elem);
    vMQ_Log(NULL,NULL,21,"[FRONTEND] Added Gateway\n");

/* Create POI Mapping queue */
    vFeCreatePOIMapping();
```

APPENDIX A — PAGE 255 OF 279

```
        return (NULL);
}

/*::::::::::::::::::::::::::::::::::::::::::::::::::::::::::::::::
::::::::::::::::
:: Function:      pAddSub
::
:: Purpose: Traverses through the list of subscribers and return
a pointer to
::                the subscriber if already exists.  If subscriber
does not exist
::                already then create a new structure element in the
list a return
::                a pointer to the subscriber. If this is the first
element to the
::                structure  then  it  is  the  gateway  structure
otherwise it is a
::                subscriber element.
::
:: Returns:
::
:: Input:
::
:: Output:
::
:: Globals:
::
:: Called Routines:
::
:: Revision:
:: WHO          --WHEN--  WHAT
:: Raju         09/06/94  Original
::::::::::::::::::::::::::::::::::::::::::::::::::::::::::::::::::
:::::::::::::::*/
SUBSCRIBER *pAddSub(SPIF_HEADER *spif_header,char *cpMsg)
{
    SUBSCRIBER  sSub, *pSub;
    SPIFPARSE ServerRequest;
    Q_ELEM         *pq_elem;
    Q_HEAD         sHead, *pq;
    char       *cp, *cpalt;
    int            i, j;
    short          sCount;
    short          sStartLen, sEndLen;

vMQ_Log(NULL,NULL,21,"[FRONTEND] AddSub calling sFindSpifID
%ld\n",
        spif_header->lSpifID);

if( (pSub = pFindSpifID(spif_header->lSpifID)) != NULL)
    {
        vMQ_Log(NULL,NULL,0,"[FRONTEND] Found subscriber in
AddSub\n");
        return ((SUBSCRIBER *)pSub);
```

```
      }
      else
      {
           /* Initailize the subscriber structure */
           vMQ_Log(NULL,NULL,21,"[FRONTEND] Creating new structure
%ld\n",
                spif_header->lSpifID);
           pSub = &sSub;
           memcpy((char    *)&pSub->ServerRequest,    (char
*)&ServerRequest,
                     sizeof(SPIFPARSE));

pSub->lStatus = 0;
           pSub->bit_map = 0;
           pSub->sStateflag = 0;
           pSub->lTrx_count = 0;
           pSub->lRcv_count = 0;
           pSub->sItemCount = 0;
           pSub->iValidated = 0;
           pSub->lErrorCount = 0;
           pSub->lRoute_count = 0;
           pSub->sManeuverCount = 0;
           pSub->lRequestPending = 0;
           pSub->lResponsePending = 0;
           pSub->lExternalQuery_count = 0;
           pSub->lInternalQuery_count = 0;

memset((char *)&pSub->OriginLocus, -1, sizeof(ALOCUS));
           memset((char    *)&pSub->DestinationLocus,    -1,
sizeof(ALOCUS));

pSub->sGatewayFlag = 0;
           pSub->iCommPort = iDataPort;
           pSub->lSessionID = ulSessionID;
           pSub->sBurstCount = sConfirmMax;
           pSub->sPacketLimit = sPacketLimit;
           pSub->lMsgtype = SPIF_PASS_THROUGH;
           pSub->lSpifID = spif_header->lSpifID;
           pSub->lLastCommtime = pSub->tstart_time = time(0L);

strcpy(pSub->caMsg, cpMsg);
           strcpy(pSub->caConfig, "\0");
           strcpy(pSub->caLanguage,"ENGLISH.FEB");

sCount = 0;
           while( 1 )
           {
                cp = strchr(cpMsg,'|');
                cp++;
                cpMsg = cp;
                sCount++;
                if( sCount == 4 )
                     break;
           }
           sStartLen = strlen(cp);
           cp = strchr(cpMsg,'|');
```

```c
          sEndLen = strlen(cp);
          strncpy(pSub->caSCR, cpMsg,(sStartLen - sEndLen));
          pSub->caSCR[sStartLen - sEndLen] = '\0';

cpMsg = cp;
          if( sMoveLong(&cpMsg, &pSub->lMsgid, 16) != SUCCESS)
          {
                vMQ_Log(NULL,NULL,0,     "[FRONTEND]    Invalid messageID\n");
          }
          else
                pSub->ServerRequest.lMsgid = pSub->lMsgid;

cpMsg = cp + 6;
          sStartLen = strlen(cpMsg);
          cp = strchr(cpMsg,'|');

/*****************************************************
          cp--;
          if( *cp == '\\' )
          {
                cpalt = cp + 2;
                cp = strchr(cpalt,'|');
          }
          else
                cp++;
          *****************************************************/ sEndLen = strlen(cp);
          strncpy(pSub->ServerRequest.caID, cpMsg,(sStartLen - sEndLen));
          pSub->ServerRequest.caID[sStartLen - sEndLen] = '\0';

/*****************************************************
          if( strchr(pSub->ServerRequest.caID,'\\') != NULL )
          {
                for( i=0, j=0; i<strlen(pSub->ServerRequest.caID); i++)
                {
                      if( pSub->ServerRequest.caID[i] != '\\' )
                      {
                            pSub->ServerRequest.caID[j]    = pSub->ServerRequest.caID[i];
                            j++;
                      }
                }
                pSub->ServerRequest.caID[j] = '\0';
          }
          *****************************************************/ sprintf(pSub->caTmpfile,"tmp.%ld.%ld",getpid(),pSub->lSpifID);
          vMakeUpper(pSub->caSCR);
          vMakeUpper(pSub->ServerRequest.caID);
```

APPENDIX A — PAGE 258 OF 279

```
              vMQ_Log(NULL,NULL,21, "[FRONTEND] user %s, file %s,
msgid %ld scr %s\n",
              pSub->ServerRequest.caID,   pSub->caTmpfile,
pSub->lMsgid, pSub->caSCR );
     }

/* add this to the q */
     pq_elem = (Q_ELEM *)q_new(pSub,sizeof(SUBSCRIBER));
     pq = pQhead;
     q_atail(pq,pq_elem);
     vMQ_Log(NULL,NULL,21,"[FRONTEND] Added subscriber\n");

return (NULL);
}

/*::::::::::::::::::::::::::::::::::::::::::::::::::::::::::::::
:::::::::::::::
:: Function:      vFeUpdate_Sub
::
:: Purpose: Update the subscriber lastcommtime for the approriate
subscriber
::
:: Returns:
::
:: Input:
::
:: Output:
::
:: Globals:
::
:: Called Routines:
::
:: Revision:
:: WHO            --WHEN--  WHAT
:: Raju           09/06/94  Original
::::::::::::::::::::::::::::::::::::::::::::::::::::::::::::::::
:::::::::::::*/ void vFeUpdate_Sub(long lSpifID)
{
     time_t        now;
     Q_ELEM        *pq_elem;
     Q_HEAD        *pq;
     SUBSCRIBER    *pSub;

time(&now);

if( pQhead == NULL )
     {
          return;
     } pq = pQhead;

/* Traverse the subscriber list */
```

```
        Q_FORWTRAV(pq_elem,pq)
        {
                pSub = (SUBSCRIBER *) q_data(pq_elem);

/* Look for matching SPIFID and not a gateway */
                /* Update Lastcommtime and heartbeat sent and send
status fields */
                if((pSub->lSpifID == lSpifID) && (pSub->sGatewayFlag
!= 1))
                {
                        pSub->lLastCommtime = now;
                        pSub->lStatus &= ~SS_SEND_HBEAT;
                        pSub->lStatus &= ~SS_HBEAT_SENT;
                        pGSub->lLastCommtime = now;
                        pGSub->lStatus &= ~SS_SEND_HBEAT;
                        pGSub->lStatus &= ~SS_HBEAT_SENT;
                }
        }
        return;
}

/*::::::::::::::::::::::::::::::::::::::::::::::::::::::::::::::
:::::::::::::::
:: Function:      vFeLogout_Sub
::
:: Purpose: Logout any given spifid.
::
:: Returns:
::
:: Input:
::
:: Output:
::
:: Globals:
::
:: Called Routines:
::
:: Revision:
:: WHO          --WHEN--  WHAT
:: Raju         09/06/94  Original
::::::::::::::::::::::::::::::::::::::::::::::::::::::::::::::::
:::::::::::::*/ void vFeLogout_Sub(lSpifID, sCode)
long lSpifID;
short      sCode;
{
     char       *cp;
     long       lLen;
     time_t          now;
     Q_ELEM          *pq_elem;
     Q_HEAD          *pq;
     SUBSCRIBER      *pSub;

time(&now);
```

APPENDIX A -- PAGE 260 OF 279

```
    if( pQhead == NULL)
    {
        return;
    } pq = pQhead;

/* Traverse the subscriber list */
    Q_FORWTRAV(pq_elem,pq)
    {
        pSub = (SUBSCRIBER *) q_data(pq_elem);

/* Look for a matching subscriber ID */
        if((pSub->lSpifID == lSpifID) && (pSub->sGatewayFlag != 1))
        {
            /* send a subscriber disconnect message ok to SPIF */
            pSub->lMsgtype = SPIF_SUBSCRIBER_DISCONNECT;
            sSendHeader( 8, pSub->lSpifID, pSub->lMsgtype);
            pSub->sResultCode = sCode;
            vHandleAuditLog(NULL, NULL, MQ_MTS_AUDIT_CLLOGOUT, lFID,
                 (void *)pSub, NULL, 1);
            vMQ_EventLog(NULL,NULL, MQ_EVB_LOGOUT,
                 pSub->caSCR, strlen(pSub->caSCR));
            vMQ_Log(NULL,NULL,10,"[FRONTEND]    Deleting subscriber\n");

/* Delete the subscriber */
            if( iDelSub( pSub->lSpifID) != SUCCESS)
            {
                vMQ_Log(NULL,NULL,0,"[FRONTEND]  Unable to delete subscriber\n");
            }
        }
    }
}

/*::::::::::::::::::::::::::::::::::::::::::::::::::::::::::::::::::
::::::::::::::::
:: Function: vFeHandleSigUsr1
::
:: Purpose: Signal handler for USR1
::
:: Returns:
::
:: Input:
::
:: Output:
::
:: Globals:
::
:: Called Routines:
::

APPENDIX A -- PAGE 261 OF 279
```

```
:: Revision:
:: WHO          --WHEN--   WHAT
:: Raju         09/06/94   Original
::::::::::::::::::::::::::::::::::::::::::::::::::::::::::::::
:::::::::::::::*/ void vFeHandleSigUsr1(int sig)
{
    Q_ELEM         *pq_elem;
    Q_HEAD         *pq;
    SUBSCRIBER     *pSub;

if( pQhead == NULL)
    {
         return;
    } pq = pQhead;

/* Traverse the subscriber list and print the subscriber
details */
    Q_FORWTRAV(pq_elem,pq)
    {
         pSub = (SUBSCRIBER *) q_data(pq_elem);

vMQ_Log(NULL, NULL, 30,
              "[FRONTEND] Sub:<%s> Cnt: %2d Trx: %6d Rcv: %6d \
              Rs: %6d EQs: %6d IQs: %6d Cs: %s",
              pSub->caSCR,
              pSub->sManeuverCount,
              pSub->lTrx_count,
              pSub->lRcv_count,
              pSub->lRoute_count,
              pSub->lExternalQuery_count,
              pSub->lInternalQuery_count,
              pSub->caConfig);
    }
    signal(SIGUSR1, vFeHandleSigUsr1);
}

/*:::::::::::::::::::::::::::::::::::::::::::::::::::::::::::::
:::::::::::::::
:: Function: vFeHandleTerminate
::
:: Purpose: Terminate signal handler.
::
:: Returns:
::
:: Input:
::
:: Output:
::
:: Globals:
::
```

APPENDIX A — PAGE 262 OF 279

```
::   Called Routines:
::
::   Revision:
::   WHO            --WHEN--   WHAT
::   Raju           09/06/94   Original
::::::::::::::::::::::::::::::::::::::::::::::::::::::::::::::::
:::::::::::::::*/ void    vFeHandleTerminate(int   type)
{
     Q_ELEM          *pq_elem;
     Q_HEAD          *pq;
     SUBSCRIBER *pSub;
     char       buff[128];

/* Type NORMAL(0) specifies proper termination */
     /* Type ABORT(1) specifies abruptly terminating before
proper reset */
     if( pQhead == NULL)
     {
          type = TERMINATE_ABORT;
     } pq = pQhead;

if(type == TERMINATE_NORMAL)
     {
     vMQ_Log(NULL, NULL, 0, "[FRONTEND] Terminating NORMAL\n");

/* Traverse the subscriber list */
          Q_FORWTRAV(pq_elem,pq)
          {
               pSub = (SUBSCRIBER *) q_data(pq_elem);

/* Delete all subscribers and send subscriber
disconnect */
               /* request to all and audit each request */
               if(pSub->sGatewayFlag != 1)
               {
                    pSub->lMsgtype = SPIF_SUBSCRIBER_DISCONNECT;
                    sSendHeader(    8,    pSub->lSpifID,
pSub->lMsgtype);

pSub->sResultCode = LOGOUT_BY_OPERATOR;
                    vHandleAuditLog(NULL,    NULL,
MQ_MTS_AUDIT_CLLOGOUT, lFID,
                                                  (void *)pSub, NULL,
1);
                    vMQ_EventLog(NULL,NULL, MQ_EVB_LOGOUT,
                                          pSub->caSCR,
strlen(pSub->caSCR));
                    vMQ_Log(NULL,NULL,0,"[FRONTEND]    Deleting
subscriber\n");

/* delete the subscriber */
                    if( iDelSub( pSub->lSpifID) != SUCCESS)
```

```
                {
                        vMQ_Log(NULL,NULL,0,
                                "[FRONTEND]  Unable   to   delete
subscriber\n");
                }
            }
        }

/* Delete the gateway */
        pGSub->sGatewayFlag = 0;
        pGSub->lMsgtype = SPIF_GATEWAY_DISCONNECT;
        sSendHeader( 8, pGSub->lSpifID, pGSub->lMsgtype);

pGSub->sResultCode = LOGOUT_BY_OPERATOR;
        vHandleAuditLog(NULL,   NULL,   MQ_MTS_AUDIT_CLLOGOUT,
lFID,
                                    (void *)pGSub, NULL, 1);
        vMQ_EventLog(NULL,NULL, MQ_EVB_LOGOUT,
                                p G S u b - > c a S C R ,
strlen(pGSub->caSCR));
        vMQ_Log(NULL,NULL,0,"[FRONTEND] Deleting Gateway\n");

if( iDelSub( pGSub->lSpifID) != SUCCESS)
        {
            vMQ_Log(NULL,NULL,0,"[FRONTEND] Unable to delete
Gateway\n");
        }

/* unregiter the frontend */
        vFeRequestUnRegistry_all();
    }
    else
    {
        /* Traverse the subscriber list */
        Q_FORWTRAV(pq_elem,pq)
        {
            pSub = (SUBSCRIBER *) q_data(pq_elem);

/* Delete all temp files */
            if(pSub->sGatewayFlag != 1)
            {
#ifdef DELETE
                sprintf(buff,"tmp.%ld.%ld",    getpid(),
pSub->lSpifID);
                if( strcmp(buff,pSub->caTmpfile) != 0)
                {
                    unlink(pSub->caTmpfile);
                } unlink(buff);
                unlink(pSub->caBtrfFile);

endif
            }
        }
    }
```

```
        /* close data and listen ports */
        close(iDataPort);
        close(iListenPort);

/* terminate the queues */
        vMQ_Log(NULL, NULL, 0, "[FRONTEND] Terminating \n");
        vMQU_CloseConfig(&pMQU_master);
        iMQ_Terminate(pvMQ_master);
        exit(0);
}

/*:::::::::::::::::::::::::::::::::::::::::::::::::::::::::::::::::
:::::::::::::::
:: Function: vFeHandleTimeout_all
::
:: Purpose: Timeout handler.
::
:: Returns:
::
:: Input:
::
:: Output:
::
:: Globals:
::
:: Called Routines:
::
:: Revision:
:: WHO           --WHEN--  WHAT
:: Raju          09/06/94  Original
::::::::::::::::::::::::::::::::::::::::::::::::::::::::::::::::::
:::::::::::::::*/ void vFeHandleTimeout_all()
{
    char *cp;
    char buff[MAX_MSG_SIZE];
    long lLen;
    short     count = 0;
    time_t    now;
    Q_ELEM        *pq_elem;
    Q_HEAD        *pq;
    SUBSCRIBER    *pSub;

time(&now);
    if (pQhead == NULL)
    {
        return;
    } pq = pQhead;

vMQ_Log(NULL, NULL, 30, "[FRONTEND] Handling timeout\n");
    /* Traverse the subscriber list */
    Q_FORWTRAV(pq_elem,pq)
```

```c
    {
        pSub = (SUBSCRIBER *) q_data(pq_elem);
        vMQ_Log(NULL, NULL, 30, "[FRONTEND] SPIFID %ld, Subid %s, seq %ld\n",
            pSub->lSpifID, pSub->caSCR, pSub->lSequence);

/* If it is a gateway do not timeout */
        if( pSub->sGatewayFlag == 1)
        {
            continue;
        } count++;

/* change for timeout of serverguide response */
        if( ( pSub->lResponsePending == 1 ) &&
            ( pSub->tReplyTime + lDBETimeout ) < now )
        {
            vMQ_Log(NULL, NULL, 0, "[FRONTEND] serverguide TIMEDOUT\n");
            pSub->sResultCode = FEERR_SGTO;
            vSendErrorResponse(pSub, " Route Failed ");
            pSub->tReplyTime = now;
            pSub->lResponsePending = 0;
        }

/* Check if heartbeat has already been sent */
        if( (pSub->lStatus & SS_HBEAT_SENT ) &&
            ((pSub->lLastCommtime + lHeartbeat_wait) < now))
        {
            /* Heart beat has been sent already so logout the subscriber */
            vMQ_Log(NULL, NULL, 5, "[FRONTEND] Hangup on timeout\n");
            vFeLogout_Sub(pSub->lSpifID, LOGOUT_BY_HEARTBEAT);
        }
        else if(( pSub->lStatus & SS_SEND_HBEAT )  ||
            ((pSub->lLastCommtime + lHeartbeat)  < now))
        {
            if( pSub->lResponsePending != 1 )
            {
                cp = &buff[0];
                pSub->lMsgtype = SPIF_CLIENT_HEARTBEAT;
                /* Send Heartbeat message */
                vMQ_Log(NULL, NULL, 10, "[FRONTEND] Sending HEARTBEAT=Y\n");
                lLen = lFillMsgFields(pSub, cp);
                strcpy(cp+lLen,"E|OK|HEARTBEAT=Y|\n\r");
                sSendMsg(pSub, (void *)buff, strlen(cp));
                pSub->lStatus |= SS_HBEAT_SENT;
                pSub->lStatus &= ~SS_SEND_HBEAT;
                pSub->lLastCommtime = now - lHeartbeat + lHeartbeat_wait;
            }
        }
    }
```

APPENDIX A — PAGE 266 OF 279

```c
      if( (sTerm_After_Service == 1) && (count == 0) )
      {
           vMQ_Log(NULL, NULL, 0,
           "[FRONTEND] Terminating after Service.\n");
           vFeGateDisconnect_all(GATEDISCONNECT_BY_OPERATOR);
      } if( sAckPending > 0 )
      {
           if(( lLastCommtime + lHeartbeat) < now)
           {
                vMQ_Log(NULL, NULL, 0,
                "[FRONTEND] Acknowledge not received. Disconnect
Gateway\n");
                vFeGateDisconnect_all(GATEDISCONNECT_BY_OPERATOR);
           }
      }
      alarm( lHeartbeat_wait );
}

/*:::::::::::::::::::::::::::::::::::::::::::::::::::::::::::::::::
:::::::::::::::
:: Function: vCreate_Configtable
::
:: Purpose: Create the configtable to keep track of valid DBEs.
::
:: Returns:
::
:: Input:
::
:: Output:
::
:: Globals:
::
:: Called Routines:
::
:: Revision:
:: WHO          --WHEN--  WHAT
:: Raju         09/06/94  Original
:::::::::::::::::::::::::::::::::::::::::::::::::::::::::::::::::::
::::::::::::::*/ void vCreate_Configtable()
{
      char *cpName;
      char *cpFile;
      char *cpDescription;
      long laddress;
      long lstatus;
      Q_HEAD          *pconfig;
      Q_ELEM          *pconfig_elem;
      CONFIGTABLE sTable, *pTable;

pQConfig = NULL;
      pQConfig = &sConfig;
```

APPENDIX A — PAGE 267 OF 279

```
        q_newlist(pQConfig);
        pconfig = pQConfig;
        pTable = &sTable;
        vMQ_Log(NULL,NULL,21,"[FRONTEND]    calling    Get
FirstService\n");

/* read the first element in the services */
        if(iMQU_GetFirstService( pMQU_master,&cpName, &laddress,
            &cpDescription, &lstatus, &cpFile) == SUCCESS)
        {
            vMQ_Log(NULL,NULL,21,
                "[F R O N T E N D]      First     Service
n=%s,d=%s,a=%ld,s=%ld,f=%s\n",
                cpName, cpDescription, laddress, lstatus, cpFile);

if((lstatus & MQU_STATUS_DBE) && ( lstatus    &
MQU_STATUS_AVAILABLE))
            {
                strcpy(pTable->caName,cpName);
                strcpy(pTable->caDescription,cpDescription);

/* add this to the q */
                pconfig_elem = q_new(pTable,sizeof(CONFIGTABLE));
                q_atail(pconfig,pconfig_elem);
            }

/* read next avaliable services upto the end */
            while(iMQU_GetNextService(   pMQU_master,    &cpName,
&laddress,
                &cpDescription, &lstatus, &cpFile) == SUCCESS)
            {
#ifdef DEBUG
                vMQ_Log(NULL,NULL,21,
                    "[F R O N T E N D]      Next     Service
n=%s,d=%s,a=%ld,s=%ld,f=%s\n",
                    cpName,  cpDescription,  laddress,  lstatus,
cpFile);
#endif
                /* copy available services to the table */
                if((lstatus & MQU_STATUS_DBE) && ( lstatus &
MQU_STATUS_AVAILABLE))
                {
                    vMQ_Log(NULL,NULL,10,
                        "[F R O N T E N D]     VALIDDBE
n=%s,d=%s,a=%ld,s=%ld,f=%s\n",
                        cpName,    cpDescription,    laddress,
lstatus, cpFile);
                    strcpy(pTable->caName,cpName);
                    strcpy(pTable->caDescription,cpDescription);
                    p   c   o   n   f   i   g   _   e   l   e   m       =
q_new(pTable,sizeof(CONFIGTABLE));
                    q_atail(pconfig,pconfig_elem);
                }
            }
        }
        else
```

```
        {
            vMQ_Log(NULL,NULL,0,"[FRONTEND]    No    Services
available\n");
            vFeHandleTerminate(TERMINATE_NORMAL);
        }
}

/*::::::::::::::::::::::::::::::::::::::::::::::::::::::::::::::::
::::::::::::::
:: Function: sGenerateConfigQuery
::
:: Purpose: Query for the list of valid DBEs write the output
into a file
::          whose filepointer is provided. Returns a count of
valid DBEs.
::
:: Returns:
::
:: Input:
::
:: Output:
::
:: Globals:
::
:: Called Routines:
::
:: Revision:
:: WHO          --WHEN--  WHAT
:: Raju         09/06/94  Original
::::::::::::::::::::::::::::::::::::::::::::::::::::::::::::::::::
:::::::::::::*/ short sGenerateConfigQuery(FILE *fp)
{
        short           count = 0;
        Q_HEAD          *pconfig;
        Q_ELEM          *pconfig_elem;
        CONFIGTABLE *pTable;

pconfig = pQConfig;

/* check if it is the first element in the queue */
        if( pconfig == NULL )
        {
            return 0;
        }

Q_FORWTRAV(pconfig_elem,pconfig)
        {
            count++;
            pTable = (CONFIGTABLE *) q_data(pconfig_elem);

/* .CFG has been added to maintain compatibility with
phase 0 */
```

```
            fprintf( fp, "%s:%s.CFG\n", pTable->caDescription,
pTable->caName);
    } return count;
}

/*::::::::::::::::::::::::::::::::::::::::::::::::::::::::::::
:::::::::::::::
:: Function: vFeCreatePOIMapping
::
:: Purpose: Reads teh POI Mapping data file and creates a linked
list of
::              mapping infromation.
::
:: Returns: None
::
:: Input: None,  Name of poimapping data file name in global
variable.
::
:: Output: None
::
:: Globals:    Creates a linked list of POI mapping information.
::
:: Called Routines: None
::
:: Revision:
:: WHO           --WHEN--  WHAT
:: Raju          03/29/95  Original
::::::::::::::::::::::::::::::::::::::::::::::::::::::::::::::
::::::::::::::*/ void vFeCreatePOIMapping()
{
    FILE            *pFp;
    Q_ELEM          *pqe;
    POIMAP          sPOIMap;
    char            caBuff[BUFF_SIZE];
    char            *cp;

/* create a POI list */
    q_newlist(&qhPOIMap);

/* Open the POI mapping file */
    if((pFp = fopen(cpPOIMapConfig,"r")) == NULL)
    {
        vMQ_Log(NULL,NULL,0,
                "[FRONTEND] Unable to open POIMap file <%s>\n",
cpPOIMapConfig);
        return;
    }

/* read the data and build a q of POI Mappings */
    while(fgets(caBuff,sizeof(caBuff)-1,pFp) != NULL)
    {
```

```
        /* Format of the POI Mapping file */
        /* Comments are allowed with first character "#" */
        /* In all other cases First four characters in each line
refers */
        /* to External name.  The fifth character is the
delimiter ':' */
        /* and all charecters after the delimiter upto newline
is the   */
        /* internal name. Each mapping should be in one line. */
        /* Ex:  AIRP:AIRPORT  */

/* This is a comment */
        if( caBuff[0] == '#' )
            continue;

/* First four characters is the external name */
        strncpy( sPOIMap.caExtName, caBuff, 4);
        sPOIMap.caExtName[4] = '\0';

/* External and internal names are separated by ':' */
        if( (cp = strstr(caBuff, ":")) == NULL)
        {
           vMQ_Log(NULL,NULL,0, "[FRONTEND] Error in POI Mapping
file\n");
            break;
        }
        cp++;

/* Rest of the line up to newline constitutes the
internal name */
        strcpy(sPOIMap.caIntName, cp);
        sPOIMap.caIntName[strlen(sPOIMap.caIntName) - 1] = '\0';

/* Add the mapping to the queue */
        pqe = (Q_ELEM *)q_new(&sPOIMap, sizeof(POIMAP));
        q_atail(&qhPOIMap,pqe);
    }

/* Close the POI mapping file */
    fclose(pFp);
    return;
}

/*::::::::::::::::::::::::::::::::::::::::::::::::::::::::::::::
:::::::::::::::
:: Function: sFeFindPOIMapping
::
:: Purpose: Traverses through the linked list of External to
Internal POI
::          mapping infromation.  If there is a match the
internal name
::          is sent in the output parameter.
::
:: Returns: SUCCESS if POI Mapping is found,  FAILURE otherwise.
::
```

```
:: Input: External name of POI.
::
:: Output:     Internal name of POI if SUCCESS.
::
:: Globals: Linked list of POI mapping information.
::
:: Called Routines: None.
::
:: Revision:
:: WHO           --WHEN--   WHAT
:: Raju          03/29/95   Original
::::::::::::::::::::::::::::::::::::::::::::::::::::::::::::
::::::::::::::*/ short sFeFindPOIMapping( cpPOIName, cpIntname )
char    *cpPOIName;
char    *cpIntname;
{
    char            *cp;
    Q_ELEM          *pqe;
    POIMAP          *pPOIMap;

/* Traverse the queue */
    Q_FORWTRAV(pqe,&qhPOIMap)
    {
        pPOIMap = (POIMAP *) q_data(pqe);

/* check if the queue element External name matches with
the */
        /* supplied name */ if(strncmp(pPOIMap->caExtName,cpPOIName,strlen(cpPOIName)) == 0)
        {
            /* Match has been found and the internal name is
returned */
            /* back in the output parameter */
            strcpy(cpIntname, pPOIMap->caIntName);
            return(SUCCESS);
        }
    }

/* Supplied name does not match with any mapping */
    return(FAILURE);
}
```

APPENDIX A — PAGE 272 OF 279

```c
/* Copyright (C) 1994,1995 SEI Information Technology, Inc. */
/*:::::::::::::::::::::::::::::::::::::::::::::::::::::::::::
:::::::::::::::::
:: Filename:        ids_defs.h
:: Purpose:              General program defines.
:: Revision:        08/31/94      RPD        Original
:::::::::::::::::::::::::::::::::::::::::::::::::::::::::::::
:::::::::::::::*/
#ifndef _IDS_DEFS_H
define _IDS_DEFS_H ifdef _WINDOWS
include <windows.h>
#define   SPRINTF       wsprintf
#ifdef _WINDLL
#define FUNC_DECL    __pascal __loadds
#else                   /* _WINDLL */
#define FUNC_DECL
#endif                  /* _WINDLL */
#else                   /* _WINDOWS */
#define   SPRINTF       sprintf
#define FUNC_DECL
#define min(a,b)     (((a) < (b)) ? (a) : (b))
#endif                  /* _WINDOWS */

/*
 * Basic Type defines:
 */
#define CHAR            char
#define UCHAR           unsigned char
#define SHORT           short
#define USHORT          unsigned short
#define INT                 int
#define UINT            unsigned int
#define LONG            long
#define ULONG           unsigned long
#define VOID            void
#define BYTE            unsigned char
#define DOUBLE          double
#define FLOAT           float
#ifndef BOOL
#define BOOL            int
endif    /* BOOL */ define STRCAT          strcat
define STRCHR          strchr
#define STRCMP          strcmp
#define STRCPY          strcpy
#define   STRLEN            strlen
#define STRNCAT             strncat
#define STRNCMP             strncmp
#define STRNCPY             strncpy
#define STRSTR          strstr
#define STRTOL          strtol
```

APPENDIX A — PAGE 273 OF 279

```
/*
 * Public defines:
 */
#ifndef TRUE
#define TRUE                            1
endif   /* TRUE */ ifndef FALSE
define FALSE                           0
endif   /* FALSE */ define SUCCESS                                 0
define FAILURE                                -1
define ABORT                           1 endif   /* _IDS_DEFS_H */
```

```
/*
 cvs id:   $Id: ut_parse.h,v 1.2 1995/04/27 20:38:16 rajub Exp $
 source:   $Source: /ids/cvs/host/libut/src/ut_parse.h,v $
*/
/* Copyright (C) 1994,1995 SEI Information Technology, Inc. */ typedef  struct    {
     short     rank;
     short     x[3];
     short     y[3];
     }    VB_ARMS;
```

```c
static   char *  _sccs_ =   { "    $ S o u r c e :
/ids/cvs/host/libut/src/ut_vlog.c,v $ Ver: $Revision: 1.1 $ Date:
$Date: 1994/12/20 16:19:09 $"};
/* Copyright (C) 1994,1995 SEI Information Technology, Inc. */

/*:::::::::::::::::::::::::::::::::::::::::::::::::::::::::::::
::::::::::
:: Filename:    ut_vlog.c
::
:: Purpose:     Provides the vLog function
::
:: Revision:
:: WHO    --WHEN--  WHAT
:: DAB    07/22/94  Creation
::
:::::::::::::::::::::::::::::::::::::::::::::::::::::::::::::::
:::::::::*/ include  <stdio.h>
include  <stdlib.h>
#include  <stdarg.h>
include  <time.h> extern    int   iDebug;

/***************************************************************
************
                                                            
 vLog:    Log info for debug purposes                       
                                                            
***************************************************************
**********/
void vLog(int tflag, char *format, ... )
{
    va_list       alist;
    FILE     *fp;
    time_t        now;
    struct tm *ptm;

now = time(0L);
    ptm = localtime(&now);

if (iDebug >= tflag)
    {
        va_start(alist, format);

if ((fp = fopen("flog.out", "a")) != (FILE *)NULL)
        {
            /* if (tflag & 1) */
            fprintf(fp,    "[%.5d]    %.2d/%.2d/%.2d %.2d:%.2d:%.2d ",
                        getpid(),
                        ptm->tm_mon+1,
                        ptm->tm_mday,
                        ptm->tm_year,
```

```
                    ptm->tm_hour,
                    ptm->tm_min,
                    ptm->tm_sec);
            vfprintf(fp, format, alist);
            fclose(fp);
        }
    }
}
```

```
static    char *  _ s c c s _  =   { "    $ S o u r c e :
/ids/cvs/host/libut/src/utdispm.c,v $ Ver: $Revision: 1.1 $ Date:
$Date: 1994/12/20 16:19:09 $"};
/* Copyright (C) 1994,1995 SEI Information Technology, Inc. */

/*:::::::::::::::::::::::::::::::::::::::::::::::::::::::::::
:::::::::::
:: Filename:   utdispm.c
::
:: Purpose:       Provide the utility function for message
dispatching
::
:: Revision:
:: WHO     --WHEN--  WHAT
:: DAB   08/03/94   Creation
::
:::::::::::::::::::::::::::::::::::::::::::::::::::::::::::::
::::::::*/ include   <stdlib.h>
include   <stdio.h>
#include   "gdefines.h"
#include   "utdispm.h"
#include   "mq_pub.h"

/*:::::::::::::::::::::::::::::::::::::::::::::::::::::::::::
:::::::::::
:: Function:   sUtDispatchMessage
::
:: Purpose:       Translates from message type and message
subtype to a
::              handler function and calls the function.
::
:: Returns:       SUCCESS if a match is found, otherwise
FAILURE. FAILURE may
::              also be returned if any required parameter
value is invalid.
::
:: Input:    Pointers to QueueWatch, QueueConfig, Dispatch
Table, message
::              data. Values for message type and message
subtype.
::
:: Output:       none
::
:: Globals:      Calls indicated function from dispatch table.
::
:: Revision:
:: WHO     --WHEN--  WHAT
:: DAB   08/03/94   Original
::
:::::::::::::::::::::::::::::::::::::::::::::::::::::::::::::
::::::::*/
```

```
short     sUtDispatchMessage ( pMQ, pMQU, pDTable, lMessageType,
lMessageSubtype,
              pData )
void            *pMQ;
void            *pMQU;
UT_DISPATCHTABLE   *pDTable;
long            lMessageType;
long            lMessageSubtype;
void            *pData;
{
    /* Validate the incoming parameters */
    if (pMQ == NULL || pMQU == NULL || pDTable == NULL)
        return FAILURE;

for ( ; pDTable->vDispatchFunction != NULL; pDTable++ )
    {
        if (  pDTable->lMessageType    ==    (lMessageType  &
MQ_MT_MSGTYPE_MASK) &&
                   (pDTable->lMessageSubtype == lMessageSubtype
||
                   pDTable->lMessageSubtype == -1))
        {
            /* We have a match - execute the function */
            (*(pDTable->vDispatchFunction))(pMQ,    pMQU,
pDTable, lMessageType,
                    lMessageSubtype, pData);
            return SUCCESS;
        }
    }

/* Here becasue there was not match before end of table
marker */
    return FAILURE;
}
```

What is claimed is:

1. A method of transmitting route directions in a compact form, comprising the steps of:
   (a) generating a first set of maneuver arms for providing a graphical representation of a calculated route to be taken by a vehicle through an intersection and geometric representations of a plurality of segments of roads to be traveled about an intersection along the route, wherein the intersection is an origin, and said representations of each of said plurality of segments of roads starts at the origin and radiates outward to an endpoint Xi, Yi to approximate the angles at which the roads approach the intersection, to depict a first intersection on a display, each maneuver arm of the first set of maneuver arms being represented by at least one endpoint;
   (b) generating a second set of maneuver arms to depict a second intersection on a display, each maneuver arm of the second set of maneuver arms being represented by at least one endpoint;
   (c) comparing the proximity of the first intersection and the second intersection and, if the first intersection and the second intersection are within a predetermined range of each other, combining the first set of maneuver arms with the second set of maneuver arms to produce a combined set of endpoints to depict the first set of maneuver arms and the second set of maneuver arms on a common display; and
   (d) transmitting the combined set of endpoints to a remote unit in electromagnetic form.

2. A method of efficiently transmitting routing directions and driving actions, said method comprising the steps of:
   (a) generating a routing direction and a driving action for a user;
   (b) expressing the routing direction and the driving action in at least one of a plurality of tokenized forms, each of said plurality of tokenized forms representing a pre-defined routing direction and driving action in compact form;
   (c) electromagnetically transmitting said at least one of said plurality of tokenized forms to a remote unit;
   (d) receiving said at least one of said plurality of tokenized forms at said remote unit; and
   (e) at said remote unit, expanding said at least one of said plurality of tokenized forms received in step (d) into a textual driving instruction indicating what direction a vehicle should proceed at an intersection and what additional driving action should be taken, for display to a user at said remote unit.

3. A method as set forth in claim 2, further comprising the steps of:
   (f) receiving instructions from said user specifying that textual driving instructions be displayed in one or more languages; and
   (g) at said remote unit, expanding said at least one of said plurality of tokenized forms, received in step (d), into a textual driving instruction for each of said one or more languages specified in step (f).

4. A method as set forth in claim 2, further comprising the steps of:
   (f) in step (c), transmitting a road name to said remote unit along with said one of said plurality of tokenized forms; and
   (g) in step (e), inserting the road name transmitted in step (f) into expanded text corresponding to said at least one of said plurality of tokenized forms received in step (d).

5. A system for generating and transmitting route directions in a compact form, comprising:
   (a) a base unit which
      (i) generates a first set of maneuver arms for providing a gaphical representation of a calculated route to be taken by a vehicle through an intersection and geometric representations of a plurality of segments of roads to be traveled about an intersection along the route, wherein the intersection is an origin and said representations of each of said plurality of segments of roads starts at the origin and radiates outward to an endpoint Xi, Yi to approximate the angles at which the roads approach the intersections, to depict a first intersection on a display, each maneuver arm of the first set of maneuver arms being represented by at least one endpoint,
      (ii) generates a second set of maneuver arms to depict a second intersection on a display, each maneuver arm of the second set of maneuver arms being represented by at least one endpoint, and
      (iii) compares the proximity of the first intersection and the second intersection and, if the first intersection and the second intersection are within a predetermined range of each other, combines the first set of maneuver arms with the second set of maneuver arms to produce a combined set of endpoints to depict the first set of maneuver arms and the second set of maneuver arms on a common display; and
   (b) a communications link to transmit the combined set of endpoints to a remote unit in electromagnetic form.

6. A system for generating and transmitting routing directions comprising:
   (a) a base unit which
      (i) generates a routing direction and driving action for a user and
      (ii) expresses the routing direction and driving action in at least one of a plurality of tokenized forms, each of said plurality of tokenized forms representing a pre-defined routing direction and driving action in compact form;
   (b) a communications link to electromagnetically transmit said at least one of said plurality of tokenized forms; and
   (c) a remote unit which
      (i) receives said at least one of said plurality of tokenized forms from the communications link, and
      (ii) expands said at least one of said plurality of tokenized forms into a textual driving instruction indicating what direction a vehicle should proceed at an intersection and what additional driving action should be taken, for communication to a user at said remote unit.

7. A system as set forth in claim 6, wherein:
   the remote unit receives instructions from the user specifying that textual driving instructions be displayed in one or more languages; and
   the remote unit expands said at least one of said plurality of tokenized forms into a textual driving instruction for each of said one or more languages specified by the user.

8. A system as set forth in claim 6, wherein:
   the communications link transmits a road name to said remote unit along with said one of said plurality of tokenized forms; and
   the remote unit inserts the road name transmitted by the communications link into expanded text corresponding to said at least one of said plurality of tokenized forms.

9. A system as set forth in claim 6, wherein the remote unit includes a display for said communication to said user at said remote unit.

10. A system as set forth in claim 6, wherein the remote unit includes an annunciator for said communication to said user at said remote unit.

11. A method of efficiently transmitting routing directions and driving actions, said method comprising the steps of:

(a) generating a routing direction and driving action for a user;

(b) expressing the routing direction and driving action in at least one of a plurality of tokenized forms, each of said plurality of tokenized forms representing a pre--defined routing direction and driving action in compact form;

(c) electromagnetically transmitting said at least one of said plurality of tokenized forms to a remote unit;

(d) receiving said at least one of said plurality of tokenized forms at said remote unit; and (e) at said remote unit, expanding said at least one of said plurality of tokenized forms received in step (d) into a textual driving instruction indicating what direction a vehicle should proceed at an intersection and what additional driving action should be taken, for annunciation to a user at said remote unit.

* * * * *